US011743213B2

(12) United States Patent
Dalonzo et al.

(10) Patent No.: US 11,743,213 B2
(45) Date of Patent: Aug. 29, 2023

(54) USER INTERFACES FOR MESSAGES

(71) Applicant: Apple Inc., Cupertino, CA (US)

(72) Inventors: Christian X. Dalonzo, San Francisco, CA (US); Zheng Xuan Hong, Sunnyvale, CA (US); Chanaka G. Karunamuni, San Jose, CA (US); Grant R. Paul, San Francisco, CA (US); Christopher D. Matthews, San Francisco, CA (US); Robert Garcia, III, San Francisco, CA (US); Eugene Mitsuo Irinaga Bistolas, San Francisco, CA (US); Conner Joseph Irwin, Cupertino, CA (US); Brandon Otto Young, San Jose, CA (US); Elliot A. Barer, Santa Clara, CA (US); Craig M. Federighi, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/033,405

(22) Filed: Sep. 25, 2020

(65) Prior Publication Data

US 2021/0385175 A1 Dec. 9, 2021

Related U.S. Application Data

(60) Provisional application No. 63/041,994, filed on Jun. 21, 2020, provisional application No. 63/036,927, filed on Jun. 9, 2020.

(51) Int. Cl.

*G06F 3/04817* (2022.01)
*G06F 3/0482* (2013.01)

(Continued)

(52) U.S. Cl.

CPC ............ *H04L 51/04* (2013.01); *G06F 3/0482* (2013.01); *G06F 3/0484* (2013.01);

(Continued)

(58) Field of Classification Search

CPC ....... H04L 51/046; H04L 51/16; H04L 51/36; H04L 51/04; H04L 51/216; H04L 51/56; G06F 3/0482; G06F 3/04817

See application file for complete search history.

(56) References Cited

U.S. PATENT DOCUMENTS 5,533,110 A 7/1996 Pinard et al.
6,323,846 B1 11/2001 Westerman et al.

(Continued)

FOREIGN PATENT DOCUMENTS

JP 2010-134517 A 6/2010
JP 2010-152538 A 7/2010

(Continued)

OTHER PUBLICATIONS

Corrected Notice of Allowance received for U.S. Appl. No. 17/033,424, dated Jun. 14, 2021, 25 pages.

(Continued)

*Primary Examiner* — Tan H Tran

(74) *Attorney, Agent, or Firm* — Kubota & Basol LLP

(57) ABSTRACT

In some embodiments, an electronic device presents representations of messaging conversations. In some embodiments, an electronic device indicates which messages are replies to other messages in a messaging conversation. In some embodiments, an electronic device creates and presents links (e.g., rich links) to contacts in a messaging conversation (e.g., "mentions"). In some embodiments, an electronic device presents indications of messages that are replies to other messages. In some embodiments, an electronic device presents options to create a link (e.g., a rich link) to contacts in a messaging conversation (e.g., "mentions") using a suggested entry user interface element.

15 Claims, 112 Drawing Sheets

(51) Int. Cl.
*H04L 51/04* (2022.01)
*G06F 3/0484* (2022.01)
*H04L 51/046* (2022.01)
*H04L 51/42* (2022.01)
*H04L 51/56* (2022.01)
*H04L 51/216* (2022.01)

(52) U.S. Cl.
CPC ........ *G06F 3/04817* (2013.01); *H04L 51/046* (2013.01); *H04L 51/216* (2022.05); *H04L 51/42* (2022.05); *H04L 51/56* (2022.05)

(56) References Cited

U.S. PATENT DOCUMENTS 6,330,589 B1 12/2001 Kennedy
6,559,863 B1 5/2003 Megiddo
6,570,557 B1 5/2003 Westerman et al.
6,677,932 B1 1/2004 Westerman
6,700,591 B1 3/2004 Sharpe
7,124,164 B1 10/2006 Chemtob
7,213,206 B2 5/2007 Fogg
7,478,129 B1 1/2009 Chemtob
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,662 B2 11/2010 Malik
7,844,914 B2 11/2010 Andre et al.
7,957,762 B2 6/2011 Herz et al.
8,001,184 B2 8/2011 Etgen et al.
8,006,002 B2 8/2011 Kalayjian et al.
8,006,191 B1 8/2011 Anderson
8,239,784 B2 8/2012 Hotelling et al.
8,279,180 B2 10/2012 Hotelling et al.
8,375,307 B2 2/2013 Kim
8,381,135 B2 2/2013 Hotelling et al.
8,479,122 B2 7/2013 Hotelling et al.
8,572,499 B2 10/2013 Lee et al.
8,645,866 B2 2/2014 Nestler et al.
8,719,729 B2 5/2014 Smith et al.
8,762,475 B2 6/2014 Cheung et al.
8,775,957 B2 7/2014 Kim
8,782,561 B2 7/2014 Bae et al.
8,788,603 B2 7/2014 Griffin et al.
8,799,820 B2 8/2014 Pascal et al.
8,805,450 B2 8/2014 Wen et al.
8,806,364 B2 8/2014 Hwang
8,838,180 B2 9/2014 Do
8,869,041 B2 10/2014 Lee et al.
8,930,827 B1 1/2015 Dumans
9,130,893 B2 9/2015 Chang et al.
9,154,605 B2 10/2015 Stovicek et al.
9,251,404 B2 2/2016 Saari et al.
9,258,404 B2 2/2016 Lee et al.
9,348,458 B2 5/2016 Hotelling et al.
9,438,542 B1 9/2016 Chen et al.
9,459,752 B2 10/2016 Wang et al.
9,537,674 B2 1/2017 Freeman et al.
9,596,200 B1 3/2017 Chen et al.
9,628,426 B2 4/2017 Bell et al.
9,632,651 B2 4/2017 Kim et al.
9,654,616 B2 5/2017 Choi et al.
9,749,273 B2 8/2017 Zlatokrilov
9,785,618 B2 10/2017 Fujita et al.
9,933,937 B2 4/2018 Lemay et al.
9,959,037 B2 5/2018 Chaudhri et al.
9,971,500 B2 5/2018 Fang et al.
9,992,150 B2 6/2018 Koolwal et al.
10,097,492 B2 10/2018 Tsuda et al.
10,222,935 B2 3/2019 Vedha
10,225,389 B2 3/2019 Lindberg et al.
10,268,340 B2 4/2019 Chen et al.
10,284,812 B1 5/2019 Van Os et al.
10,332,097 B2 6/2019 Park et al.
10,360,287 B2 7/2019 Lane et al.
10,402,375 B2 9/2019 Jain et al.
10,484,328 B2 11/2019 Kimura et al.
10,511,559 B2 12/2019 Stovicek et al.
10,564,807 B2 2/2020 Yang et al.
10,606,848 B2 3/2020 Kimball et al.
10,620,777 B2 4/2020 Labey
10,620,785 B2 4/2020 Kidron et al.
10,712,939 B2 7/2020 Harada et al.
10,725,626 B2 7/2020 Meixner et al.
10,728,352 B2 7/2020 Song et al.
10,732,793 B2 8/2020 Park et al.
10,747,391 B2 8/2020 Han et al.
11,153,235 B1 10/2021 Dalonzo et al.
2002/0015024 A1 2/2002 Westerman et al.
2004/0015548 A1 1/2004 Lee
2005/0120306 A1 6/2005 Klassen et al.
2005/0190059 A1 9/2005 Wehrenberg
2005/0270307 A1 12/2005 Brouaux
2006/0017692 A1 1/2006 Wehrenberg et al.
2006/0033724 A1 2/2006 Chaudhri et al.
2006/0041629 A1 2/2006 Lira
2006/0168530 A1 7/2006 Muller et al.
2006/0197753 A1 9/2006 Hotelling
2006/0212830 A1 9/2006 Fogg
2006/0253787 A1 11/2006 Fogg
2007/0035513 A1 2/2007 Sherrard et al.
2007/0083827 A1 4/2007 Scott et al.
2007/0282956 A1 12/2007 Staats
2008/0104173 A1 5/2008 Wilcox et al.
2008/0201664 A1 8/2008 O
2008/0216022 A1 9/2008 Lorch et al.
2008/0307322 A1 12/2008 Stochosky et al.
2009/0138806 A1 5/2009 Galvin et al.
2009/0164923 A1 6/2009 Ovi
2009/0193348 A1 7/2009 Banks et al.
2009/0295731 A1 12/2009 Kim et al.
2009/0305732 A1 12/2009 Marcellino et al.
2009/0319619 A1 12/2009 Affronti et al.
2009/0327972 A1 12/2009 Mccann et al.
2010/0017470 A1 1/2010 Hyoung et al.
2010/0050120 A1 2/2010 Ohazama et al.
2010/0095248 A1 4/2010 Karstens
2010/0162138 A1 6/2010 Pascal et al.
2010/0216448 A1 8/2010 Jeon et al.
2010/0273457 A1 10/2010 Freeman et al.
2011/0225539 A1 9/2011 Lee et al.
2011/0231499 A1 9/2011 Stovicek et al.
2011/0246918 A1 10/2011 Henderson
2011/0258275 A1 10/2011 Rao
2012/0124147 A1 5/2012 Hamlin et al.
2012/0185797 A1 7/2012 Thorsen et al.
2012/0260288 A1 10/2012 Fujiki
2013/0047099 A1 2/2013 Markman et al.
2013/0066984 A1 3/2013 Shin
2013/0111356 A1 5/2013 Vasudevan et al.
2013/0125020 A1 5/2013 Lee et al.
2013/0125060 A1 5/2013 Lee et al.
2013/0125061 A1 5/2013 Lee et al.
2013/0125062 A1 5/2013 Lee et al.
2013/0125063 A1 5/2013 Lee et al.
2014/0096033 A1 4/2014 Blair
2014/0245178 A1* 8/2014 Smith ..................... H04L 51/16
715/753
2014/0310365 A1 10/2014 Sample et al.
2015/0002304 A1 1/2015 Sun et al.
2015/0089400 A1 3/2015 Staats
2016/0050165 A1 2/2016 Thomas et al.
2016/0065519 A1* 3/2016 Waltermann ............ H04L 67/10
709/206
2016/0077708 A1 3/2016 Han et al.
2016/0154556 A1 6/2016 Cheung et al.
2016/0328140 A1 11/2016 Zhang
2016/0364368 A1* 12/2016 Chen ..................... G06F 3/0482
2017/0003840 A1 1/2017 Utsuki et al.
2017/0005977 A1 1/2017 Snabl
2017/0054664 A1* 2/2017 Lee ......................... H04L 51/16
2017/0083168 A1 3/2017 Linner
2017/0109013 A1 4/2017 Hong

(56) References Cited

U.S. PATENT DOCUMENTS

| | | | |
|---|---|---|---|
| 2017/0142039 A1 | 5/2017 | Martinazzi et al. | |
| 2017/0142055 A1 | 5/2017 | Martinazzi et al. | |
| 2017/0169125 A1 | 6/2017 | Greco et al. | |
| 2017/0180299 A1 | 6/2017 | Garza | |
| 2017/0293623 A1 | 10/2017 | Kimball et al. | |
| 2017/0329779 A1 | 11/2017 | Lewin-Eytan et al. | |
| 2017/0336926 A1* | 11/2017 | Chaudhri | G06F 3/0412 |
| 2017/0353414 A1* | 12/2017 | Ertmann | H04L 51/32 |
| 2017/0357394 A1 | 12/2017 | Jon et al. | |
| 2018/0046333 A1 | 2/2018 | Klassen et al. | |
| 2018/0063040 A1 | 3/2018 | Rensburg | |
| 2018/0095940 A1 | 4/2018 | Meixner et al. | |
| 2018/0107342 A1 | 4/2018 | Deets, Jr. | |
| 2018/0109475 A1 | 4/2018 | Griffin et al. | |
| 2018/0121034 A1 | 5/2018 | Baker et al. | |
| 2018/0335928 A1 | 11/2018 | Van Os et al. | |
| 2018/0351903 A1 | 12/2018 | Allen et al. | |
| 2018/0352393 A1 | 12/2018 | Lottermoser et al. | |
| 2019/0044898 A1 | 2/2019 | Shioya et al. | |
| 2019/0058680 A1 | 2/2019 | Rosania et al. | |
| 2019/0097964 A1 | 3/2019 | Martinazzi et al. | |
| 2019/0132405 A1 | 5/2019 | Song et al. | |
| 2019/0138160 A1 | 5/2019 | Deets et al. | |
| 2019/0138174 A1 | 5/2019 | Deets et al. | |
| 2019/0171338 A1 | 6/2019 | Voss et al. | |
| 2019/0173811 A1* | 6/2019 | Estrada | H04L 51/02 |
| 2019/0245821 A1 | 8/2019 | Crowe et al. | |
| 2020/0012419 A1 | 1/2020 | Yang et al. | |
| 2020/0026783 A1* | 1/2020 | Watanabe | H04L 67/2804 |
| 2020/0028815 A1 | 1/2020 | He et al. | |
| 2020/0133463 A1 | 4/2020 | Sun et al. | |
| 2020/0285663 A1* | 9/2020 | Karn | G06F 40/258 |
| 2021/0385184 A1 | 12/2021 | Dalonzo et al. | |
| 2022/0150195 A1 | 5/2022 | Chaudhri et al. | |

FOREIGN PATENT DOCUMENTS

| | | | |
|---|---|---|---|
| JP | 2014-67358 | A | 4/2014 |
| JP | 2017-211968 | A | 11/2017 |
| JP | 2018-60508 | A | 4/2018 |
| JP | 2020-57382 | A | 4/2020 |
| KR | 10-2013-0097970 | A | 9/2013 |
| KR | 10-2014-0065075 | A | 5/2014 |
| KR | 10-2014-0104286 | A | 8/2014 |
| KR | 10-2015-0108324 | A | 9/2015 |
| KR | 10-1614287 | B1 | 4/2016 |
| KR | 10-2017-0033183 | A | 3/2017 |
| KR | 10-2018-0017227 | A | 2/2018 |
| KR | 10-1910581 | B1 | 10/2018 |
| KR | 10-2019-0082998 | A | 7/2019 |
| KR | 10-2020-0061677 | A | 6/2020 |
| WO | 2013/169849 | A2 | 11/2013 |
| WO | 2014/105276 | A1 | 7/2014 |

OTHER PUBLICATIONS

Corrected Notice of Allowance received for U.S. Appl. No. 17/033,424, dated Mar. 1, 2021, 21 pages.

Final Office Action received for U.S. Appl. No. 17/033,369, dated Apr. 21, 2021, 33 pages.

Non-Final Office Action received for U.S. Appl. No. 17/033,369, dated Jan. 7, 2021, 35 pages.

Non-Final Office Action received for U.S. Appl. No. 17/033,369, dated Oct. 29, 2021, 29 pages.

Notice of Allowance received for U.S. Appl. No. 17/033,424, dated Feb. 24, 2021, 24 pages.

Search Report received for Danish Patent Application No. PA202070645, dated Jan. 28, 2021, 4 pages.

Search Report received for Danish Patent Application No. PA202070646, dated Feb. 16, 2021, 4 pages.

Office Action received for Japanese Patent Application No. 2020-160772, dated Dec. 3, 2021, 7 pages (3 pages of English Translation and 4 pages of Official Copy).

"[Marriage Hunting] What describes a typical man?," Girls Channel [online], May 14, 2020 [retrieved on Nov. 24, 2021]. Retrieved from the Internet: <URL:https://girlschannel.net/topics/2683093/>.

"Comments Spontaneously Screenshot on Girl-Chan part 4," Girls Channel [online]. May 23, 2020 [retrieved on Nov. 24, 2021]. Retrieved from the Internet: <URL:https://girlschannel.net/topics/2700443/>.

Final Office Action received for U.S. Appl. No. 17/033,369, dated Jan. 14, 2022, 30 pages.

International Search Report received for PCT Patent Application No. PCT/US2021/036691, dated Oct. 4, 2021, 4 pages.

Corbet, Jonathan, "Gaim Screenshot", LWN.net, Available Online at: <https://lwn.net/Articles/217306/>, [Retrieved Dec. 5, 2022], Jan. 12, 2007, 1 page.

Corbet, Jonathan, "The Grumpy Editor's Guide to Graphical IRC Clients", LWN.net, Available Online at: <https://lwn.net/Articles/216456/>, [Retrieved Dec. 5, 2022], Jan. 16, 2007, pp. 1-13.

* cited by examiner

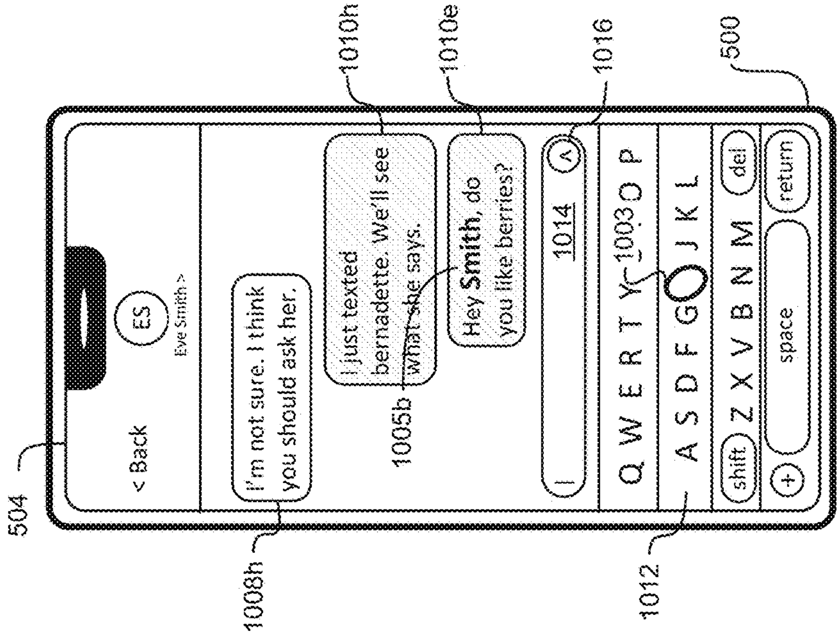
FIG. 10BBB
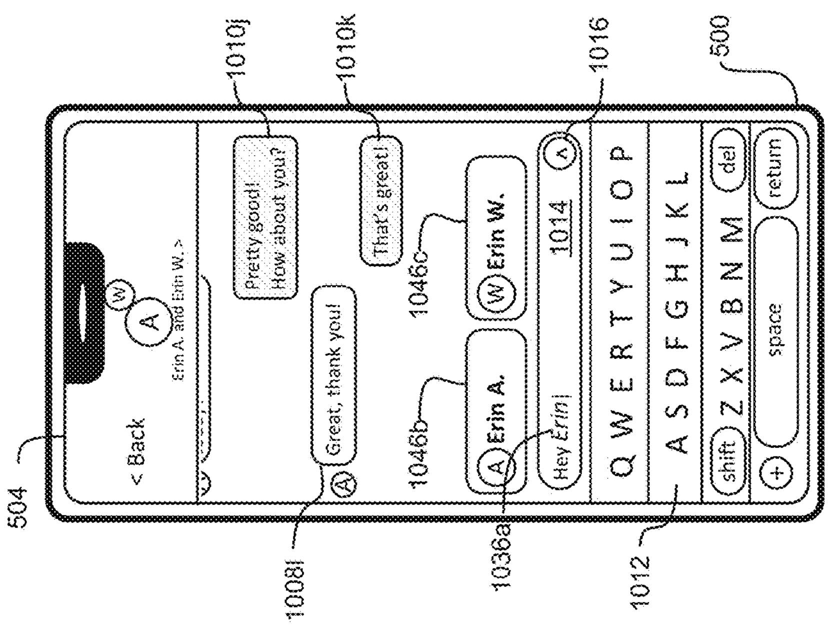
FIG. 10AAA

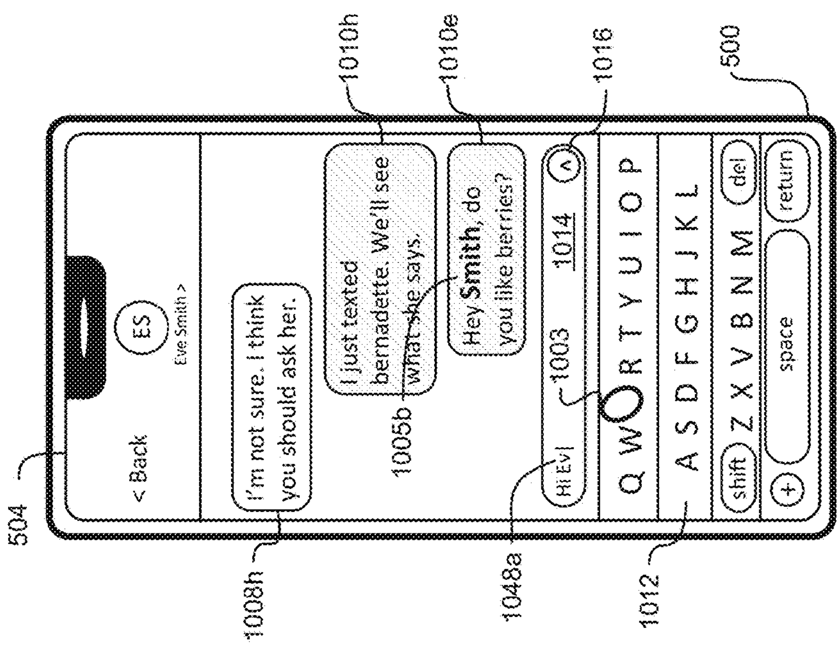
FIG. 10CCC
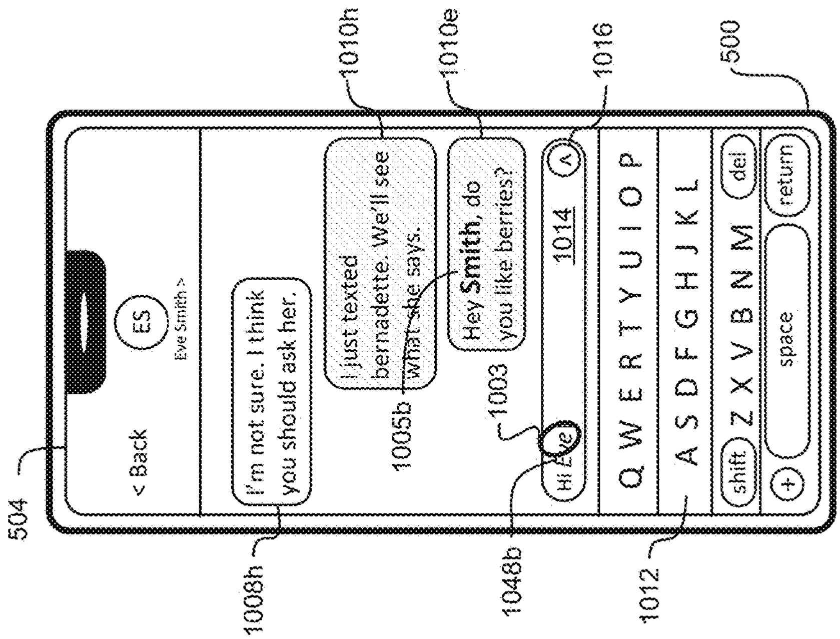
FIG. 10DDD

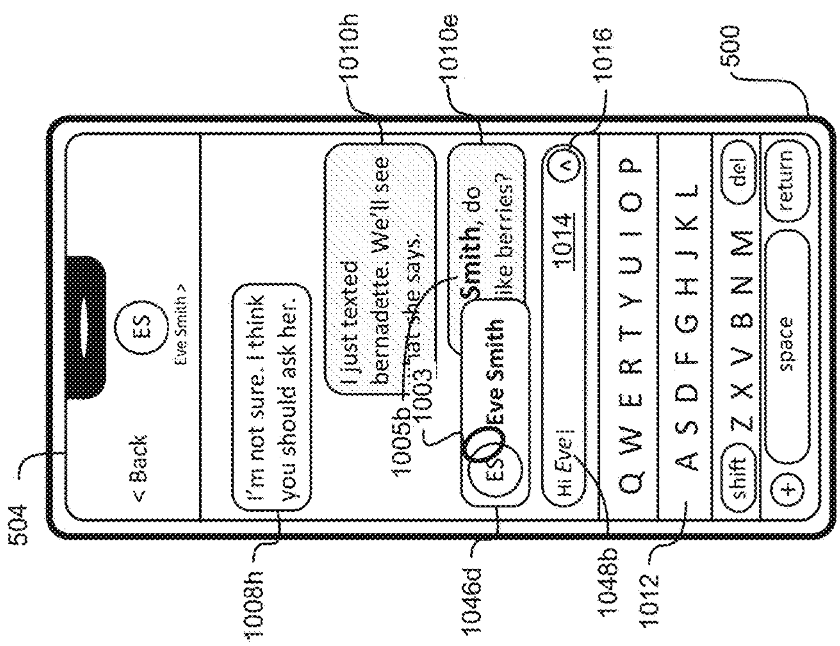
FIG. 10EEE
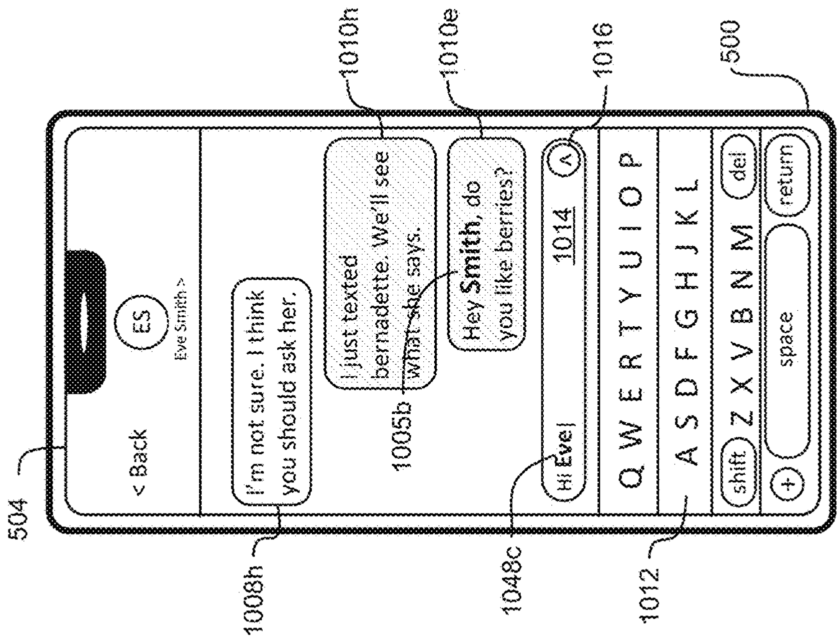
FIG. 10FFF

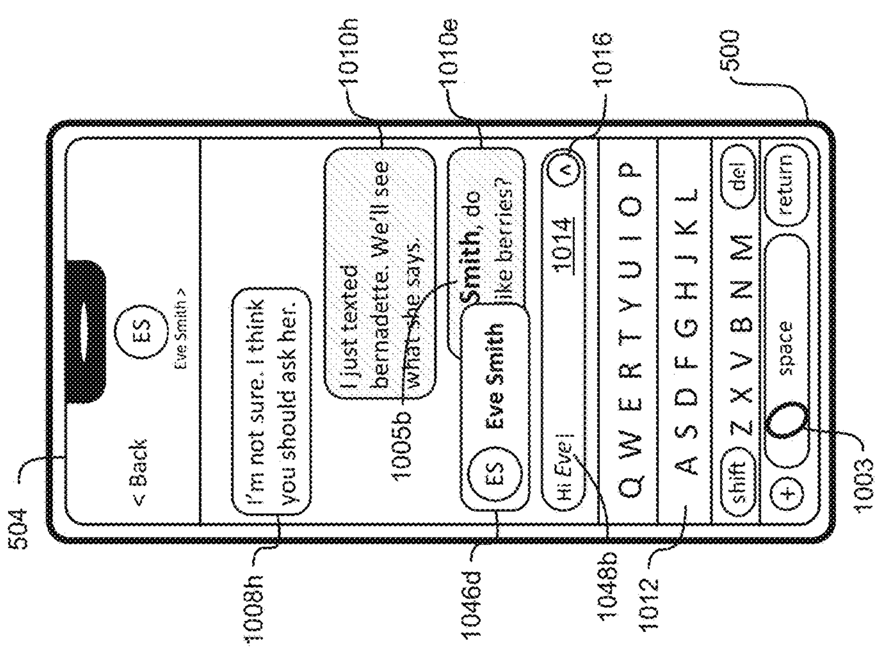
FIG. 10GGG
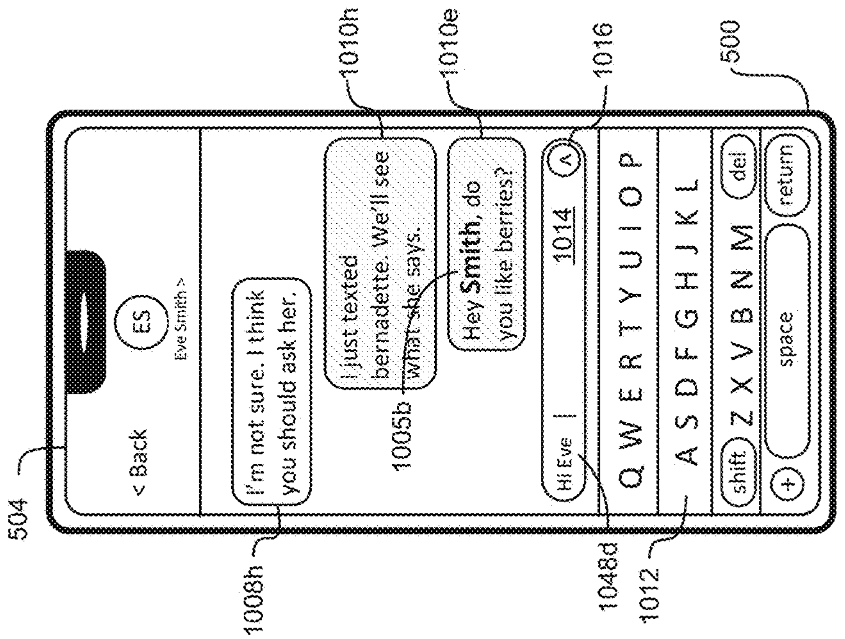
FIG. 10HHH

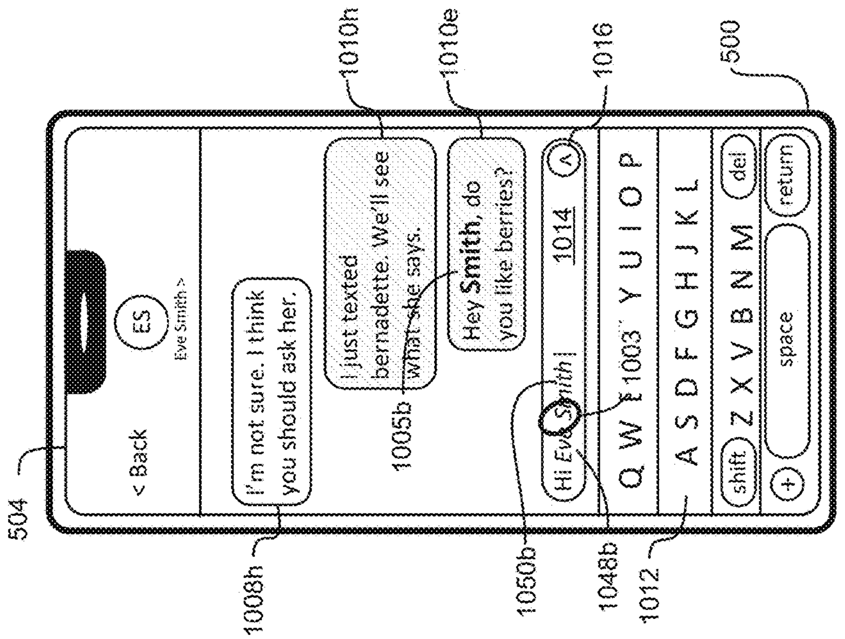
FIG. 10JJJ
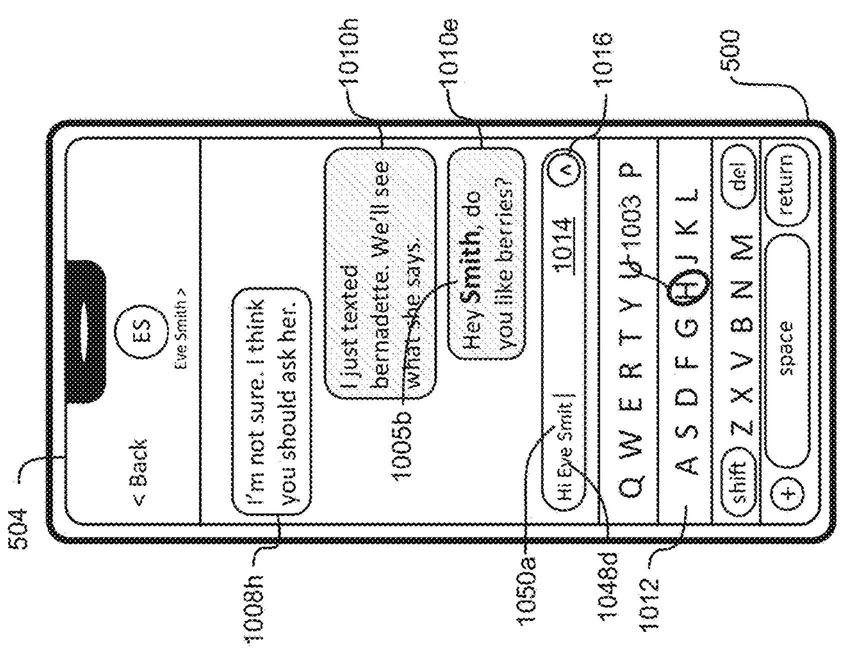
FIG. 10III

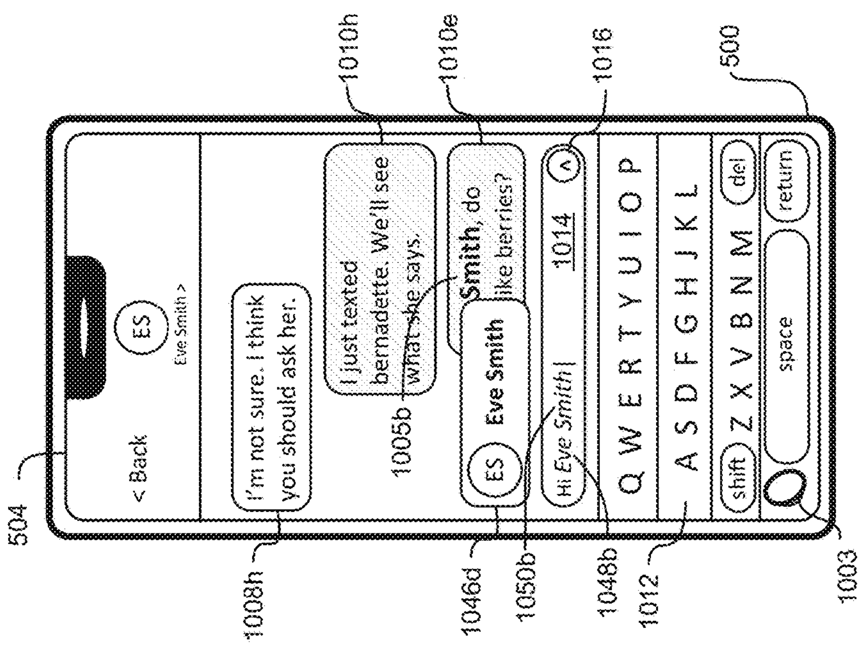
FIG. 10KKK
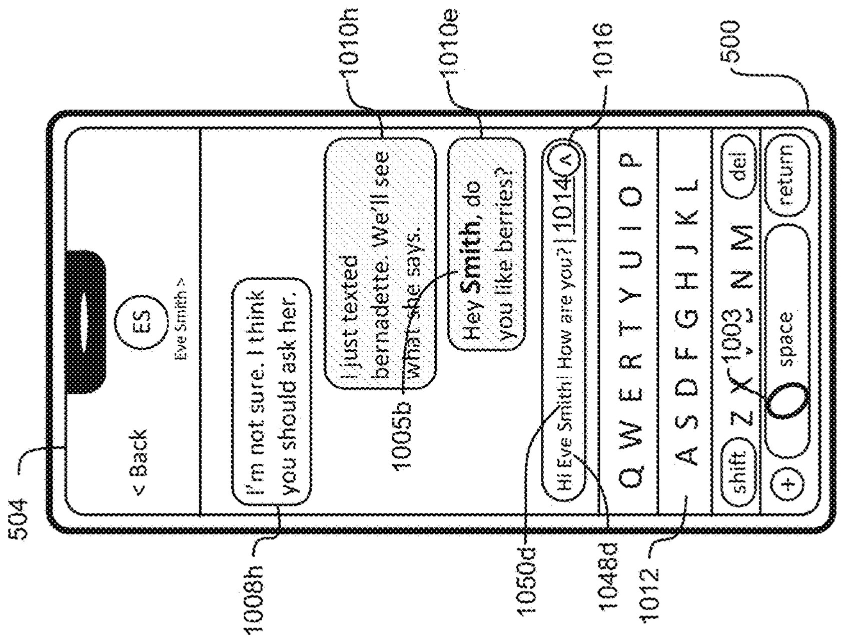
FIG. 10LLL

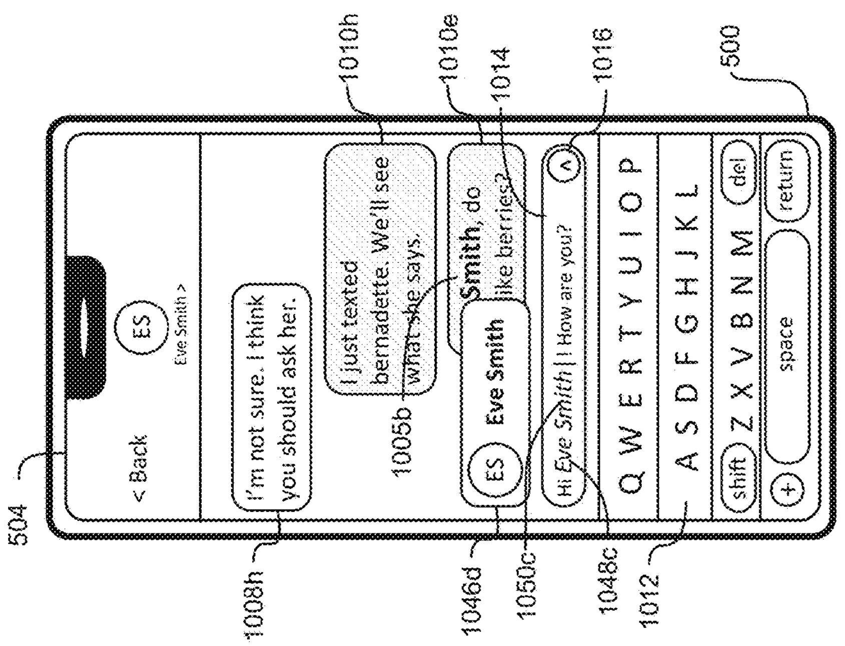
FIG. 10MMM
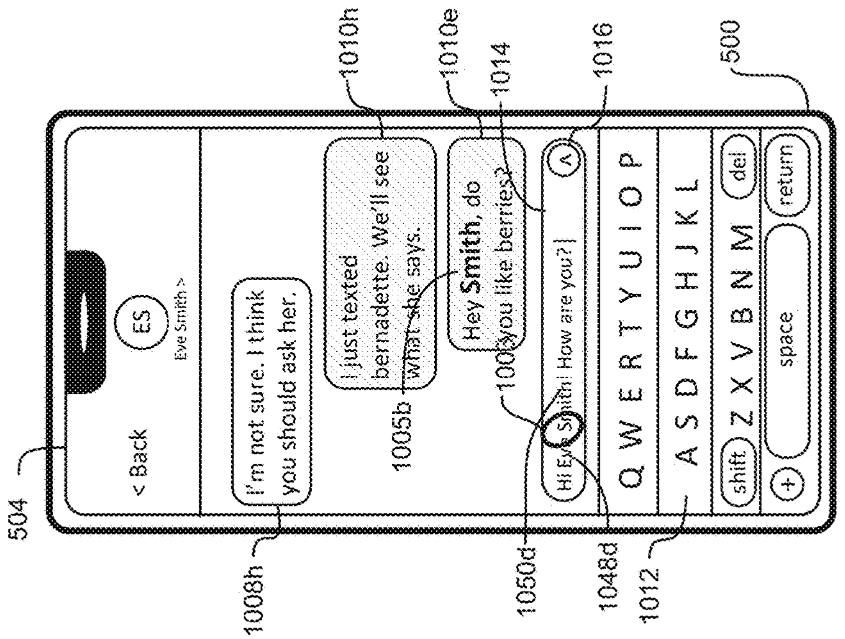
FIG. 10NNN

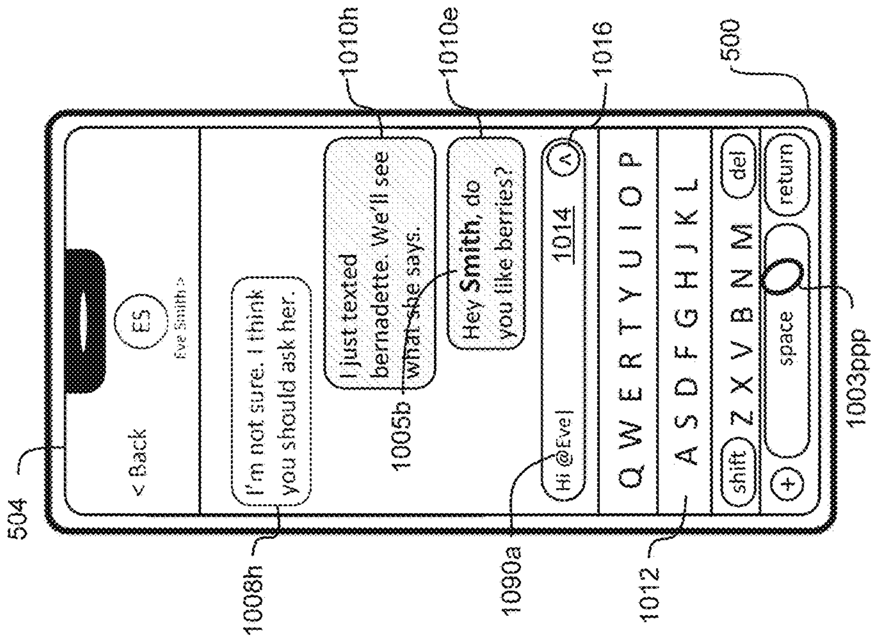
FIG. 10PPP
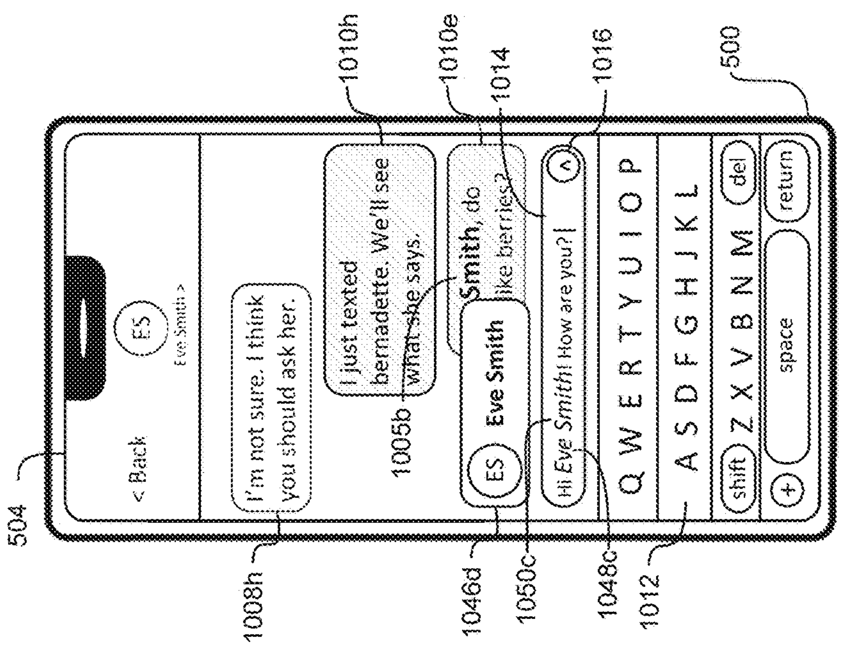
FIG. 10OOO

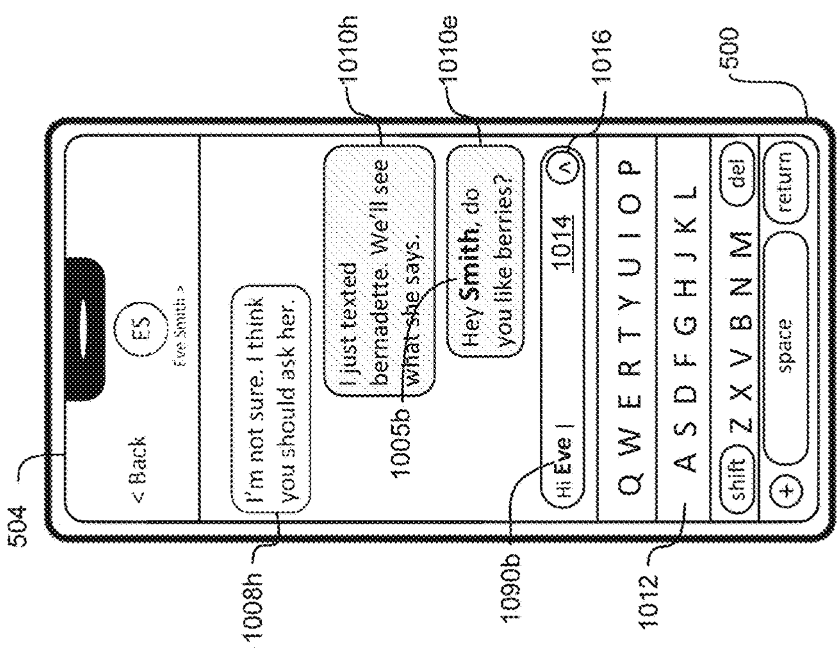
FIG. 10QQQ
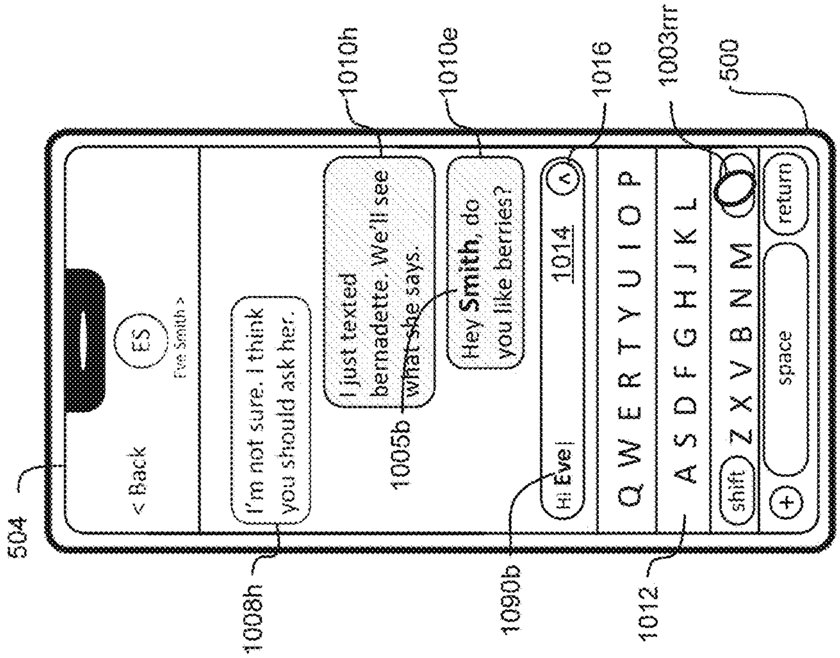
FIG. 10RRR

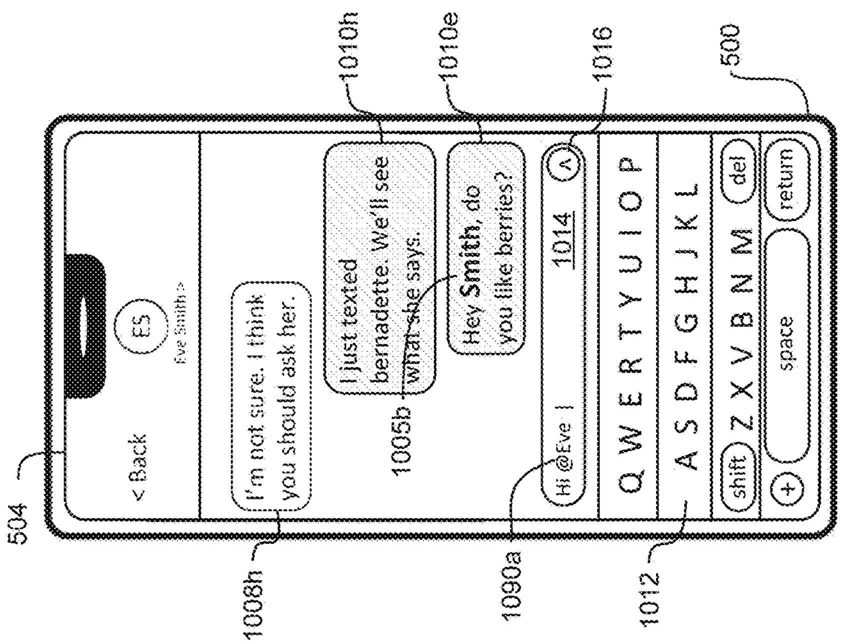
FIG. 10TTT
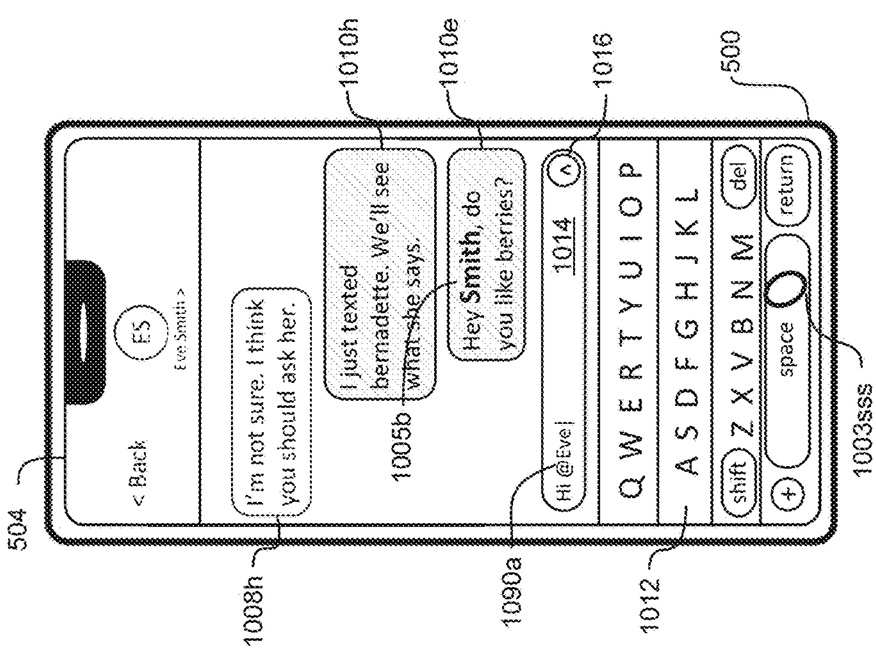
FIG. 10SSS

USER INTERFACES FOR MESSAGES

CROSS-REFERENCE TO RELATED APPLICATIONS

This application claims the priority benefit of U.S. Provisional Application No. 63/036,927, filed Jun. 9, 2020, and U.S. Provisional Application No. 63/041,994, filed Jun. 21, 2020, the contents of which are hereby incorporated by reference in their entireties for all purposes.

FIELD OF THE DISCLOSURE

This specification relates generally to electronic devices that present messaging user interfaces, and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to use electronic devices to send and receive messages. An electronic device can present messaging user interfaces to facilitate doing so.

SUMMARY

Some embodiments described in this disclosure are directed to ways of presenting representations of messaging conversations. Some embodiments described in this disclosure are directed to ways of indicating which messages are important to a user and providing these messages in a prominent, easily accessible place in a user interface. Some embodiments described in this disclosure are directed to ways of creating and presenting links (e.g., rich links) to tag a person in a messaging conversation. Some embodiments described in this disclosure are directed to presenting indications of messages that are replies to other messages. Enhancing messaging interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

DESCRIPTION OF EMBODIMENTS

Figure 1A:
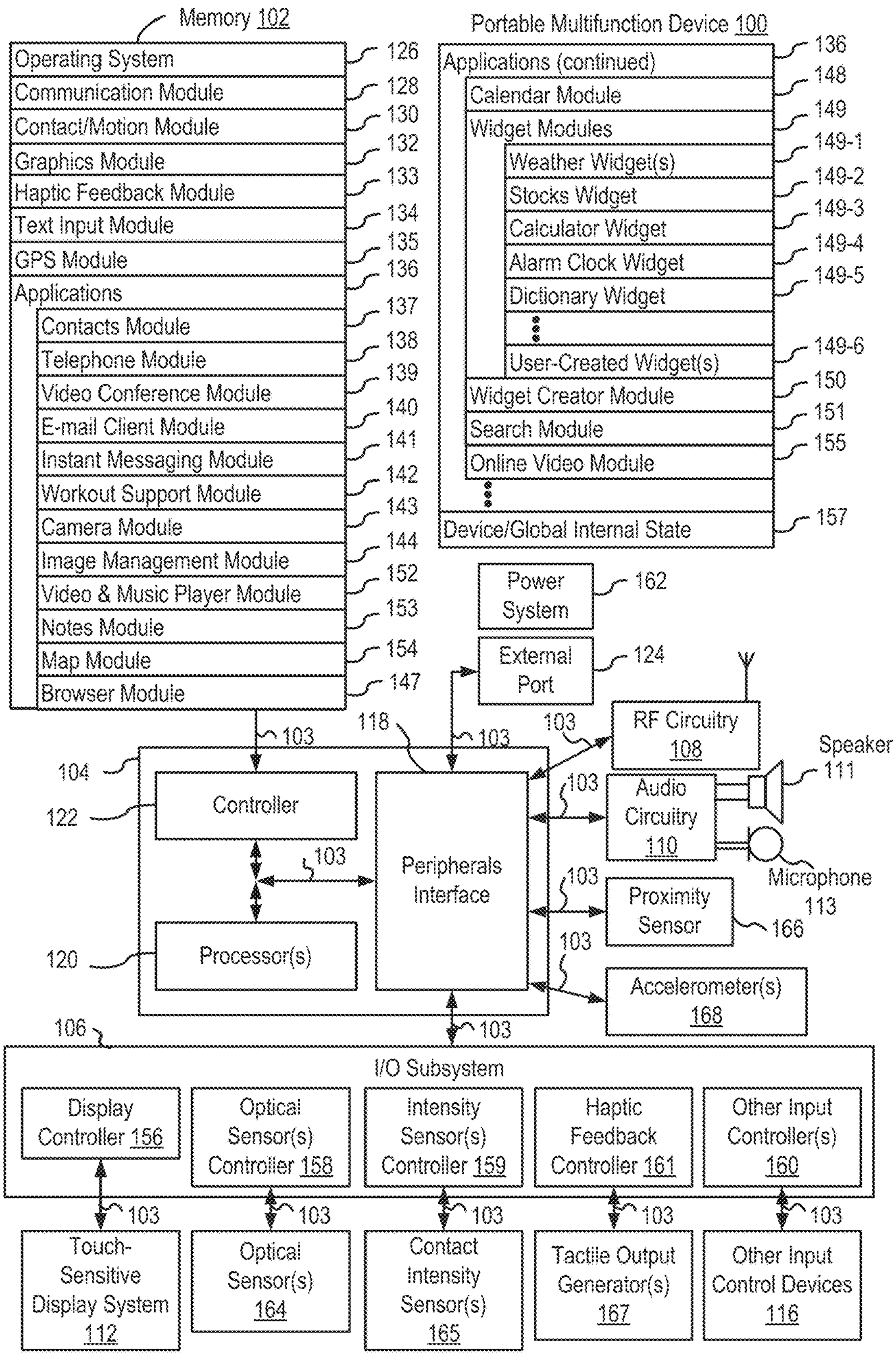
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device presents messaging user interfaces. In some implementations, the messaging user interfaces allow the user to organize representations of messaging conversations in a customized way. In some implementations, the messaging user interfaces allow the user an easy way to view replies to a message within a messaging conversation. In some implementations, the messaging user interfaces allow the user to create and view links (e.g., rich links) to tag a person in a conversation. Such techniques can reduce the cognitive burden on a user who uses an example electronic device. Further, these techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller (s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
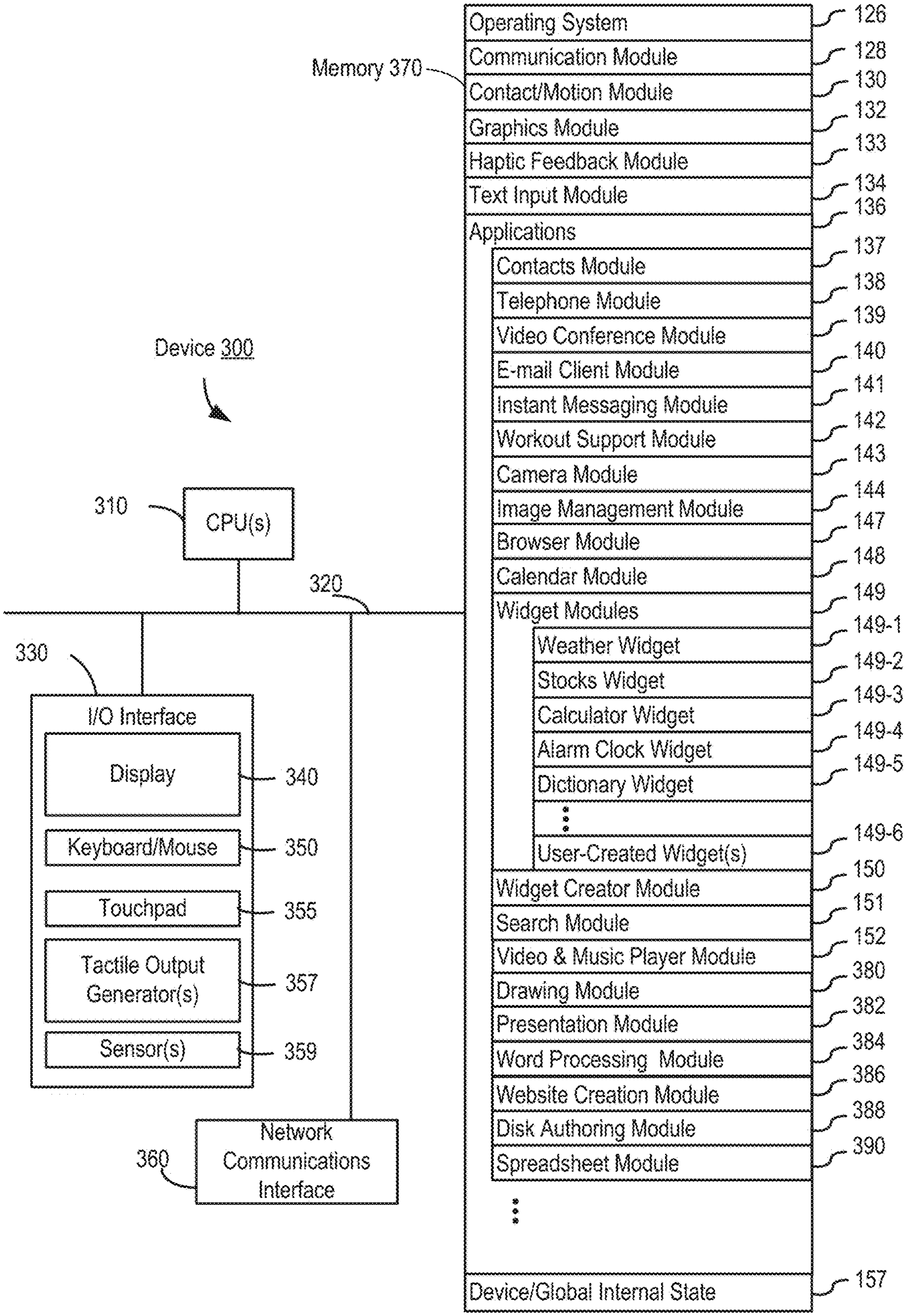
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
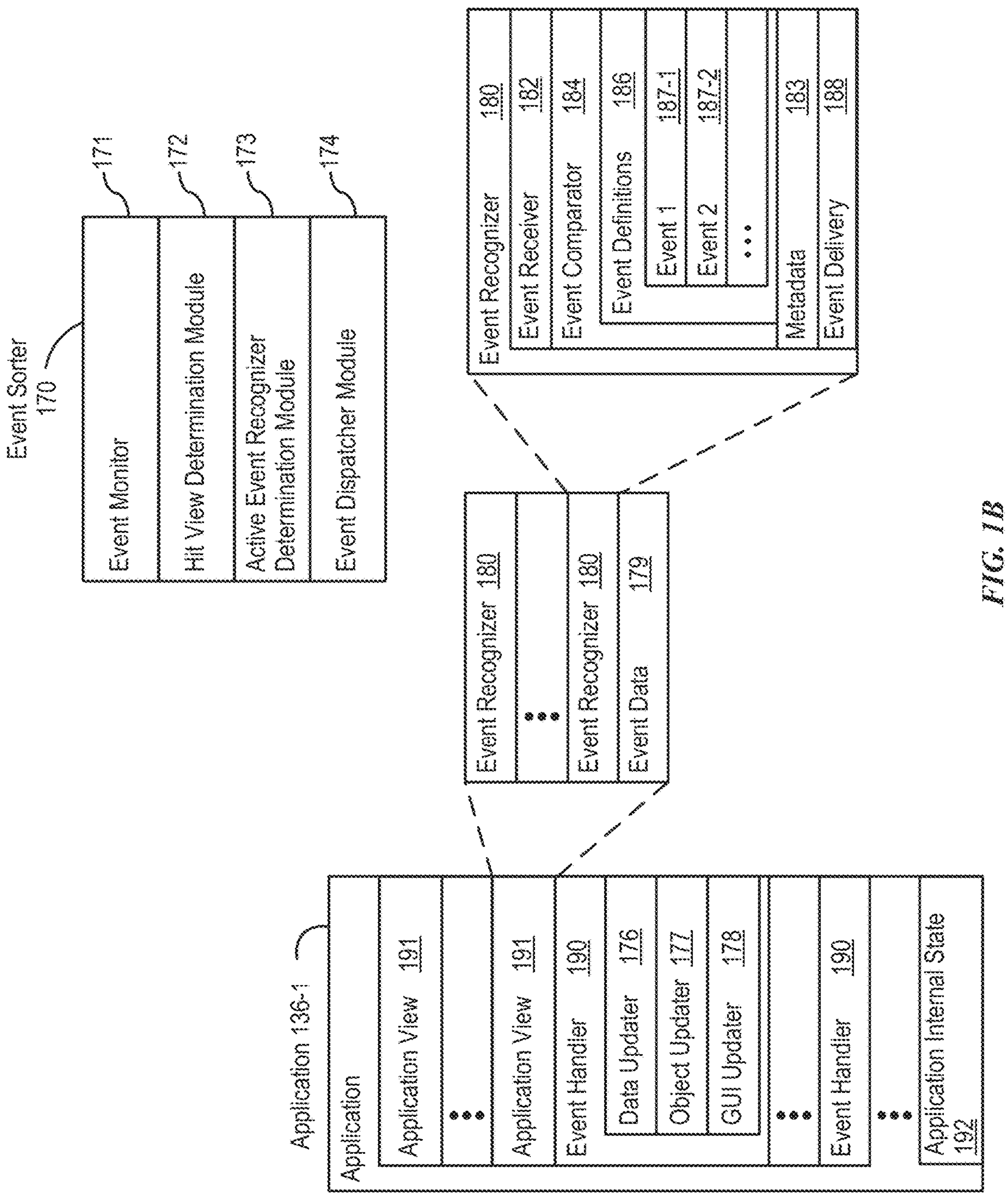
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
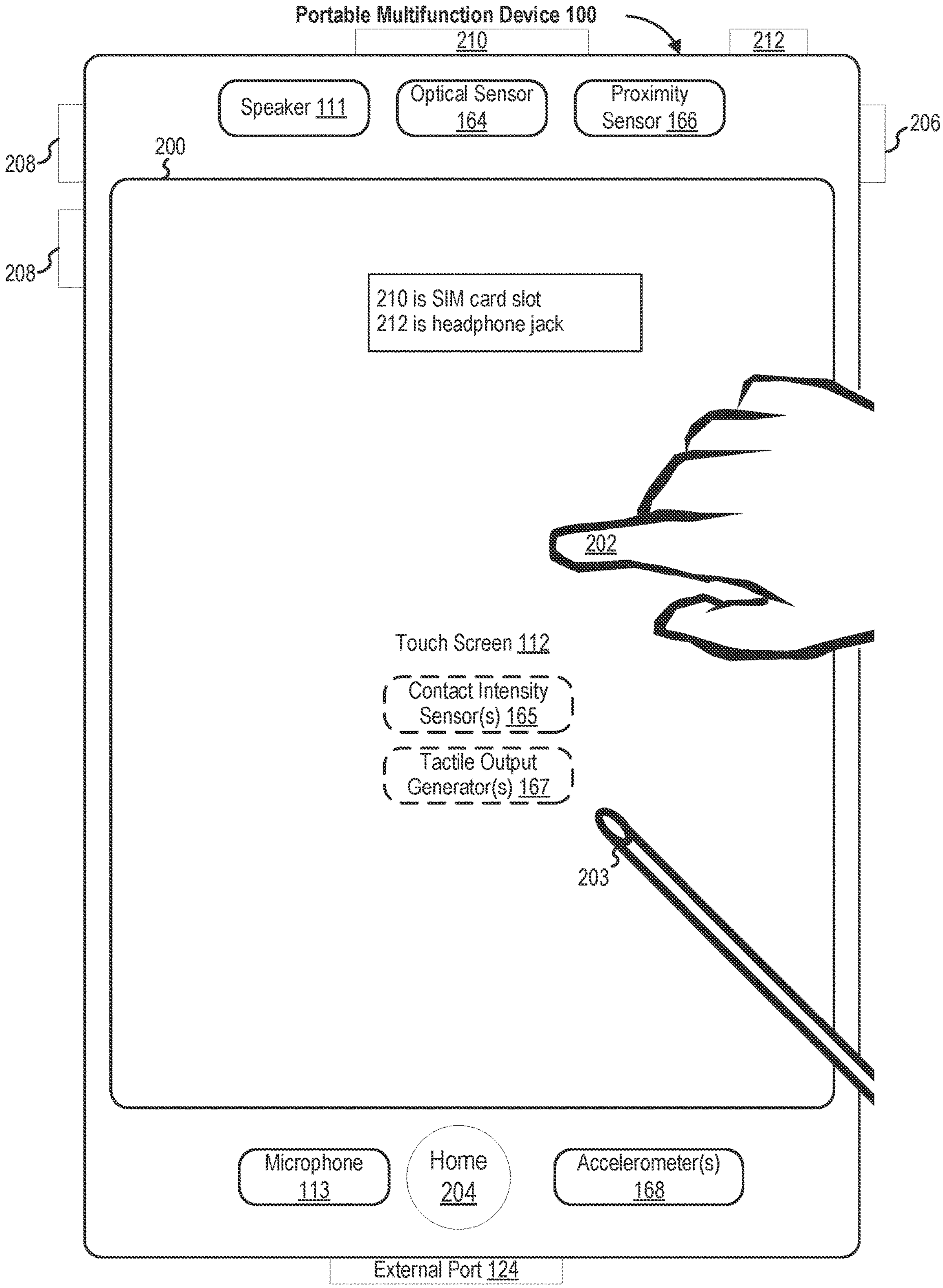
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
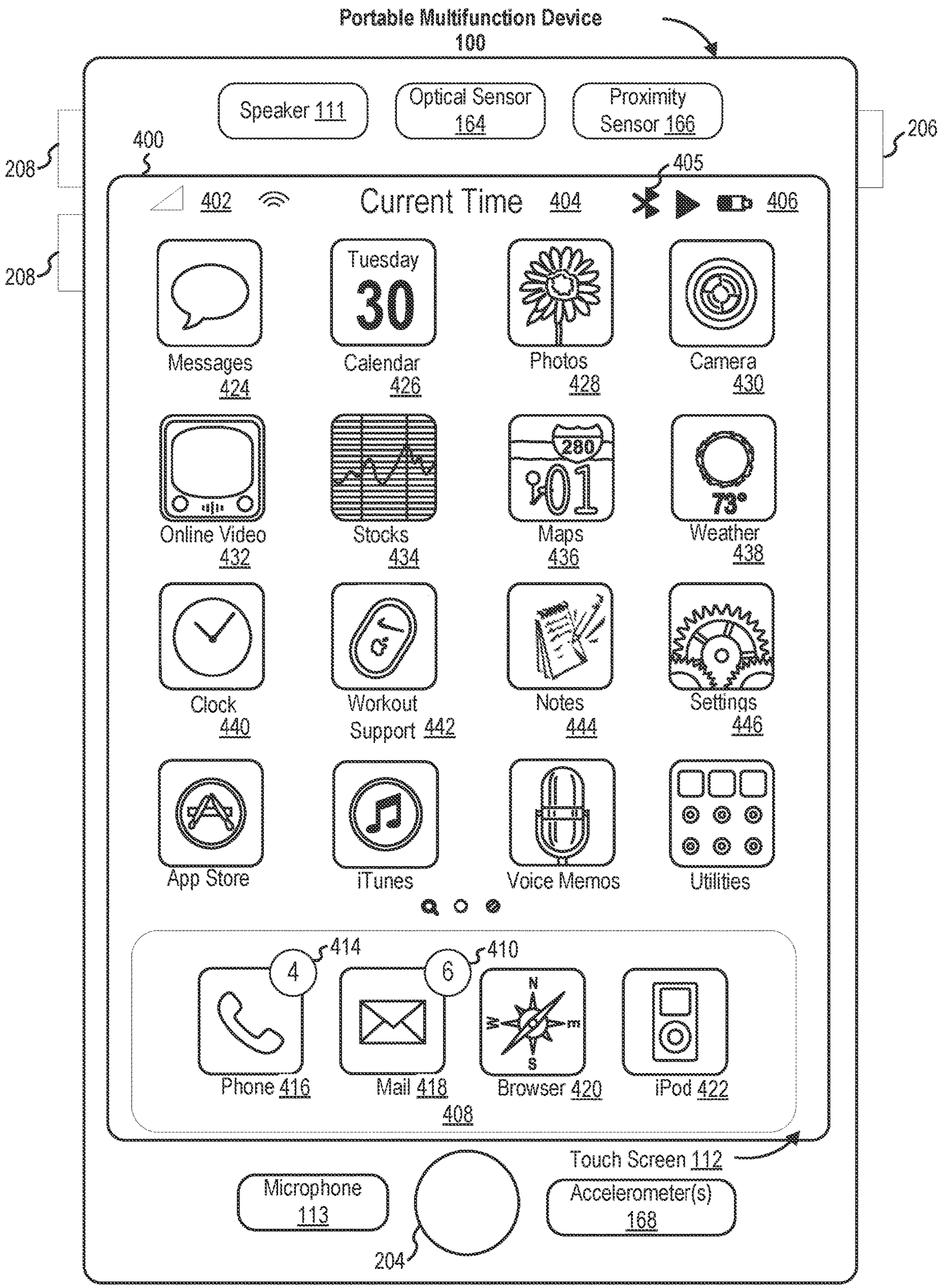
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
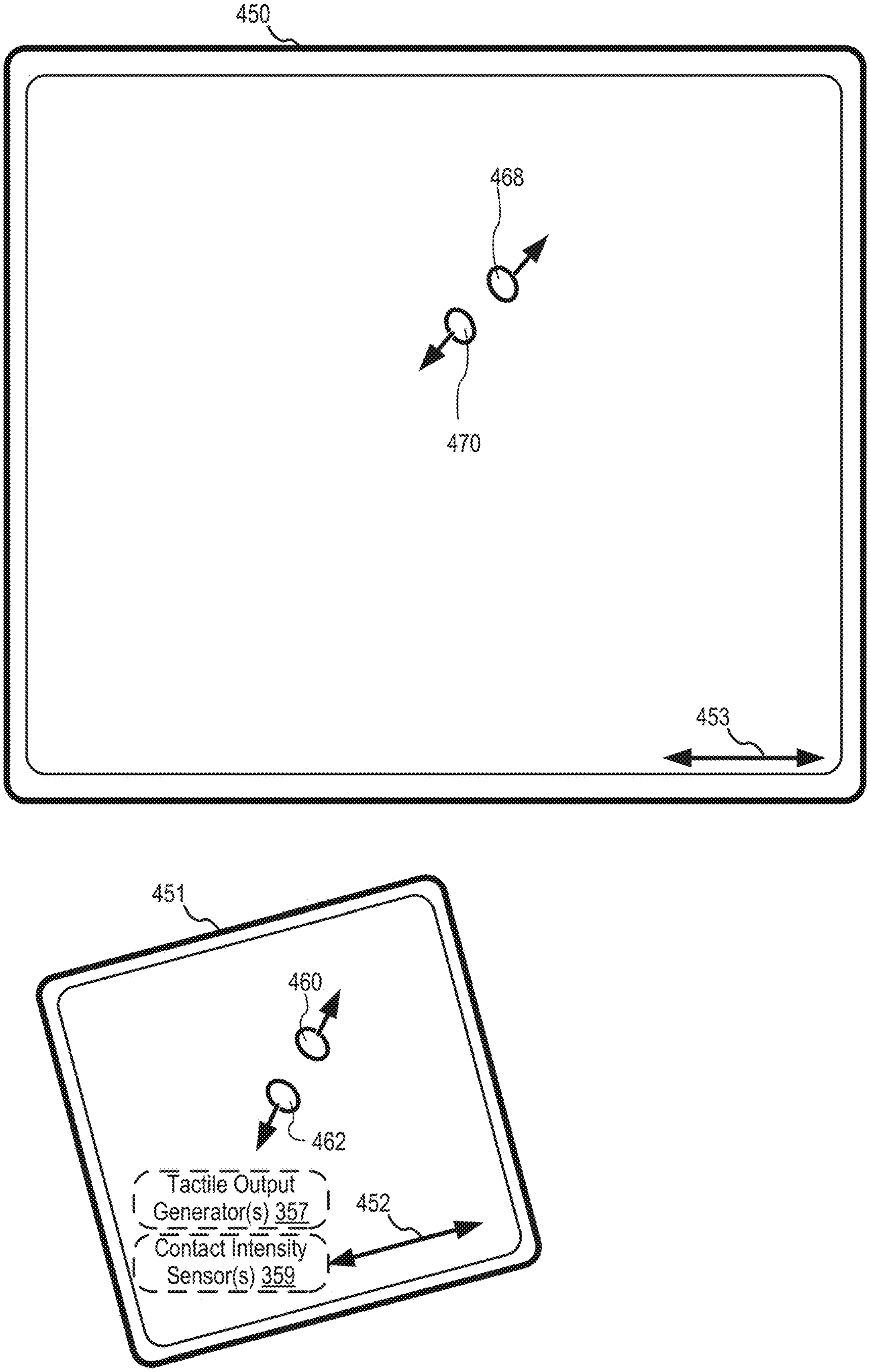
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
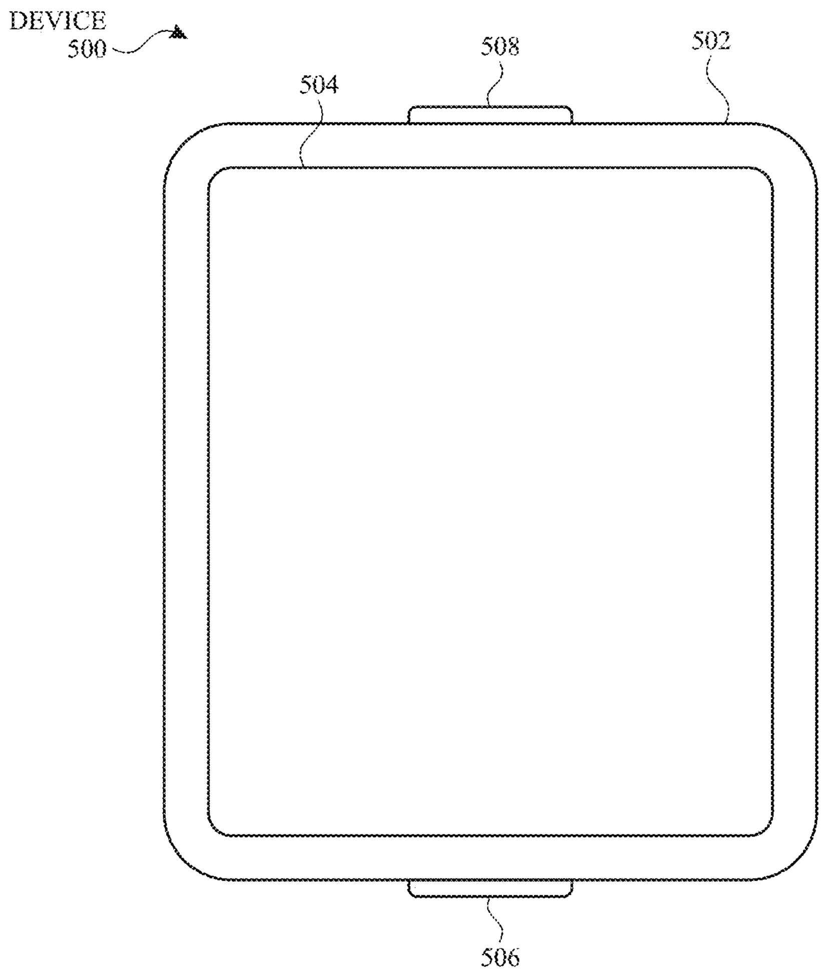
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
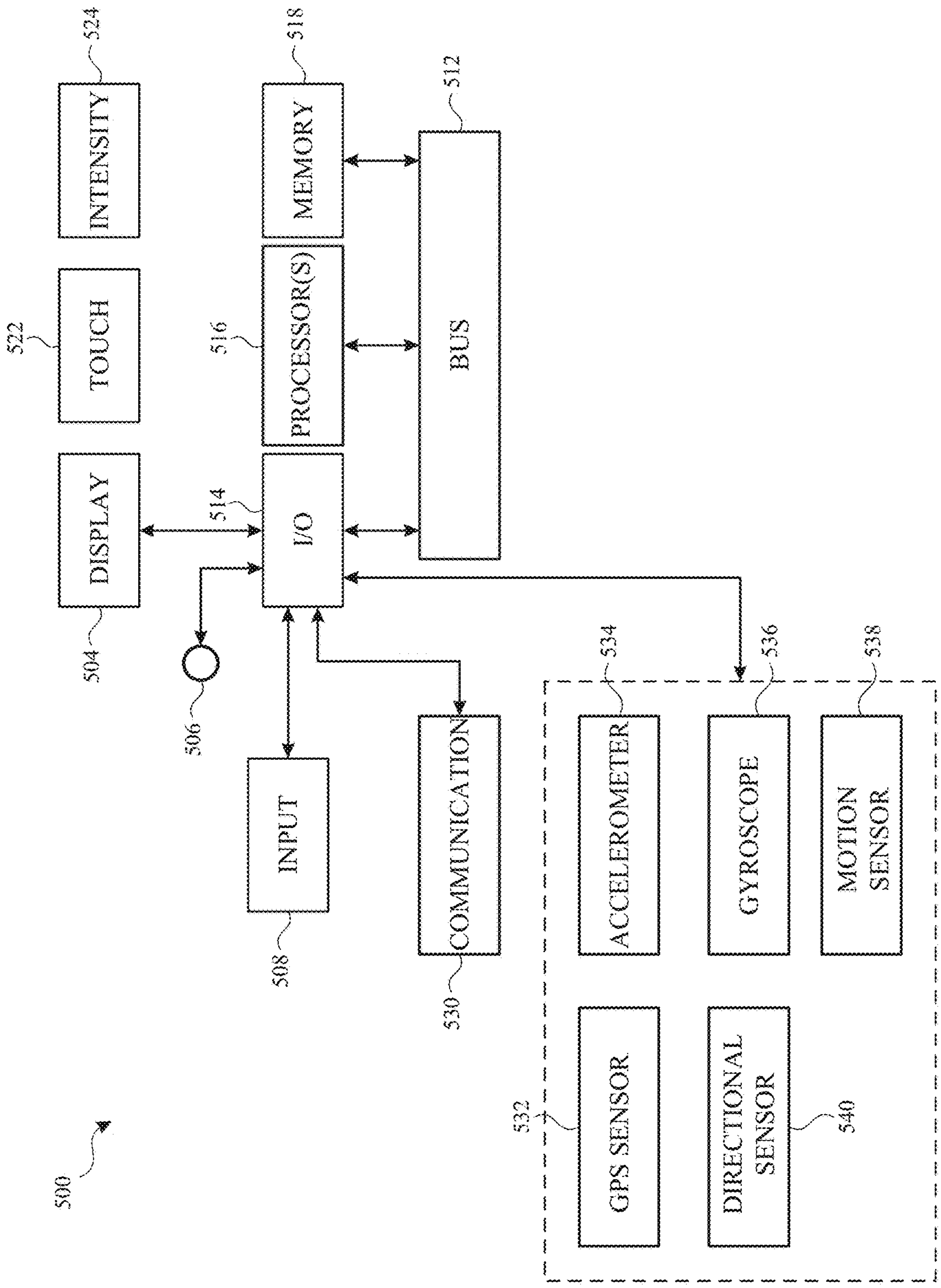
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
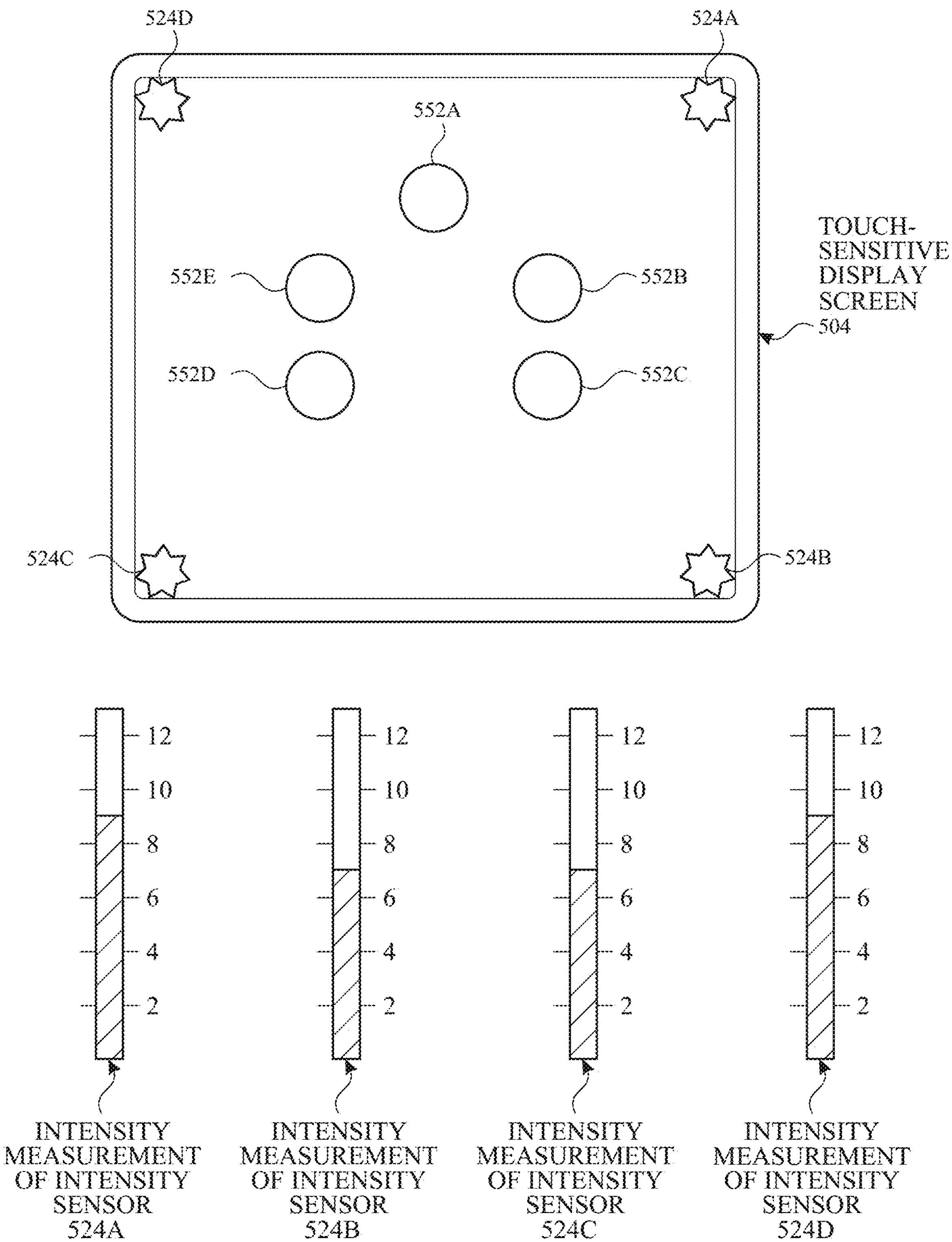
FIGS. 5C-5D illustrate exemplary components of a personal electronic device having a touch-sensitive display and intensity sensors in accordance with some embodiments.
Figure 5D:
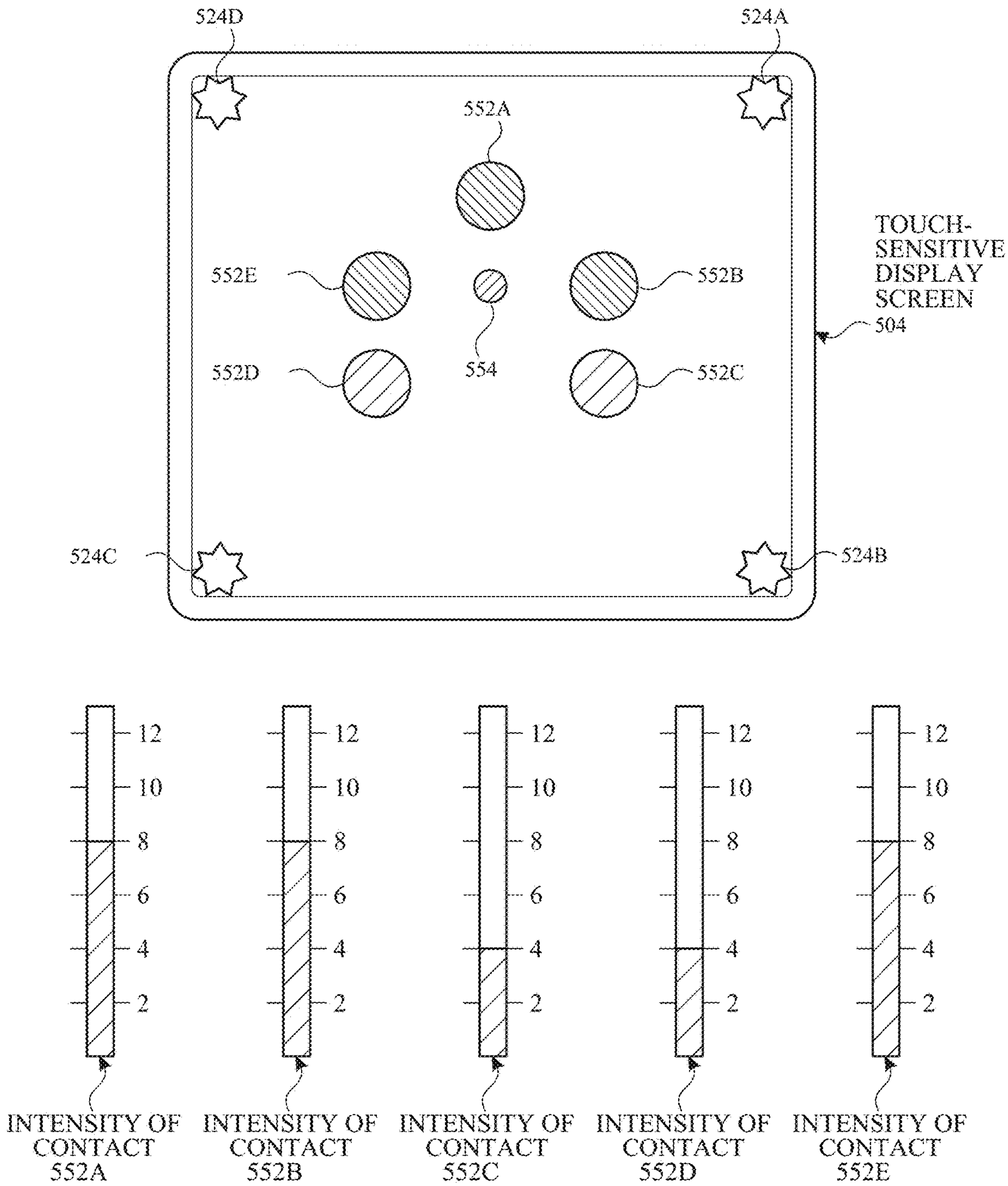

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
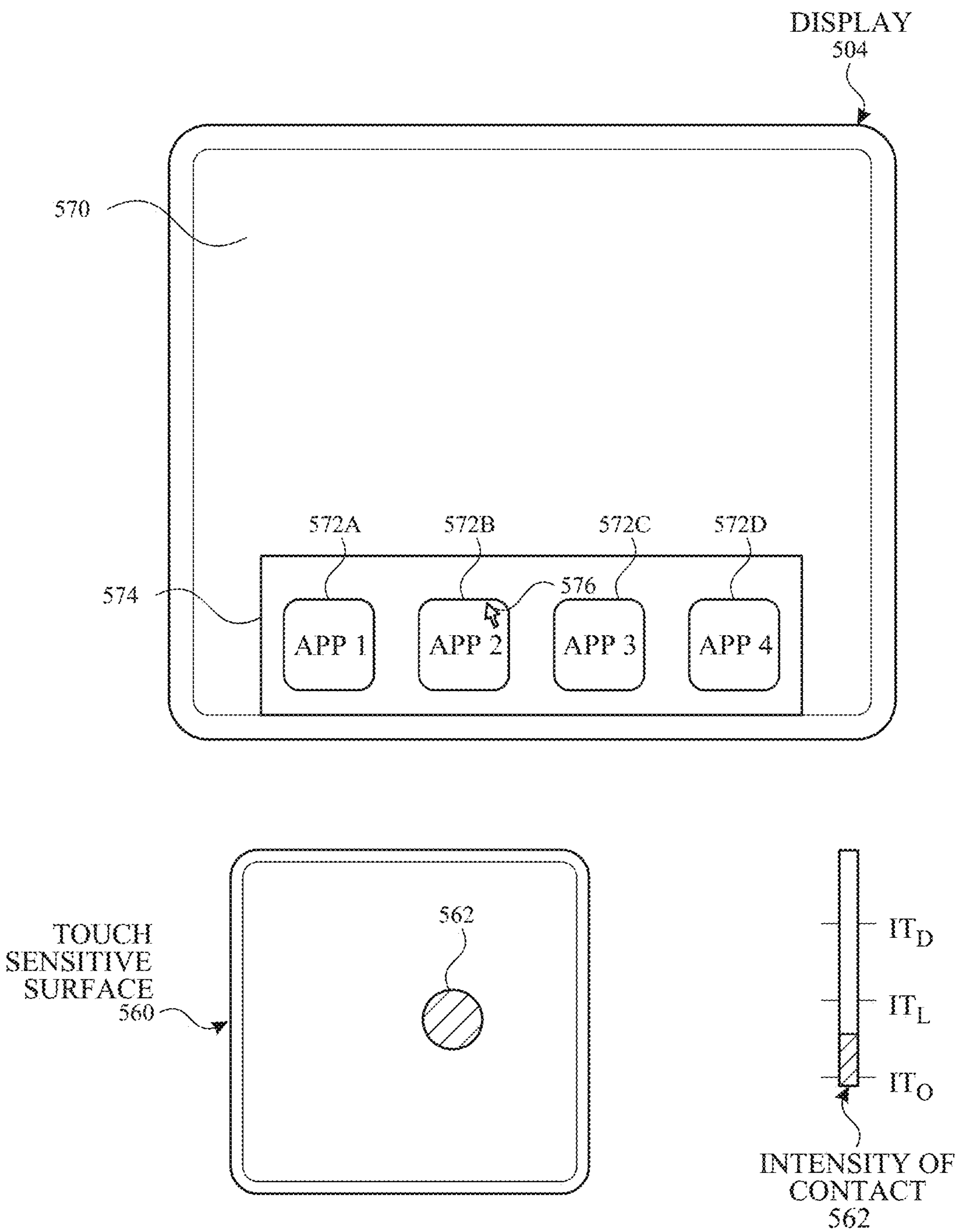
FIGS. 5E-5H illustrate exemplary components and user interfaces of a personal electronic device in accordance with some embodiments.
Figure 5F:
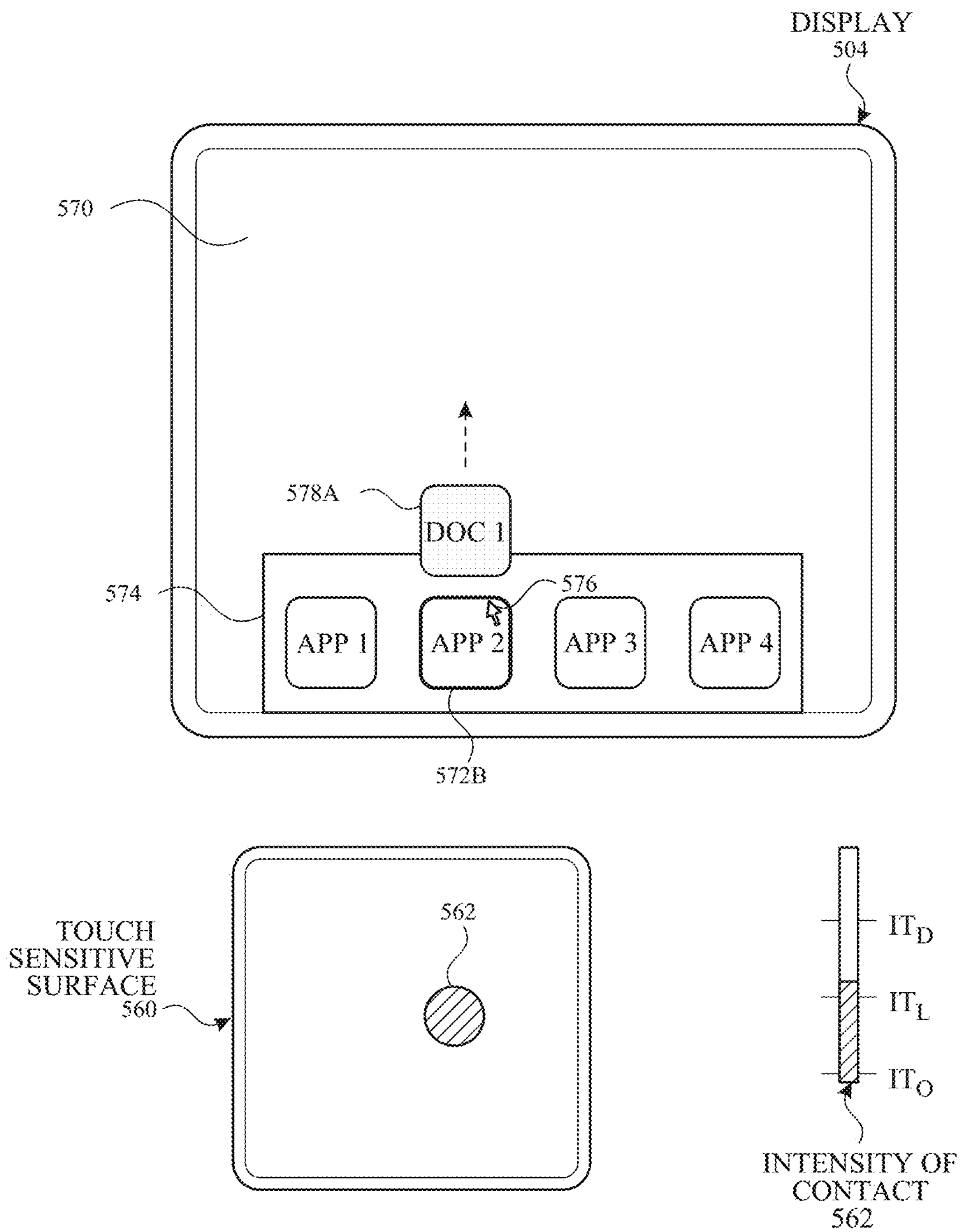
Figure 5G:
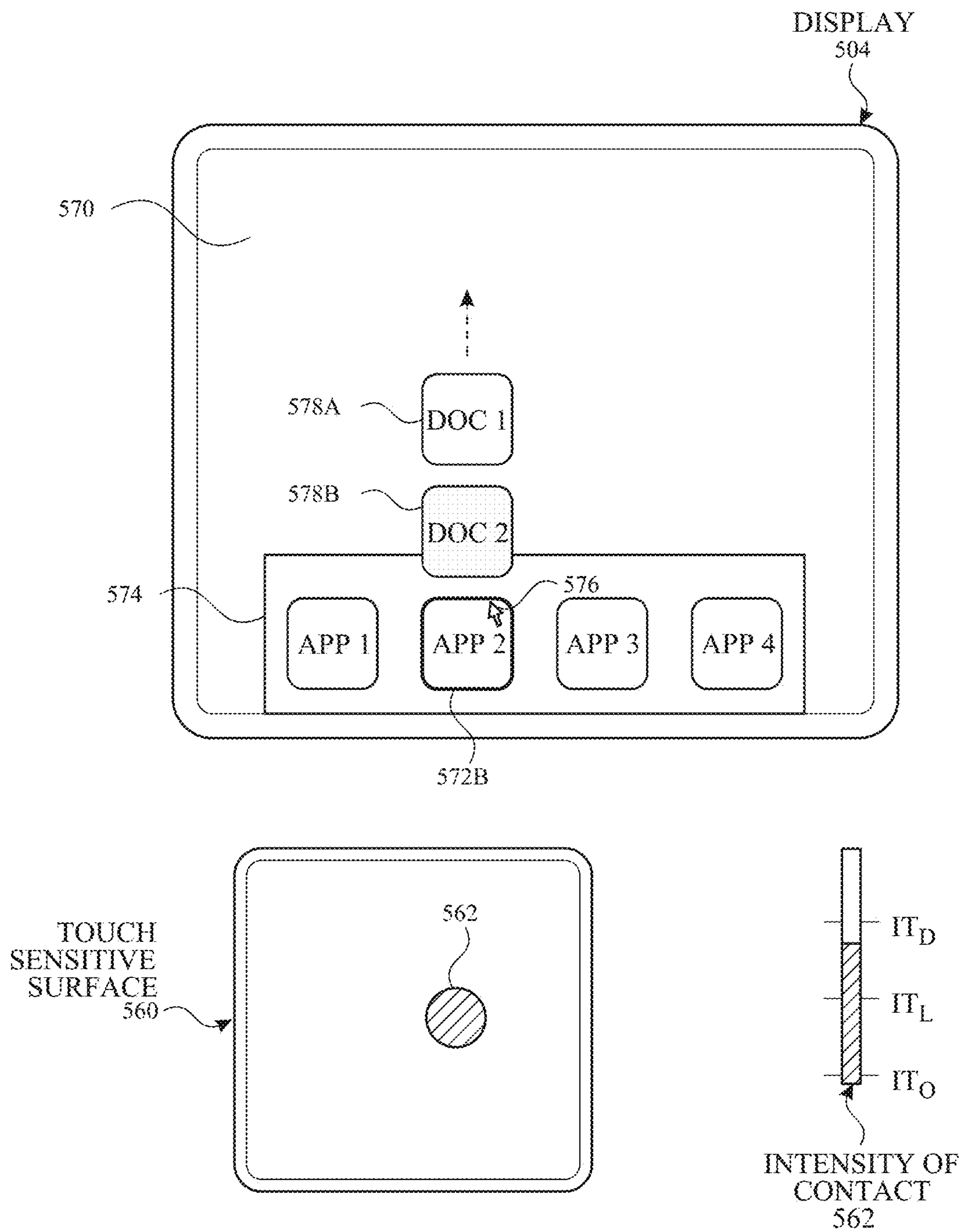
Figure 5H:
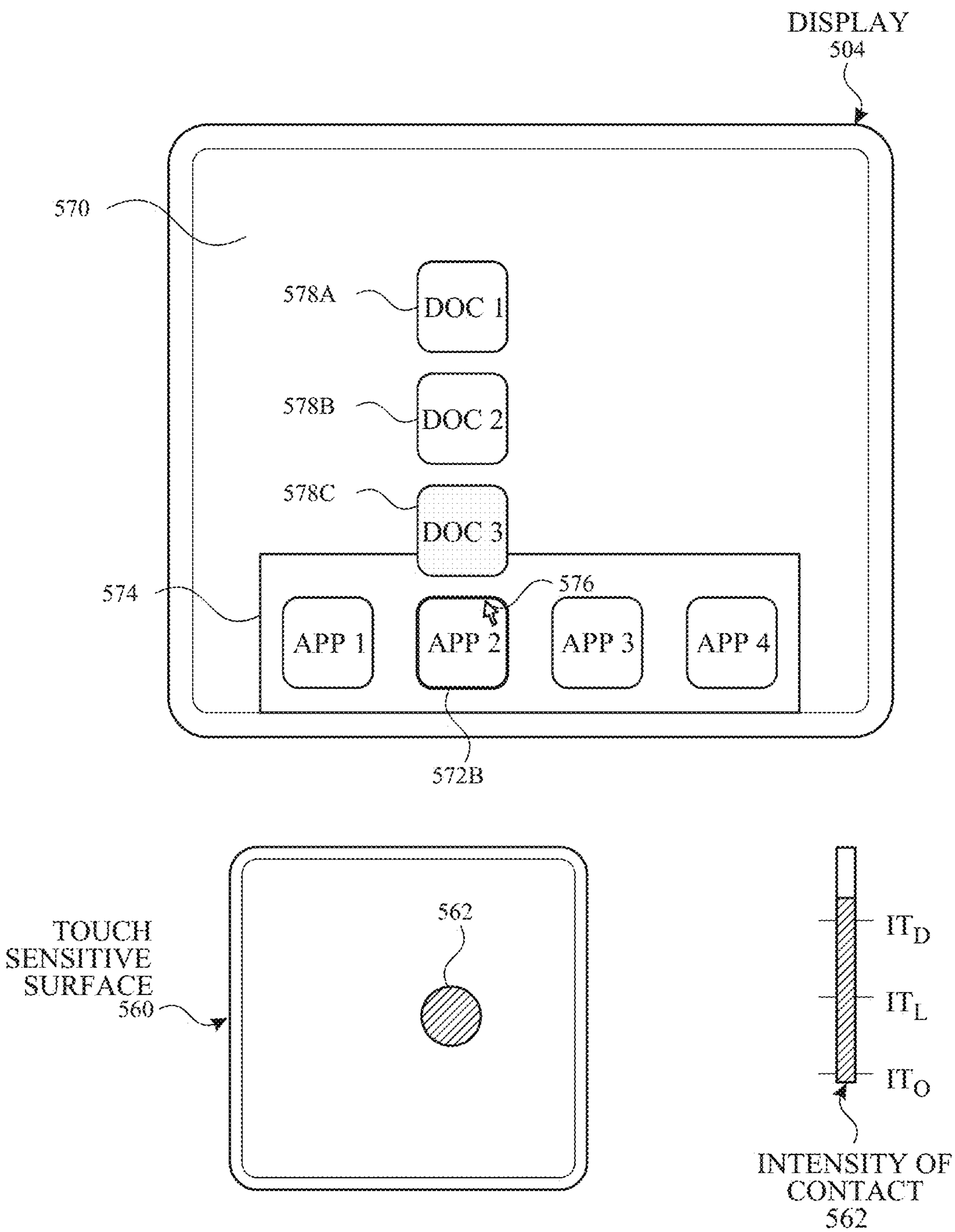

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "IT'D") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT'D"). Contact 562 is maintained on touch-sensitive surface 560. In response to the detection of the gesture, and in accordance with contact 562 having an intensity that goes above the deep press intensity threshold (e.g., "IT'D") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

USER INTERFACES AND ASSOCIATED PROCESSES

User Interfaces for Displaying Representations of Messaging Conversations

Users interact with electronic devices in many different manners, including using electronic devices to view messaging conversations. The embodiments described below provide ways in which an electronic device displays representations of messaging conversations that, when selected, cause the electronic device to display the messaging conversation associated with the selected representation. In some embodiments, the electronic device displays one or more representations of messaging conversations in a "pinned" region of the user interface according to a user-defined order. Displaying representations of messaging conversations in a user-defined order enhances interactions with a device such as by making it easier for the user to locate representations of certain conversations, thus reducing the amount of time a user needs to perform navigational operations and reducing the power usage of the device, which increases battery life for battery-powered devices. It is understood that people use devices. When a person uses a device, that person is optionally referred to as a user of the device.

In some embodiments, an electronic device sorts one or more messaging conversations chronologically (e.g., based on recency of messaging activity for those conversations). Users may wish to configure the electronic device to display one or more representations of messaging conversations at a predetermined location in the user interface independent from chronology of messaging activity. FIGS. 6A-6SS illustrate exemplary ways in which an electronic device 500 displays representations of messaging conversations according to some embodiments. The embodiments in these figures are used to illustrate the processes described below, including the processes described with reference to FIG. 7. Although FIGS. 6A-6SS illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6SS.

FIG. 6A illustrates an electronic device 500 displaying an exemplary user interface 602 for setting up a pinned conversations feature of a messaging application. In some embodiments, the user interface 602 is displayed in response to detecting activation of a pinned conversations feature (e.g., in response to a user input to configure pinned conversations, in response to installing an updated version of a messaging application on the electronic device that includes the pinned conversations feature, etc.). In some embodiments, pinning a conversation allows a user to place a representation of the conversation in a prominent location in the user interface so that, for as long as the conversation is pinned, it will display in an easily accessible location. For example, a user may message daily with his best friend. The user may want to pin the representation of the messaging conversation with his best friend to a top portion of a messaging application's user interface so that when the user enters the messaging application, the user can easily see the pinned conversation. The messaging application is optionally an application installed on the electronic device 500 by which the electronic device is able to send/receive electronic messages, and that displays information related to those messages as described herein. In some embodiments, the pinned conversations feature causes the electronic device 500 to display one or more representations of conversations in fixed locations in a messaging application, while representations of unpinned conversations are sorted, e.g., in a list format, based on how recently new messaging activity has been received in the conversation so that older messages are displayed at the bottom of the list. In some embodiments, one or both of the pinned and non-pinned messages are sorted according to different criteria. In some embodiments, both pinned and non-pinned messages are sorted according to the same criteria. For example, both types of messages can each be sorted chronologically or in a predetermined order.

As shown in FIG. 6A, in some embodiments, a user selects (e.g., with contact 603) an option 604 to proceed to configure pinned conversations. In response to the user's selection in FIG. 6A, the electronic device 500 presents a user interface, e.g., the user interface illustrated in FIG. 6B, to customize pinned conversations.

Figure 6B:
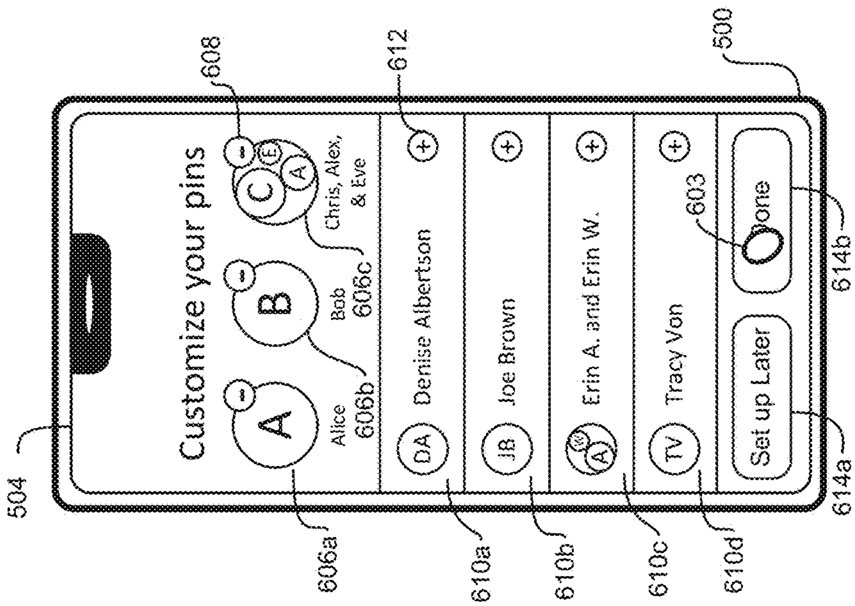
FIGS. 6A-6SS illustrate exemplary ways in which an electronic device presents representations of messaging conversations in accordance with some embodiments.
Figure 6A:
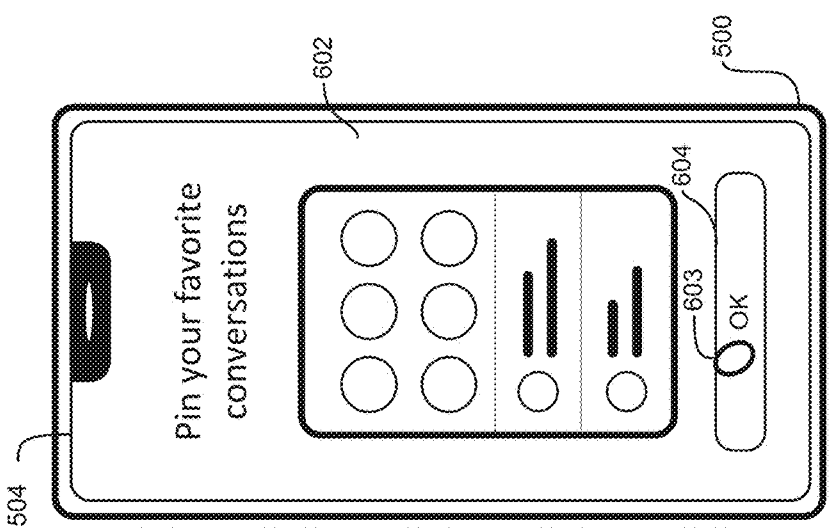
Figure 6D:
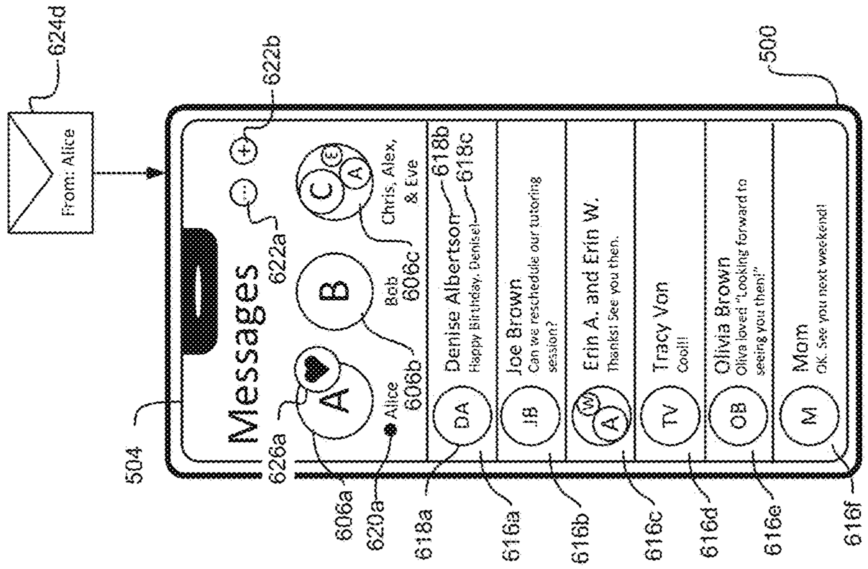

FIG. 6B illustrates an example messaging application user interface that includes representations 606*a-c* of messaging conversations to be displayed in a pinned conversations region of the messaging application user interface and representations 610*a-d* of conversations to be displayed in an unpinned messages region of the messages user interface. In some embodiments, the messaging application may recommend a different number of conversations to be pinned. In some embodiments, a user can select representations of different conversations (e.g., 610*a-d*) to be pinned. The messaging conversations represented by representations 606*a-c* are optionally selected by the electronic device 500 based on how frequently and/or recently messages have been received in the conversations and/or based on whether or not the participants in the conversations are on a favorite contacts list of the electronic device 500. In some embodiments, the electronic device 500 does not suggest conversations to be pinned.

Representations 606*a*-606*c* are optionally displayed with selectable options 608 that, when selected, causes the electronic device 500 to remove the conversation from the pinned conversations region (e.g., and moved to the unpinned region as a representation 610). Representations 610*a-d* are optionally displayed with selectable options 612 that, when selected, causes the electronic device 500 to add the respective conversation to the pinned conversations region (e.g., and removed as a representation 610 from the unpinned region). In some embodiments, the user is able to select which representations should be displayed in the pinned conversations region and which representations should be displayed in the unpinned conversations region. In some embodiments, the representations 610*a-d* of unpinned messaging conversations are sorted based on how recently new messaging activity was received in the conversations. In some embodiments, the representations 606*a* of the pinned conversations are sorted based on other criteria, such as how often new messaging activity is received in the messaging conversation or other criteria.

In some embodiments, the user interface illustrated in FIG. 6B further includes a selectable option 614*a* that, when selected, causes the electronic device 500 to forgo adding any conversations to the pinned conversations region of the messaging user interface and a selectable option 614*b* that, when selected, causes the electronic device 500 to save the displayed arrangement of pinned conversations and unpinned conversations and display the messages user interface.

Figure 6C:
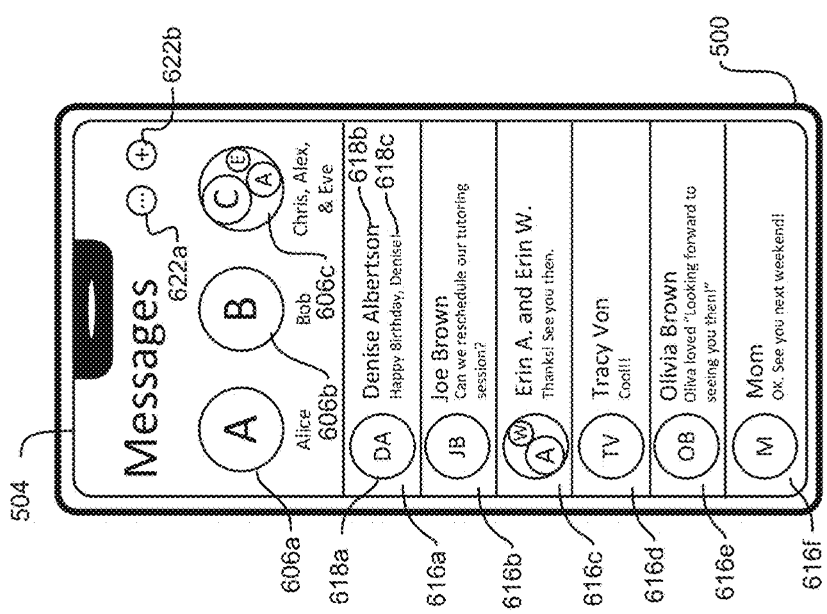
Figure 6F:
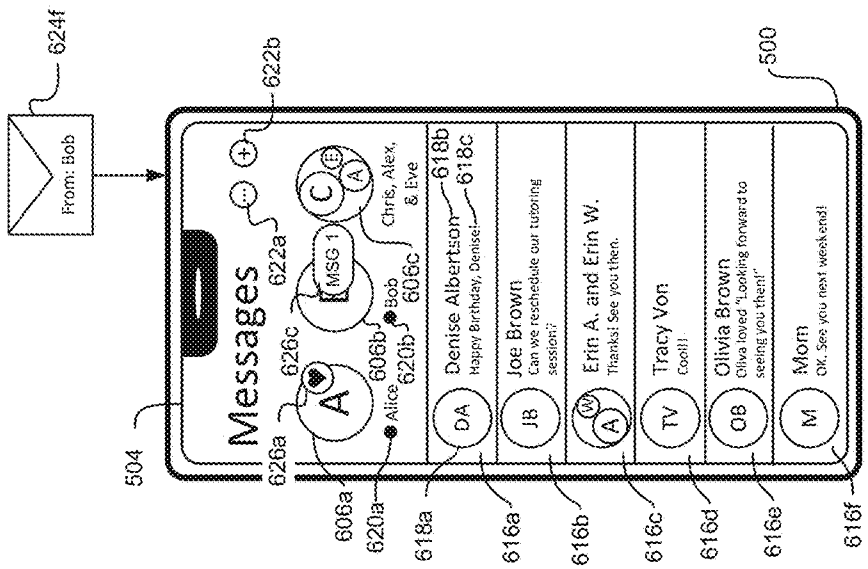

As shown in FIG. 6B, in some embodiments, the user selects (e.g., with contact 603) the option 614*b* to save the configuration of pinned and unpinned conversations and display the messaging user interface with pinned and unpinned conversations displayed according to the configuration, e.g., as shown in FIG. 6C.

FIG. 6C illustrates an exemplary messaging user interface including representations 606*a-c* of pinned conversations and representations 616*a-f* of unpinned conversations. The arrangement of the representations 606*a-c* and 616*a-f* are the same in FIG. 6B as in FIG. 6C. Thus, in some embodiments, the user is able to use the user interface illustrated in FIG. 6B to configure the messaging user interface, e.g., by selecting which conversations should be pinned, which conversations should be unpinned, and the arrangement of the pinned conversations in the user interface to be displayed. The electronic device 500 then displays the messaging user interface according to the configuration, e.g., as illustrated in FIG. 6C. The user interface optionally includes a selectable option 622*a* that, when selected, causes the electronic device 500 to display one or more settings related to the messaging user interface and a selectable option 622*b* that, when selected, causes the electronic device 500 to initiate a process for composing a new message. In some embodiments, the one or more settings related to the messaging user interface displayed in response to selection of option 622*a* includes an option to re-arrange and change the conversations that are currently displayed in the pinned conversation region in the user interface.

The representations 606*a-c* of the pinned messaging conversations optionally include images (e.g., avatars) representing the one or more users participating in each messaging conversation. In some implementations, the images of conversation participants do not include the user of the electronic device 500. In some implementations, each representation of a messaging conversation includes text indicating the names of the users in the conversation. In some embodiments, a group conversation is given a nickname which is displayed in place of the names of the participants in the conversation. In some embodiments, an image is associated with a group conversation (e.g., other than the images associated with the users in the conversation), and the image is used to represent the group messaging conversation, e.g., the images associated with the users in the conversation are replaced with the image associated with the conversation, as will be described in more detail below with reference to FIG. 6I.

In some embodiments, the representations 616*a-f* of the unpinned messaging conversations each include an image 618*a* representing the user or plurality of users included in the conversation other than the user of the electronic device 500, an indication 618*b* of the names of the one or more users in the conversation other than the user of the electronic device 500, and an indication 618*c* of the most recent messaging activity in the conversation. Representations 616*a-b* and 616*d-f* optionally represent conversations including one other user in addition to the user of the electronic device 500, and representation 616*c* represents a conversation including two users in addition to the user of the electronic device 500. In some embodiments, if an image is associated with a group conversation that is an image other than the images representing the users in the conversation, the electronic device 500 displays the image associated with the group in the representation 616 (e.g., in representation 616*c*) instead of the images associated with the users in the conversation.

In some embodiments, the representations 606*a-c* of the pinned conversations do not include indications of the most-recent, read messaging activity in those conversations, because, e.g., there is no messaging activity in those conversations that is unread by the user of the electronic device 500. In contrast, in some embodiments, the representations 616*a-f* of the unpinned conversations include indications of the most-recent, read messaging activity in the conversations, because, e.g., the messaging activity in those conversations has been "read" by the user. In some embodiments, messaging activity includes messages (e.g., text messages, audio messages, messages including images or other media) and tags added to messages (e.g., a heart tag, a thumbs up tag, a thumbs down tag, a laugh tag, an emphasis tag, etc.).

In FIG. 6D, the electronic device 500 optionally detects an indication 624*d* of messaging activity received from a contact (e.g., Alice) that is participating in a messaging conversation with a user of the electronic device 500, which the user has pinned in the messaging application user interface. In response to detecting the indication 624 of receipt of Alice's message, the electronic device 500 optionally displays a representation 626*a* of the received, unread messaging activity—which is the addition of a tag (e.g., a "heart" tag) to one of the messages in the conversation—that is displayed overlaid on the representation 606*a* of the messaging conversation. The electronic device 500 optionally additionally displays an indication 620*a* that there is unread messaging activity in the conversation proximate to the representation 606*a* of the messaging conversation.

Figure 6E:
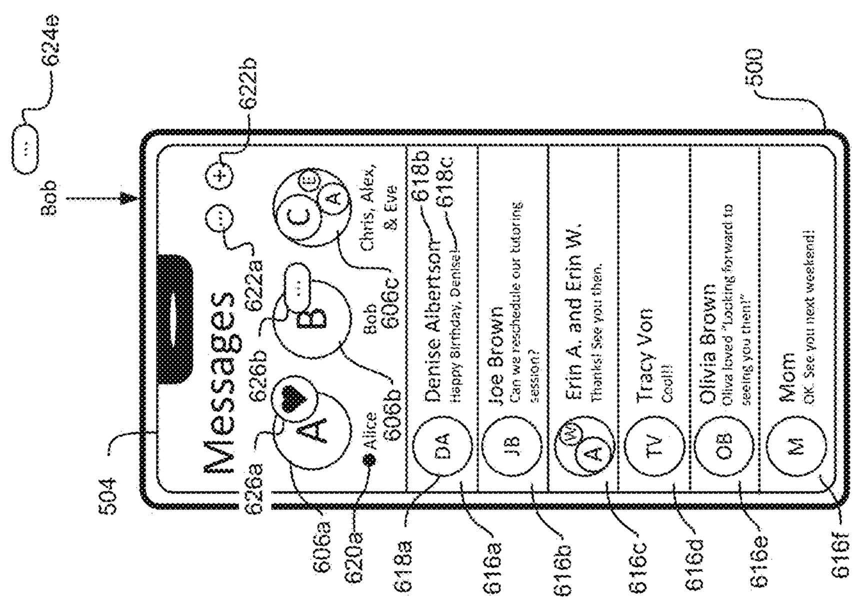
Figure 6H:
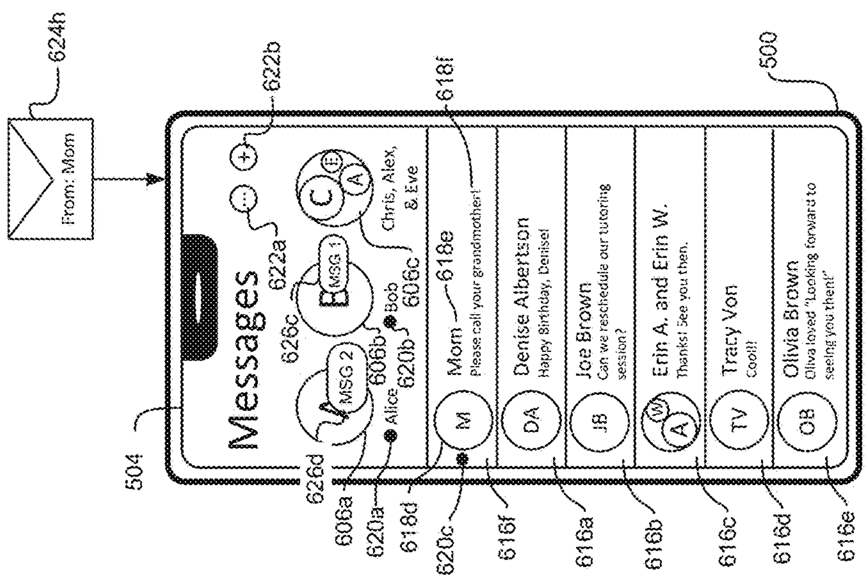

In FIG. 6E, the electronic device 500 receives an indication 624*e* that a user (e.g., Bob) is supplying an input to create messaging activity in one of the conversations (e.g., currently typing a message before sending the messaging). In response to the indication 624*e*, the electronic device 500 optionally displays an indication 626*b* of the input overlaid on the representation 606*b* of the messaging conversation to which the user is supplying the input. As shown in FIG. 6E, the indication 626*a* of the messaging activity in the other (e.g., Alice) conversation optionally remains displayed at the same size and/or location at which the indication 626*a* was displayed in FIG. 6D. In some embodiments, the indication 626*a* is displayed at a smaller size in response to receiving the indication 624*e*.

In FIG. 6F, the electronic device 500 optionally receives an indication 624*f* of messaging activity received in one of the conversations (e.g., conversation with Bob). As shown in FIG. 6F, in response to receiving indication 624*f*, that a new message added to the conversation, the electronic device 500 displays a representation 626*c* of the new, unread message. The content of representation 626*c* is optionally the content of the message, and the representation 626*c* is optionally displayed overlaid on the representation 606*b* of the messaging conversation. In some embodiments, if the length of the incoming message exceeds a predetermined threshold, the indication of the message 626*c* includes the initial portion of the message text followed by an indication that the message continues (e.g., " . . . "). The electronic device 500 optionally further displays an indication 620*b* that there is unread messaging activity in the conversation represented by representation 606*b* which is proximate to the representation 606*b* of the conversation. As shown in FIG. 6F, in some embodiments, in response to receiving an indication, e.g., indication 624*f*, of anew message, the electronic device 500 changes the size (e.g., reduces the size) and/or location of previously-received, unread messages in pinned conversations. For example, as illustrated in FIG. 6F, the indication 626*a* of the previously-received, unread messaging activity in the conversation with Alice is reduced in size when indication 626*c* is received for the messaging conversation represented by representation 606*b*. In some embodiments, the locations of indications of unread messages are displayed in the same relative position for each pinned conversation. For example, as illustrated in FIG. 6F, indication 626*c* is the same relative to representation 606*b* as the location of indication 626*a* relative to representation 606*a*. In some embodiments, the electronic device 500 ceases displaying indications of unread messages in other pinned conversations when a new unread message is received for a particular messaging conversation. Instead, only an indication is displayed for the new unread message that was most recently received. For example, in FIG. 6F indication 626*b* may be the only indication shown in the pinned conversation region in response to receiving indication 624*f*.

Figure 6G:
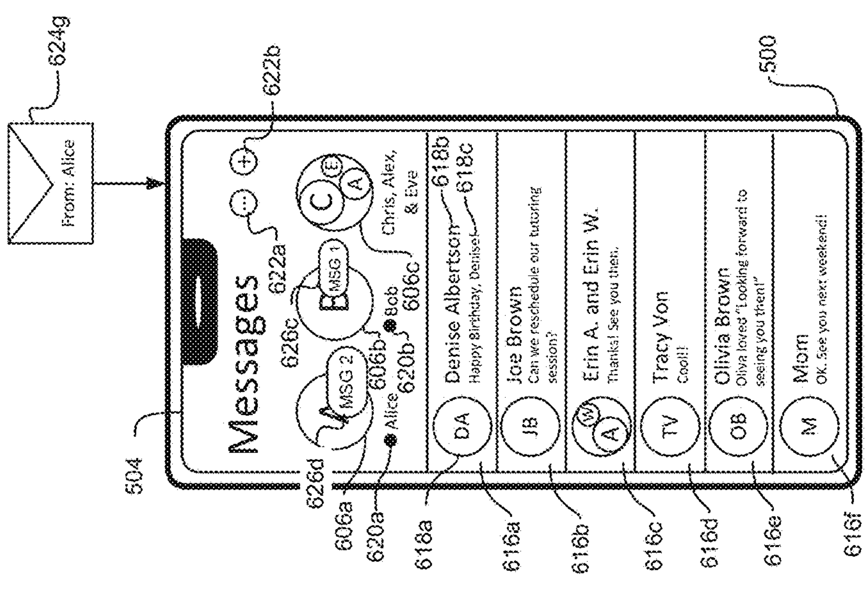
Figure 6J:
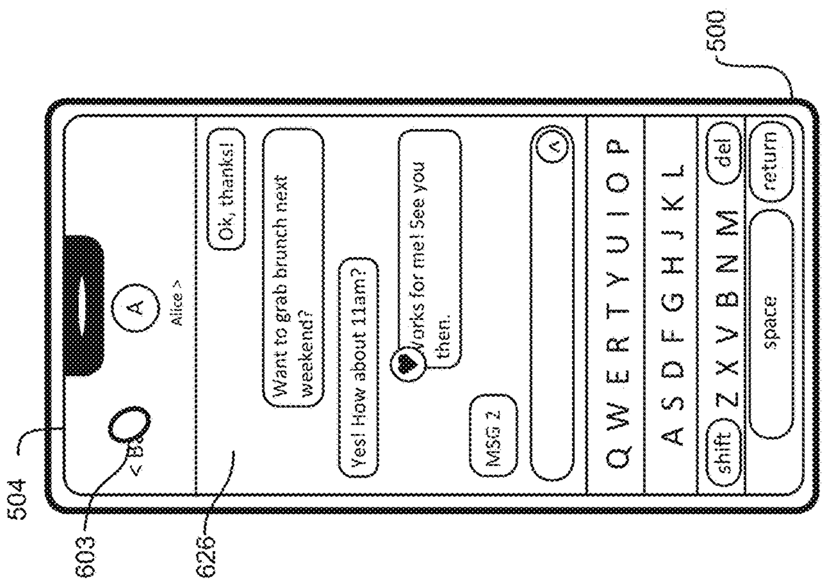

In FIG. 6G, the electronic device 500 optionally receives an indication 624*g* of messaging activity in one of the messaging conversations (e.g., conversation with Alice). In response to the indication 624*g*, the electronic device 500 optionally displays an indication 626*d* of the messaging activity overlaid on the representation 606*a* of the messaging conversation, and decreases the size (while maintaining the same position) and/or changes the position of indication 626*c* of a previously-received messaging activity. In some embodiments, the indication 626*d* of the messaging activity includes at least a portion of the message. If the length of the message exceeds a predetermined threshold, the electronic device 500 displays the first portion of the message with an indication that the message continues (e.g., " . . . "). In some embodiments, indication 626*a* continues to be displayed in response to indication 624*g*. In some embodiments, indication 626*d* is displayed at the same location at which indication 626*a* was displayed. In some embodiments, indication 626*d* is displayed at a different location from the location at which indication 626*a* was displayed. The electronic device 500 optionally continues to display the indication 620*a* of unread messaging activity in the messaging conversation. In some embodiments, the electronic device 500 ceases to display the representation 626*a* shown in FIG. 6F of the messaging activity that was previously received in the same messaging conversation.

In FIG. 6H, the electronic device 500 optionally receives an indication 624*h* of messaging activity in one of the unpinned conversations (e.g., conversation with Mom). In some embodiments, the electronic device 500 updates the representation 616*f* of the conversation to include an indication 618*f* of the most recent messaging activity in the conversation and an indication 620*c* that there is unread messaging activity in the conversation. As shown in FIG. 6H, the indication 620*c* can be a dot displayed next to image 618*d* representing the user in the conversation in which the message was received. IN some embodiments, rather than displaying indication 620*c*, the electronic device 500 can update the representation 616*f* of the messaging conversation, such as changing the color, size, translucency, etc. of the representation 616*f* or changing the size and/or text styling of the name 618*e* of the user in the conversation or the text 618*f* of the message. In some embodiments, the electronic device 500 re-orders the representations 618*a-f* of the unpinned messaging conversations to display the representation 616*f* with the recent message from Mom at the top of the list of representations in the unpinned region. As shown in FIG. 6H, the sizes of indications 626*c-d* of messaging activities received in the pinned conversations optionally do not change in response to the indication 624*h* of the messaging activity received in the unpinned conversation. In some embodiments, however, the indications 626*c-d* are displayed at a smaller size than before in response to the indication 624*h*. In some embodiments, the sizes of indications 626*c-d* get smaller over time (e.g., as time elapses since the messaging activity for those indications 626*c-d* was received) irrespective of newly received messaging activity in either the pinned or unpinned conversations.

Figure 6I:
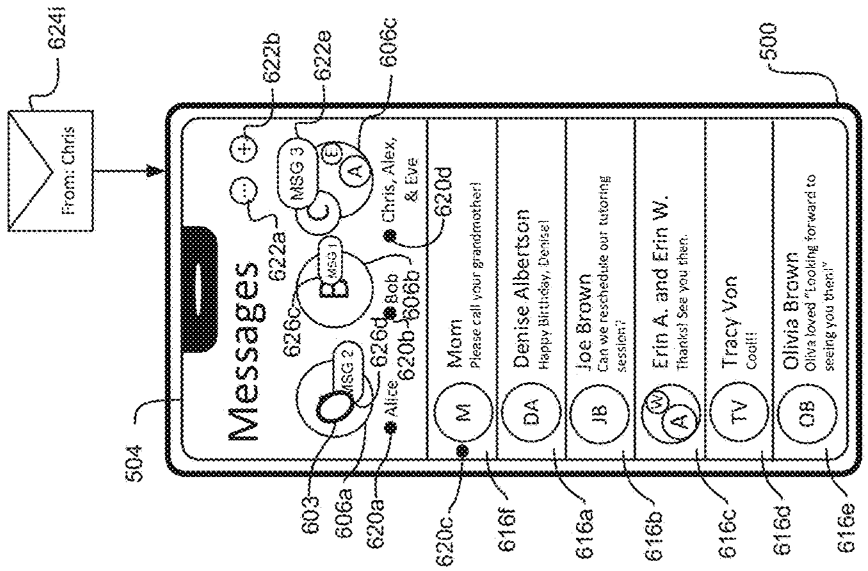
Figure 6L:
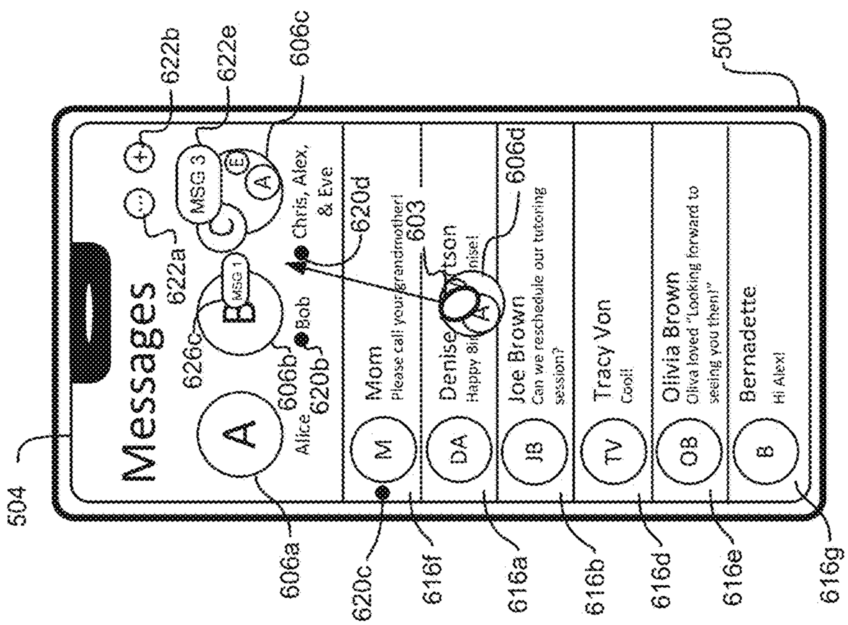

As shown in FIG. 6I, in some embodiments, the electronic device 500 receives an indication 624*i* of a new messaging activity received in a group conversation that is pinned (e.g., from Chris in the Chris, Alex and Eve conversation). In response to indication 624*i*, the electronic device 500 optionally displays an indication 622*e* of the messaging activity overlaid on the representation 606*c* of the conversation proximate to the image associated with Chris, and displays an indication 620*d* of unread messaging activity proximate to the representation 606*c* of the conversation. The electronic device 500 optionally updates the representation 606*c* of the conversation to display the image corresponding to the contact that sent the message to the side (e.g., left side) of the rest of the representation 606*c* (e.g., the avatar for Chris moves from inside representation 606*c* to an outer portion of representation 606*c*). As shown in FIG. 6I, in some embodiments, the indication 622*e* is displayed proximate to the avatar for Chris. In some embodiments, the representations of the other users in the group conversation remain inside representation 606*c*. In some embodiments, if the representation 606*c* of the group conversation is an image other than the images associated with the users in the conversation, the electronic device 500 optionally updates the representation 606*c* to include the image (e.g., avatar) corresponding to the user that sent the received message as shown in FIG. 6I, but the representation would be overlaid on the outer portion of the image representing the group rather than being overlaid on the outer portion of a container with the images representing the other users in the conversation (e.g., as shown in FIG. 6I). In some embodiments, the indication 622*e* includes at least a portion of the content of the message. If the message is less than a threshold length, the indication 622*e* optionally includes the entire content of the message. If the message is more than the threshold length, the indication 622*e* optionally includes a first portion of the message and an indication that the message continues (e.g., " . . . ").

As also shown in FIG. 6I, in some embodiments, the indications 626*c-d* of the other messaging activities in the pinned conversations are reduced in size (e.g., while remaining at the same positions) in response to indication 624*i*. The sizes of indications 626*c-d* are smaller than the sizes of the indications 626*c-d* in FIG. 6H prior to receiving indication 624*i*.

As shown in FIG. 6I, in some embodiments, the user selects (e.g., with contact 603) the representation 606*a* of one of the conversations. In response to the user's selection in FIG. 6I, the electronic device 500 optionally displays the messaging conversation corresponding to representation 606*a*, as shown in FIG. 6J.

Figure 6K:
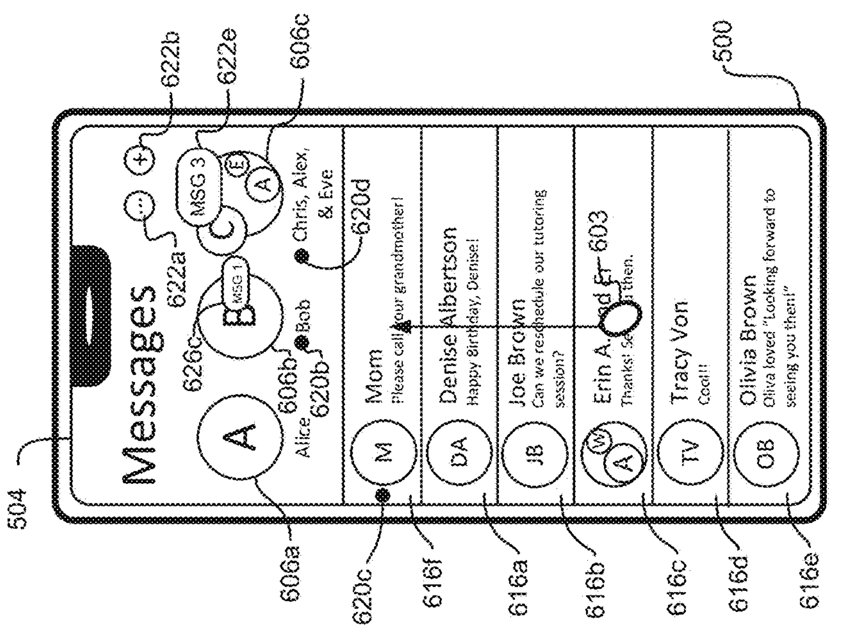
Figure 6N:
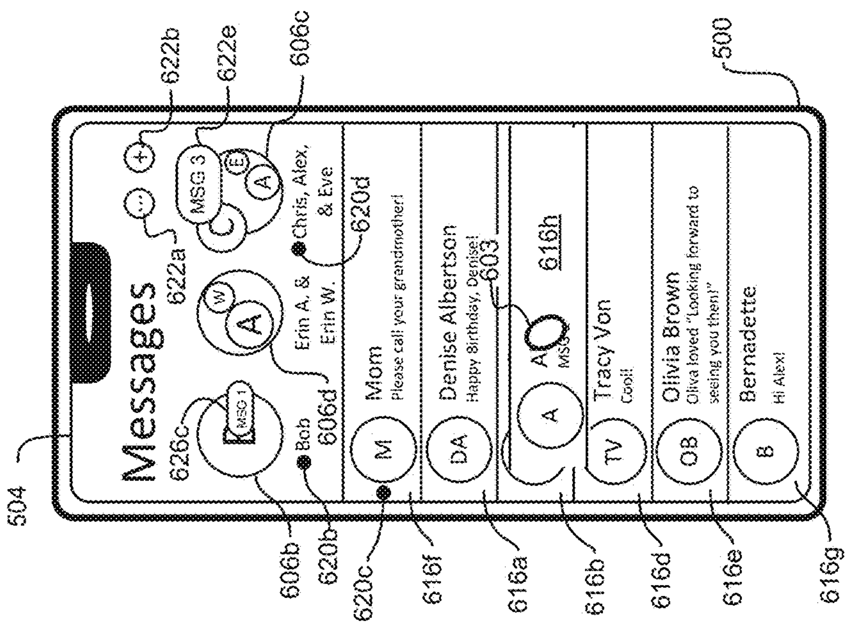

As shown in FIG. 6J, the electronic device 500 optionally displays a user interface 626 including indications of the messaging activities of the messaging conversation, including an indication of a tag added to one of the messages which was received in FIG. 6D, and a representation of a message received in FIG. 6G. As shown in FIG. 6J, in some embodiments, the user navigates back (e.g., with contact 603) to the user interface illustrated in FIG. 6K. As shown in FIG. 6K, in some embodiments, when the electronic device 500 displays the messaging user interface again, the electronic device 500 optionally displays representation 606*a* without indications 626*d* and 620*a* because the message associated with indication 626*d* has been read by the user of electronic device 500 (e.g., the content of the messaging conversation has been displayed by device 500 in FIG. 6J) and there are no new unread messages associated in the message conversation with Alice.

In some embodiments, the electronic device 500 provides ways for the user to re-arrange the representations of messaging conversations in the messaging user interface to move unpinned conversations to the group of pinned conversations and vice-versa.

In FIG. 6K, the user selects (e.g., with contact 603) one of the representations 616*c* of an unpinned conversation, for example. In some embodiments, the contact 603 is detected on the representation 616*c* for a period of time exceeding a predetermined threshold (e.g., 0.25 seconds or 0.5 seconds or 1 second) before movement of the contact is detected, thereby dragging the representation of the conversation, as shown in FIG. 6L. In some embodiments, if the contact 603 is not detected for longer than the predetermined threshold before movement of the contact is detected, the input is optionally interpreted as a scrolling input to scroll through the unpinned conversations rather than an input to move an unpinned conversation to the pinned region.

In some embodiments, (e.g., once the user begins to move contact 603) after the predetermined threshold, device 500 optionally ceases to display representation 616*c* in the unpinned region, and changes the representation of the conversation to representation 606*d* (e.g., a pinned region representation), as shown in FIG. 6L. In FIG. 6L, the user optionally continues to drag (e.g., with contact 603) the representation 606*d* of the conversation, which is optionally now a representation of a pinned conversation, towards the other representations 606*a-c* of pinned conversations. In some embodiments, when the electronic device 500 begins displaying representation 606*d*, the electronic device 500 moves representations 616*a-b* and 616*d-g* down to create an open row in the pinned region of the user interface (e.g., the row in which representation 606*c* is displayed in FIG. 6M, the region in which message 648 is displayed in FIG. 6FF, etc.) towards which the user is able to drag representation 606*d*, if the user chooses to do so. In some embodiments, representation 616*c* continues to be displayed until it is dragged to the pinned conversations region of the user interface. In some embodiments, once representation 616*c* is dragged to the pinned conversations region of the user interface, the electronic device 500 replaces representation 616*c* with representation 606*d* of the pinned conversation.

Figure 6M:
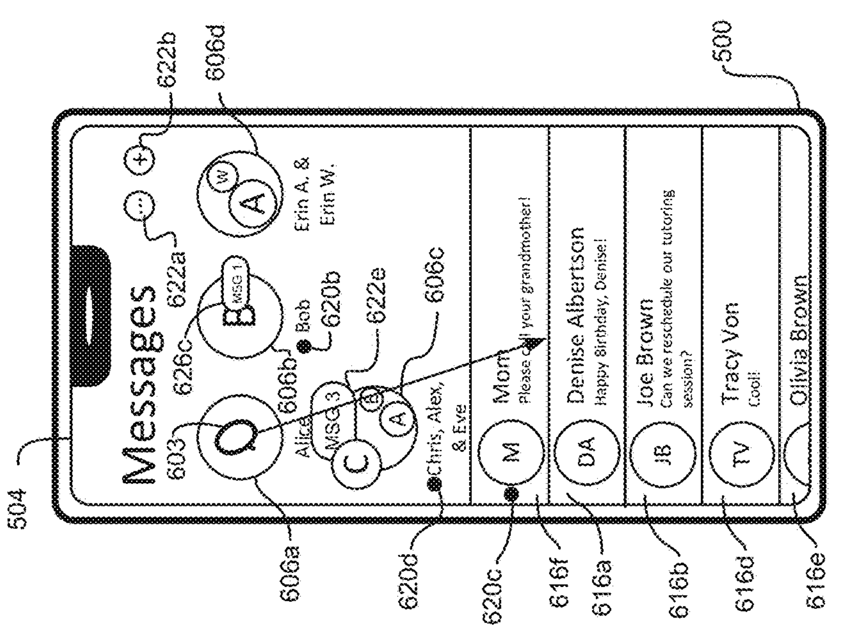
Figure 6P:
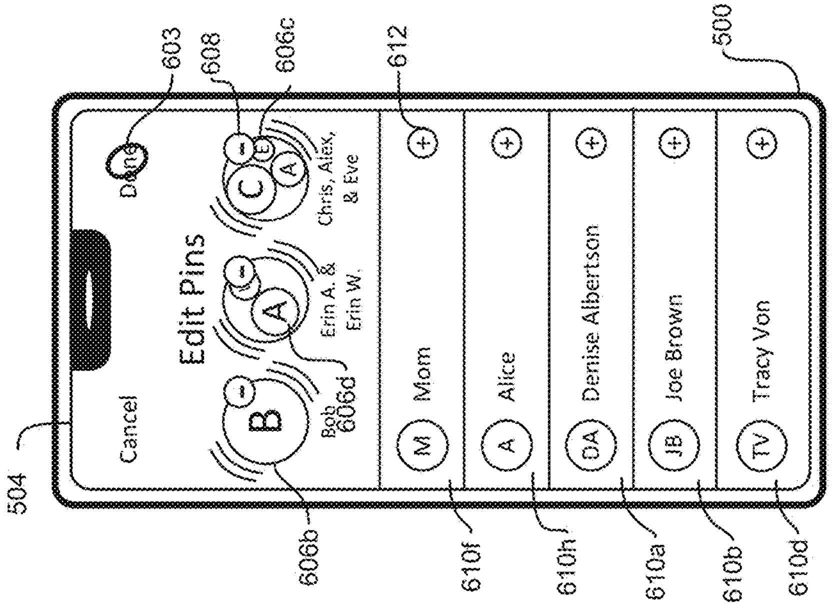

In FIG. 6M, the user has placed the representation 606*d* of the messaging conversation with the other representations 606*a-c* of pinned conversations (e.g., representation 606*d* is optionally placed upon detecting liftoff of contact 603 at the location of contact 603 when liftoff was detected). As shown in FIG. 6M, in some embodiments, the user is able to choose the location within the pinned conversation region in which to place the representation 606*d*. In FIG. 6M, the user has moved representation 606*d* to a location determined to be representation 606*c* (e.g., a location closer to representation 606*c* than another representation (e.g., representation 606*b*), and lifted off contact 603, which optionally caused representation 606*d* to be displayed in place of representation 606*c*, and moved representation 606*c* down to a second line of representations in the pinned region (e.g., automatically created by device 500 upon detecting the addition of representation 606*d*, and overflow of the first line of pinned representations). In contrast to the ordering of pinned conversations, in some embodiments, representations 616*a-b* and 616*d-f* of unpinned conversations are arranged according to the order in which the most recent messaging activity in the conversation was received.

As also shown in FIG. 6M, in some embodiments, the user selects (e.g., with contact 603) a representation 606*a* of another pinned conversation. In some embodiments, the contact 603 is detected on the representation 606*a* for a period of time exceeding a predetermined threshold (e.g., 0.25 seconds or 0.5 seconds or 1 second) before movement of the contact is detected, thereby dragging the representation of the conversation, as shown in FIG. 6N.

In some embodiments, upon detecting movement of representation 606*a* outside of the pinned region and into the unpinned region, device 500 changes representation 606*a* to an unpinned representation 616*h* (e.g., no longer displays representation 606*a*), as shown in FIG. 6N. In FIG. 6N, the user continues dragging (e.g., with contact 603) the representation 616*h* of the messaging conversation, which is now displayed as a representation 616*h* of an unpinned conversation, into the unpinned conversation region of the user interface, for example. Thus, as shown in FIG. 6N, in some embodiments, the representation of the conversation is displayed as a representation 616*h* of an unpinned conversation as soon as the user drags representation 606*a* from the pinned region of the user interface to the unpinned region of the user interface. In some embodiments, however, the electronic device 500 displays the representation 606*a* of the pinned conversation while the user continues to drag the representation into the unpinned region of the user interface and updates the representation to a representation 616*h* of an unpinned conversation in response to detecting liftoff of contact 603 illustrated in FIG. 6N.

Figure 6O:
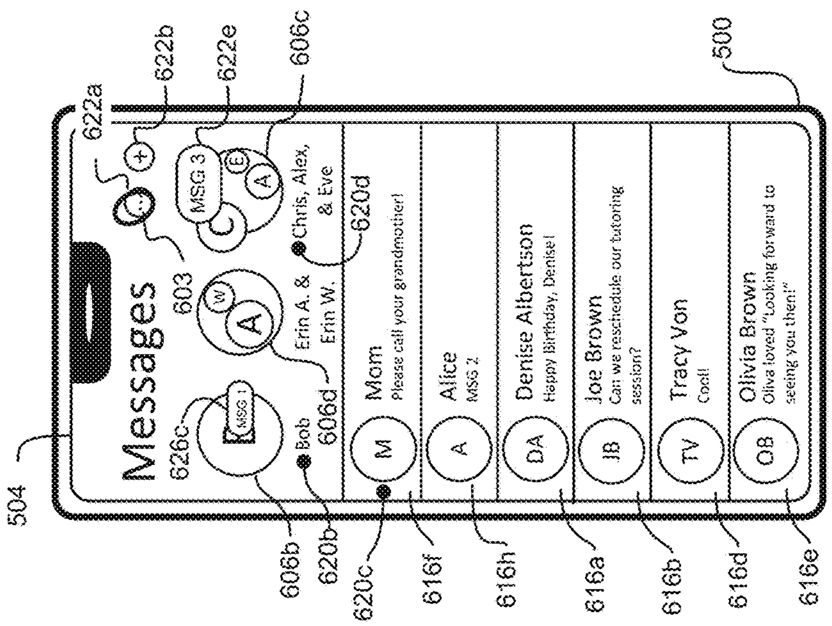

As shown in FIG. 6O, when liftoff of contact 603 is detected, the electronic device 500 displays the representation 616*h* of the messaging conversation among the other representations 616*a-b* and 616*d-f* of unpinned conversations. Rather than displaying the representation 616*h* at the location at which liftoff of contact 603 was detected, the electronic device 500 sorts the representations 616 of the unpinned conversations according to how recently the last messaging activity in each conversation was received. Therefore, in some embodiments, even though liftoff of contact 603 was detected while representation 616*h* was displayed below representation 616*a*, in response to detecting the liftoff of contact 603, representation 616*h* is displayed above representation 616*a* in the unpinned conversation region because the last messaging activity in the conversation corresponding to representation 616*h* was more recent than the last messaging activity in the conversation corresponding to representation 616*a*.

Also shown in FIG. 6O, the user may select (e.g., with contact 603) the option 622*a* to show one or more selectable options for performing actions related to the messages user interface (e.g., selecting one or more messaging conversations, editing information associated with the user account of the electronic device, editing pinned and unpinned conversations). In some embodiments, the user is able to select an option (not shown) to cause the electronic device 500 to display a user interface for editing which conversations are pinned and unpinned.

FIG. 6P illustrates an exemplary user interface for editing which conversations are pinned and unpinned. The user interface illustrated in FIG. 6P is optionally similar to the user interface described above with reference to FIG. 6B. Representations 606*b-d* of pinned conversations may include selectable options 608 that, when selected, causes the electronic device 500 to remove an associated representation 606 from the pinned conversations (e.g., and move the conversation to the unpinned region). The electronic device can animate the representations 606*b-d* of the pinned conversations in a wiggling or other motion to indicate that the position of the representations 606*b-d* can be changed and which conversations are pinned and which conversations are not pinned can be changed. Representations 610*a-b*, 610*d*, 610*f*, and 610*h* of unpinned conversations optionally include selectable options 612 that, when selected, causes the electronic device 500 to add an associated representation 610 to the pinned conversations (e.g., and remove the conversation from the unpinned region). Thus, in some embodiments, the electronic device 500 moves representations between the pinned and unpinned conversation sections of the user interface according to one or more user inputs to do so. As shown in FIG. 6P, in some embodiments, the user selects (e.g., with contact 603) an option to save changes to the pinned conversations and navigate back to the user interface illustrated in FIG. 6Q.

Figure 6Q:
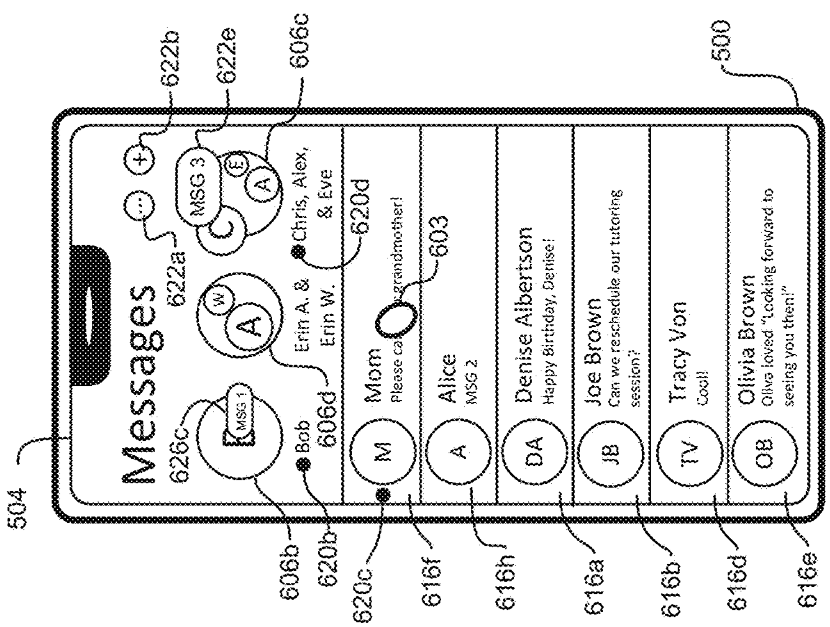
Figure 6R:
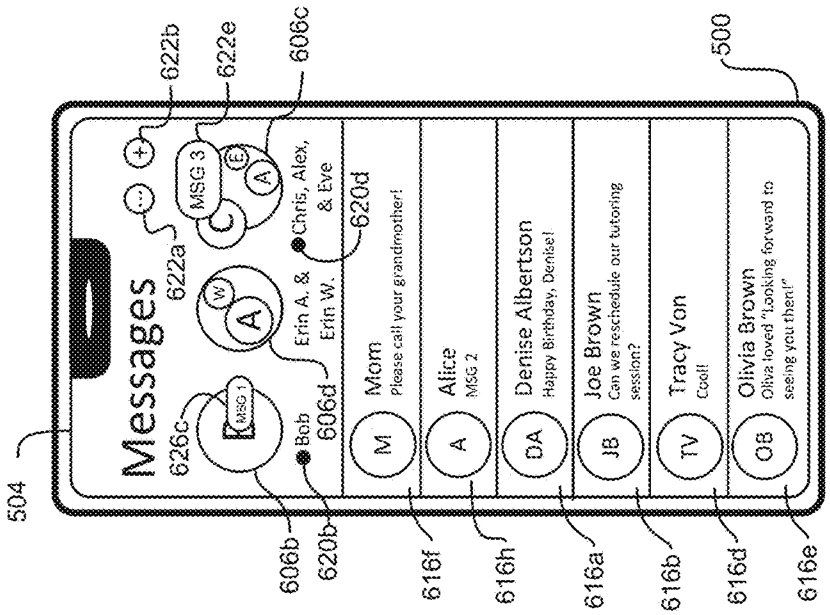

In FIG. 6Q, in some embodiments, the user selects (e.g., with contact 603) the representation 616*f* of a conversation with an unread message, as indicated by indication 620*c* included in representation 616*f*. In response to the user's selection, the electronic device 500 optionally displays the messaging conversation in a manner similar to the way FIG. 6J illustrates a different messaging conversation. After the user navigates back from the messaging conversation, the electronic device 500 optionally displays the representation 616*f* of the messaging conversation without the indication 620*c* of the unread message, because the message has been read by the user, as shown in FIG. 6R.

FIG. 6S illustrates the electronic device 500 displaying an exemplary messaging user interface with representations 606*e*, 606*g*, 616*i*, and 616*j* of group conversations including three or more users (including the user of the electronic device 500) (e.g., in addition to other representations of conversations, the details of which have been described with reference to FIGS. 6A-6R).

Representations 606*e* and 616*i* optionally include images (e.g., avatars) 630*a*-630*f* of other users included in the group conversations. The representations 630*a*-630*f* are optionally sized based on how recently each user sent messaging activity to the group conversation. In the conversation associated with representation 606*e*, representation 630*f* is optionally displayed at the largest size among the other representations in the conversation because the user associated with that representation 630*f* is the most recent user, other than the user of the electronic device 500, to send messaging activity to the group conversation. The user associated with representation 630*d* is optionally the least recent user, other than the user of the electronic device 500, to send messaging activity to the group conversation, so representation 630*d* is optionally the smallest representation of a user included in the representation 606*e* of the group conversation. In some embodiments, the representation 616*i* of an unpinned group conversation similarly includes avatars 630*a-c* of the users in the group conversation. In some embodiments, representations of pinned and unpinned group conversations are displayed in similar manners. In some embodiments, the electronic device 500 displays representations of the users in a group conversation up to a maximum number of representations of users (e.g., 5 or 6 or 7 or 8 or 9 users) in the user interface illustrated in FIG. 6S. If there are more users in the conversation than the maximum number of representations of users that are displayed, the electronic device 500 optionally displays the maximum number of users that most recently added messaging activity to the messaging conversation in the representation of the group conversation. In some embodiments, while displaying a messaging conversation of a group conversation (e.g., in a user interface similar to the user interface illustrated in FIG. 6J), the electronic device 500 is able to display a different maximum number (e.g., 4 or 5 or 6 or 7 or 8 or 9 or 10 or 11 or 12 or 13) of representations of users at the top of the user interface that is either greater than or less than the maximum number of representations of users that can be displayed in a representation of a group conversation in the user interface illustrated in FIG. 6S. In some implementations, the representation of the message that displays images associated with others in the group message is based on a template. Each template can change the size and position of images associated with others in a group message. Changes in size and position of images may be based on the recency of messages received by each person in the group. There may be a specific template based on the number of people in the group message. For example, a group message that includes three people besides the user of an electronic device may have spaces for three images representing the other people in the group message. Each group message that includes three people besides the user of the electronic device may use the same template (e.g., change sizes and positions in the same manner) so that each group message representation shows images in a uniform manner. For example, the image representing a person who sent the most recent message may show up on the right side of the group representation with the largest size of the representations of the group members.

Representations 606*g* and 616*j* include images 628*a* and 628*b* associated with the group conversations, for example. Because these group conversations have associated images 628*a* and 628*b* that have been set by a respective user in the respective conversations, the images 628*a* and 628*b* are optionally displayed in lieu of images (e.g., avatars) associated with the users in the conversation. Thus, in some embodiments, representations of pinned and unpinned group conversations with associated images (e.g., other than the avatars of the users in the group conversations) are displayed in similar manners.

Figure 6T:
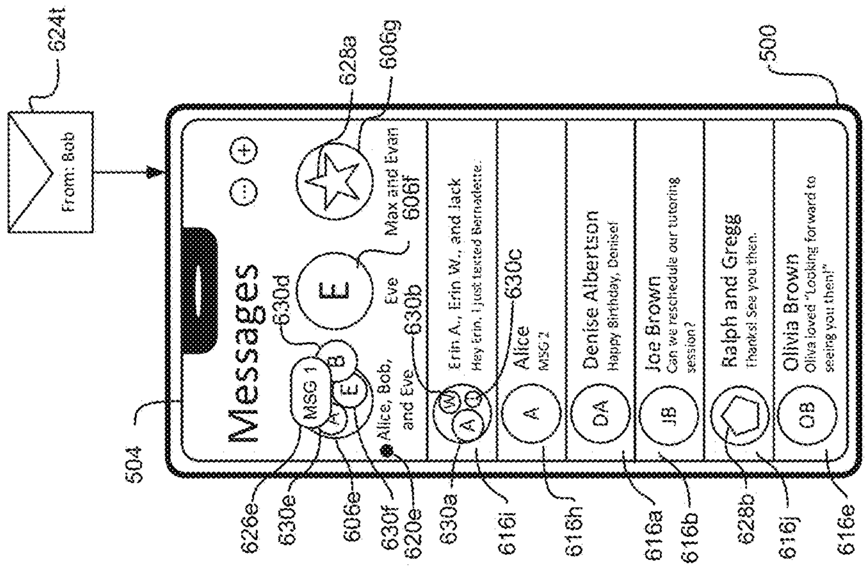
Figure 6S:
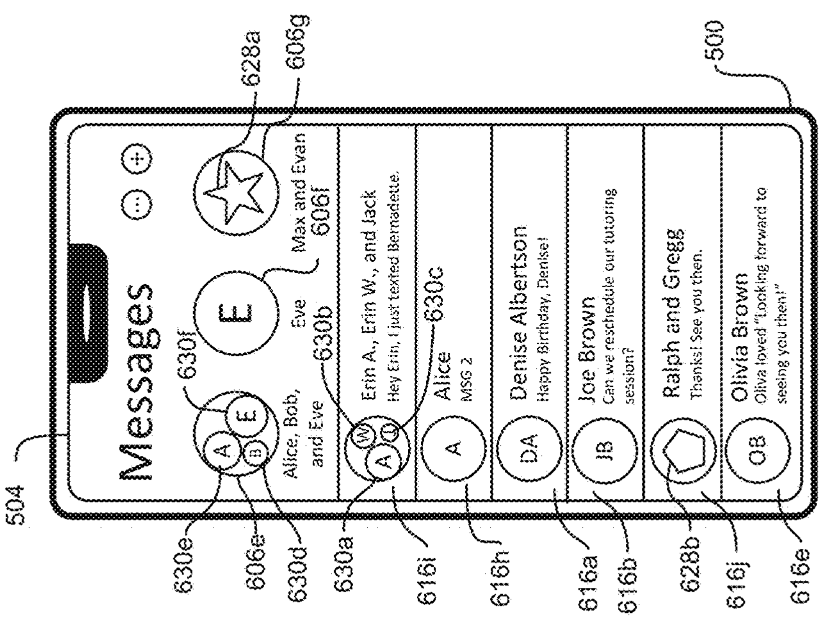

In FIG. 6T, the electronic device 500 detects an indication 624*t* of a message received in the group conversation associated with representation 606*e*. In response to the indication 624*t*, the electronic device 500 optionally displays the representation 630*d* of the user that sent the message at the perimeter (e.g., outer portion) of the representation 606*e* (e.g., moves the representation 630*d* to the perimeter of the representation 606*e*), a representation 626*e* of the content of the message displayed with (e.g., overlaid on a portion of) representation 630*d*, and an indication 620*e* that there is an unread message in the conversation.

In some embodiments, representation 630*d* is displayed at a larger size in FIG. 6T than it is in FIG. 6S. In some embodiments, if the user were to view the messaging conversation associated with representation 606*e* and return to the user interface shown in FIG. 6T, the electronic device 500 would update the representation 606*e* to include the representation 630*d* within the representation 606*e*. In some embodiments, representation 630*d* would be displayed at a larger size than the other representations 630*e* and 630*f* within the representation because the most recent message is from the user associated with representation 630*f* and representation 630*f* would be displayed larger than representation 630*e* because the user associated with representation 630*f* has provided messaging activity to the conversation more recently than the user associated with representation 630*e*.

As described above, in some embodiments, when the number of the users in the conversation exceeds a predetermined threshold (e.g., 5 or 6 or 7 or 8 or 9 etc.), only the maximum number of users with most recent messaging activity are displayed in the representation of the group conversation. In response to receiving messaging activity from a user whose representation is not included in the representation of the group conversation (e.g., because the user has not recently provided messaging activity to the conversation), the electronic device 500 optionally displays the representation of the user at the edge of the representation of the group conversation and the smallest representation of a user in the representation of the group would cease to be displayed.

In some embodiments, if a message were received in the conversation associated with representation 606*g*, the electronic device 500 would display a representation of the user that sent the message in a manner similar to the manner in which the electronic device 500 displays representation 630*d* of the user that sent the message in conversation 606*e*. For example, the electronic device 500 would display (e.g., add) the representation of the user at the perimeter of image 606*g* with a representation of the received message.

In some embodiments, if a message were received in either conversation associated with representations 616*i* and 616*j* (e.g., the unpinned message conversations in the unpinned messaging region of the messaging application user interface), the electronic device 500 would forgo displaying a representation of the user that sent the message at the periphery of image 628*b* or the circle in which representations 630*a-c* are displayed. Instead, the electronic device 500 would optionally update the text of representation 616*i* or 616*j* to include an indication of the most recent message as previously described. In some embodiments, if one of the users associated with representation 630*b* or 630*c* sends a message to the conversation associated with representation 616*i*, the electronic device 500 would optionally update the representation 616*i* of the conversation to display the representation of the user that sent the most recent message at the largest size compared to the representations of the other users. If the number of users in the conversation exceeds the maximum number of user representations that are simultaneously displayed in representations of group conversations and the user that provided the most recent messaging activity is not currently displayed in the representation of the group, the electronic device would update the group representation to remove the smallest representation of a user in the representation, decrease the size of the other user representations, and add a representation of the user that most recently sent the messaging activity to the representation of the group message and display that user representation at the largest size.

Figure 6V:
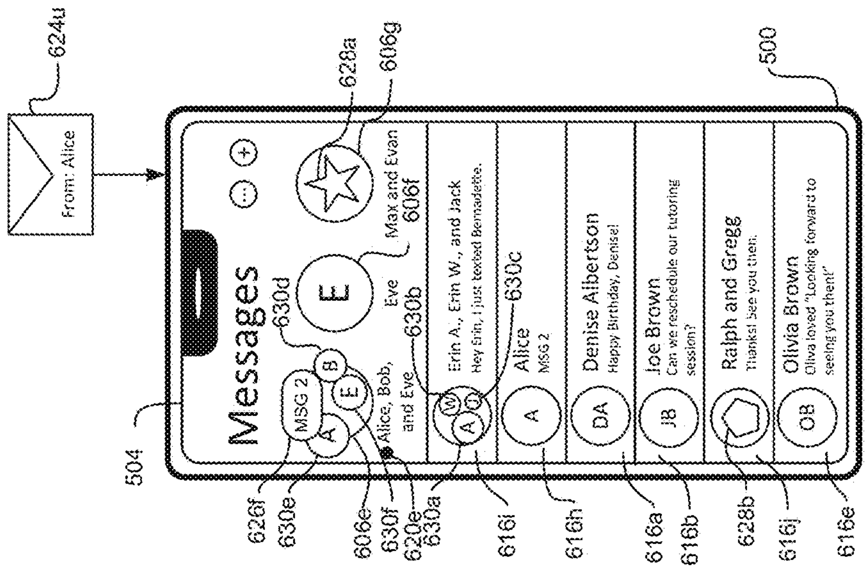
Figure 6U:
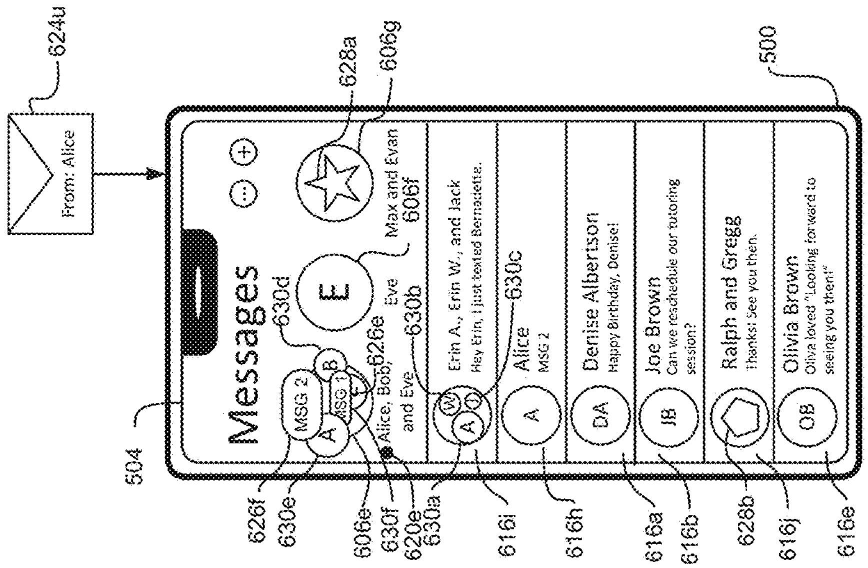

In FIG. 6U, the electronic device 500 optionally detects an indication 624*u* of another incoming message in the conversation associated with representation 606*e* from the user associated with image 630*e* (e.g., Alice). In response to detecting indication 624*u*, the electronic device 500 displays image 630*e* at the periphery (e.g., outer portion) of the representation 606*e* of the conversation and displays an indication 626*f* of the received message overlaid on image 630*e*. The electronic device 500 optionally reduces the size of image 630*d* and indication 626*e* in response to indication 624*u*. In some embodiments, the electronic device 500 updates the user interface to display image 630*d* away from the periphery of representation 606*e* (e.g., fully within representation 606*e*) in response to indication 624*u*.

Although FIG. 6U illustrates decreasing the size of indication 626*e* in response to indication 624*u*, in some embodiments, the electronic device 500 ceases displaying indication 626*e* in response to the indication 624*u*, as shown in FIG. 6V. As shown in FIG. 6V, in response to receiving the indication 624*u* of the message, the electronic device 500 displays the representation 630*e* of the contact that sent the message at the periphery of the representation 606*e* of the group conversation with the indication 626*f* of the message. The representation 630*d* of the contact that sent the previously-received message is optionally displayed at a smaller size than the size at which representation 630*d* was displayed in FIG. 6T. In some embodiments, the electronic device 500 displays indications of incoming messages for representation 606*g* that are similar to the examples described with reference to FIGS. 6T-6V because representation 606*g* is a representation of a pinned conversation. In some embodiments, the electronic device 500 forgoes displaying indications of received messages in the manner described with reference to FIGS. 6T-6V for representations 616*i* and 616*j* because representations 616*i* and 616*j* are representations of unpinned conversations. As shown in FIG. 6V, as more messaging activities are received in the group conversation, the representations of the contacts that sent the messages are displayed on alternating sides of the periphery of representation 606*e*, as will be described in more detail below with reference to FIGS. 6II-6LL.

In some embodiments, as mentioned previously, users may wish to edit which conversations are pinned at the top of the messages user interface. In some embodiments, the electronic device 500 is able to initiate additional processes to move a representation of a conversation from the unpinned region of the user interface to the pinned region of the user interface, as will now be described.

Figure 6X:
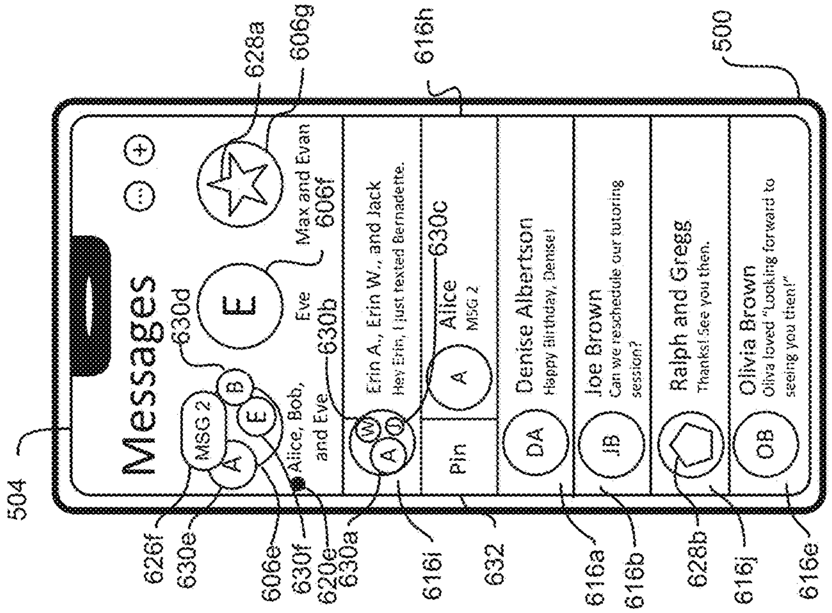
Figure 6W:
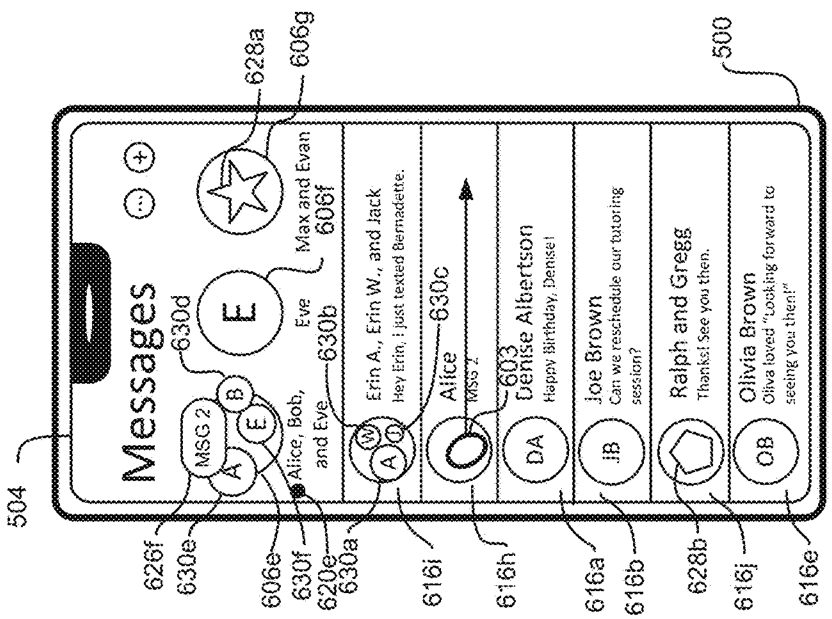
Figure 6Z:
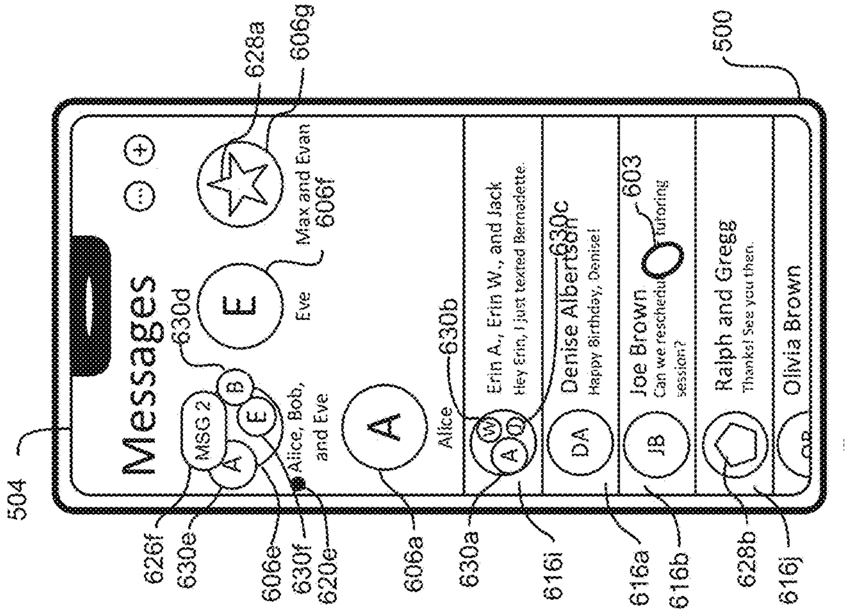

As shown in FIG. 6W, the user swipes (e.g., with contact 603) right across a representation 616*h* of a conversation that is not pinned. In some embodiments, in response to a right swipe that satisfies one or more criteria (e.g., speed or length-based criteria, such as speed above a threshold or length above a threshold), the electronic device 500 pins the conversation without additional input, as shown in FIG. 6Z (e.g., pinned as representation 606*a*). In some embodiments, in response to a right swipe that fails to satisfy the one or more criteria (e.g., speed or length-based criteria, such as speed or length below a respective threshold), the electronic device 500 displays an option to pin the conversation, as shown in FIG. 6X.

Figure 6Y:
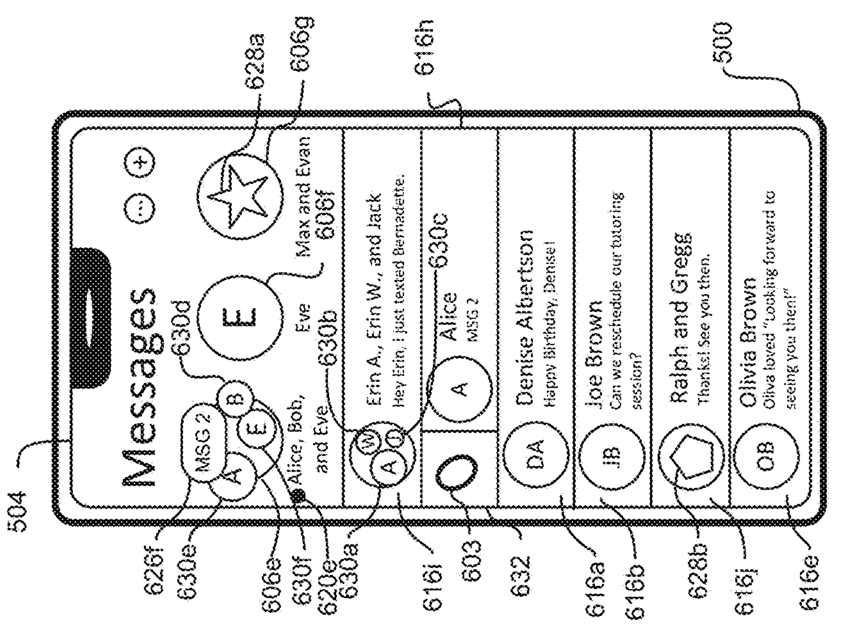
Figure 6B:
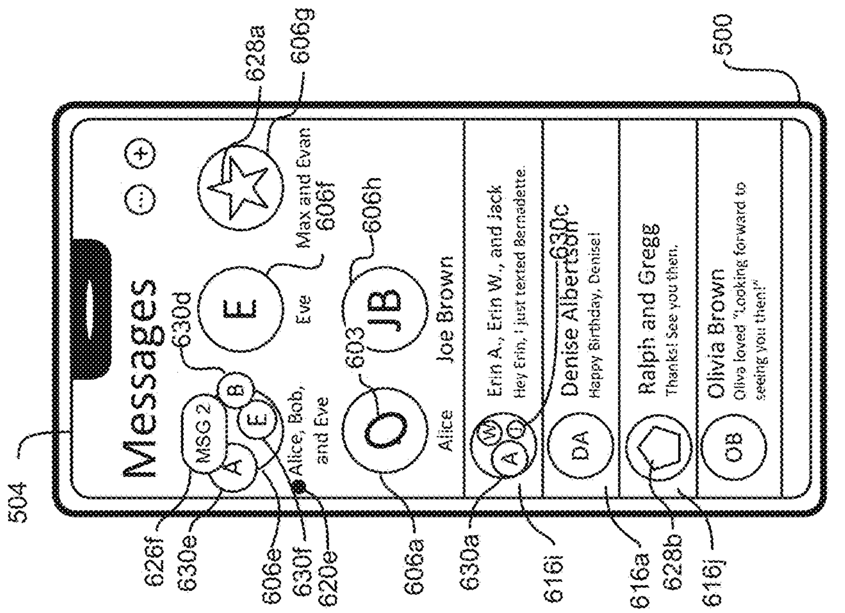
Figure 6A:
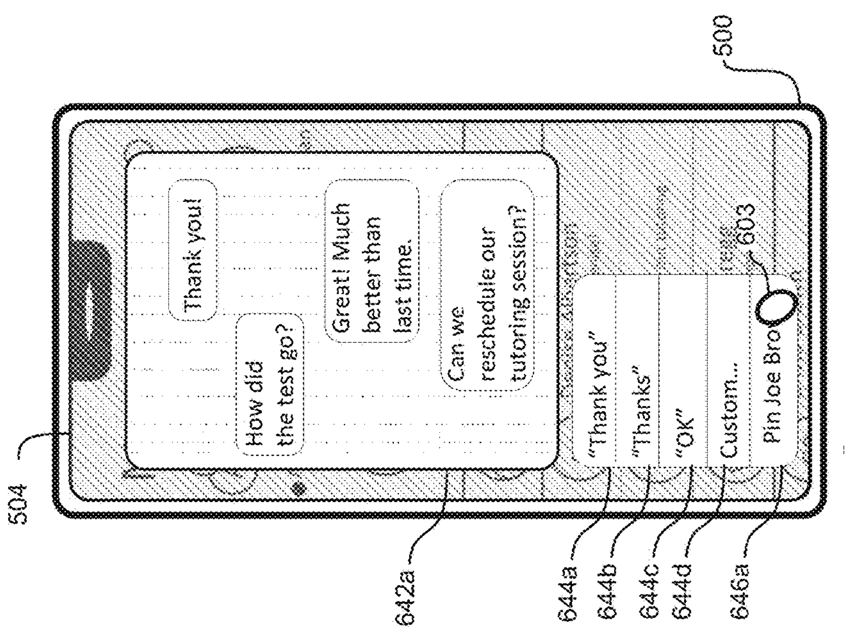
Figure 6C:
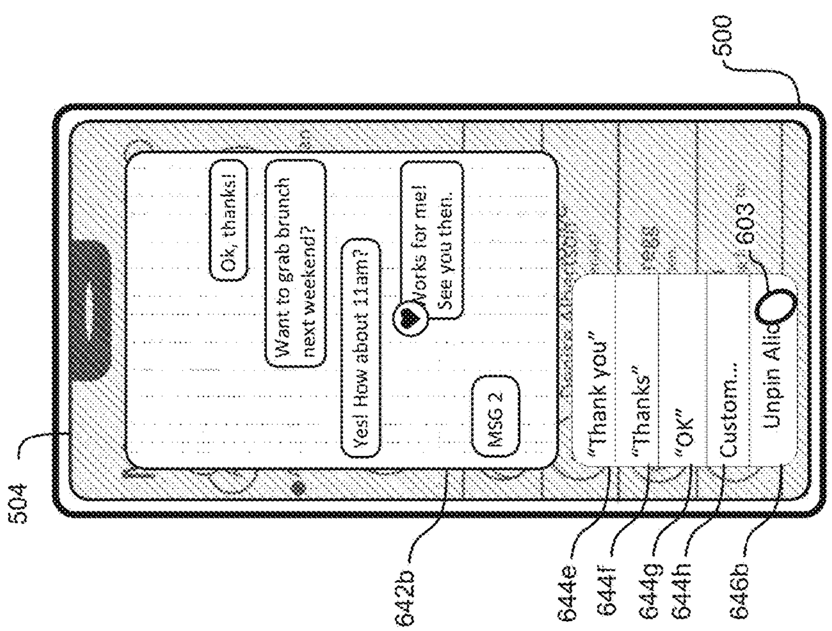
Figure 6D:
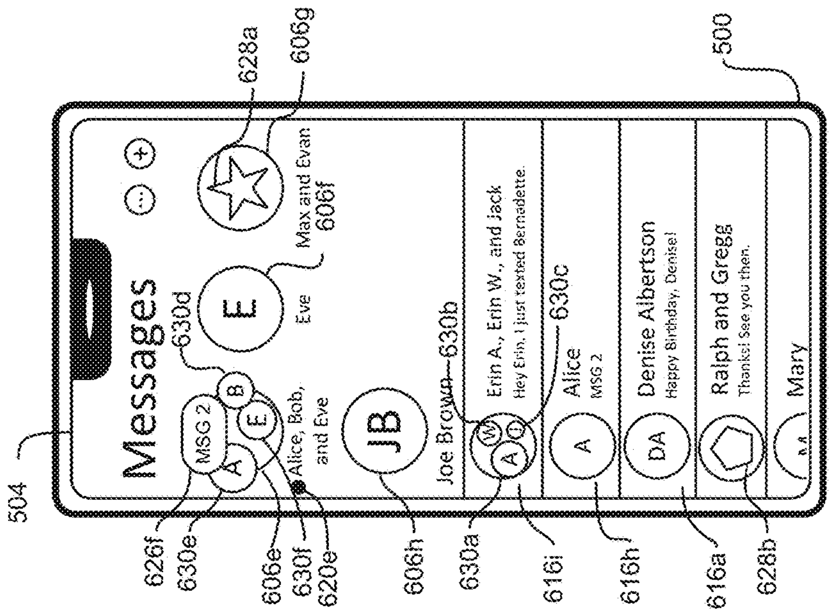
Figure 6F:
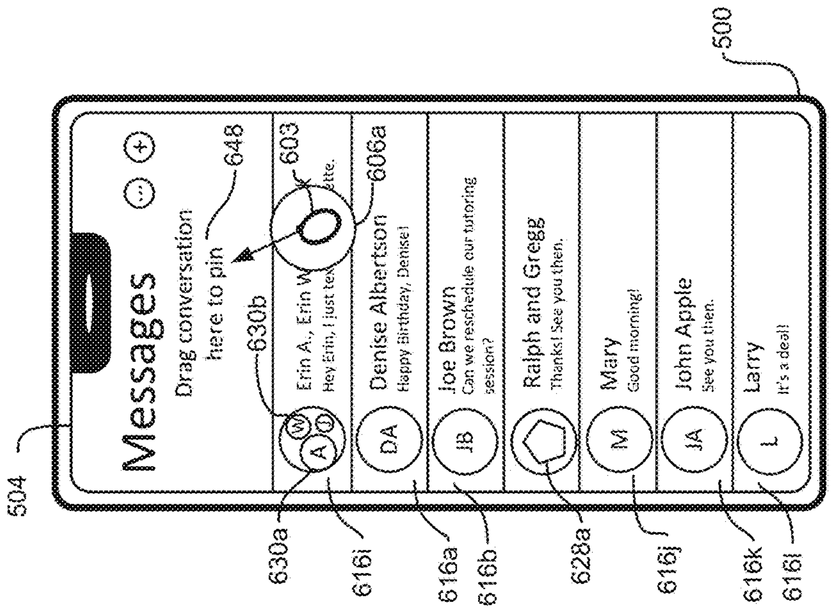
Figure 6E:
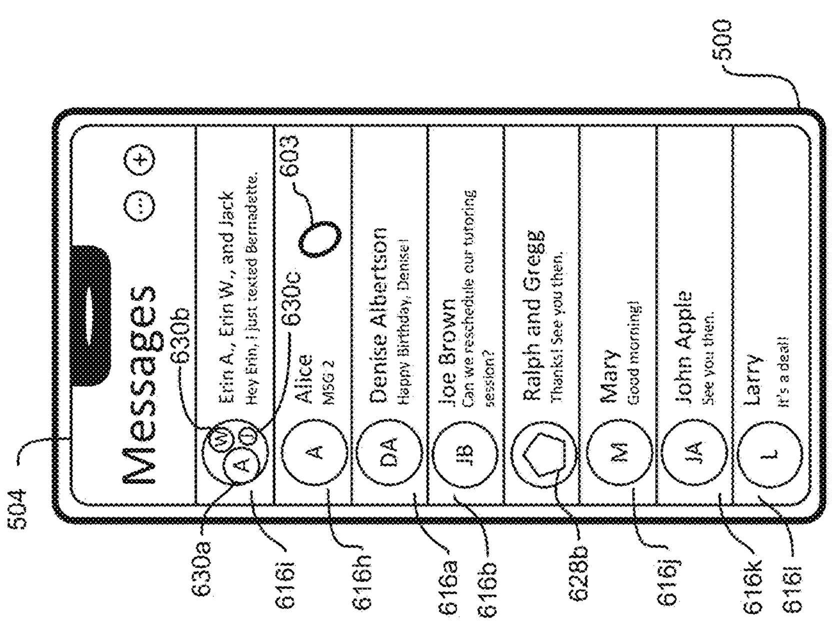
Figure 6H:
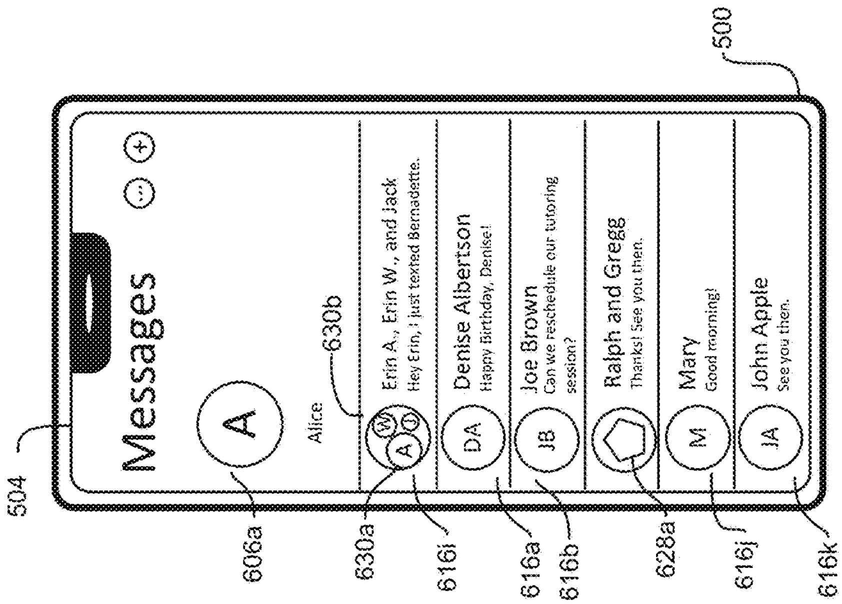
Figure 6G:
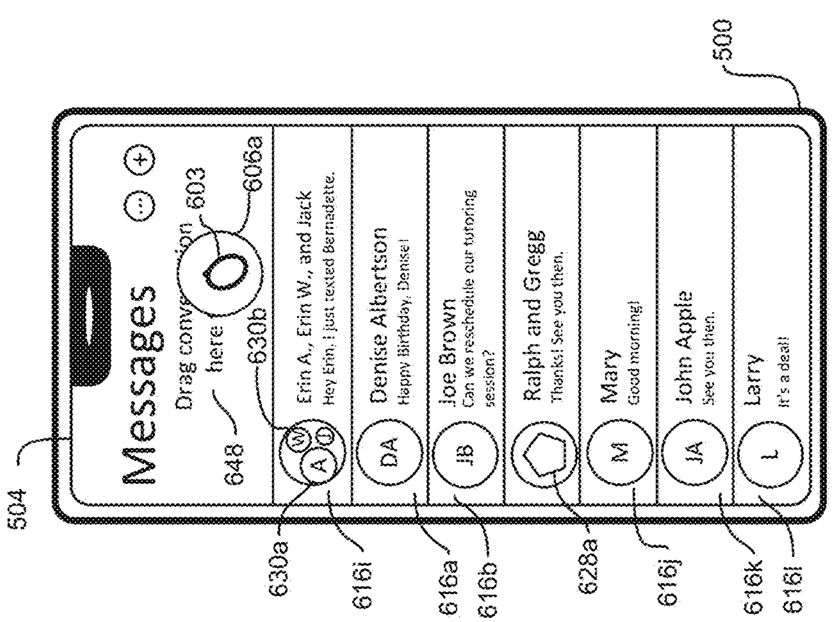
Figure 6J:
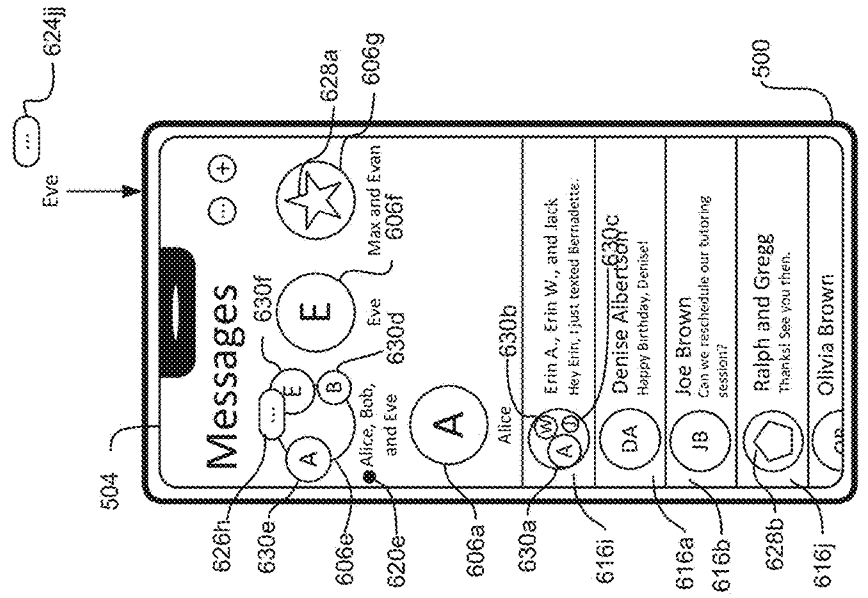
Figure 6I:
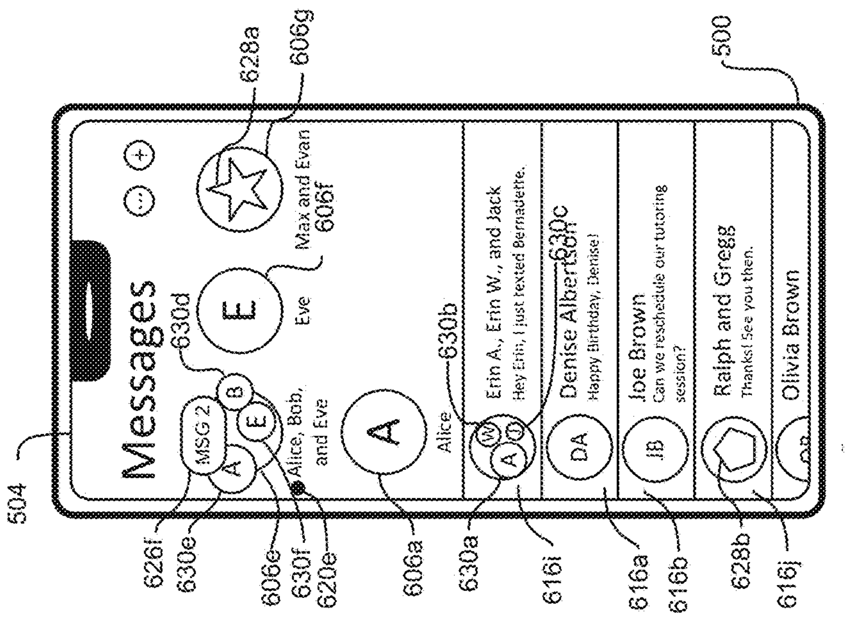
Figure 6L:
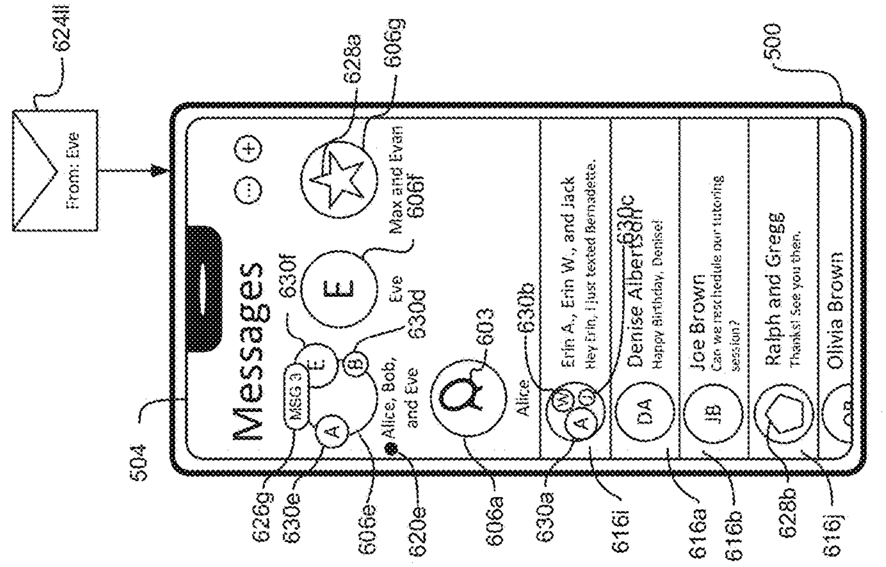
Figure 6K:
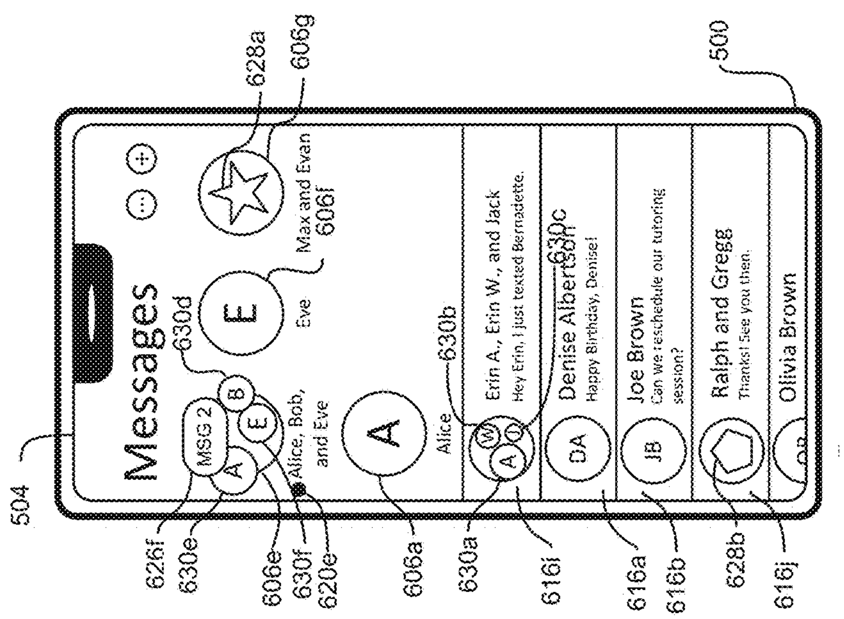
Figure 6N:
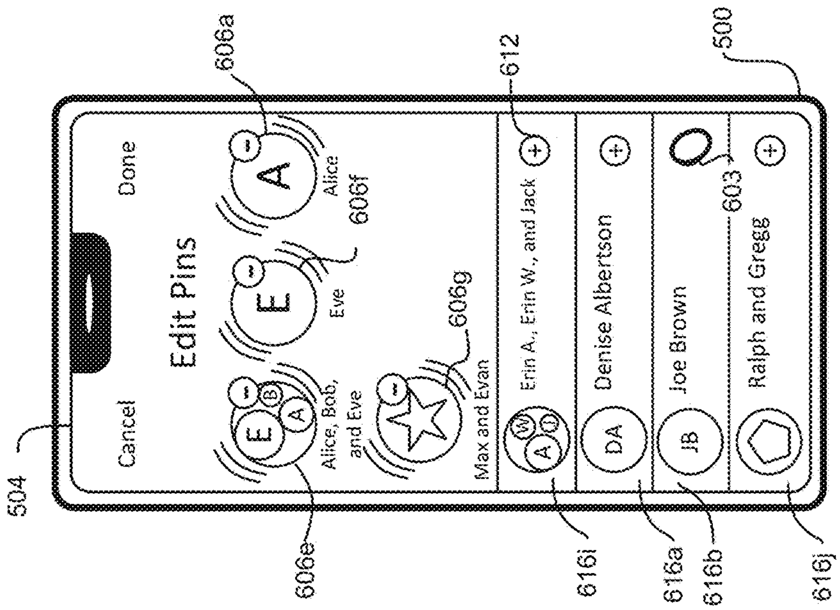
Figure 6M:
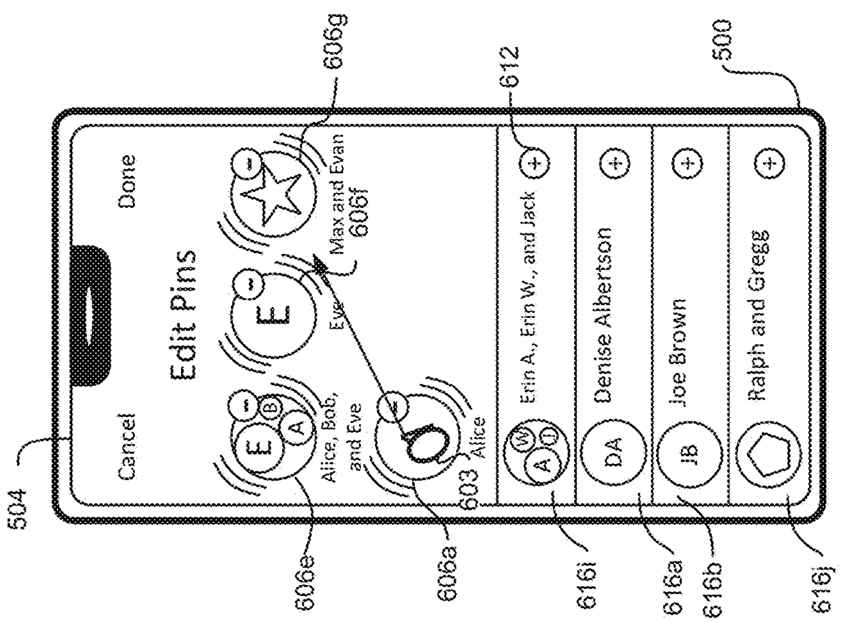
Figure 6O:
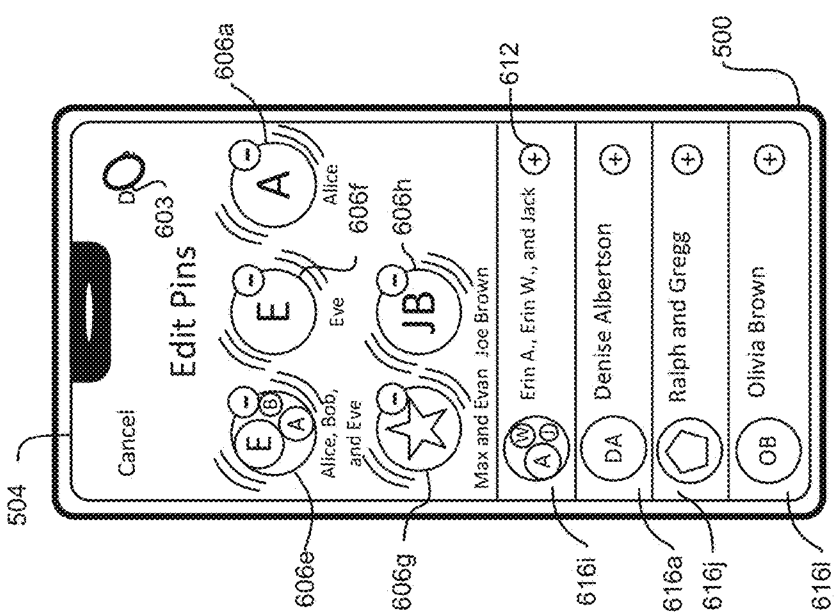
Figure 6P:
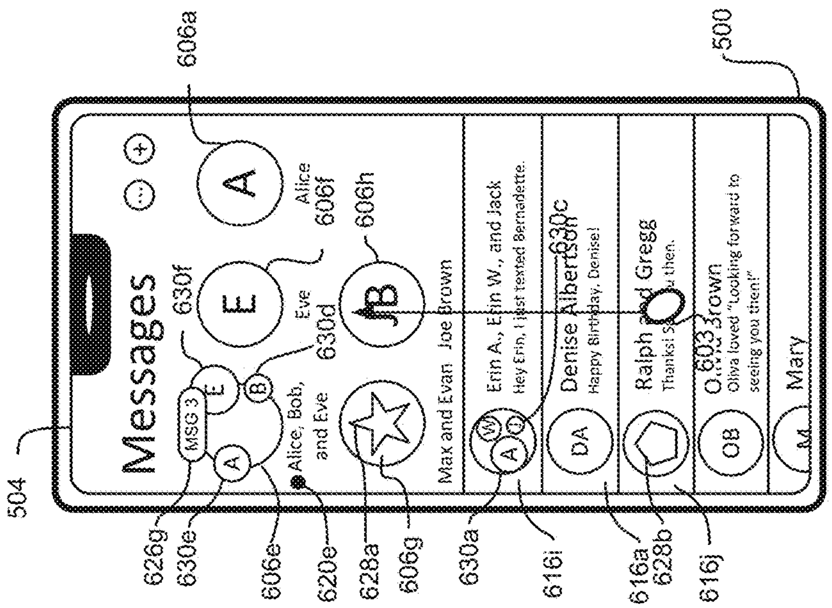
Figure 6R:
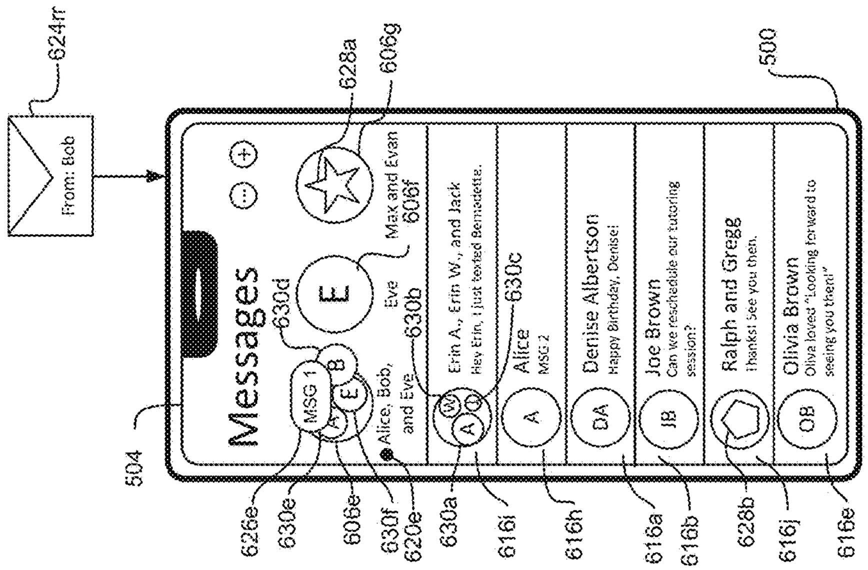
Figure 6Q:
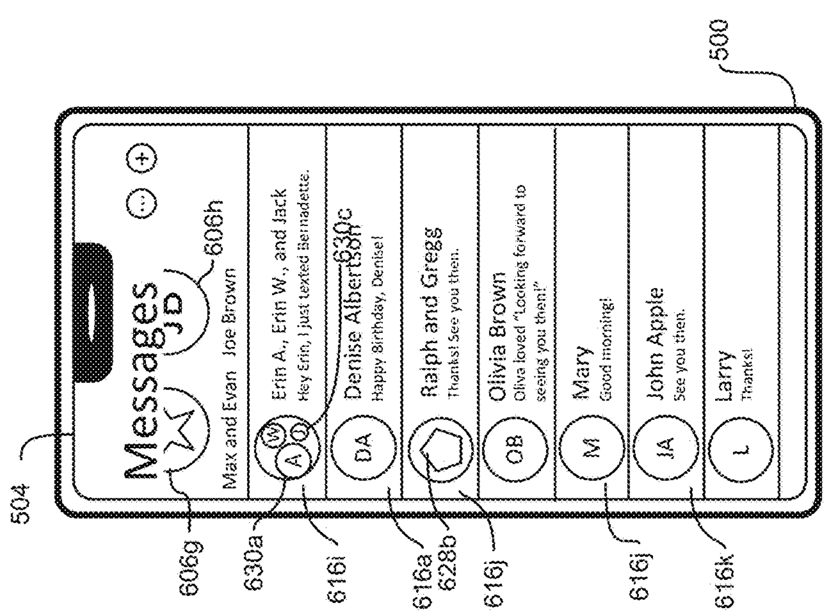
Figure 6S:
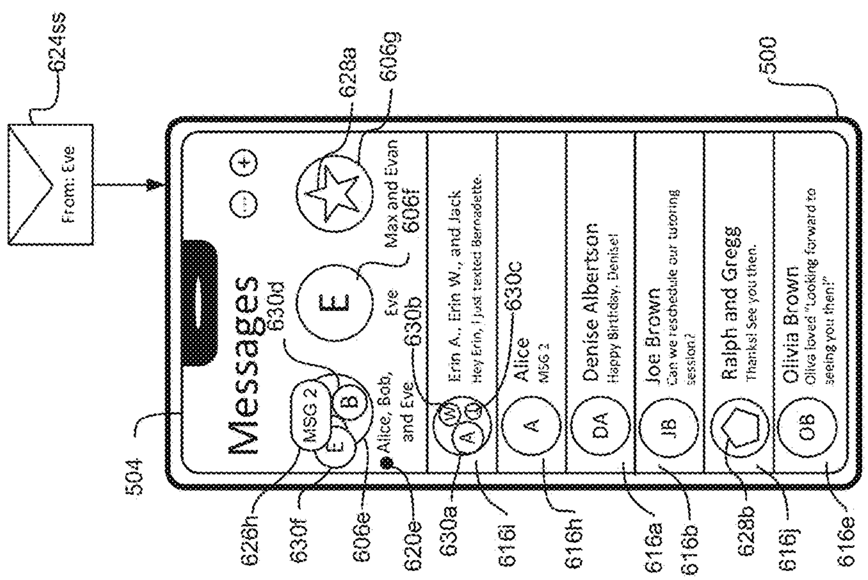

In FIG. 6X, in response to the swipe input that does not satisfy the one or more criteria, such as the swipe input illustrated in FIG. 6W, the electronic device 500 displays an option 632 adjacent to representation 616*h* that, when selected, causes the electronic device 500 to pin the conversation associated with representation 616*h*. As shown in FIG. 6Y, the user selects (e.g., with contact 603) the option 632 to pin the conversation associated with representation 616*h*.

FIG. 6Z illustrates the user interface after the conversation associated with representation 616*h* illustrated in FIGS. 6W-6Y has been pinned. The electronic device 500 displays a representation 606*a* of the conversation in the pinned conversations region, in response either to a swipe input that satisfies the criteria, such as the swipe input illustrated in FIG. 6W or in response to selection of the option 632 to pin the conversation, as shown in FIG. 6Y. As shown in FIG. 6Z, representation 616*h* is optionally no longer displayed in the unpinned conversation region. In some embodiments, representation 606*a* is added to the end of the pinned conversations.

In some embodiments, the electronic device 500 displays a menu associated with a messaging conversation, including an option to add the conversation to the pinned conversations, in response to detecting selection of a representation of the conversation with a first special characteristic (e.g., a contact that stays in place for a predetermined amount of time, such as a touch and hold input). For example, FIG. 6Z illustrates the user selecting (e.g., with contact 603) a representation 616*b* of a conversation. In some embodiments, the selection (e.g., with contact 603) is detected for an amount of time that exceeds a predetermined threshold (e.g., 0.5 seconds, 1 second, 2 seconds).

In response to the user's selection in FIG. 6Z, the electronic device 500 optionally displays the user interface illustrated in FIG. 6AA. As shown in FIG. 6AA, the electronic device 500 optionally displays a representation 642*a* of the messaging conversation corresponding to representation 616*b*, and a plurality of selectable options 644*a-c* that, when selected, cause the electronic device 500 to send a message to the messaging conversation with the contents indicated by the selected option, an option 644*d* that, when selected, causes the electronic device 500 to send a custom message to the messaging conversation, and an option 646*a* that, when selected, causes the electronic device 500 to pin the messaging conversation associated with representation 616*b*. In FIG. 6AA, the user selects (e.g., with contact 603) option 646*a* to pin the conversation.

In some embodiments, in response to the user's selection in FIG. 6AA, the electronic device 500 updates the user interface to present representation 606*h* of the messaging conversation in the pinned conversations region of the user interface (e.g., and no longer displays representation 616*b* in the unpinned conversations region of the user interface), as shown in FIG. 6BB. In some embodiments, representation 606*h* is displayed at the end of the pinned conversations section of the user interface.

As also shown in FIG. 6BB, the user selects (e.g., with contact 603) one of the representations 606*a* of a pinned conversation. In some embodiments, the electronic device 500 detects the contact 603 for an amount of time that exceeds a predetermined threshold (e.g., 0.5 seconds, 1 second, 2 seconds). In some embodiments, in response to the detecting the contact 603 illustrated in FIG. 6BB for the amount of time exceeding the threshold, the electronic device 500 displays the user interface illustrated in FIG. 6CC.

As shown in FIG. 6CC, the electronic device 500 optionally displays a representation 642*b* of the messaging conversation corresponding to representation 606*a*, a plurality of selectable options 644*e-g* that, when selected, cause the electronic device 500 to send a message to the messaging conversation indicated by the selected option, an option 644*h* to send a custom message to the conversation, and an option 646*b* to unpin the conversation. As shown in FIG. 6CC, the user selects (e.g., with contact 603) the option 646*b* to unpin the conversation.

In some embodiments, in response to the user's selection in FIG. 6CC, the electronic device 500 updates the messaging user interface to cease displaying representation 606*a* illustrated in FIG. 6BB and instead display representation 616*h* of the conversation in the unpinned conversations region of the user interface, as shown in FIG. 6DD.

In some embodiments, while the electronic device 500 displays representations of messaging conversations in the unpinned region of the user interface without displaying representations of messaging conversations in the pinned region of the user interface (e.g., because no conversations have yet been placed in the pinned region by the user), the user may wish to move one or more of the representations to the pinned region of the user interface. In response to an input beginning to drag a representation of an unpinned messaging conversation, the electronic device 500 optionally displays an indication of a location in which to drag and drop a representation of an unpinned conversation to pin the conversation when there are no pinned conversations in the user interface, as will now be described with reference to FIGS. 6EE-6HH.

In some embodiments, as shown in FIG. 6EE, the electronic device 500 displays the messaging user interface including representations 616 of messaging conversations. The electronic device 500 optionally displays the representations 616 such that representations 616 of conversations with the most recent messaging activity are displayed towards the top of the user interface. For example, the conversation associated with representation 616*i* has the most recent messaging activity and the conversation associated with representation 616*l* has the least recent messaging activity among the conversations for which representations 616 are currently displayed. In some embodiments, the user is able to scroll down in the messaging user interface to reveal additional representations of unpinned conversations. In FIG. 6EE, no conversations have been pinned yet. As shown in FIG. 6EE, the user selects (e.g., with contact 603) one of the representations 616*h* of a messaging conversation, for example. The electronic device 500 optionally detects the contact 603 for an amount of time exceeding a predetermined threshold (e.g., 0.5 seconds, 1 second, 2 seconds). In some embodiments, in response to detecting the contact 603 for the time exceeding the predetermined threshold, the electronic device 500 displays an indication of a location to which to drag the representation to pin the conversation (e.g., at the top of the messaging user interface, in an area that corresponds to where the pinned conversations will be displayed), as shown in FIG. 6FF.

As shown in FIG. 6FF, the electronic device 500 optionally displays representation 606*a* and an indication 648 of a region of the user interface that corresponds to the pinned conversations region of the user interface. In some embodiments, representation 616*h* illustrated in FIG. 6EE is replaced with representation 606*a* illustrated in FIG. 6FF in response to detecting contact 603 illustrated in FIG. 6EE for the time exceeding the predetermined time threshold before the user begins to drag the representation 606*a* of the conversation. In some embodiments, representation 616*h* illustrated in FIG. 6EE is replaced with representation 606*a* illustrated in FIG. 6FF in response to the user dragging the representation 606*a* at least a threshold distance. In response to detecting the user dragging the representation 606*a* to region 648 (e.g., with contact), the electronic device 500 optionally displays the representation 606*a* in the pinned conversations region of the user interface, as illustrated in FIGS. 6GG-6HH.

In some embodiments, as shown in FIG. 6GG, the user drags the representation 606*a* to indication 648 with contact 603. In response to detecting liftoff of contact 603 at the location illustrated in FIG. 6GG (or any other location overlapping indication 648), the electronic device 500 optionally displays the representation 606*a* of the conversation in the pinned conversations region of the user interface, as shown in FIG. 6HH.

In some embodiments, as shown in FIG. 6HH, in response to the user dragging and dropping representation 606*a* to indication 648*b*, as shown in FIGS. 6EE-6GG, the electronic device 500 displays the representation 606*a* at a predetermined location (e.g., on the left side, in the first position in the pinned region, etc.) of the pinned conversations region of the user interface. In some embodiments, the electronic device 500 displays representation 606*a* at the predetermined location (e.g., on the left side) of the pinned conversations region regardless of the location within the region at which the representation 606*a* is dropped, because representation 606*a* is optionally the first representation displayed in the pinned region.

In some embodiments, rather than displaying the representation 606*a* at the predetermined location (e.g., the left side) of the pinned conversations region as shown in FIG. 6HH, the electronic device 500 displays the representation 606*a* proximate to the location at which the representation 606*a* was dropped (e.g., in response to detecting liftoff of contact 603). For example, in response to detecting the representation 606*a* being dropped at the location illustrated in FIG. 6GG, the electronic device 500 optionally display the representation 606*a* in the middle of the pinned conversations region.

As described previously, in some embodiments, the electronic device 500 displays an indication of the last message received in a group conversation, including displaying a representation of the user that sent the last group message at the perimeter of the representation of the group conversation. The electronic device 500 optionally ceases to display the indication of a message if another message is received in the conversation, but optionally continues to display the representations of users that recently provided messaging activity to the messaging conversation. In some embodiments, there is a maximum number of representations of users that are displayed at the perimeter of the representation of the group conversation, such as 2 or 3 or 4. These and other exemplary details will now be described.

FIG. 6II illustrates an example of a representation 606*e* of a group conversation. Representation 606*e* can be the same representation with the same conversation history as described above with reference to FIGS. 6T-6V, for example. In FIG. 6II, the electronic device 500 optionally displays representation 630*d* (e.g., avatar) at the perimeter of representation 606*e* because the user represented by representation 630*d* has previously transmitted messaging activity to the conversation that has not yet been read by the user of electronic device 500. The electronic device 500 optionally displays an indication 626*f* of the most recent messaging activity sent to the conversation, and optionally displays representation 630*e* of the user that sent the message associated with indication 626*f* at the perimeter of representation 606*e* (e.g., indication 626*f* is optionally overlaid on a portion of representation 630*e*). In some embodiments, because the user associated with representation 630*e* sent messaging activity to the conversation more recently than the user associated with representation 630*d* sent messaging activity to the conversation, representation 630*e* is displayed at a larger size than the size of representation 630*d*, even though both representations are displayed at the perimeter (e.g., outer portion) of representation 606*e*.

In FIG. 6JJ, the electronic device 500 optionally detects an indication 624*jj* that the user associated with representation 630*g* is currently providing input to compose messaging activity in the messaging conversation (e.g., is typing but has not yet sent the messaging activity). In some embodiments, in response to indication 624*jj*, the electronic device 500 displays an indication 626*h* that the user is providing the input to the messaging conversation with representation 630*g* displayed at the perimeter of representation 606*e* (e.g., indication 626*h* is optionally overlaying a portion of representation 630*f*, and representation 630*f* moves from an inner portion to an outer portion of representation 606*e*). In some embodiments, representation 630*f* is displayed on the side of representation 606*e* opposite the side at which representation 630*e* is displayed because representation 630*e* was the most recent user avatar to be displayed at the perimeter. In some embodiments, representation 630*f* is displayed above representation 630*d* because the messaging activity associated with representation 630*f* was received more recently than the messaging activity associated with representation 630*d*. In some embodiments, in response to displaying representation 630*f*, the electronic device 500 moves representation 630*d* (e.g., moving representation 630*d* down to make room for representation 630*f*). The electronic device 500 optionally displays representation 630*f* at the same size as representation 630*e* and ceases displaying representation 626*f* illustrated in FIG. 6II. In some embodiments, the electronic device 500 does not decrease the sizes of representations 630*e* and 630*d* of the other users that recently provided messaging activity to the messaging conversation in response to indication 624*jj* because the message associated with the inputs corresponding to indication 624*jj* has not yet been sent. In some embodiments, the electronic device 500 does decrease the sizes of representations 630*e* and 630*d* of the other users (e.g., while maintaining their relative sizes) that recently provided messaging activity to the messaging conversation in response to indication 624*jj* and displays representation 630*f* at a larger size than representation 630*e* or 630*d*.

In FIG. 6KK, the user ceases providing input to compose a messaging activity in the messaging conversation (e.g., ceases typing a message without sending the message). In some embodiments, in response to ceasing to detect the indication 624*jj* of the user composing the messaging activity illustrated in FIG. 6JJ, the electronic device 500 ceases displaying the indication 626*h*, displays indication 630*g* of the user inside the representation 606*e* of the messaging conversation instead of at the perimeter of the representation 606*e* of the messaging conversation, and re-displays representation 626*f* of the most recent unread message in the conversation.

In FIG. 6LL, the electronic device 500 detects an indication 62411 of a message sent by the user associated with representation 630*g*. In response to indication 62411, the electronic device 500 optionally displays an indication 626*g* of the message (e.g., overlaying a portion of representation 630*g*), displays the representation 630*g* of the user that set the message at the perimeter of representation 606*e* of the messaging conversation, reduces the sizes of indications 630*e* and 630*d* of the other users that recently provided messaging activity to the conversation, and ceases displaying the representation 626*f* of another message illustrated in FIG. 6KK. In some embodiments, representation 630*f* is displayed on the side of representation 606*e* opposite the side at which representation 630*e* is displayed because representation 630*e* was the most recent user avatar to be displayed at the perimeter. In some embodiments, representation 630*f* is displayed above representation 630*d* because the messaging activity associated with representation 630*f* was received more recently than the messaging activity associated with representation 630*d*. In some embodiments, in response to displaying representation 630*f*, the electronic device 500 moves representation 630*d* (e.g., moving representation 630*d* down to make room for representation 630*f*).

As described above, in some embodiments, there is a maximum number of representations of users that the electronic device 500 displays at the perimeter of the representation of a group conversation. An example will be described in which the electronic device 500 displays a maximum of three representations of users, but it should be understood that the maximum can be a different number, such as 2 or 4 or 5 or any other suitable number. In this example, while displaying representations of three users at the perimeter of a representation of the group conversation, the electronic device 500 receives an indication of an additional message received in the conversation from a user whose avatar is not currently displayed at the perimeter of the representation of the conversation. In this example, in response to the indication of the new message, the electronic device 500 ceases to display the smallest representation of another user (e.g., representation 630*d* in FIG. 6LL) displayed at the perimeter of representation 606*e*, reduces the size of the other representations of users displayed at the perimeter of the representation 606*e* of the conversation, and displays the representation of the user that sent the most recent message at the perimeter of the representation of the group conversation. In some embodiments, the representations of the users are displayed alternating on opposite sides of the representation of the group conversation. For example, if the representation of the user that sent the most recent message to the conversation is displayed on the right side of the representation of the group message, then the electronic device 500 will optionally display the representation of the next user to send a message on the left side of the representation of the group conversation, and so on. In some embodiments, the electronic device 500 displays the representation of the user with the most recent messaging conversation at a vertical location above a representation of a user with less recent messaging activity. For example, in FIG. 6LL, representation 630*g* is displayed at a vertical location above the representation 630*d*, because the user associated with representation 630*g* sent a message to the conversation more recently that the user associated with representation 630*d*.

Returning to FIG. 6LL, the user selects (e.g., with contact 603) a representation 606*a* of a messaging conversation. In some embodiments, the contact 603 is detected for a time that exceeds a predetermined threshold (e.g., 0.5 seconds, 1 second, 2 seconds, 3 seconds). In some embodiments, this predetermined threshold is longer than the predetermined threshold described above with reference to FIGS. 6Z and 6BB.

In some embodiments, in response to the user's selection in FIG. 6LL in which contact 603 is detected for a time exceeding the predetermined threshold, the electronic device 500 displays a user interface for editing the conversations that are pinned, as shown in FIG. 6MM. In some embodiments, while displaying the user interface for editing the pinned conversations, the user is able to drag representations 616 of conversations are not pinned to the pinned conversation region to pin them, drag representations 606 of pinned conversations down to the unpinned conversations to unpin them, and/or rearrange the order of the representations 606 of pinned conversations. As shown in FIG. 6MM, the user selects and drags (e.g., with contact 603) a representation 606*a* of a pinned conversation to re-arrange its position within the other pinned conversations.

In some embodiments, as shown in FIG. 6NN, in response to the input illustrated in FIG. 6MM, the electronic device 500 displays the representation 606*a* at the location to which the representation 606*a* was dragged by the user. The electronic device 500 optionally moves representation 606*g* down to the second row of pinned conversations to accommodate representation 606*a* in the first row of pinned conversations. As shown in FIG. 6NN, the user selects (e.g., with contact 603) an option 612 to add a conversation associated with representation 616*b* to the pinned conversations.

In some embodiments, as shown in FIG. 6OO, in response to the user input illustrated in FIG. 6NN, the electronic device 500 displays representation 606*h* of the conversation selected by the user at the end of the pinned conversations region of the user interface and ceases displaying representation 616*b* of the conversation in the unpinned region of the user interface. in FIG. 6OO, the user selects (e.g., with contact 603) an option to stop editing the pinned conversations, for example.

As shown in FIG. 6PP, in response to the user's selection in FIG. 6OO, the electronic device 500 optionally ceases displaying the user interface for editing pinned conversations and displays the messaging user interface with the pinned conversations arranged according to the changes made by the user in FIGS. 6MM-6OO.

In some embodiments, the messaging user interface is scrollable, including scrolling the pinned conversations. In FIG. 6PP, the user swipes up (e.g., with contact 603 detected in the unpinned region or the pinned region, but without remaining stationary for the predetermined time thresholds described previously) to scroll the user interface down, for example. As shown in FIG. 6QQ, in some embodiments, in response to the input to scroll the user interface, the electronic device 500 scrolls the user interface including scrolling the representations 606 of pinned conversations (e.g., off touch screen 504). In some embodiments, it is possible to scroll the user interface down such that the representations 606 of pinned conversations are no longer displayed (e.g., scrolled completely off touch screen 504). In some embodiments, however, the representations 606 of pinned conversations are fixed in position in the user interface and scrolling only causes scrolling of the representations 616 of unpinned conversations while the representations 606 of pinned conversations continue to be displayed.

FIGS. 6RR-6SS illustrate another example of the electronic device 500 updating a representation 606*e* of a group conversation in response to receiving indications 624*n* and 624*ss* of incoming messages in the conversation. In some embodiments, the electronic device 500 displays an image associated with the user that sent the most recent message at the periphery of the representation 606*e*. In some embodiments, the electronic device 500 moves a representation of a user from the periphery of representation 606*e* to the interior of representation 606*e* in response to receiving another message in the messaging conversation from a different user, even if the user of the electronic device 500 does not read the messaging conversation between the receipt of the messages.

As shown in FIG. 6RR, in response to receiving an indication 624*rr* of a message in the conversation associated with representation 606*e*, the electronic device 500 displays the representation 630*d* of the user that sent the message at the periphery of the representation 606*e* of the messaging conversation. In some embodiments, the electronic device 500 also displays an indication 626*e* of the contents of the message in a manner similar to the manner described above.

As shown in FIG. 6SS, in response to receiving an indication 624*ss* of a subsequent message in the conversation associated with representation 606*e*, the electronic device 500 displays the representation 630*f* of the user that sent the subsequent message at the periphery of representation 606*e* of the messaging conversation. In some embodiments, as shown in FIG. 6SS, the electronic device 500 also moves the representation 630*d* of the user that sent the message received in FIG. 6RR to the inside of representation 606*e* and ceases displaying the indication 626*e* of the contents of the message received in FIG. 6RR in response to indication 624*ss* even if the user does not view the messaging conversation between receipt of indication 624*n* and indication 624*ss*. As shown in FIG. 6SS, the representation 630*f* is displayed at a larger size than representation 630*d*, for example. In some embodiments, the electronic device 500 also displays an indication 626*h* of the contents of the message associated with indication 624*ss*.

Figure 7:
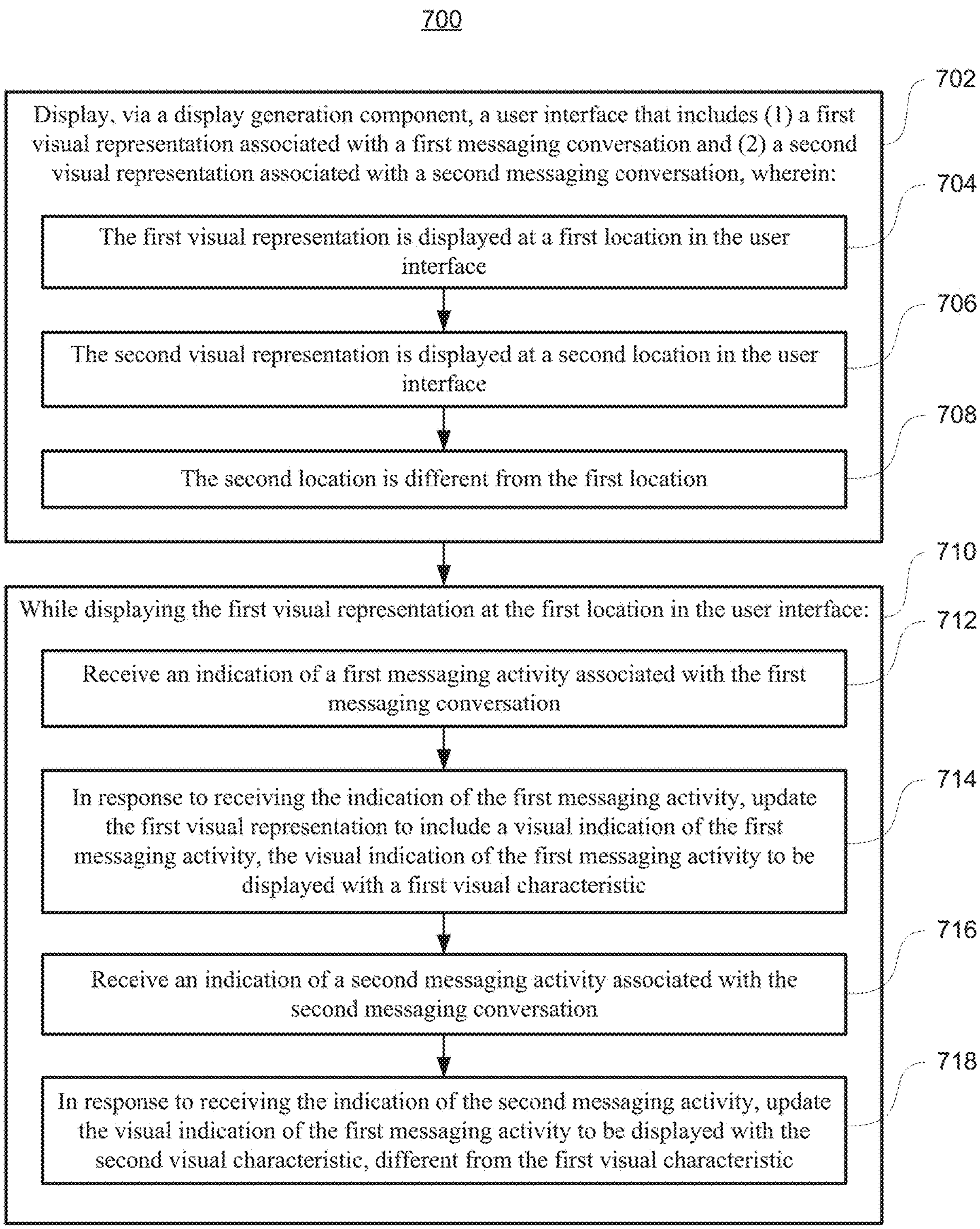
FIG. 7 is a flow diagram illustrating a method of presenting representations of messaging conversations in accordance with some embodiments of the disclosure.

FIG. 7 is a flow diagram illustrating a method 700 of presenting representations of messaging conversations in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device presents representations of messaging conversations. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed by an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.). In some embodiments, the electronic device 500 displays (702), via the display generation component, a user interface that includes (1) a first visual representation 606*a* associated with a first messaging conversation and (2) a second visual representation 606*b* associated with a second messaging conversation, such as in FIG. 6C. In some embodiments, the first visual representation 606*a* is displayed at a first location in the user interface (704), such as in FIG. 6C. In some embodiments, the second visual representation 606*b* is displayed at a second location in the user interface (706), such as in FIG.

6C. In some embodiments, such as in FIG. 6C, the second location is different from the first location (708). In some embodiments, each respective visual representation associated with a respective messaging conversation optionally includes a representation of one or more contacts included in the messaging conversation. For example, the respective visual representation includes an image associated with a contact card of one or more contacts in the conversation and/or an image associated with the conversation. In some embodiments, the user interface includes a plurality of representations of conversations that are "pinned" to a respective region of the user interface (e.g., the top of the user interface) and a plurality of representations of conversations that are not "pinned". The representations of the pinned conversations optionally have a different design, format, etc. than that of the representations of the conversations that are not pinned. In some embodiments, the representations of the pinned conversations are arranged in a grid and each include an image representing one or more participants in the conversation and text indicating a name of the contact in the messaging conversation or a name associated with a group conversation. The representations of the conversations that are not pinned optionally include all of the elements of the representations of pinned conversations and optionally further include a timestamp of the last messaging activity in the conversation and an indication of the last messaging activity in the conversation regardless of whether or not a user of the electronic device has opened the conversation since the last activity was received (e.g., regardless of whether or not the last activity is "read"). In some embodiments, the representations of pinned conversations only include indications of messaging activity that has been received since the user viewed the messaging conversation (e.g., the representations of pinned conversations only include indications of unread messaging activity). In some embodiments, messaging activity includes transmission of a message in the conversation and/or transmission of addition of a tag to an existing message (e.g., reactions such as "like," "love," "dislike," a laugh, emphasis, or a question mark) and/or changes to the members of the group (e.g., adding or removing a contact to/from the conversation) and/or changes to a name of the conversation.

In some embodiments, such as in FIG. 6D, while displaying the first visual representation 606*c* at the first location in the user interface (e.g., without moving the first visual representation) (710), the electronic device 500 receives an indication 624*d* of a first messaging activity associated with the first messaging conversation (712). In some embodiments, messaging activity includes transmission of a message in the conversation and/or transmission of addition of a tag to an existing message (e.g., reactions such as "like," "love," "dislike," a laugh, emphasis, or a question mark) and/or changes to the members of the group (e.g., adding or removing a contact to/from the conversation) and/or changes to a name of the conversation.

In some embodiments, such as in FIG. 6D, in response to receiving the indication 624*d* of the first messaging activity, the electronic device 500 updates (714) the first visual representation 606*a* to include a visual indication 626*a* of the first messaging activity, the visual indication 626*a* of the first messaging activity to be displayed with a first visual characteristic. In some embodiments, the first messaging conversation is a pinned conversation and the visual indication of the first messaging activity is displayed overlaid on the visual representation of the first messaging conversation. The first messaging activity is optionally receipt of a message in the first messaging conversation and the visual indication of the message includes some or all of the text of the message. In some embodiments, the visual indication of the message is initially displayed with a first size.

In some embodiments, such as in FIG. 6F, the electronic device 500 receives (716) an indication of a second messaging activity associated with the second messaging conversation. In some embodiments, messaging activity includes transmission of a message in the conversation and/or transmission of addition of a tag to an existing message (e.g., reactions such as "like," "love," "dislike," a laugh, emphasis, or a question mark) and/or changes to the members of the group (e.g., adding or removing a contact to/from the conversation) and/or changes to a name of the conversation. In some embodiments, the second messaging conversation is a different conversation than the first messaging conversation and both the first messaging conversation and the second messaging conversation are "pinned" to a respective region in the user interface.

In some embodiments, such as in FIG. 6F, in response to receiving the indication 624*f* of the second messaging activity, the electronic device 500 updates (718) the visual indication 626*a* of the first messaging activity to be displayed with the second visual characteristic, different from the first visual characteristic. In some embodiments, changing the visual characteristic of the visual indication of the first messaging activity in the first messaging conversation includes reducing a size of the visual indication, changing a color scheme of the visual indication (e.g., changing from being displayed in color to being displayed in black and white or grayscale), changing a translucency of the visual indication, etc.). In some embodiments, in response to receiving the indication of the second messaging activity associated with the second messaging conversation, the electronic device displays, via the display generation component, a visual indication of the second messaging activity on the second visual representation associated with the second messaging conversation.

The above-described manner of updating the display to display the visual indication of the first messaging activity with the visual characteristic having the second value different from the first value in response to receiving the indication of the second messaging activity enables the electronic device to continue to display the indication of the first messaging activity in a manner that efficiently communicates that other messaging activity has been received since the first messaging activity was received, which simplifies the interaction between the user and the electronic device and enhances the operability of the electronic device and makes the user-device interface more efficient (e.g., by enabling the user to determine the recency of the first messaging activity without entering an input that requests more information about the first messaging activity or the second messaging activity), which additionally reduces power usage and improves battery life of the electronic device by enabling the user to use the electronic device more quickly and efficiently.

In some embodiments, such as in FIG. 6F, the first visual representation 606*a* is still displayed at the first location after the visual indication 626*a* has been updated to be displayed with the second visual characteristic. In some embodiments, the locations of the first visual representation associated with the first messaging conversation and the second visual representation associated with the second messaging conversation are displayed at fixed locations in the user interface. Updating the first visual indication to be displayed with the second visual characteristic optionally includes one of updating a size, color, or translucency of the visual representation of the first messaging conversation without changing the location of the first visual representation. In some embodiments, in response to receiving an indication of subsequent messaging activity in the first messaging conversation, the electronic device displays a visual indication of the subsequent messaging activity and changes a location of the visual indication of the first messaging activity within the representation of the first messaging conversation, but does not change the location of the visual representation of the first messaging conversation itself. The above-described manner of maintaining the location of the first visual representation when updating the visual characteristic of the visual indication enables the electronic device to provide an efficient way of displaying the first visual representation, which simplifies the interaction between the user and the electronic device and enhances the operability of the electronic device and makes the user-device interface more efficient (e.g., by reducing the time and number of inputs needed to locate the first visual representation to access the first messaging conversation), which additionally reduces power usage and improves battery life of the electronic device by enabling the user to use the electronic device more quickly and efficiently.

In some embodiments, the second visual representation continues to be displayed at the second location in the user interface in response to receiving the indication of the first messaging activity and in response to receiving the indication of the second messaging activity. For example, the location in the user interface of the second visual representation does not change in response to receiving an indication of messaging activity in the second conversation or any other conversation. In some embodiments, the representations of the first messaging conversation and the second messaging conversation are displayed in a "pinned conversations" region of the user interface. Optionally, the location of each respective representation of a pinned conversation does not change when messaging activity is detected. In some embodiments, the messaging user interface further includes representations of additional messaging conversations that are not pinned. Optionally, the representations of additional messaging conversations are displayed in reverse-chronological order of the most recent messaging activity in the conversations. For example, if an indication of messaging activity associated with a respective conversation that is not pinned is detected, the electronic device updates the locations of the representations of the messaging conversations that are not pinned such that the representation of the respective conversation is displayed with highest priority in the user interface (e.g., at the top of a column of representations of messaging conversations).

In some embodiments, such as in FIG. 6H, the user interface further includes a third visual representation **616*f* associated with a third messaging conversation. In some embodiments, while displaying the first, second and third visual representations 606*a*-*b* and 616*f* in the user interface, the electronic device 500 receives an indication 624*h* of a third messaging activity associated with the third messaging conversation (e.g., a new message (e.g., including text and/or media, such as images, audio, etc.) is added to the conversation and/or a tag is added to an existing message in the conversation). In some embodiments, such as in FIG. 6H, in response to receiving the indication 624*h* of the third messaging activity, in accordance with a determination that one or more criteria are satisfied (e.g., not already at the top of the list of unpinned messages), updating a location of the third visual representation 616*f* in the user interface without updating the first location of the first visual representation 606*a* and the second location of the second visual representation 606*b***. In some embodiments, prior to receiving the indication of the third messaging activity, the most recently received messaging activity among unpinned conversations was associated with a different messaging conversation. Optionally, prior to receiving the indication of the third messaging activity, the representation of the different messaging conversation is displayed at the highest priority region of unpinned messaging conversations in the user interface. In some embodiments, in response to receiving the indication of the third messaging activity, the electronic device displays the representation of the third messaging conversation in the highest priority region of unpinned messaging conversations and moves the remaining representations of unpinned messaging conversations down in priority. For example, before the indication of the third messaging activity was received, a representation of a fourth messaging conversation is displayed at the top of the unpinned messages region of the user interface, with representations of other messaging conversations displayed below. In this example, in response to receiving the indication of the third messaging activity, the electronic device displays the representation of the third conversation at the top of the unpinned messages region of the user interface and moves the representations of the other unpinned conversations down. In some embodiments, in accordance with a determination that the one or more criteria are not satisfied, the electronic device does not update the location of the third visual representation. For example, if the most recently received messaging activity among the unpinned conversations was in the third conversation prior to receiving the third messaging activity, the electronic device optionally displays the third visual representation at the top of the unpinned conversations region of the user interface and continues to display the third visual representation at that location in response to receiving the indication of the third messaging activity.) In some embodiments, in response to receiving the indication of the third messaging activity, the electronic device updates the third visual representation to indicate the third messaging activity without updating the first visual representation and the second visual representation. In some embodiments, updating the third visual representation includes displaying an indication of the third messaging activity, such as by updating the visual representation to include a visual representation of the received messaging activity. For example, if the third messaging activity is a text message, the third visual representation is updated to include an indication of the sender of the text message and at least part of the text of the message. In some embodiments, in response to receiving messaging activity associated with an unpinned conversation, the representations of the pinned conversations are not changed. In some embodiments, the third visual representation is updated regardless of whether or not the one or more criteria are satisfied. The above-described manner of updating the third visual representation to indicate the third messaging activity without updating the first visual representation and the second visual representation enables the electronic device to efficiently communicate to the user that further messaging activity in the first or second messaging conversations has not been received, which simplifies the interaction between the user and the electronic device and enhances the operability of the electronic device and makes the user-device interface more efficient (e.g., by reducing the time it takes the user to determine which conversation received the recent messaging activity), which additionally reduces power usage and improves battery life of the electronic device by enabling the user to use the electronic device more quickly and efficiently.

In some embodiments, such as in FIG. 6I, the user interface further includes a third visual representation 606*c* associated with a third messaging conversation, and the visual indication 626*c* of the second messaging activity is displayed with a third visual characteristic (e.g., size, color, translucency, etc.). In some embodiments, such as in FIG. 6I, while displaying the first, second and third visual representations 606*a-c* in the user interface, receiving an indication 624*i* of a third messaging activity associated with the third messaging conversation (e.g., receipt of a new message in the third messaging conversation or a new tag being added to an existing message in the third messaging conversation). In some embodiments, such as in FIG. 6I, in response to receiving the indication of the third messaging activity, in accordance with a determination that one or more criteria are satisfied (e.g., the third messaging conversation is a "pinned" conversation), the electronic device 500 updates the visual indication of the first messaging activity 626*d* to be displayed with a fourth visual characteristic different from the second visual characteristic, and updating the visual indication 626*c* of the second messaging activity to have a fifth visual characteristic different from the third visual characteristic. In some embodiments, the respective locations of the first, second, and third representations of respective messaging conversations are the same before the indication of the third messaging activity is received as the respective locations of the first, second, and third representations of respective messaging conversations after the indication of the third messaging activity is received. The electronic device optionally displays the visual indication of the most-recently received messaging activity at the largest size compared to the other visual indications of other messaging activities and, when a new indication of a new messaging activity is received, the electronic device reduces the size of the visual indications of the previously-received messaging activities. In some embodiments, the electronic device only displays visual indications of messaging activities in pinned conversations while the messaging activities are unread by the user. In some embodiments, once the user has read a respective messaging activity (e.g., by selecting the representation of the messaging conversation in which the messaging activity was received to view the messaging conversation after the messaging activity was received), the electronic device ceases to display the visual indication of the messaging activity with the representation of the messaging activity. The above-described manner of updating the visual characteristics of the first and second visual indications of respective messaging activities enables the electronic device to efficiently communicate the order in which the messaging activities were received across different conversations, which simplifies the interaction between the user and the electronic device and enhances the operability of the electronic device and makes the user-device interface more efficient (e.g., by reducing the inputs needed to view the indications of all of the messaging activities with an indication of the order in which the messaging activities were received), which additionally reduces power usage and improves battery life of the electronic device by enabling the user to use the electronic device more quickly and efficiently.

In some embodiments, such as in FIG. 6I, while displaying the first visual representation 606*a* including the visual indication of the first messaging activity, receiving, via the one or more input devices, an input (e.g., via contact 603) to display the first messaging activity within the first messaging conversation. In some embodiments, the electronic device detects selection of the first visual representation. In some embodiments, displaying the first messaging activity within the first messaging conversation includes displaying the additional messages included in the messaging conversation. In some embodiments, in response to receiving the input to display the first messaging activity within the first messaging conversation, such as in FIG. 6I, the electronic device 500 displays, via the display generation component, a content of the first messaging conversation including the first messaging activity (e.g., representations of the other messaging activities in the first messaging conversation and a representation of the first messaging activity. In some embodiments, such as in FIG. 6K, after displaying the content of the first messaging conversation including the first messaging activity, the electronic device displays, via the display generation component, the user interface that includes the first visual representation 606*a* associated with the first messaging conversation and the second visual representation 606*b* associated with the second messaging conversation, wherein the first visual representation 606*b* does not include the visual indication 626*b* of the first messaging activity, such as in FIG. 6I. For example, removing, from the first visual representation, the visual indication of the first messaging activity. In some embodiments, the first visual representation is not displayed while the electronic device displays the content of the first messaging conversation. The electronic device optionally displays the first visual representation in response to receiving an input corresponding to request to navigate back in the user interface to the user interface including the representations of messaging conversations, including the first visual representation without the visual indication of the first messaging activity. In some embodiments, the electronic device displays the visual representations of pinned conversations including visual indications of messaging activity that has been received since the last time the user viewed the content of the respective pinned conversation. The electronic device optionally ceases to display visual indications of messaging activity in the visual representations of pinned conversations in response to detecting that the user has viewed the content of the respective pinned messaging conversation since the messaging activity was received. In some embodiments, the representations of unpinned conversations always include a visual indication of the most recent messaging activity regardless of whether or not the user has viewed the content of the messaging conversation since the most recent messaging activity was received. In some embodiments, the electronic device displays the representations of unpinned conversations including the visual indication of the last-received messaging activity in the conversation even if the most recent messaging activity was generated by the user account associated with the electronic device. The electronic device optionally does not display indications of messaging activity generated by the user account of the electronic device with the visual representations of pinned conversations. The above-described manner of removing the visual indication of the first messaging activity in response to the input to display the content of the first messaging conversation enables the electronic device to efficiently indicate to the user whether or not there is unread messaging activity associated with the first messaging conversation, which simplifies the interaction between the user and the electronic device and enhances the operability of the electronic device and makes the user-device interface more efficient (e.g., by reducing the time and number of inputs it takes the user to determine whether or not new messaging activity associated with the first messaging conversation has been received), which additionally reduces power usage and improves battery life of the electronic device by enabling the user to use the electronic device more quickly and efficiently.

In some embodiments, such as in FIG. 6C, the user interface further includes a third visual representation 616*a* associated with a third messaging conversation. In some embodiments, such as in FIG. 6C, the first and second locations are in a first region of the user interface (e.g., a pinned conversations region of the user interface). In some embodiments, such as in FIG. 6C the third location is in a second region of the user interface (e.g., an unpinned conversations region of the user interface), and the second region is displayed with lower priority than (e.g., below) the first region in the user interface. In some embodiments, such as in FIG. 6C, the first respective visual representations of first respective messaging conversations, including the third visual representation 616*a* of the third messaging conversation, are displayed in the second region of the user interface in an order based on recency of messaging activity in the first respective messaging conversations (e.g., in response to receiving new messaging activity in one of the respective messaging conversations, the priority with which the respective visual representations of the respective messaging conversations are displayed is updated to display the respective messaging conversation in which the new messaging activity was received with the highest priority. The electronic device optionally displays the representation of the messaging conversation in the second region that has the most recent activity at the top of the second region, with the remaining representations of messaging conversations displayed in order of most recent to least recent activity. In some embodiments, second respective visual representations of second respective messaging conversations, including the first visual representation 606*c* of the first messaging conversation and the second visual representation 606*b* of the second messaging conversation, are displayed in the first region of the user interface in an order not based on recency of messaging activity in the second respective messaging conversations. In some embodiments, visual representations of conversations in the first region of the user interface are arranged according to a user-defined order. In some embodiments, visual representations of conversations in the second region of the user interface are displayed in an order with the messaging conversations with the most recent activity being displayed with higher priority than messaging conversations with less recent activity (e.g., the representations are arranged in reverse-chronological order). The above-described manner of displaying representations of conversations in different regions based on different ordering enables the electronic device to provide efficient access to certain conversations, which simplifies the interaction between the user and the electronic device and enhances the operability of the electronic device and makes the user-device interface more efficient (e.g., by reducing the number of inputs required to view the contents of pinned conversations), which additionally reduces power usage and improves battery life of the electronic device by enabling the user to use the electronic device more quickly and efficiently.

In some embodiments, such as in FIG. 6K, the user interface further includes a third visual representation 616*c* associated with a third messaging conversation, the third visual representation 616*c* displayed at a third location in the user interface. In some embodiments, such as in FIG. 6K, the first and second locations are in a first region of the user interface (e.g., a pinned conversations region of the user interface). In some embodiments, such as in FIG. 6K, the third location is in a second region of the user interface (e.g., an unpinned conversations region of the user interface). In some embodiments, while displaying the third visual representation 616*c* of the third messaging conversation in the second region of the user interface, the electronic device 500 receives, via the one or more input devices, an input (e.g., with contact 603) corresponding to a request to move the third visual representation from the second region to the first region. In some embodiments, the electronic device detects selection of the third visual representation and movement from the second region to the first region (e.g., the electronic device detects the user "dragging" the third representation from the second region to the first region). In some embodiments, in response to receiving the input corresponding to the request to move the third visual representation 616*c* from the second region to the first region, such as in FIG. 6K, moving the third representation from the second region to a third location in the first region, wherein the third location is different from the first location and the second location, and the third location does not change in response to detecting messaging activity at the electronic device, such as in FIG. 6M. In some embodiments, in response to detecting movement of the third visual representation to the first region, the electronic device displays the third visual representation at the end of the group of pinned conversations. In some embodiments, in response to detecting movement of the third visual representation to the first region, the electronic device displays the third visual representation at a location selected by the user (e.g., defined by the location to which the user drags the third representation). While the first, second, and third visual representations are displayed in the first region, the locations of the first, second, and third visual representations remain unchanged in response to detected receipt of new messaging activity. The above-described manner of moving the third representation to the first region in response to the input enables the electronic device to provide an efficient way of adding conversations to the pinned conversations region, which simplifies the interaction between the user and the electronic device and enhances the operability of the electronic device and makes the user-device interface more efficient (e.g., by reducing the number of inputs needed to add conversations to the pinned conversations region), which additionally reduces power usage and improves battery life of the electronic device by enabling the user to use the electronic device more quickly and efficiently.

In some embodiments, such as in FIG. 6M the first and second locations are in a first region of the user interface (e.g., a pinned conversations region of the user interface). In some embodiments, such as in FIG. 6M, the user interface includes a second region of the user interface (e.g., an unpinned conversations region of the user interface). In some embodiments, such as in FIG. 6M, while displaying the first visual representation 606*a* in the first region of the user interface, the electronic device 500 receives, via the one or more input devices, an input corresponding to a request to move the first visual representation from the first region to the second region. In some embodiments, the electronic device detects selection of the first visual representation and movement from the first region to the second region (e.g., the electronic device detects the user "dragging" the first representation from the first region to the second region). In some embodiments, in response to receiving the input corresponding to the request to move the first visual representation 606*a* from the first region to the second region, such as in FIG. 6M, the electronic device 500 moves the first representation from the first region to a third location in the second region, wherein the third location is based on a recency of messaging activity in the first messaging conversation with respect to other messaging conversations that have visual representations displayed in the second region of the user interface, such as in FIG. 6N. In some embodiments, in response to detecting movement of the first representation to the second region, the electronic device displays the first visual representation within the representations of other unpinned conversations according to reverse-chronological order of the order in which messaging activity was received in each unpinned conversation independent of the location in the user interface at which the input moving the first visual representation ends (e.g., the location at which the user "drops" the first visual representation within the second region). The electronic device optionally updates the order in which representations of messaging conversations are displayed in response to receiving messaging activity associated with an unpinned conversation. The above-described manner of moving the third representation to the second region in response to the input enables the electronic device to provide an efficient way of removing conversations from the pinned conversations region, which simplifies the interaction between the user and the electronic device and enhances the operability of the electronic device and makes the user-device interface more efficient (e.g., by reducing the number of inputs needed to remove conversations from the pinned conversations region), which additionally reduces power usage and improves battery life of the electronic device by enabling the user to use the electronic device more quickly and efficiently.

In some embodiments, such as in FIG. 6E, the visual indication of the first messaging activity includes a first respective indication 626*b* that another device associated with the first messaging conversation is receiving one or more input characters without receiving a request to send the one or more characters to the first messaging conversation. For example, a respective user, other than a user of the electronic device, included in the first messaging conversation is currently providing input to the first messaging conversation. In some embodiments, the first respective indication does not indicate a type of the input (e.g., voice input, typing, etc.) or messaging activity (e.g., a text message versus a tag versus an image etc.) being provided by the respective user to the first messaging conversation. The electronic device optionally displays the same typing indicator independent of the type of input or type of message being provided by the user. For example, the typing indicator is shown in response to detecting an indication that the user is entering text with a soft keyboard. As another example, the typing indicator is shown in response to detecting an indication that the user is selecting an image to send in a message to the messaging conversation. In some embodiments, in response to detecting that the respective user has ceased entering input to the first messaging conversation, the electronic device ceases to display the visual indication. For example, in response to detecting an indication that the respective user is typing a message to be sent to the first messaging conversation, the electronic device displays the visual indication. The above-described manner of displaying the visual indication of the user providing input to the first messaging conversation enables the electronic device to efficiently indicate that the user is providing input without receiving an input requesting to view the contents of the messaging conversation, which simplifies the interaction between the user and the electronic device and enhances the operability of the electronic device and makes the user-device interface more efficient (e.g., by reducing the number of inputs needed to view the indication), which additionally reduces power usage and improves battery life of the electronic device by enabling the user to use the electronic device more quickly and efficiently.

In some embodiments, such as in FIG. 6F, in response to an indication that the other device associated with the first messaging conversation has received the request to send the one or more characters to the first messaging conversation (e.g., an end of the input to the first messaging conversation provided by the respective user, such as an input to send the message that was composed to the messaging conversation), replacing the first respective indication 626*b*, such as in FIG. 6E, with a second respective indication 636*c*, such as in FIG. 6F, that indicates a type (e.g., and optionally content of) of messaging activity that was provided by the respective user to the first messaging conversation. In some embodiments, possible types of messaging activity include sending text to the conversation, sending an image to the conversation, sending audio to the conversation, or adding a tag (e.g., a like tag, a dislike tag, etc.) to an existing message in the conversation. For example, if the messaging content includes adding a tag to an existing message in the conversation, the second respective indication is an image corresponding to the tag. As another example, if the messaging content includes a message including text, the second respective indication includes at least a portion of the text of the message. In some embodiments, if the respective user ceases providing input to the messaging conversation without transmitting messaging activity, the first respective indication ceases to be displayed without displaying the second respective indication. The above-described manner of replacing the first respective indication with a second respective indication that indicates the type of messaging activity enables the electronic device to provide an efficient way to view the type of messaging content added to the conversation, which simplifies the interaction between the user and the electronic device and enhances the operability of the electronic device and makes the user-device interface more efficient (e.g., by reducing the number of inputs needed to view the type of messaging activity that was added to the conversation), which additionally reduces power usage and improves battery life of the electronic device by enabling the user to use the electronic device more quickly and efficiently.

In some embodiments, the visual indication 626*c* of the first messaging activity includes at least a portion of a most recent unread message in the first messaging conversation, such as in FIG. 6F. In some embodiments, if the most recent unread message in the messaging conversation has a length that is less than a threshold, the entire content of the message is displayed. In some embodiments, if the most recent unread message in the messaging conversation has a length that is greater than the threshold, a portion of the message is displayed. The electronic device optionally does not display a visual indication of messaging activity that has been read in the first messaging conversation. The above-described manner of including at least the portion of the most recent unread message enables the electronic device to efficiently provide the content of the messaging activity without receiving an input to view the content of the messaging conversation which simplifies the interaction between the user and the electronic device and enhances the operability of the electronic device and makes the user-device interface more efficient (e.g., by reducing the number of inputs needed to view the portion of the messaging activity), which additionally reduces power usage and improves battery life of the electronic device by enabling the user to use the electronic device more quickly and efficiently.

In some embodiments, such as in FIG. 6U, while displaying the first visual representation 606*e* including the visual indication 626*e* of the first messaging activity (e.g., and before displaying the content of the first messaging conversation including the first messaging activity), the electronic device 500 receives an indication 624*u* of third messaging activity associated with the first messaging conversation. In some embodiments, such as in FIG. 6U, in response to receiving the indication 624*u* of the third messaging activity associated with the first messaging conversation, the electronic device updates the first visual representation 626*e* to concurrently include a visual indication 626*e* of the first messaging activity and a visual indication 626*f* of the third messaging activity. In some embodiments, the electronic device displays visual indications of more than one unread messaging activity received in a pinned conversation. In some embodiments, there is a limit to the number of indications of unread messaging activities within a single conversation that the electronic device will display. In response to detecting that the user has viewed the contents of the first messaging conversation, the electronic device optionally ceases to display the indications of the first and third messaging activities as part of the visual representation of the first messaging conversation. The above-described manner of concurrently displaying the visual indications of the first and third messaging activities enables the electronic device to efficiently display indications of multiple messaging activities added to the first messaging conversation without receiving an input to present the contents of the first messaging conversation which simplifies the interaction between the user and the electronic device and enhances the operability of the electronic device and makes the user-device interface more efficient (e.g., by reducing the number of inputs needed to determine that there are multiple unread messages in a conversation), which additionally reduces power usage and improves battery life of the electronic device by enabling the user to use the electronic device more quickly and efficiently.

In some embodiments, such as in FIG. 6U, a size of the visual indication of the first messaging activity is based on a recency of the first messaging activity, and a size of the visual indication of the third messaging activity is based on a recency of the third messaging activity. In some embodiments, the more recent a messaging activity is, the larger the indication of the messaging activity is displayed. While displaying the visual indication of the first messaging activity, in response to receiving the indication of the third messaging activity, the electronic device optionally displays the indication of the first messaging activity at a size smaller than the indication of the third messaging activity. In some embodiments, in response to receiving an indication of a fourth messaging activity associated with the second conversation, the electronic device optionally reduces the size of the visual indications of the first and third messaging activities. In some embodiments, in response to receiving an indication of a fourth messaging activity associated with the second conversation, the electronic device optionally does not update the sizes of the visual indications of the first and third messaging activities. The above-described manner of displaying the visual indications at a size based on the recency of the messaging activity enables the electronic device to efficiently communicate the order in which the messaging activities were received, which simplifies the interaction between the user and the electronic device and enhances the operability of the electronic device and makes the user-device interface more efficient (e.g., by reducing the number of inputs needed to view the order in which the messaging activities were received), which additionally reduces power usage and improves battery life of the electronic device by enabling the user to use the electronic device more quickly and efficiently.

In some embodiments, such as in FIG. 6T, before receiving the indication of the third messaging activity, the visual indication 626*e* of the first messaging activity has a first size. In some embodiments, such as in FIG. 6U, after receiving the indication 624*u* of the third messaging activity, the visual indication 626*e* of the first messaging activity has a second size, smaller than the first size (e.g., the visual indication of the third messaging activity has a third size, larger than the second size). In some embodiments, in response to detecting receipt of new messaging activity, the electronic device reduces the size of indications of other messaging activity associated with the same (or a different) conversation and displays the indication of the new messaging activity at a size larger than the size of the representation of the other messaging activity. In some embodiments, rather than reducing the size of the visual indication of the first messaging activity, the electronic device ceases to display the visual indication of the first messaging activity in response to receiving the indication of the third messaging activity. The above-described manner of reducing the size of the visual indication of the first messaging activity in response to receiving the indication of the third messaging activity enables the electronic device to efficiently indicate the order in which the messaging activities were received, which simplifies the interaction between the user and the electronic device and enhances the operability of the electronic device and makes the user-device interface more efficient (e.g., by reducing the number of inputs needed to view the order in which the messaging activities were received), which additionally reduces power usage and improves battery life of the electronic device by enabling the user to use the electronic device more quickly and efficiently.

In some embodiments, before receiving the indication of the third messaging activity, the visual indication of the first messaging activity is at a first respective location in the first visual representation. In some embodiments, after receiving the indication of the third messaging activity, the visual indication of the first messaging activity has a second respective location in the first visual representation, different from the first respective location, and the visual indication of the third messaging activity has a third respective location in the first visual representation, different from the second respective location. In some embodiments, the positions of visual representations of messaging activity in a pinned conversation change as additional messaging activity in the pinned conversation is received. In some embodiments, the positions are predetermined based on the number of indications displayed in one visual representation and the order in which the messaging activities corresponding to the indications are received. In some embodiments, the positions are random. The above-described manner of changing the location of the visual indication of the first messaging activity in response to receiving the indication of the third messaging activity enables the electronic device to display the indications of messaging activities at locations that are non-overlapping and easy for the user to view, which simplifies the interaction between the user and the electronic device and enhances the operability of the electronic device and makes the user-device interface more efficient (e.g., by enabling the user to see the indications, thus reducing the need for the user to provide an input to view the content of the messaging conversation to view indications of the messaging activities), which additionally reduces power usage and improves battery life of the electronic device by enabling the user to use the electronic device more quickly and efficiently.

In some embodiments, the size of the visual indications of the messaging activities are within a range set by a lower size threshold and an upper size threshold. In some embodiments, the electronic device displays, as a maximum, two lines of text when displaying a visual indication of text messaging activity in a pinned conversation. The electronic device optionally displays a portion of the message at the beginning of the message with an indication that the message has additional content if the message exceeds the maximum visual indication size.

In some embodiments, while displaying multiple visual indications of messaging activity in a respective visual representation of a respective pinned messaging conversation, the electronic device displays the visual indications of the messaging activities at different vertical positions in the user interface.

In some embodiments, such as in FIG. 6D, in response to receiving the indication 624*d* of the first messaging activity, the electronic device 500 updates the user interface to include a visual indication 620*a* displayed in association with the first visual representation that indicates an existence of unseen messaging activity in the first messaging conversation. In some embodiments, in addition to displaying the visual indications of the messaging activities, in response to detecting receipt of new messaging activity in a pinned conversation, the electronic device displays a visual indication that new messaging activity has been added to the conversation since the user viewed the content of the messaging conversation. The visual indication is optionally the same regardless of the type, content, or number of unread messaging activities associated with the pinned conversation. In some embodiments, the visual indication displayed in association with the first visual representation is displayed at a location that does not overlap the visual representation of the conversation. In some embodiments, the respective visual indication of respective messaging activity is displayed overlaid on the visual representation of the conversation. The above-described manner of displaying the visual representation that indicates existence of unseen messaging activity enables the electronic device to efficiently indicate that the messaging conversation includes unseen activity, which simplifies the interaction between the user and the electronic device and enhances the operability of the electronic device and makes the user-device interface more efficient (e.g., by reducing the number of inputs needed to determine that there is unseen messaging activity, such as by eliminating the need for the user to view the contents of the messaging conversation in order to determine whether or not a new messaging activity has been added to the conversation), which additionally reduces power usage and improves battery life of the electronic device by enabling the user to use the electronic device more quickly and efficiently.

In some embodiments, in accordance with a determination that one or more criteria are satisfied (e.g., the electronic device has not set up the pinned conversations feature of the messaging activity), the electronic device optionally configures the pinned conversations feature of the messaging application, including automatically selecting one or more conversations to "pin" based on one or more criteria (e.g., recency of messaging activity in the conversations, frequency with which messaging activity is received in the conversations, how long ago the messaging conversation was initiated, whether one or more participants in a messaging conversation is on a favorite contacts list).

In some embodiments, in a pinned conversations setup user interface, the electronic device displays representations of a plurality of conversations to be pinned each associated with a selectable option that, when selected, removes the respective conversation from the pinned conversations region. The electronic device optionally displays representations of additional messaging conversations that are not yet pinned with selectable options that, when selected, causes the electronic device to add the respective conversation to the pinned conversations.

In some embodiments, while displaying the indications of the automatically selected pinned conversations, the electronic device receives an input confirming that the conversations should be pinned. In response to the input, the electronic device optionally displays the messaging user interface with the representations of the automatically selected pinned conversations displayed in the pinned conversations region of the user interface and representations of other messaging conversations in an unpinned conversations user interface.

In some embodiments, while displaying the indications of the automatically selected pinned conversations, the electronic device receives an input denying that the conversations should be pinned. In response to the input, the electronic device optionally displays the messaging user interface with the representations of the automatically selected pinned conversations displayed in the unpinned conversations region of the user interface.

In some embodiments, while displaying the messages user interface, the electronic device detects an input corresponding to a request to edit selection of which conversations are pinned conversations. In response to the input, the electronic device displays representations of the pinned conversations in a first region each associated with a selectable option that, when selected, removes the respective conversation from the pinned conversations region and places them in the unpinned conversations region. The electronic device optionally displays representations of additional messaging conversations in the unpinned conversations region with selectable options that, when selected, causes the electronic device to add the respective conversation to the pinned conversations region.

In some embodiments, such as in FIG. 6I, the first messaging conversation is a group messaging conversation (e.g., includes three or more participating electronic devices, including the electronic device), the first messaging activity is provided to the first messaging conversation by a first respective contact in the first messaging conversation, and updating the first visual representation 606*c* in response to receiving the indication of the first messaging activity includes updating the first visual representation 606*c* to include a visual representation of the first respective contact displayed in association with the visual indication 622*e* of the first messaging activity. In some embodiments, the first visual representation includes a representation of a plurality of contacts participating in the first messaging conversation and, in response to the indication of the first messaging activity, the representation of the first respective contact is displayed at an updated location in the first representation of the first messaging conversation. The electronic device optionally displays the representation of the first respective contact and the visual indication of the first message at an edge of the representation of the first messaging conversation. In some embodiments, the visual representation of the first messaging conversation includes an image associated with the messaging conversation that does not include images associated with the contacts included in the messaging conversation. Optionally, in response to receiving the indication of the first messaging activity, the electronic device updates the first visual representation to include the image associated with the first respective contact displayed proximate to the visual indication of the first message. The above-described manner of updating the first visual representation to include the visual representation of the first respective contact displayed in association with the visual indication of the first messaging activity enables the electronic device to efficiently communicate which user in the group conversation sent the first messaging activity, which simplifies the interaction between the user and the electronic device and enhances the operability of the electronic device and makes the user-device interface more efficient (e.g., by reducing the number of inputs needed to determine who sent the first messaging activity), which additionally reduces power usage and improves battery life of the electronic device by enabling the user to use the electronic device more quickly and efficiently.

In some embodiments, such as in FIG. 6T the first messaging conversation is a group messaging conversation (e.g., includes three or more participating electronic devices, including the electronic device). In some embodiments, such as in FIG. 6T, the first messaging activity is provided to the first messaging conversation by a first respective contact in the first messaging conversation. In some embodiments, such as in FIG. 6T, the first visual representation 606*e* includes a first region configured to include one or more representations 630*e-f* of respective contacts included in the first messaging conversation that do not have unseen messaging activity at the electronic device. In some embodiments, instead of displaying the one or more representations of respective contacts included in the first messaging conversation that do not have unseen messaging activity at the electronic device, the first visual representation includes an image associated with the group conversation that is different from the images associated with the one or more contacts included in the messaging conversation. The representations of the respective contacts optionally include images associated with contact cards of the one or more contacts. In some embodiments, the first region of the first visual representation is optionally within a visual indication of an outline of a region, such as a circle. In some embodiments, such as in FIG. 6T, the first visual representation 606*e* includes a second region, different from the first region, configured to include one or more representations 630*d* of respective contacts included in the first messaging conversation that do have unseen messaging activity at the electronic device. In some embodiments, in response to receiving new messaging activity at the electronic device and before the user has viewed the messaging activity within the content of the messaging conversation, the electronic device displays the visual representations of the one or more contacts that sent the new messaging activity. The second region is optionally at the perimeter of a visual outline of a region (e.g., a circle enclosing the visual representations of the one or more users that do not have unseen messaging activity or a circle enclosing the visual indication of the messaging activity that is different from the one or more images associated with the contacts included in the messaging conversation). In some embodiments, such as in FIG. 6T, updating the first visual representation 606*e* in response to receiving the indication 624*t* of the first messaging activity includes moving a visual representation 630*d* of the first respective contact from the first region to the second region in the first visual representation. For example, prior to receiving a new messaging activity in the first conversation since the user has viewed the contents of the messaging conversation, the electronic device displays a plurality of representations of the contacts in the messaging conversations within a circle that is part of the representation of the first messaging conversation. In this example, in response to receiving the first messaging activity from a first user of the plurality of users, the electronic device updates the visual representation of the first messaging conversation to move a representation of the first user from within the circle to the perimeter of the circle. In some embodiments, the representation of the first contact that sent the first messaging activity is displayed proximate to the visual indication of the first messaging activity. The above-described manner of updating the first visual representation to move the visual representation of the first respective contact from the first region to the second region enables the electronic device to efficiently communicate that the user is in the conversation before the user sends the first messaging activity and efficiently communicate which user provided the first messaging activity after the first messaging activity is received, which simplifies the interaction between the user and the electronic device and enhances the operability of the electronic device and makes the user-device interface more efficient (e.g., by reducing the number of inputs needed to view the users in the conversation and the user that sent the first messaging activity), which additionally reduces power usage and improves battery life of the electronic device by enabling the user to use the electronic device more quickly and efficiently.

In some embodiments, while displaying the first visual representation 606*e* including the visual indication 626*e* of the first messaging activity and the visual representation 630*d* of the first respective contact, such as in FIG. 6T, the electronic device 500 receives an indication 624*t* of a third messaging activity provided to the first messaging conversation by a second respective contact, different from the first respective contact, such as in FIG. 6U. In some embodiments, such as in FIG. 6U, in response to receiving the third messaging activity, the electronic device the first visual representation, including reducing a size of the visual representation 630*d* of the first respective contact displayed in the first visual representation (e.g., in some embodiments, the size of the visual indication of the first messaging activity is also reduced in response to receiving the third messaging activity. In some embodiments, rather than reducing the size of the visual indication of the first messaging activity and the visual representation of the first respective contact, the electronic device ceases to display the visual indication of the first messaging activity and/or the visual representation of the first respective contact. In some embodiments, in addition to changing the size of the visual representation of the first respective contact and/or the visual indication of the first messaging activity, the electronic device updates the location of the visual representation of the first respective contact and/or the location of the visual indication of the first messaging activity within the visual representation of the first messaging conversation. In some embodiments, such as in FIG. 6U, the electronic device 500 adds a visual representation 630*e* of the second respective contact to the first visual representation (e.g., wherein the visual representation of the second respective contact is displayed at a larger size than the visual representation of the first respective contact). In some embodiments, the electronic device 500 displays, in association with the visual representation 630*e* of the second respective contact, a visual indication 626*f* of the third messaging activity in the first visual representation. In some embodiments, the visual indication of the third messaging activity is displayed in physical proximity to the visual representation of the second respective contact. The above-described manner of reducing the size of the visual representation of the first respective contact and adding a visual representation of the second respective contact and a visual indication of the third messaging activity in response to receiving the third messaging activity enables the electronic device to make room to display additional indications of incoming messaging activities as the incoming messaging activities are received while continuing to display the visual representations of the previously-received messaging activities and the users that sent the previously-received messaging activities, which simplifies the interaction between the user and the electronic device and enhances the operability of the electronic device and makes the user-device interface more efficient (e.g., by reducing the number of inputs needed to view the indications of the received messaging activities), which additionally reduces power usage and improves battery life of the electronic device by enabling the user to use the electronic device more quickly and efficiently.

In some embodiments, such as in FIG. 6S, the first messaging conversation is a group messaging conversation (e.g., includes three or more participating electronic devices, including the electronic device), the first visual representation 606*e* includes a plurality of representations 630*d-f* of a plurality of respective contacts included in the first messaging conversation, and the plurality of representations 630*d-f* of the plurality of respective contacts are displayed with different sizes based on a recency of messaging activity of the respective contacts in the first messaging conversation. In some embodiments, the representation of the user that most recently sent a messaging activity to the first messaging conversation is displayed at the largest size within the representation of the first messaging conversation and the user that least recently sent a messaging activity to the first messaging conversation among the users for whom representations are displayed is displayed at the smallest size within the representation of the first messaging conversation. In some embodiments, the electronic device displays a maximum predetermined number (e.g., 6 or 7 or 8) of representations of contacts included in the first messaging conversation that are the maximum number of most recently active users in the conversation. For example, if there are ten users other than the user of the electronic device included in a messaging conversation, the representation of the messaging conversation includes indications of the 7 users that most recently sent messaging activities to the conversation, sized based on the recency with which the users sent the messaging activities to the conversation, with the user that most recently sent messaging activity to the messaging conversation having the largest representation and the size of the representations of the other uses descending in order of how recently they provided messaging activity to the conversation. In some embodiments, the first visual representation of the group messaging conversation does not include a representation of the user of the current electronic device (e.g., the device on which the first visual representation is being displayed) no matter the messaging activity of the current electronic device in that group messaging conversation. The above-described manner of displaying the representations of the other contacts sized based on how recently the contacts provided messaging activity to the conversation enables the electronic device to identify the conversation based on the users that recently sent messaging activity to the conversation, which simplifies the interaction between the user and the electronic device and enhances the operability of the electronic device and makes the user-device interface more efficient (e.g., by displaying the representation of the conversation in a way that is quickly recognizable to the user, thus reducing the number of inputs needed to view a desired messaging conversation), which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, and 1500) are also applicable in an analogous manner to method 700 described above with respect to FIG. 7. For example, the ways of presenting representations of messaging conversations described above with reference to method 700 optionally have one or more of the characteristics of the ways of creating and presenting mentions, presenting indications of messages that are replies to other messages in a conversation, etc., described herein with reference to other methods described herein (e.g., methods 900, 1100, 1300, 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 702 and receiving operations 712 and 716 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces Indicating Messages that are Replies to Other Messages

Users interact with electronic devices in many different manners, including using an electronic device to display representations of messages in a messaging conversation. The embodiments described below provide ways in which an electronic device presents indications of messages that are replies to other messages. Presenting the indications of messages that are replies to other messages in the ways described herein enhances interactions with a device such as by reducing the time and inputs it takes a user to view messages in the same reply thread, thus reducing the amount of time needed by a user to perform operations, thus reducing the power usage of the device, which increases battery life for battery-powered devices. It is understood that people use devices. When a person uses a device, that person is optionally referred to as a user of the device.

Figure 8A:
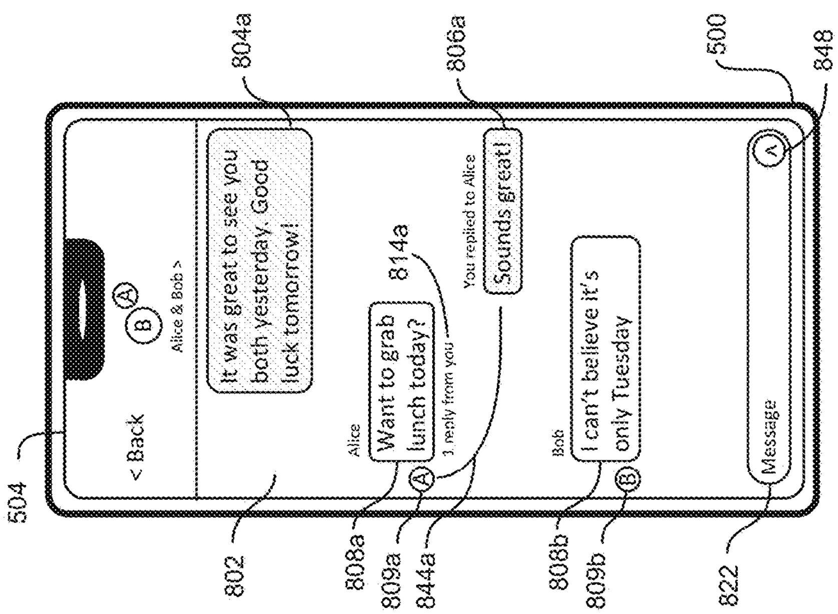
FIGS. 8A-8AA illustrate exemplary ways in which the electronic device indicates which messages are replies to other messages in a messaging conversation according to some embodiments.

FIGS. 8A-8AA illustrate exemplary ways in which an electronic device 500 displays representations of messages within a conversation that are replies to respective other messages in the conversation according to some embodiments. The embodiments in these figures are used to illustrate the processes described below, including the processes described with reference to FIG. 9. Although FIGS. 8A-8AA illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8AA.

FIG. 8A illustrates an exemplary user interface including a messaging conversation 802 between the user of the electronic device 500 and two contacts named Alice and Bob. In some embodiments, the electronic device 500 displays the messaging conversation 802 in response to detecting selection of a representation of the conversation, such as one of the representations of messaging conversations described above with reference to FIGS. 6A-7. The messaging conversation 802 optionally includes a representation 804*a* of a message from the user of the electronic device that is not a reply to any particular message in the conversation, a representation 808*a* of a message from another user that is not a reply to any particular message in the conversation, a representation 806*a* of a message from the user of the electronic device 500 that is a reply to the message associated with representation 808*a*, and a representation 808*b* of another message from a user other than the user of the electronic device 500 that is not a reply to a particular message in the conversation. Representation 808*a* is optionally displayed with an indication 814*a* that one message (e.g., from the user of the electronic device 500) has been received in reply to the message corresponding to representation 808*a*. In some embodiments, the electronic device 500 forgoes displaying the indication 814*a* because the representation 806*a* of the reply is displayed proximate to (e.g., immediately after, without other intervening messages) the representation 808*a* of the message. Representation 808*a* and representation 806*a* are optionally connected by a line 844*a* indicating that the message corresponding to representation 806*a* is a reply to the message corresponding to representation 808*a*. As shown in FIG. 8A, in some embodiments, line 844*a* connects the representation, e.g., avatar, of the contact Alice displayed in association with representation 808*a* to representation 806*a*. The user interface optionally further includes a text entry field 822 towards which input composing a message is directed, and a selectable option 848 that, when selected, causes the electronic device 500 to transmit a draft message to the messaging conversation. As shown in FIG. 8A, in some embodiments, representations 804*a* and 806*a* of messages sent by the user of the electronic device 500 are displayed in a different color than representations 808*a* and 808*b* of messages received from users other than the user of the electronic device 500. In some embodiments, the representations 804*a* and 806*a* are displayed with a green, blue, or other colored background with white or another color of text, and representations 808*a* and 808*b* are displayed on a white or grey or other colored background with black text or a black or other colored background with white text. Moreover, in some embodiments, representations 804*a* and 806*a* of messages from the user of the electronic device 500 are displayed on one side of the user interface (e.g., the right side) and representations 808*a* and 808*b* of messages sent by other users are displayed on the other side of the user interface (e.g., the left side).

Figure 8B:
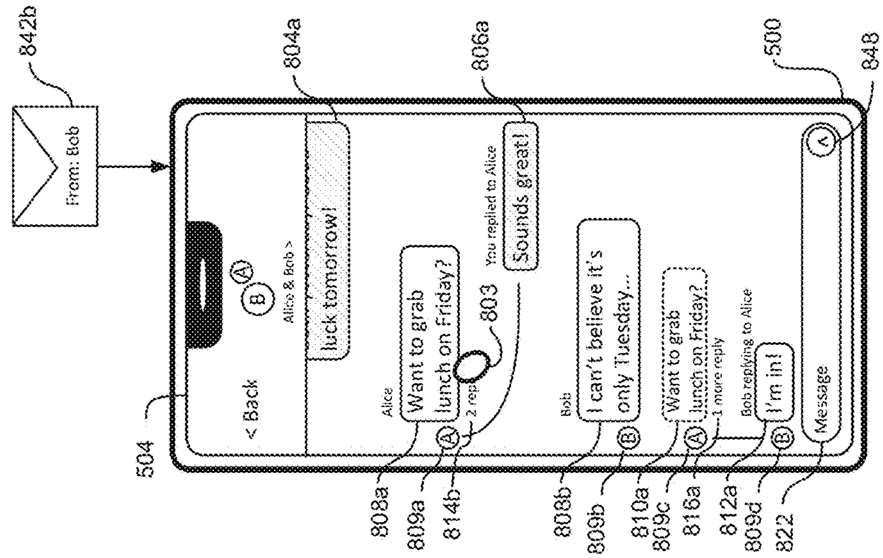

In FIG. 8B, the electronic device 500 optionally detects an indication 842*b* of an incoming message from a user (e.g., Bob) of the conversation other than the user of the electronic device 500. In response to indication 842*b*, the electronic device 500 optionally displays a representation 812*a* of the message. In some embodiments, the representation 812*a* of the incoming message includes an indication of the user that sent the message and an indication of the user to which the message is a reply (e.g., "Bob replying to Alice"). Because the message corresponding to representation 812*a* is a reply to another message in the conversation, the electronic device 500 optionally displays an indication 810*a* of the message to which the most recent message is a reply. Representation 810*a* and representation 808*a* may correspond to the same message. Representation 810*a* and representation 808*a* can have one or more differences in visual characteristics. For example, the size of representation 810*a* can be smaller than the size of representation 808*a*. As another example, the colors and/or opacity of representation 810*a* can be different from those of representation 808*a*. Because the message corresponding to representation 808*b*, which may not be a reply to the message corresponding to representation 808*a*, was optionally received before receiving the message corresponding to representation 812*a*, the electronic device 500 optionally displays the second representation 810*a* of the message to which the most recent message is a reply to reduce the number of inputs needed to view the contents of the message associated with representation 808*a* and the contents of the message corresponding to representation 812*a*. In some embodiments, even if the message corresponding to representation 808*b* was not received between the message corresponding to the representation 808*a* and the message corresponding to representation 812*a*, the electronic device 500 still displays the second representation 810*a* of the message corresponding to representation 808*a*.

The representation 810*a* of the message to which the most recent message is a reply optionally includes an indication 816*a* of the number of reply messages received between the message corresponding to representation 808*a* and the message corresponding to representation 812*a*. For example, the message corresponding to representation 806*a* is also a reply to the message corresponding to representation 808*a*. Because there is one other reply (e.g., the message corresponding to representation 806*a*) other than the message corresponding to representation 812*a* that is a reply to the message corresponding to representation 810*a*, the indication 816*a* indicates one additional reply. In some embodiments, instead of displaying the number of replies received between the message corresponding to representation 810*a* and the message corresponding to the representation 812*a*, the electronic device 500 displays an indication of the number of messages received after representation 810*a*. For example, if another message is received after receiving the message corresponding to representation 812*a* and the new message is a reply to the message corresponding to representation 810*a*, the representation would be updated to indicate two replies received since displaying representation

810*a*. In some embodiments, however, the indication 816*a* reflects the total number of replies to the message corresponding to representations 808*a* and 810*a* (e.g., two replies in this example).

In FIG. 8B, the electronic device 500 optionally updates the indication 814*b* of the number of replies to the message corresponding to representation 808*a* in response to indication 842*b*. In some embodiments, the electronic device 500 does not display indication 814*b*. In some embodiments, the electronic device 500 displays an indication of the number of replies to the message corresponding to representation 808*a* other than the message corresponding to representation 806*a* (e.g., one message in this example). In some embodiments, the indication of the number of replies to the message corresponding to representation 808*a* other than the message corresponding to representation 806*a* is displayed at the location of indication 814*b* or elsewhere (e.g., below representation 806*a*).

As shown in FIG. 8B, in some embodiments, the user selects (e.g., with contact 803) the indication 814*b* of the number of replies to the message corresponding to indication 808*a*. In response to the user's selection in FIG. 8B, the electronic device 500 optionally displays a user interface including representations of the message corresponding to representation 808*a* and representations of the messages that are replies to that message without displaying representations of other messages in the conversation that are not replies to the message corresponding to representation 808*a*. FIG. 8C illustrates an exemplary user interface that includes a representation 838*a* of the message represented by representations 808*a* and 810*a* in FIG. 8B, and representations 840*a* and 838*b* of subsequent messages in the conversation that are replies to the message corresponding to representation 838*a*. The user interface illustrated in FIG. 8C optionally does not include representations of messages that are not in the same replies thread, such as representation 808*b*.

In some embodiments, the representations 838*a*, 838*b*, and 840*a* are displayed overlaid on the messaging user interface illustrated in FIG. 8B. In some embodiments, however, the representations 838*a*, 838*b*, and 840*a* are not overlaid on the messaging user interface and are instead displayed on some other background (e.g., a plain background or an image etc.). Although representations 838*a*, 840*a*, and 838*b* are shown as having the same color schemes as the representations 808*a*, 806*a*, and 812*a* illustrated in FIG. 8B, in some embodiments, the representations 838*a*, 840*a*, and 838*b* are displayed in different colors than the representations 808*a*, 806*a*, and 812*a*. In some embodiments, a different visual characteristic (e.g., size, font, outline color, translucency, etc.) is altered between representations 808*a*, 806*a*, and 812*a* and representations 838*a*, 840*a*, and 838*b*. The user interface further includes a text entry field 824 that has been updated to indicate that messaging content input to the text entry field 824 will create a message that is also a reply to the message corresponding to representation 838*a*. In some embodiments, the text entry field 824 is not updated (e.g., includes the text "message" instead of "reply").

As shown in FIG. 8C, in some embodiments, the replies user interface does not include lines connecting the representations 838*a*, 840*a*, and 838*b* of the messages in the reply thread because the replies user interface only includes messages that are replies to the same thread, so it is clear that the messages corresponding to representations 840*a* and 838*b* are replies to the message corresponding to representation 838*a* without displaying lines connecting the representations. In some embodiments, as shown in FIG. 8C, there is only one representation 838*a* of the message corresponding the representation 838*a* because intervening messages in the conversation that are not replies to the message associated with representation 838*a* are not shown in the replies user interface. Therefore, in some embodiments, additional representations of the message corresponding to representation 838*a* are not needed in order for the user to easily view the contents of the messages in the conversation. As shown in FIG. 8C, representations 838*a* and 838*b* of messages from users other than the user of the electronic device 500 are displayed on one side (e.g., the left side) of the user interface and representation 840*a* of a message from the user of the electronic device 500 is displayed on the other side of the user interface (e.g., the right side).

As shown in FIG. 8C, in some embodiments, the user selects (e.g., with contact 803) the text entry field 822. In response to the user's selection in FIG. 8C, the electronic device 500 optionally displays a soft keyboard 846 while remaining in the replies user interface of FIG. 8C, as shown in FIG. 8D.

Figure 8D:
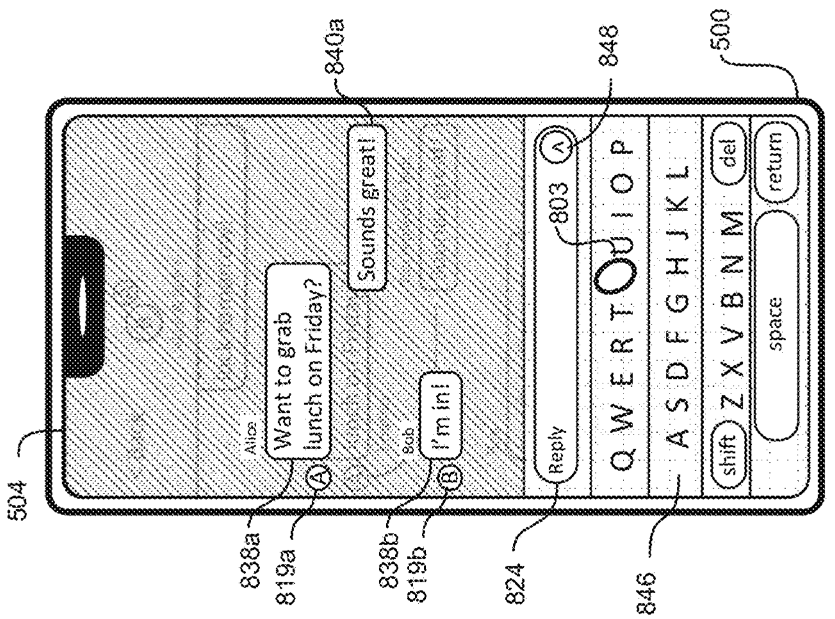
Figure 8C:
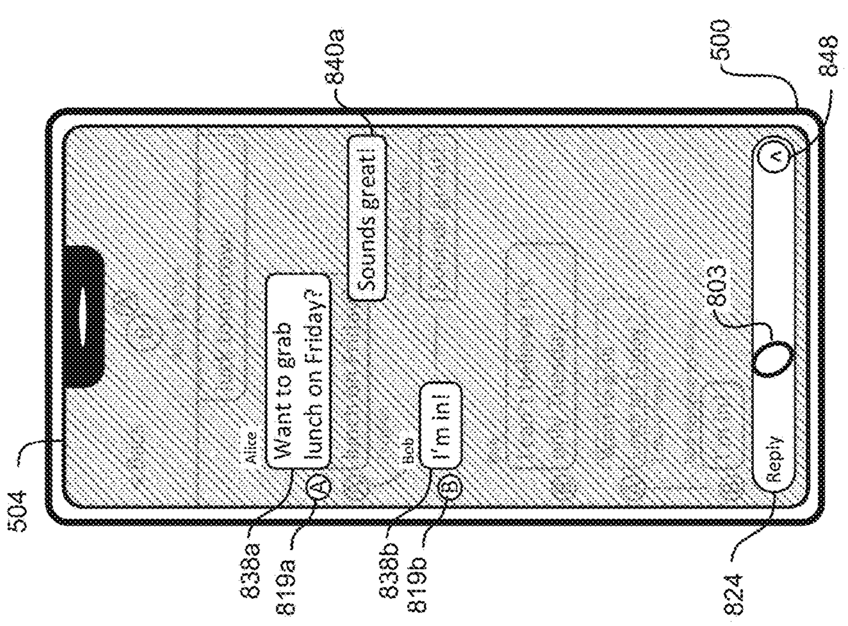

FIG. 8D illustrates the updated user interface, which may include the soft keyboard 846 toward which input is directed to compose a message that is a reply to the message corresponding to representation 838*a*. As shown in FIG. 8D, in some embodiments, the user selects (e.g., with contact 803) a region of the soft keyboard 846 corresponding to a character to begin entering a message.

Figure 8F:
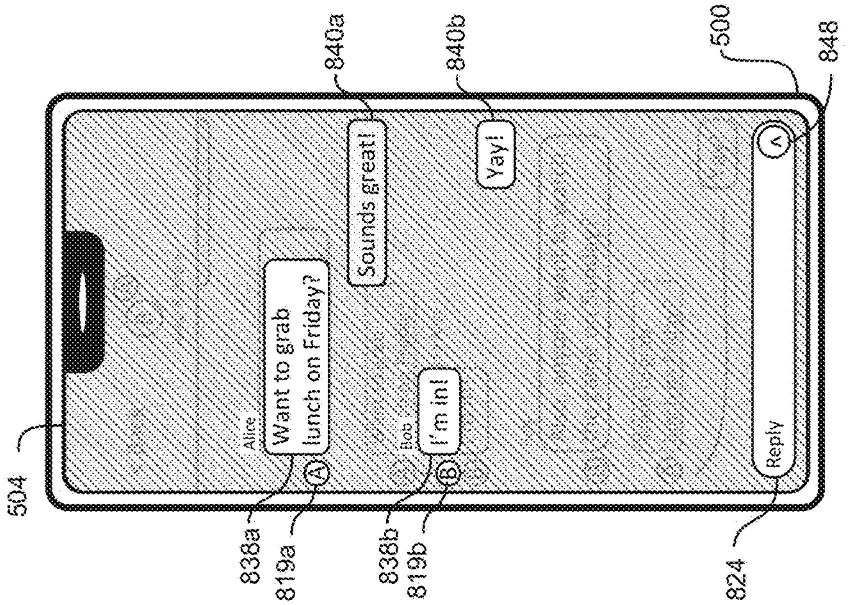
Figure 8E:
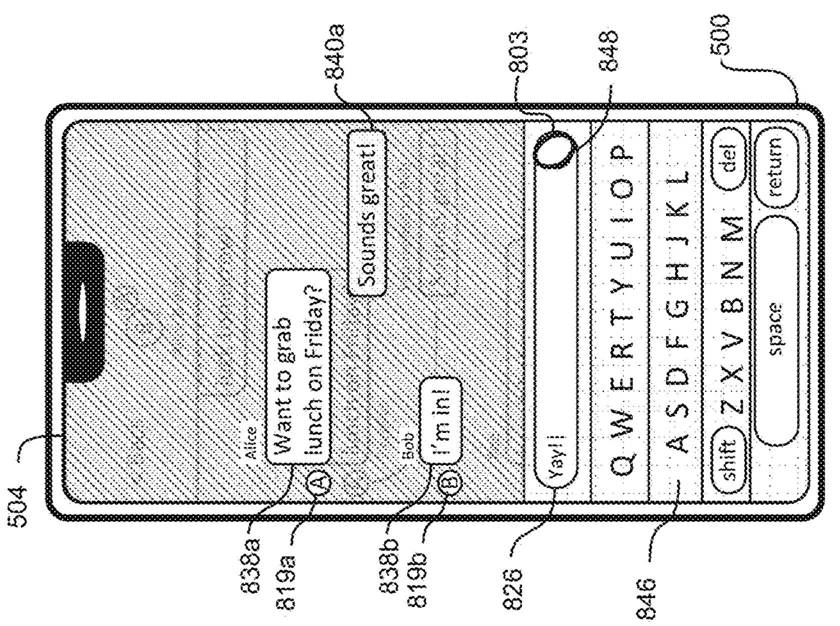

In FIG. 8E, in some embodiments, the user has finished entering text into the text entry field 826 that will be a reply to the message corresponding to representation 838*a*. The user optionally selects (e.g., with contact 803) the option 848 to send the reply message to the messaging conversation.

In some embodiments, in response to the user's selection in FIG. 8E, the electronic device 500 transmits the message and updates the user interface as shown in FIG. 8F.

As shown in FIG. 8F, in some embodiments, the electronic device 500 displays a representation 840*b* of the message sent by the user in the user interface with the representations 840*a* and 838*b* of messages that are replies to the message corresponding to representation 838*a*. For example, representation 840*b* is displayed on the same side of the user interface as representation 840*a* of another message sent by the user of the electronic device 500. The electronic device 500 optionally updates the messaging user interface in the background of the user interface to include another representation of the user's message corresponding to representation 840*b* connected to a representation of the message corresponding to representation 838*a* with a curved line. An additional representation of the message corresponding to representation 838*a* can be displayed because a message that is not a reply to the message corresponding to representation 838*a* has been received in between receiving the message corresponding to representation 838*b* and the message corresponding to representation 840*b*. The curved line connecting the representation of the message corresponding to representation 838*a* and the representation of the message corresponding to representation 840*b* is optionally displayed as described in more detail below with reference to FIGS. 12A-13.

Figure 8G:
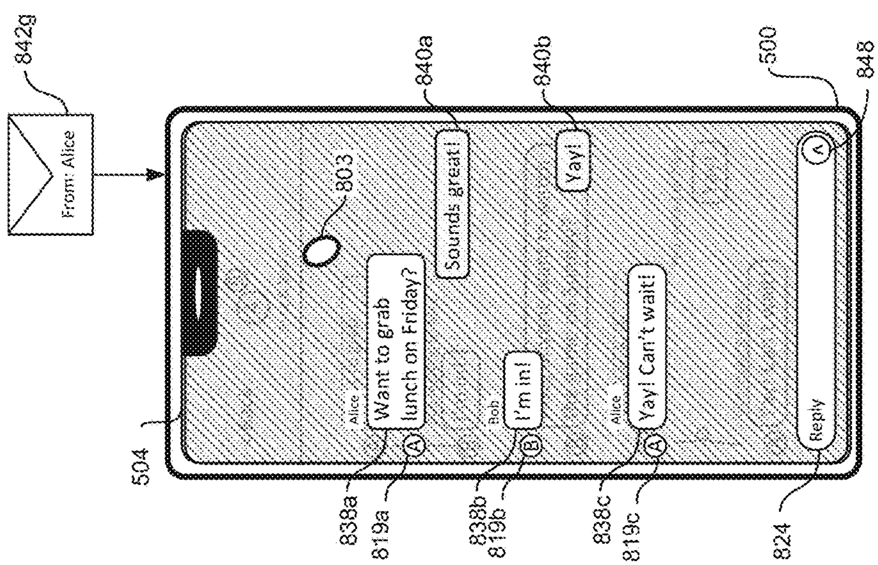

As illustrated in FIG. 8G, in some embodiments, the electronic device 500 detects an indication 842*g* of a message received from another user in the conversation while device 500 is displaying the replies user interface. The message is optionally a reply to the message corresponding to representation 838*a*, so the electronic device 500 optionally displays a representation 838*c* of the message in the replies user interface on the left side of the user interface because the message was sent by a user other than the user of the electronic device 500. In some embodiments, the electronic device 500 also updates the user interface in the background to include an additional representation of the received message.

As shown in FIG. 8G, the user selects (e.g., with contact 803) the background of the replies user interface. In response to the user's selection in FIG. 8G, the electronic device 500 optionally displays the user interface illustrated in FIG. 8H. In some embodiments, the electronic device 500 also navigates away from the user interface illustrated in FIG. 8G in response to detecting selection of a representation 838*a-c* or 840*a-b* of a message in the user interface. In some embodiments, the electronic device 500 also navigates away from the user interface illustrated in FIG. 8G in response to detecting an input for ceasing to display the messaging application user interface. In some embodiments, the electronic device 500 also navigates away from the user interface illustrated in FIG. 8G in response to detecting an input for closing the messaging application.

Figure 8H:
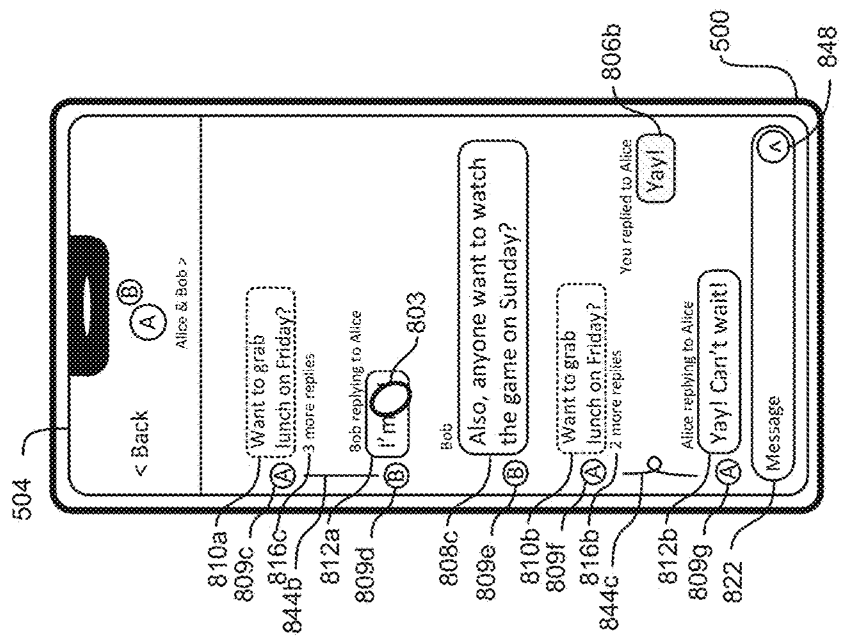

FIG. 8H illustrates an example t messages user interface which has representations of all of the messages in the conversation, including messages that are not replies to the message corresponding to representation 838*a* in FIG. 8G (e.g., and the message corresponding to representation 808*a* in FIG. 8B). The representations may include a representation 806*b* of the message sent by the user in FIG. 8E and a representation 812*b* of the message received in FIG. 8G. In some embodiments, representation 806*b* is displayed on the right side because the message was sent by the user of the electronic device. In some embodiments, representation 812*b* is displayed on the left side of the user interface because the message was sent by a user other than the user of the electronic device 500. As shown in FIG. 8H, in some embodiments, representations 806*b* and 812*b* may be displayed in association with a second representation 810*b* of the message to which the messages corresponding to representations 806*b* and 812*b* are replies. A looped line 844*c* optionally connects representation 810*b* and representation 812*b*. The loop of looped line 844*c* may be in line with representation 806*b*, thus indicating that the message corresponding to representation 806*b* is also a reply to the message corresponding to representation 810*b*. Additional details about the display of looped line 844*c* are described below with reference to FIGS. 12A-13.

In some embodiments, if the electronic device 500 detects selection of representation 810*b*, the electronic device 500 configures text box 822 to receive an input composing a message that is a reply to the message corresponding to representation 810*b*. As shown in FIG. 8H, representation 812*b* includes an indication that a user sent a message as a reply to the message corresponding to representation 810*b*. In some embodiments, the representation 812*b* includes an indication that the user sent the message as a reply to a message sent by the user of the electronic device 500 (e.g., "Alice replying to Alice."). For example, the message corresponding to representation 812*b* may be sent in reply to a message that was sent in reply to a message sent by the user of the electronic device 500 (e.g., "Alice replying to you").

Figure 8I:
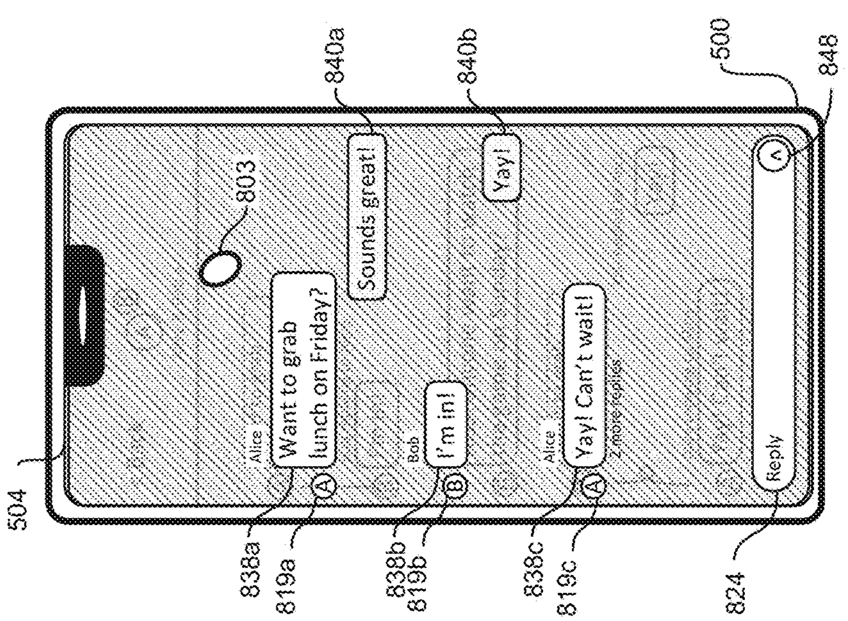
Figure 8J:
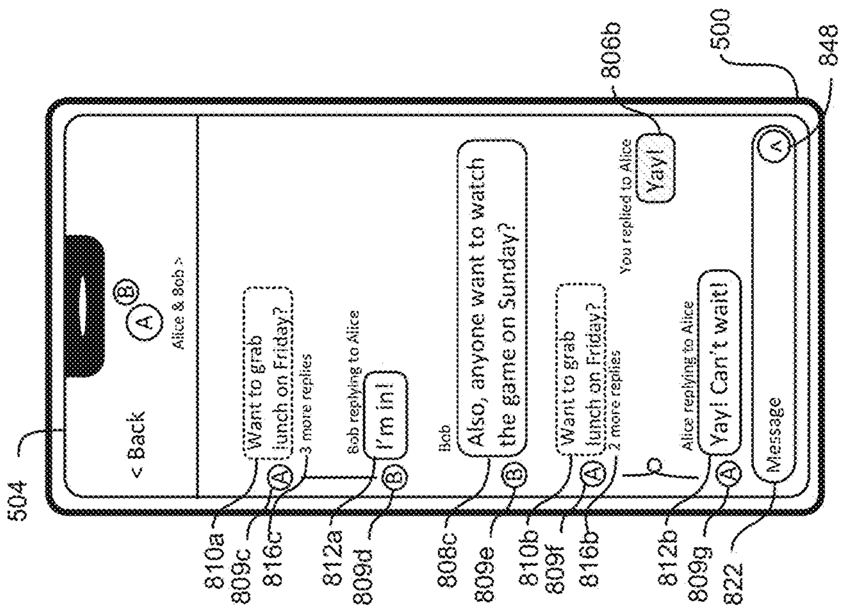

As shown in FIG. 8H, in some embodiments, the user selects (e.g., with contact 803) the representation 812*a* of a message that is a reply to the message associated with representation 810*a* (e.g., the message associated with representation 808*a* in FIG. 8B). In response to the user's selection in FIG. 8H, the electronic device 500 optionally displays the user interface illustrated in FIG. 8I. The user interface illustrated in FIG. 8I may be the same as the user interface illustrated in FIG. 8G. Therefore, the user interface illustrated in FIGS. 8I and 8G can be accessed in response to selecting the representation 812*a* of a message as shown in FIG. 8H or selecting indication 814*b* as shown in FIG. 8B. As shown in FIG. 8I, in some embodiments, the user selects (e.g., with contact 803) the background of the replies user interface. In response to the user's selection in FIG. 8I, the electronic device 500 optionally displays the user interface illustrated in FIG. 8J. The user interface illustrated in FIG. 8J may be the same as the user interface illustrated in FIG. 8H.

Figure 8K:
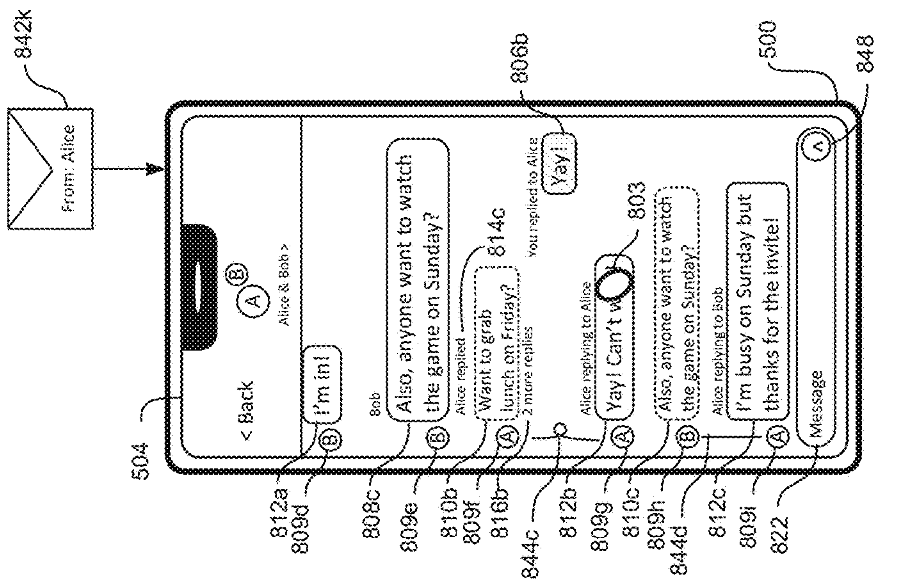

In FIG. 8K, in some embodiments, the electronic device 500 receives an indication 842*k* of an incoming message in the conversation (e.g., from Alice). In some embodiments, in response to indication 842*k*, the electronic device 500 displays a representation 812*c* of the message, which is a reply to the message corresponding to representation 808*c*. Because the messages corresponding to representations 806*b* and 812*b* were received between the message corresponding to representation 808*c* and the message corresponding to representation 812*c*, the electronic device 500 optionally displays an additional representation 810*c* of the message corresponding to representation 808*c*. The user representations, e.g., representations 809*h* and 809*i*, may be connected by line 844*d* indicating that the message represented by representation 812*c* is a reply to the message represented by representation 810*c*. Representation 808*c* is optionally updated to include an indication 814*c* that a reply to the message corresponding to representation 808*c* has been received (e.g., and from whom the reply was received).

As shown in FIG. 8K, in some embodiments, the user selects (e.g., with contact 803) a representation 812*b* of a reply message. In some embodiments, contact 803 is detected for an amount of time that exceeds a predetermined threshold (e.g., 0.25, 0.5, or 1 second). In response to the user's selection in FIG. 8K where the contact 803 is detected for the amount of time exceeding the predetermined threshold, the electronic device 500 optionally displays the user interface illustrated in FIG. 8L. In some embodiments, the contact 803 is one of two contacts detected for times that are less than the predetermined threshold that are detected within a second threshold time (e.g., 0.1, 0.25, 0.5, or 1 second) of each other (e.g., a "double-tap"). In response to the user's selection in FIG. 8K where two contacts 803 are detected within the second threshold time of each other, the electronic device 500 optionally displays the user interface illustrated in FIG. 8M.

Figure 8L:
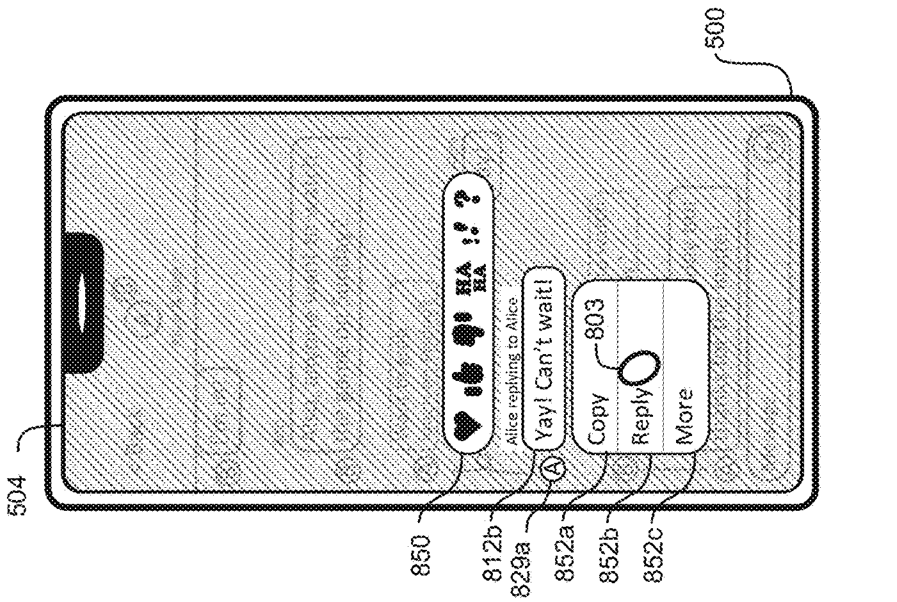

In FIG. 8L, in some embodiments, the electronic device 500 displays the representation 812*b* selected (e.g., with contact 803) by the user in FIG. 8K overlaid on a blurred version of the messaging conversation. In some embodiments, the representation 812*b* is displayed on a blank background or another background other than the blurred version of the messaging conversation. The representation 812*b* is optionally displayed with a plurality of options 850 for adding a tag to the message corresponding to representation 812*b*, an option 852*a* to copy the message, an option 852*b* to reply to the message, and an option 852*c* to view additional options associated with the message. In FIG. 8L, the user selects (e.g., with contact 803) the option 852*b* to reply to the message corresponding to representation 812*b*.

Figure 8N:
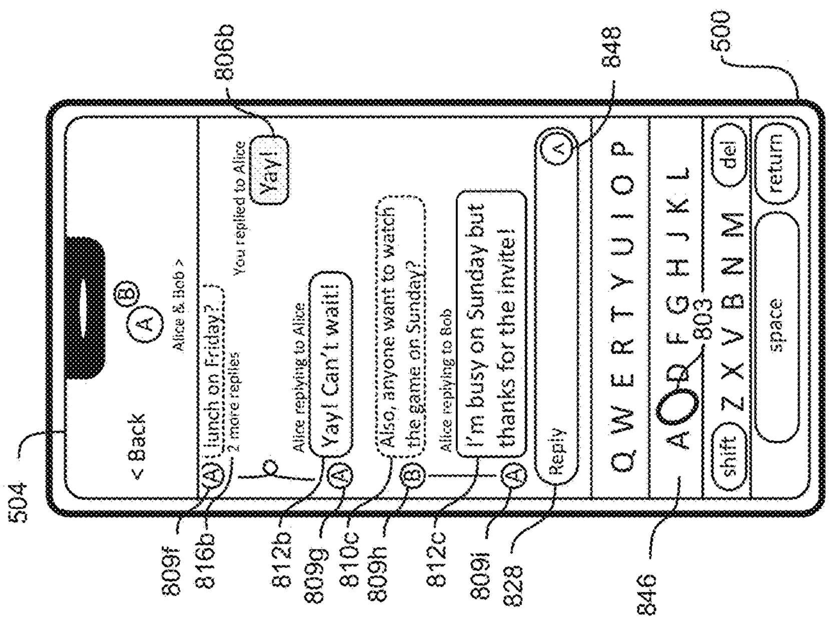
Figure 8M:
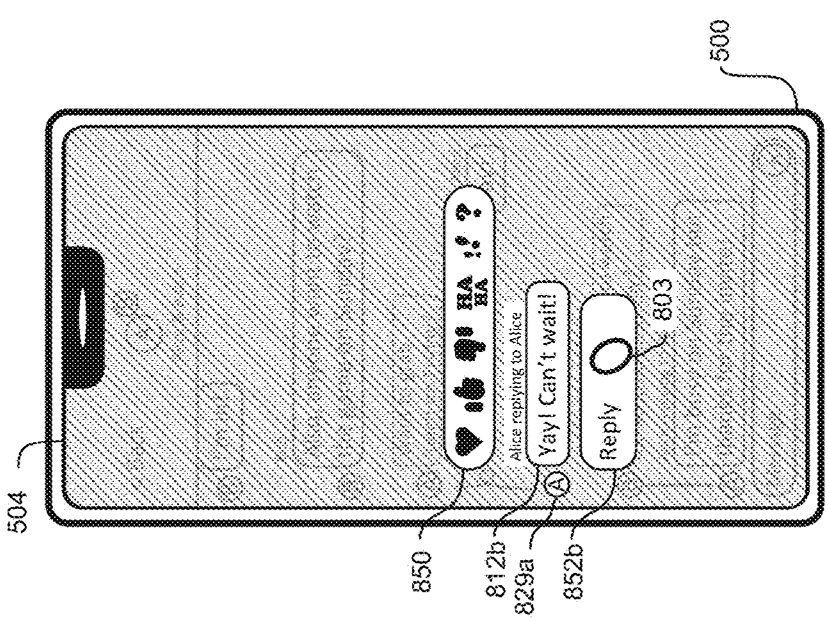

In FIG. 8M, in some embodiments, the option 852*b* to reply to the message corresponding to representation 812*b* is displayed without the option 852*a* to copy the message or the option 852*c* to view additional options associated with the message. The electronic device 500 optionally displays the plurality of options 850 to add a tag to the message corresponding to representation 812*b*. In some embodiments, in FIG. 8M, the user selects (e.g., with contact 803) the option 852*b* to reply to the message corresponding to representation 812*b*.

In some embodiments, in response to the user's selection in either FIG. 8L or 8M, the electronic device 500 displays the soft keyboard 846 in the messaging user interface as shown in FIG. 8N (e.g., without transitioning to the replies user interface of, for example, FIG. 8I). In some embodiments, instead of displaying the soft keyboard 846 in the user interface shown in FIG. 8N, in response to the user's selection in either FIG. 8L or 8M, the electronic device 500 displays the soft keyboard 846 within a replies user interface similar to the user interface illustrated in FIG. 8C-8G or 8I.

As shown in FIG. 8N, the messaging user interface optionally displays the representation of the most recently received message at the bottom of the user interface, which is just above the soft keyboard 846. In some embodiments, the electronic device 500 scrolls the user interface to display representation 812*b* and/or representation 810*b* (see FIG. 8K) just above the soft keyboard 846, because the user selected representation 812*b* as the message to which to reply and the message corresponding to representation 812*b* is a reply to the message corresponding to representation 810*b*.

In FIG. 8N, in some embodiments, the user selects (e.g., with contact 803) one of the regions of soft keyboard 846 corresponding to a character to compose a message that is a reply the message corresponding to representation 812*b*, which is a reply to the message corresponding to representation 810*b*.

Figure 8P:
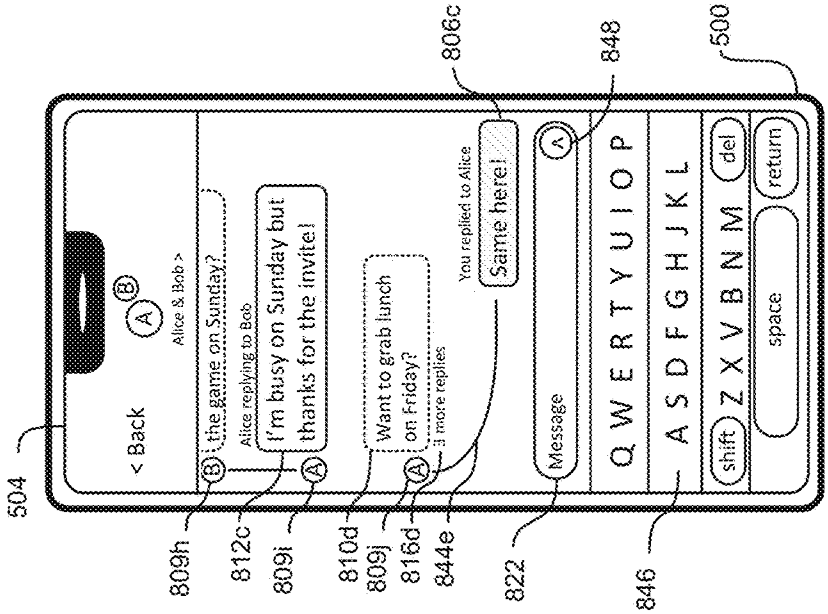
Figure 8O:
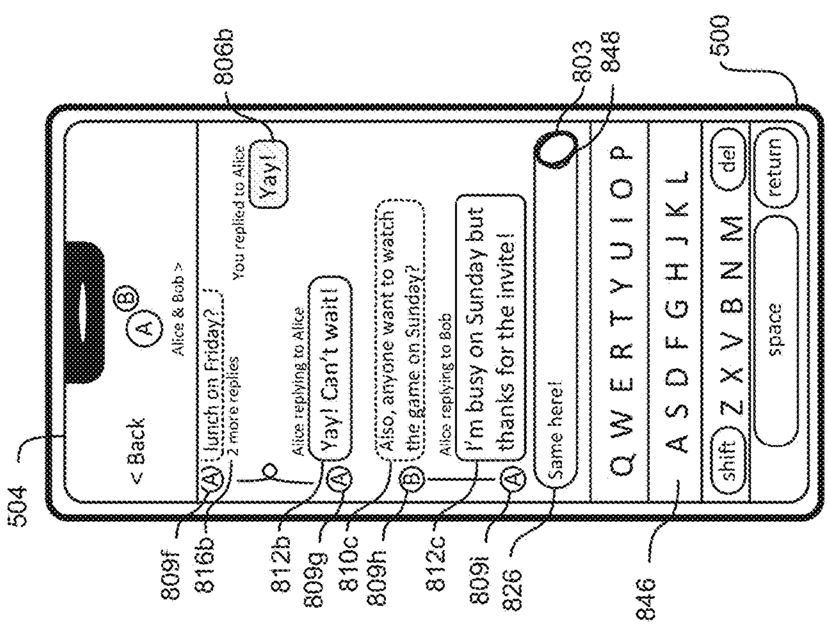

In FIG. 8O, after having provided the text to text entry field 826 via soft keyboard 846, in some embodiments, the user selects (e.g., with contact 803) the option 848 to send the message to the messaging conversation.

In response to the user's selection in FIG. 8O, in some embodiments, the electronic device 500 displays the user interface illustrated in FIG. 8P.

In FIG. 8P, the electronic device 500 optionally displays a representation 806*c* of the message sent by the user in FIG. 8O on the right side of the user interface because messages from the user of the electronic device 500 are displayed on the right side of the user interface in some embodiments. Representation 806*c* may be displayed connected by line 844*e* to representation 810*d*. Representation 810*d* is optionally displayed because the message received immediately prior to the message corresponding to representation 806*c* is not a reply to the message associated with representation 810*d*. In some embodiments, the electronic device 500 displays representation 810*d* instead of a representation of the message corresponding to representation 812*b*, because the message corresponding to representation 812*b* is a reply to the message corresponding to representation 810*d*. Thus, in some embodiments, if a user sends a new message that is a reply to a first message, which is a reply to a second message in the conversation, the new message is treated as a reply to the second message. In some embodiments, if a user sends a new message that is a reply to a first message, which is a reply to a second message in the conversation, the new message is treated as a reply to the first message. Thus, in some embodiments, the electronic device 500 displays a new representation of the message corresponding to representation 812*b* (e.g., "Yay! Can't Wait!") instead of or in addition to representation 810*d*. As shown in FIG. 8P, representation 810*d* includes an indication 816*d* of the number of replies to the message corresponding to representation 810*d* received prior to the message corresponding to representation 806*c*.

Figure 8R:
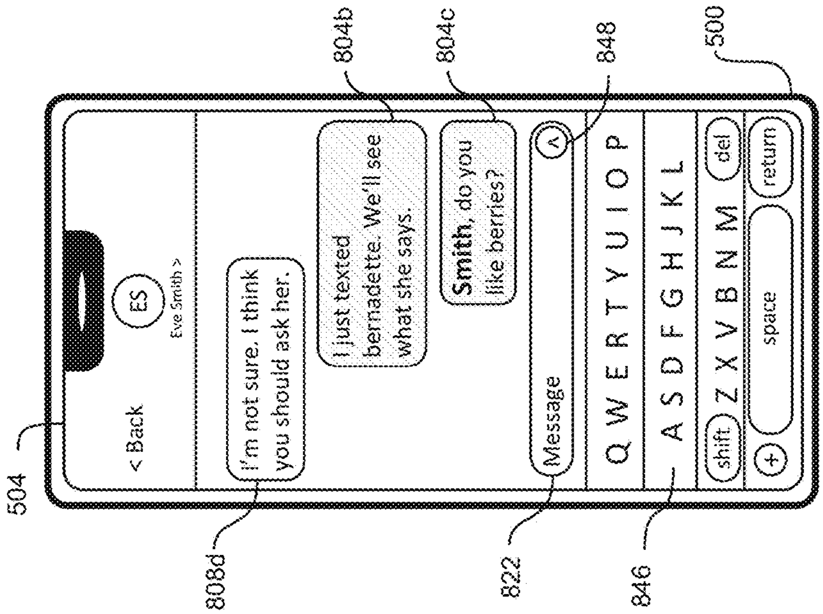
Figure 8Q:
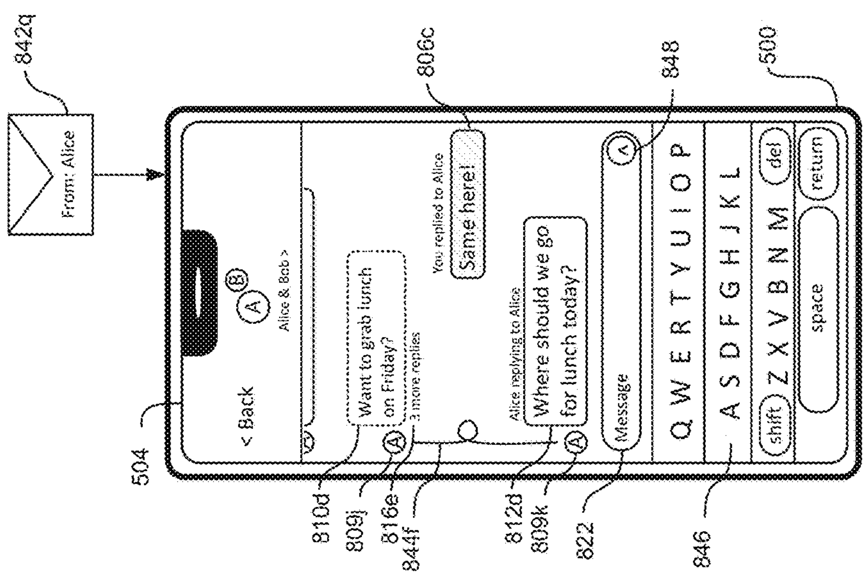

In FIG. 8Q, in some embodiments, the electronic device 500 detects indication 842*q* of an incoming message to the messaging conversation. In response to indication 842*q*, the electronic device 500 displays representation 812*d* of the message on the left side of the user interface because the message was sent by a user other than the user of the electronic device. The message corresponding to representation 812*d* may be a reply to the message corresponding to representation 810*d*, so representation 812*d* may displayed connected to representation 810*d* by looped line 844*f*. The loop of the looped line 844*f* may be aligned with representation 806*c*, which indicates that the message corresponding to representation 806*c* is also a reply to the message corresponding to representation 810*d*. In some embodiments, as shown in FIG. 8Q, looped line 844*f* is aligned with representations 809*j* and 809*k* of the people who sent the messages represented by representations 810*d* and 812*d* rather than being aligned with the containers of the contents of the messages. In some embodiments, instead of displaying a looped line 844*f*, the electronic device 500 displays a curved line connecting representations 810*d* and 806*c* (e.g., by connecting associated representations 809*j* and 809*k* of the users who sent the messages corresponding to representations 810*d* and 806*c*), and another curved line connecting representations 806*c* and 812*d*. In some embodiments, these curved lines would also be aligned with the avatars of representations 810*d* and 812*d* instead of being aligned with the containers that contain the contents of the messages. Representation 810*d* may still include indication 816*e* of the number of reply messages received prior to the message corresponding to representation 806*c*.

In FIG. 8R, in some embodiments, the electronic device 500 displays a messaging conversation between the user of the electronic device 500 and one other user (e.g., as opposed to a group conversation with three or more total users). The messaging conversation optionally includes a representation 808*d* of a message from the other user on the left side of the user interface and representations 804*b* and 804*c* of messages from the user of device 500 on the right side of the user interface.

Figure 8T:
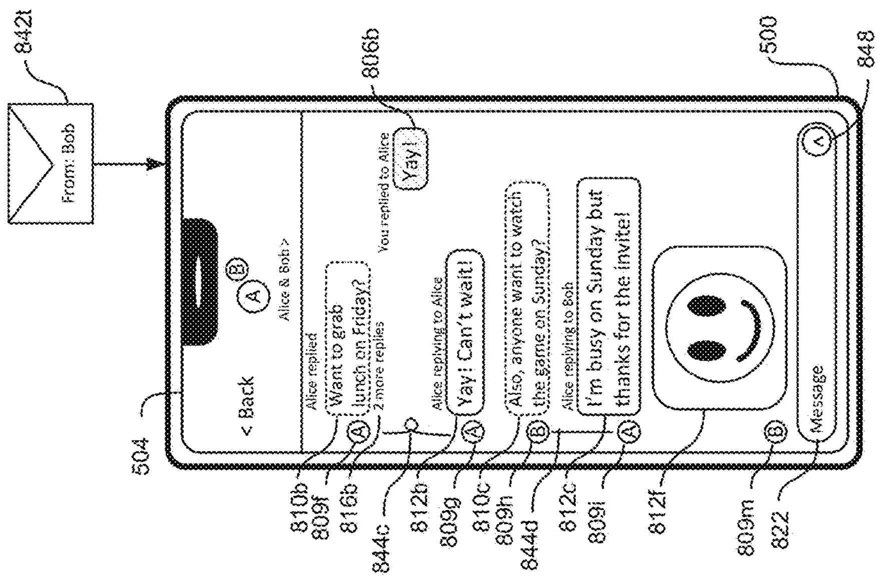
Figure 8S:
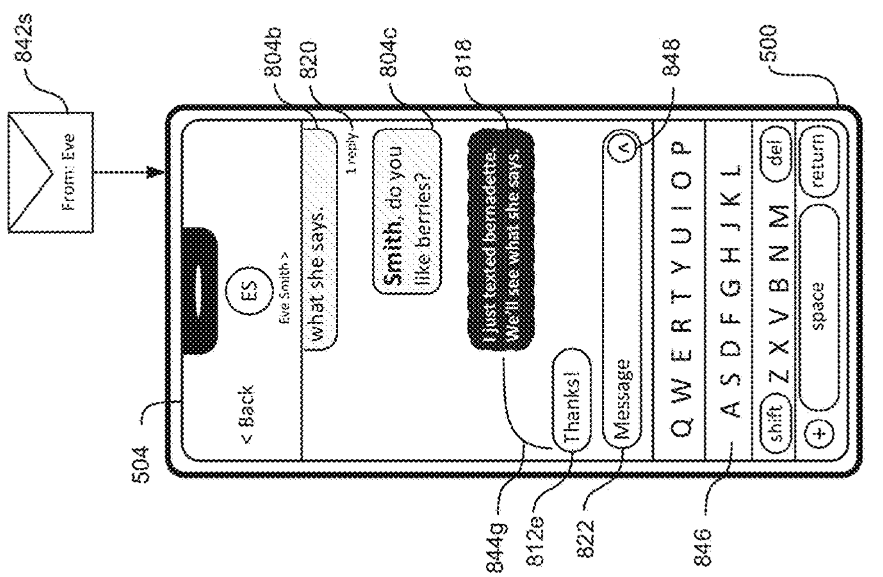

In some embodiments, as shown in FIG. 8S, the electronic device 500 detects an indication 842*s* of a message from the other user. In response to the indication 842*s*, the electronic device 500 optionally displays representation 812*e* of the message on the left side of the user interface because representations of messages from the other user are displayed on the left side of the user interface, as described above. Because the message corresponding to representation 812*e* may be a reply to the message corresponding to representation 804*b* and the message corresponding to representation 804*c* was received between the messages corresponding to representations 804*b* and 812*e*, the electronic device 500 displays representation 812*e* connected to representation 818 (which is a second representation of the message corresponding to representation 804*b*) by line 844*g*. Representation 818 can be displayed on the right side of the user interface because it is a representation of a message sent by the user of the electronic device 500 and representations of messages sent by the user of the electronic device 500 are displayed on the right side of the user interface, as described above. As shown in FIG. 8S, representation 818 is displayed with opposite colors compared to representation 804*b* because representation 818 is a second representation of the same message displayed in response to receiving a reply to the message.

As shown in FIG. 8T, in some embodiments, the electronic device 500 receives an indication 842*t* of a message that includes animated content (e.g., an animated emoji). In response to indication 842*t*, the electronic device 500 optionally displays indication representation 812*f* of the message including the animated content in the message user interface, as shown in FIG. 8T. As an example, FIG. 8U illustrates another frame of the animation after the passage of some amount of time. In some embodiments, while displaying the animation illustrated in FIGS. 8T-8U, the electronic device 500 plays audio content associated with the animation included in representation 812*f*.

Figure 8V:
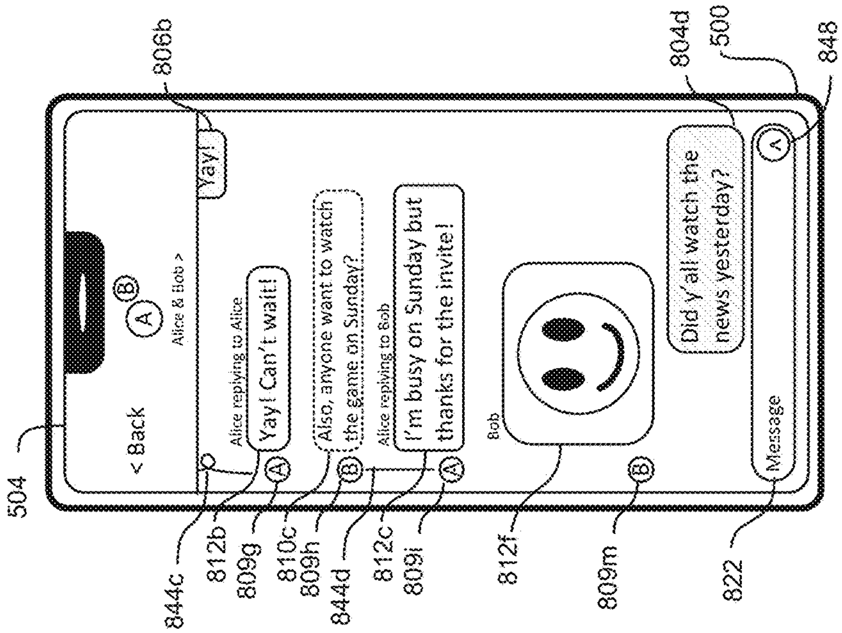
Figure 8U:
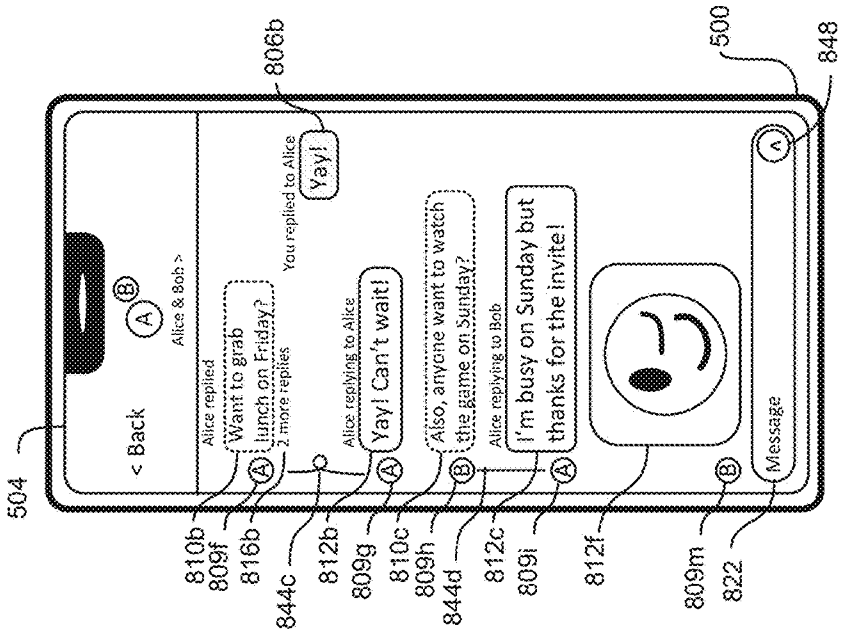

In some embodiments, as shown in FIG. 8V, the electronic device 500 displays a representation 804*d* of a message added to the messaging conversation by the user after the animated content corresponding to representation 812*f*. In some embodiments, because the message associated with representation 804*d* is not a reply to the message associated with representation 812*f*, the electronic device 500 does not display an indication that the message associated with representation 804*d* is a reply to the message associated with representation 812*f* (e.g., a curved line connecting representations 812*f* and 804*d*). In some embodiments, the animation included in representation 812*f* continues to play on a loop. In some embodiments, the animation included in representation 812*f* is paused until selection of the representation 812*f* is detected.

Figure 8X:
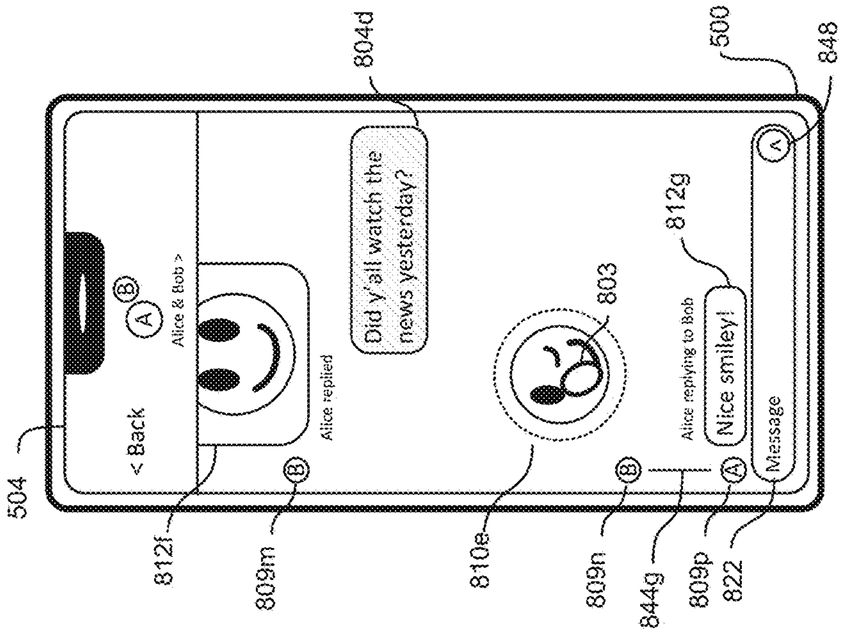
Figure 8W:
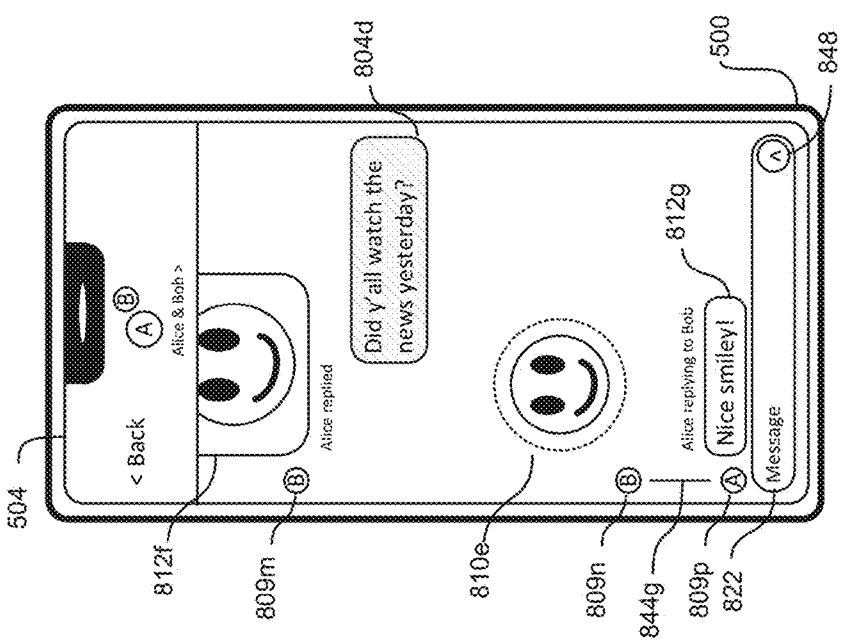

As shown in FIG. 8W, in some embodiments, the electronic device 500 receives a message that is a reply to the message associated with representation 812*f* after having displayed representation 804*d*. In some embodiments, the electronic device 500 displays a representation 812*g* of the message connected by line 844*g* to representation 810*e*, which is a second representation of the message associated with representation 812*f* As shown in FIG. 8W, in some embodiments, representation 810*e* is displayed at a smaller size than representation 812*f*. In some embodiments, representation 810*e* and 812*f* are displayed at the same size. Representation 812*f* can be shown in the same side of the user interface as the other representations of messages from users other than the user of the electronic device 500 because it is a representation of a message from a user other than the user of the electronic device 500, as described above. As described above, in some embodiments, an additional representation 810*e* of the message corresponding to representation 812*f* is displayed because the message corresponding to representation 804*d* was received between the messages corresponding to representations 812*f* and 812*g*.

As shown in FIG. 8X, in some embodiments, representation 810*e* includes the same animation as the animation included in representation 812*f*. In some embodiments, the sound that is played in association with representation 812*f* is not played in association with representation 810*e*. As shown in FIG. 8X, the user may select (e.g., with contact 803) the representation 810*e*.

Figure 8Z:
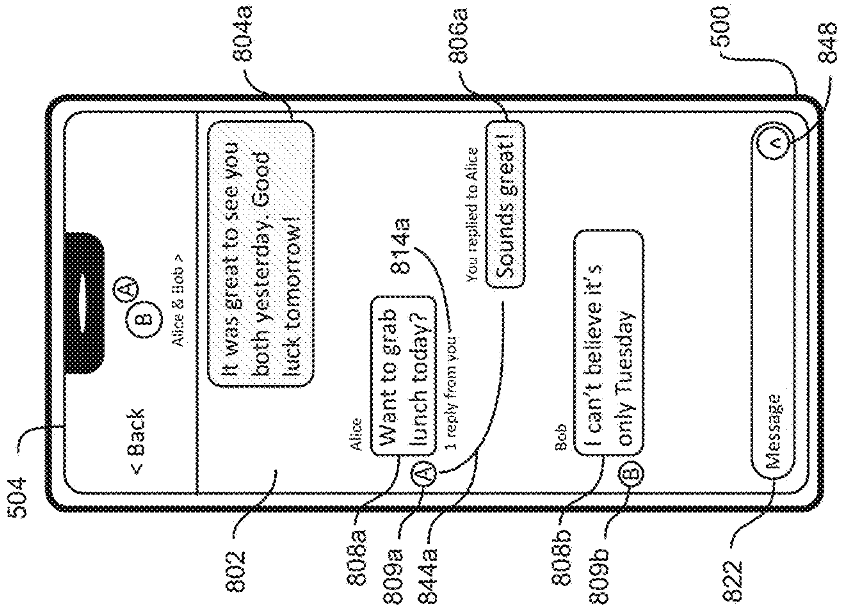
Figure 8Y:
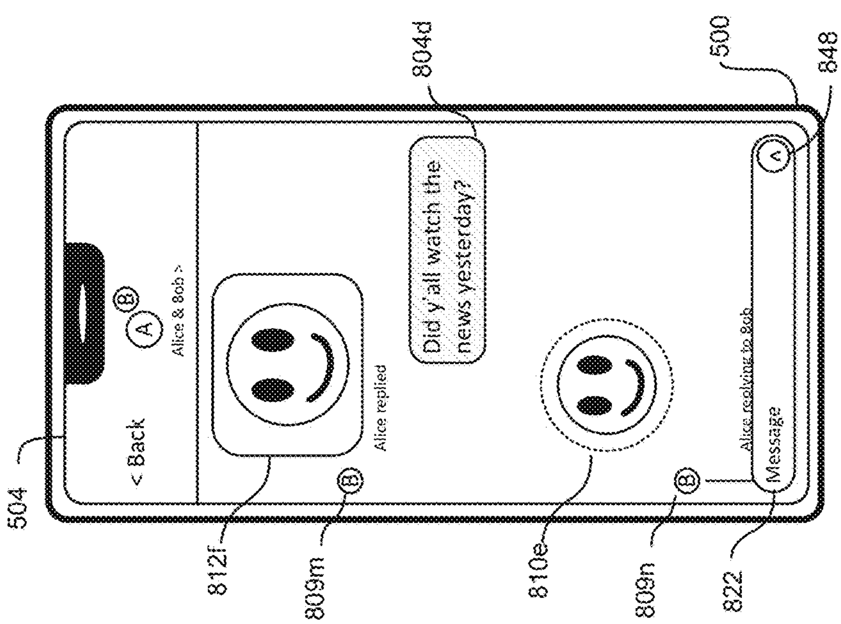
Figure 8A:
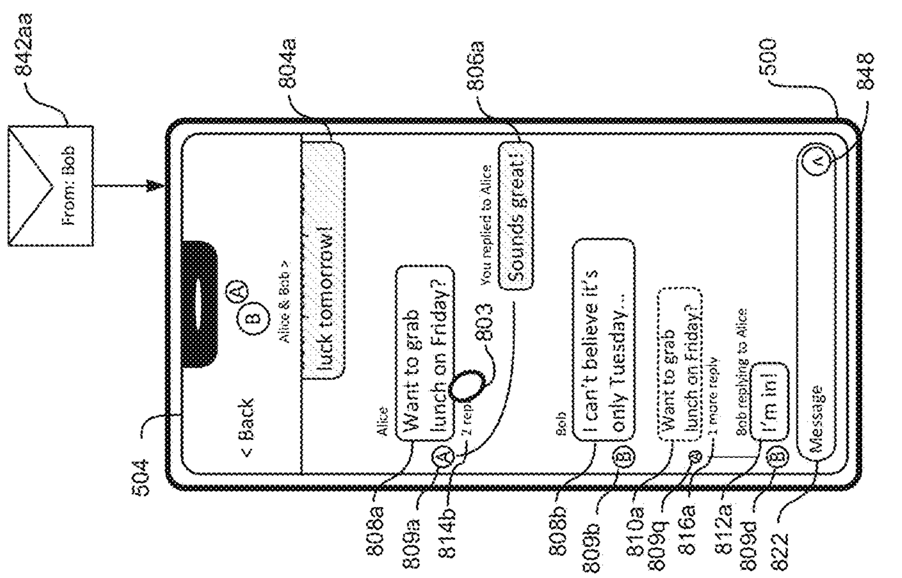

As shown in FIG. 8Y, in some embodiments, in response to the user's selection in FIG. 8X, the electronic device 500 scrolls the messaging conversation to a location that allows the entire representation 812*f* to be displayed. In some embodiments, while displaying the user interface illustrated in FIG. 8Y, the electronic device 500 plays the audio associated with the animation included in representation 812*f*. In some embodiments, in response to the user's selection in FIG. 8X, the electronic device 500 displays a replies user interface similar to the replies user interface illustrated in FIG. 8C that includes representations of the messages corresponding to representations 812*f* and 812*g* without including a representation of the message corresponding to representation 804*d*. In some embodiments, while displaying the replies user interface, the electronic device 500 plays the audio associated with the animation of the message corresponding to representation 812*f* and plays the animation.

In some embodiments, as described above, the electronic device 500 displays a representation of a user that sent a respective message with the representation of the message. In some embodiments, as described above, the electronic device 500 displays an additional representation of a respective message when a message that is a reply to the respective message is received after one or more other messages that are not replies to the respective message have been received since receipt of the respective message. In some embodiments, as described above the additional representation of the respective message is displayed at a smaller size than the representation of the respective message that was initially displayed in response to receiving the respective message. As will now be described with reference to FIGS. 8Z-8AA, in some embodiments, the electronic device 500 also displays the representation of the user that sent the respective message associated with the additional representation of the respective message at a smaller size than the representations of users associated with representations of messages that are the original representations of the messages (e.g., as opposed to additional representations of the messages).

FIG. 8Z illustrates an example of a messaging conversation user interface. Representations 808*a* and 808*b* of messages are displayed with associated representations 809*a* and 809*b* of users that sent the messages. In some embodiments, the representations 809*a* and 809*b* are displayed at the same size because representations 808*a* and 808*b* of the messages are both the initial representations of the messages (e.g., as opposed to additional representations of the messages as described above).

FIG. 8ZZ illustrates an example of an updated user interface in response to receiving an indication 842*aa* of a message that is a reply to the message associated with representation 808*a*. In some embodiments, in response to the indication 842*aa*, the electronic device 500 displays an additional representation 810*a* of the message associated with representation 808*a*. The additional representation 810*a* of the message can include a representation 809*q* of the user that sent the message associated with representations 808*a* and 810*a*. In some embodiments, representation 809*q* is the same as representation 809*a* except that representation 809*q* is displayed at a smaller size than representation 809*a*. Moreover, in some embodiments, representation 809*q* is smaller than representation 809*d* displayed in association with the representation 812*a* of the message that is a reply to the message associated with representations 808*a* and 810*a*. In some embodiments, representation 809*q* has additional differences from the other representations 809*a* and 809*d* of users, such as being displayed with a different color, translucency, or other visual effect from the color, translucency, or other visual effect of representations 809*a* and 809*d*.

Figure 9:
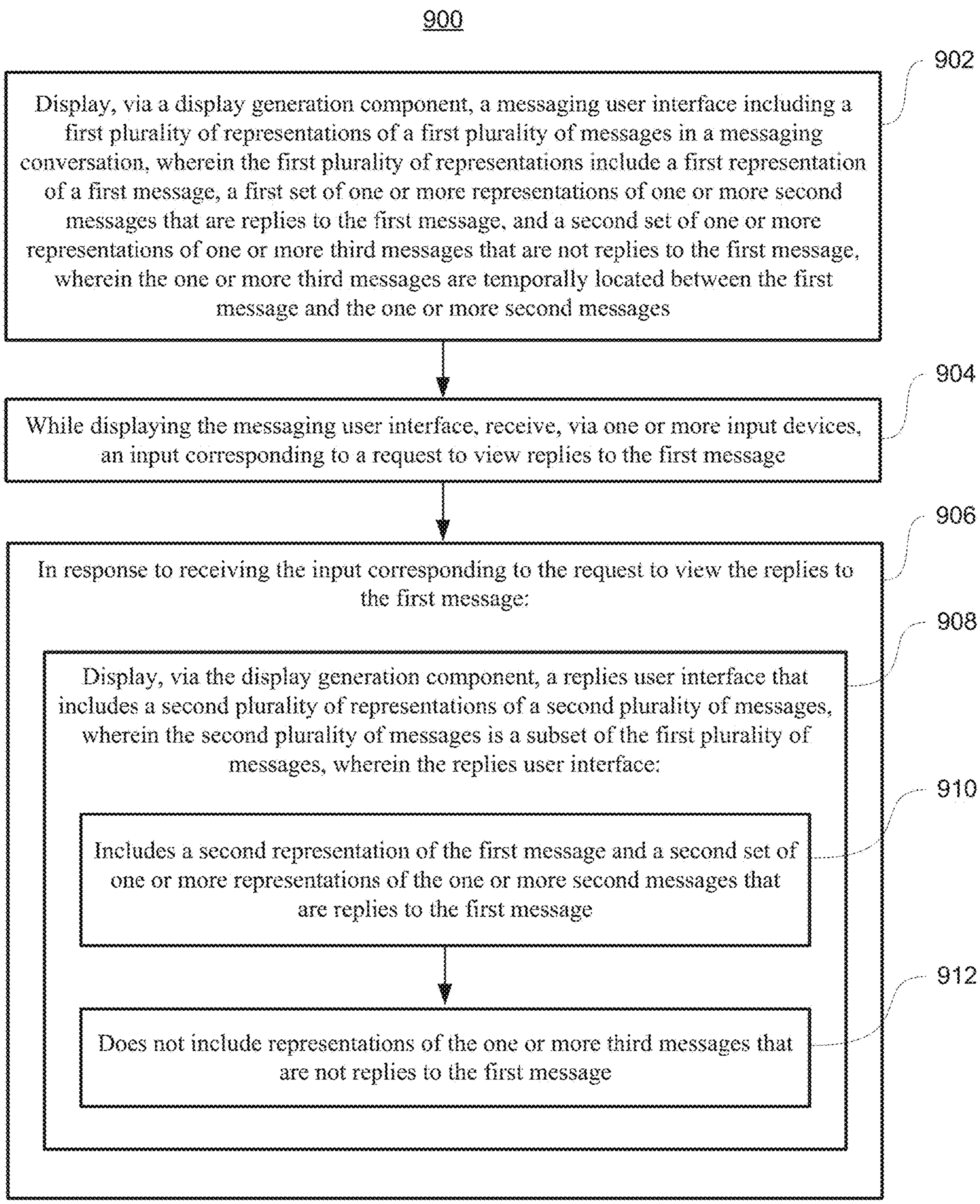
FIG. 9 is a flow diagram illustrating a method of indicating which messages are replies to other messages in a messaging conversation according to some embodiments.

FIG. 9 is a flow diagram illustrating a method 900 of indicating which messages are replies to other messages in a messaging conversation according to some embodiments. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

As described below, the method 900 provides ways in which an electronic device presents indications of messages that are replies to other messages. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device 500 in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, method 900 is performed an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.)). In some embodiments, such as in FIG. 8A, the electronic device 500 displays (902), via the display generation component, a messaging user interface including a first plurality of representations 804*a*, 808*a*, 806*a*, and 808*b* of a first plurality of messages in a messaging conversation, wherein the first plurality of representations include a first representation 808*a* of a first message, a first set of one or more representations 806*a* of one or more second messages that are replies to the first message, and a second set of one or more representations 804*a* and 808*b* of one or more third messages that are not replies to the first message, wherein the one or more third messages are temporally located between the first message and the one or more second messages. In some embodiments, the first representation of the first message includes an indication of a contact that sent the message and the content (e.g., text, a still or video image, audio, link, rich link) of the message. The first message was optionally sent by a user account of the user of the electronic device or the user account of a different user (e.g., a contact of the user of the electronic device or another user account). In some embodiments, the one or more representations of the one or more second messages include indications that the one or more second messages are replies to the first message. For example, a representation of a respective second message includes a line connecting the content of the respective second message to a representation of the first message. In some embodiments, because the one or more third messages are temporally located between the first message and the one or more second messages, the electronic device displays at least two representations of the first message: (1) an indication of the first message that is located temporally based on when the first message was received in the messaging conversation and (2) an indication of the first message that is displayed after the representations of the one or more third messages in association with the representations of the one or more second messages.

In some embodiments, such as in FIG. 8B, while displaying the messaging user interface, the electronic device 500 receives (904), via the one or more input devices, an input corresponding to a request to view replies to the first message. In some embodiments, the representation of the first message includes an indication of a number of messages that are replies to the first message. In some embodiments, the representation of the first message includes a selectable option that, when selected, causes the electronic device to cease displaying messages in the conversation that are not replies to the first message and display the first message and messages that are replies to the first message. Optionally, the indication of the number of messages that are replies to the first message is the selectable option. In some embodiments, the input corresponding to the request to view replies to the first message is selection of the selectable option. In some embodiments, such as in FIG. 8C, in response to receiving the input corresponding to the request to view the replies to the first message (906), the electronic device 500 displays (908), via the display generation component, a replies user interface that includes a second plurality of representations 838*a*, 840*a*, and 838*b* of a second plurality of messages, wherein the second plurality of messages is a subset of the first plurality of messages (e.g., the replies user interface includes representations of a subset of messages in the messaging conversation. In some embodiments, the replies user interface includes a representation of the first message and representations of messages that are replies to the first message and does not include representations of messages in the conversation that are not replies to the first message. In some embodiments, such as in FIG. 8C, the replies user interface includes (910) a second representation 838*a* of the first message and a second set of one or more representations 840*a* and 838*b* of the one or more second messages that are replies to the first message and does not include (912) representations 808*b* of the one or more third messages that are not replies to the first message. In some embodiments, the messaging conversation includes a fourth message and one or more fifth messages that are replies to the fourth message. In some embodiments, in response to detecting an input corresponding to a request to view the replies to the fourth message, the electronic device displays a replies user interface including the fourth message and the one or more fifth messages without including the other messages in the messaging conversation. The above-described manner of displaying a replies user interface that includes representations of the first message and the one or more second messages but does not include representations of the third messages enables the electronic device to efficiently display representations only of messages that are replies to the first message and the first message itself, which simplifies the interaction between the user and the electronic device and enhances the operability of the electronic device and makes the user-device interface more efficient (e.g., by reducing the number of inputs needed to view all of the replies to the first message), which additionally reduces power usage and improves battery life of the electronic device by enabling the user to use the electronic device more quickly and efficiently.

In some embodiments, prior to receiving one or more inputs corresponding to entry of the contents of a message, the electronic device detects an input corresponding to a request to make the message a reply to the first message. In some embodiments, the one or more inputs include selection of the first message lasting more than a threshold amount of time (e.g., 0.5 seconds, 1 second) or double-selection (e.g., double-click) of the first message.

In some embodiments, a representation of a respective second message includes an indication that the respective second message is a reply to the first message. The indication that the respective second message is a reply to the first message is optionally text indicating that the author of the second respective message is replying to the author of the first message. For example, if Alice's message is a reply to Bob's message, the representation of Alice's message includes the text "Alice replying to Bob."

In some embodiments, a respective third message is received after the first message and before a respective second message of the one or more second messages. The representation of the respective second message optionally includes a second representation of the first message and a line connecting the second representation of the first message to the representation of the respective second message. In some embodiments, the second representation of the first message is displayed at a smaller size, at higher translucency, and/or with a lighter color than the original representation of the first message.

In some embodiments, such as in FIG. 8B, while displaying the messaging user interface including the first representation 808*a* of the first message, wherein the messaging user interface includes a first respective representation 808*b* of a first respective message, different from the first message, that is a most recent message in the messaging conversation, the electronic device 500 receives an indication 842*b* that a second respective message that is a reply to the first message has been added to the messaging conversation. In some embodiments, while the most recent message in the messaging conversation is not the first message, a message that is a reply to the first message is received in the conversation. The indication that the second respective message has been added to the conversation is optionally an indication that a message from a user account other than the user account associated with the electronic device has been received (e.g., the second respective message is sent by another electronic device). In some embodiments, the indication that the second respective message has been added to the conversation is optionally an indication that the electronic device has received one or more inputs corresponding to entry of a message that is a reply to the first message (e.g., the respective second message is sent by the first electronic device).

In some embodiments, such as in FIG. 8B, in response to receiving the indication 842*b* that the second respective message has been added to the messaging conversation, in accordance with a determination that the first respective message is not a reply to the first message, the electronic device 500 updates the messaging user interface to include a representation 812*a* of the second respective message and a second representation 816*a* of the first message displayed in association with the representation of the second respective message. In some embodiments, the second representation of the first message is displayed at a smaller size, at higher translucency, and/or with a lighter color than the original representation of the first message. The electronic device optionally displays the second representation of the first message with less spacing between the representation of the second respective message than the spacing between the second representation of the first message and the representation of the first respective message. In some embodiments, the electronic device displays representations of messages that are replies to the same message (e.g., representations of one or more messages that are replies to the first message) in the conversation with less spacing than the spacing between representations of messages that are not replies to the same message (e.g., a representation of a message that is a reply to the first message and a message that is not a reply to the first message). In some embodiments, the electronic device displays a line connecting the second representation of the first message to the representation of the second respective message. In some embodiments, such as in FIG. 8Q, in accordance with a determination that the first respective message is a reply to the first message, the electronic device 500 updates the messaging user interface to include a representation 812*d* of the second respective message without including the second representation of the first message. In some embodiments, the representations of the first message, the first respective message, and the second respective message are displayed in association with one another (e.g., with a line connecting the first two, and a line connecting the second two). Thus, in some embodiments, a new representation of an earlier message to which the latest message is a reply is not added to the user interface if the most recent message is a reply to the earlier message. In some embodiments, if the most recent message in the user interface is not a reply to the earlier message, then a subsequent reply to the earlier message optionally causes the electronic device to display a new representation of the earlier message in association with the subsequent reply. The above-described manner of displaying the second representation of the first message in association of the second respective message in accordance with the determination that the first respective message is not a reply to the first message enables the electronic device to display a representation of the first message in close proximity to the representation of the second respective message that is a reply to the first message which simplifies the interaction between the user and the electronic device and enhances the operability of the electronic device and makes the user-device interface more efficient (e.g., by reducing the number of inputs needed to view the content of the first message while viewing the content of the second respective message), which additionally reduces power usage and improves battery life of the electronic device by enabling the user to use the electronic device more quickly and efficiently.

In some embodiments, such as in FIG. 8B, the input corresponding to the request to view the replies to the first message includes selection of a selectable option 814*b* displayed in association with the first representation of the first message in the messaging user interface. In some embodiments, the representation of the first message includes an indication of a number of messages that are replies to the first message. In some embodiments, the representation of the first message includes a selectable option that, when selected, causes the electronic device to cease displaying messages in the conversation that are not replies to the first message and display the first message and messages that are replies to the first message. Optionally, the indication of the number of messages that are replies to the first message is the selectable option. The above-described manner of displaying the selectable option in association with the first representation of the first message enables the electronic device to provide an efficient way to view the replies to the first message without viewing other messages in the conversation, which simplifies the interaction between the user and the electronic device and enhances the operability of the electronic device and makes the user-device interface more efficient (e.g., by reducing the number of inputs needed to view the replies to the first message), which additionally reduces power usage and improves battery life of the electronic device by enabling the user to use the electronic device more quickly and efficiently.

In some embodiments, such as in FIG. 8B, the selectable option 814*b* includes a visual indication of a number of replies to the first message in the messaging conversation. In some embodiments, the selectable option includes the text “view x replies” where x is the number of replies to the first message that have been received. For example, if one reply has been received to the first message, the text of the selectable option says “view 1 reply.” As another example, if four replies have been received to the first message, the text of the selectable option says “view 4 replies.” The above-described manner of including an indication of the number of replies to the first message in the selectable option to view the replies to the first message enables the electronic device to efficiently indicate the number of replies that have been received to the first message before receiving an input to view the replies, which simplifies the interaction between the user and the electronic device and enhances the operability of the electronic device and makes the user-device interface more efficient (e.g., by reducing the number of inputs needed to determine the number of replies that have been received to the first message), which additionally reduces power usage and improves battery life of the electronic device by enabling the user to use the electronic device more quickly and efficiently.

In some embodiments, such as in FIG. 8C, displaying the replies user interface includes displaying the replies user interface overlaid on the messaging user interface (e.g., the background of the replies user interface is the messaging user interface). In some embodiments, while displaying the replies user interface, the electronic device displays the messaging user interface with lower contrast, different colors, and/or increased translucency compared to the appearance of the messaging user interface when the replies user interface is not displayed. In some embodiments, such as in FIG. 8B, before receiving the input corresponding to the request to view the replies to the first message, the messaging user interface is displayed with a visual characteristic having a first value (e.g., first contrast, first colors, first blurriness (e.g., not blurry) and/or first translucency). In some embodiments, such as in FIG. 8C, while displaying the replies user interface overlaid on the messaging user interface, the messaging user interface is displayed with the visual characteristic having a second value, different from the first value (e.g., less contrast than the first contrast, different colors than the first colors, more blurry than the first blurriness, and/or more translucency than the first translucency). The above-described manner of displaying the replies user interface overlaid on the messaging user interface with the visual characteristic having the second value enables the electronic device to visually associate the replies user interface with the messaging user interface with reduced visual clutter, which simplifies the interaction between the user and the electronic device and enhances the operability of the electronic device and makes the user-device interface more efficient (e.g., by reducing the number of inputs needed to confirm the association between the replies user interface and the messaging user interface), which additionally reduces power usage and improves battery life of the electronic device by enabling the user to use the electronic device more quickly and efficiently.

In some embodiments, such as in FIG. 8A, in the messaging user interface, the first set of one or more representations 808*a* and 806*a* are displayed in association with one or more visual indications 844*a* that the one or more second messages are replies to the first message (e.g., the one or more visual indications include text indicating that the sender of a respective second message is replying to the sender of the first message). For example, if Bob replies to Alice’s message, the representation of Bob’s message includes the text “Bob replying to Alice.” In some embodiments, such as in FIG. 8C, in the replies user interface, the second set of one or more representations 838*a*, 840*a*, and 838*b* are not displayed in association with the one or more visual indications that the one or more second messages are replies to the first message. In some embodiments, the representations of the second messages are not displayed in association with the visual indications that the second messages are replies to the first message because it is clear that the replies user interface only includes the first message and messages that are replies to the first messages. In some embodiments, the visual indications that the one or more second messages are replies to the first message are not necessary when displaying the replies user interface. The above-described manner of forgoing displaying the visual indications that the one or more second messages are replies to the first message enables the electronic device to display more second messages concurrently, which simplifies the interaction between the user and the electronic device and enhances the operability of the electronic device and makes the user-device interface more efficient (e.g., by reducing the number of inputs needed to view all of the second messages), which additionally reduces power usage and improves battery life of the electronic device by enabling the user to use the electronic device more quickly and efficiently.

In some embodiments, while displaying the replies user interface overlaid on the messaging user interface, such as in FIG. 8G, the electronic device 500 receives an indication 842*g* that a first respective message has been added to the messaging conversation (e.g., the first respective message is received from another electronic device). In some embodiments, in response to receiving the indication 842*g* that the first respective message has been added to the messaging conversation, the electronic device 500 updates the messaging user interface to include a first respective representation 838*c* of the first respective message while maintaining display of the replies user interface overlaid on the messaging user interface. In some embodiments, the first respective representation of the first respective message is displayed with the visual characteristic having the second value (e.g., increased translucency, different colors, and/or decreased contrast compared to the appearance of the messaging user interface while the replies user interface is not displayed). In some embodiments, if the first respective message is not a reply to the first message, the electronic device does not display a representation of the first respective message in the replies user interface. In some embodiments, if the first respective message is a reply to the first message, the electronic device displays a representation of the first respective message in the replies user interface while it remains overlaid on the messaging user interface. The above-described manner of updating the messaging user interface to include the first respective representation of the first respective message while maintaining display of the replies user interface overlaid on the messaging user interface enables the electronic device to indicate to the user that the first respective message has been received without requiring the user to navigate away from the replies user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 8G, the replies user interface includes a selectable option 824 that is selectable to initiate a process to reply to the first message in the messaging conversation. In some embodiments, in response to detecting selection of the selectable option, the electronic device displays one or more options (e.g., a soft keyboard, a text entry field for entering the reply, a selectable affordance for adding the reply to the conversation) for composing a message that is a reply to the first message. The one or more options for composing the message optionally include a soft keyboard and/or one or more options for adding audio and/or an image to the message. In some embodiments, if the one or more options for composing a message were displayed when the electronic device detected the request to display the replies user interface, the electronic device continues displaying the one or more options to compose the message while displaying the replies user interface without detecting selection of the selectable option to initiate the process to reply to the first message. The above-described manner of displaying the selectable option to reply to the first message within the replies user interface enables the electronic device to provide an efficient way to reply to the first message without navigating away from the replies user interface first, which simplifies the interaction between the user and the electronic device and enhances the operability of the electronic device and makes the user-device interface more efficient (e.g., by reducing the number of inputs needed to create a message that is a reply to the first message), which additionally reduces power usage and improves battery life of the electronic device by enabling the user to use the electronic device more quickly and efficiently.

In some embodiments, such as in FIG. 8G, while displaying the replies user interface, the electronic device 500 receives an indication 842*g* that a first respective message has been added to the messaging conversation as a reply to the first message (e.g., the electronic device receives an indication of a message sent by another electronic device or the electronic device detects entry of a message that is a reply to the first message). In some embodiments, such as in FIG. 8G, in response to receiving the indication 842*g* that the first respective message has been added to the messaging conversation as the reply to the first message, the electronic device 500 updates the replies user interface to include a first respective representation 838*c* of the first respective message. In some embodiments, the first respective representation of the first respective message is added to the replies user interface while the replies user interface is being displayed. The replies user interface is optionally displayed overlaid on the messaging user interface and the electronic device optionally displays a second respective representation of the first respective message in the messaging user interface while displaying the first respective representation of the first respective message in the replies user interface. The above-described manner of updating the replies user interface to include the first respective representation of the first respective message enables the electronic device to efficiently display the contents of the first respective message without requiring the user enter an input refreshing the replies user interface or navigating to the messaging user interface, which simplifies the interaction between the user and the electronic device and enhances the operability of the electronic device and makes the user-device interface more efficient (e.g., by reducing the number of inputs needed to view the first respective message), which additionally reduces power usage and improves battery life of the electronic device by enabling the user to use the electronic device more quickly and efficiently.

In some embodiments, the messaging user interface includes a text box in which a draft message will be displayed in response to detecting one or more inputs composing a message (e.g., selection of keys on a soft keyboard). Prior to receiving the one or more inputs composing the message, the electronic device optionally displays the text box with text indicating the type of message that will be sent. For example, if the message will be sent as a text message, the text box says "text message," if the message will be sent as an enhanced data-based message, the text indicates the name of the enhanced data-based messaging service. In response to detecting an input requesting to reply to the first message, the electronic device optionally updates the text box to say "reply."

In some embodiments, such as in FIG. 8B, the replies user interface is displayed in response to the input corresponding to the request to view the replies to the first message satisfying one or more first criteria or one or more second criteria (e.g., the replies user interface is displayed in response to detecting selection of the selectable option displayed in association with the representation of the first message or in response to detecting selection of one of the first set of one or more representations of a respective second message). In some embodiments, such as in FIG. 8B, the one or more first criteria are satisfied when the input includes selection of a selectable option 814*b* displayed in association with the first representation of the first message in the messaging user interface. In some embodiments, such as in FIG. 8H, the one or more second criteria are satisfied when the input includes selection of a respective representation 812*a* of the first set of one or more representations. In some embodiments, the electronic device does not display the replies user interface in response to detecting selection of a representation of a message in the messaging user interface that is not a reply to a message in the messaging user interface. The above-described manner of displaying the replies user interface in response to detecting selection of the selectable option displayed in association with the representation of the first message or in response to detecting selection of a respective representation of the first set of one or more representations of second messages enables the electronic device to provide efficient ways of accessing the replies user interface, which simplifies the interaction between the user and the electronic device and enhances the operability of the electronic device and makes the user-device interface more efficient (e.g., by reducing the number of inputs needed to access the replies user interface), which additionally reduces power usage and improves battery life of the electronic device by enabling the user to use the electronic device more quickly and efficiently.

In some embodiments, while displaying the replies user interface overlaid on the messaging user interface, the electronic device detects an input corresponding to a request to navigate back to the messaging user interface. The input is optionally selection of a respective second representation of the first message or one of the second messages or selection of the messaging user interface (e.g., a tap on the background of the replies user interface). In some embodiments, in response to detecting the input, the electronic device displays the messaging user interface without displaying the replies user interface.

In some embodiments, such as in FIG. 8K, the first set of one or more representations includes a respective representation 812*b* of a first respective message. In some embodiments, such as in FIG. 8B, in accordance with a determination that the first respective message is a direct reply to the first message (e.g., the writer of the first respective message provided an input selecting the first message as the message to which the first respective message is a reply), the respective representation 806*a* is displayed in association with a visual indication indicating that the first respective message is a reply to the first message (e.g., the respective representation is displayed in association with a respective representation of the first message and/or with text indicating that the first respective message is a reply to the first message). In some embodiments, such as in FIG. 8B, in accordance with a determination that the first respective message is a reply to a second respective message that is a reply to the first message (e.g., the writer of the first respective message provided an input selecting the second respective message as the message to which the first respective message is a reply), and is not a direct reply to the first message, the respective representation 812*a* is displayed in association with the visual indication indicating that the first respective message is a reply to the first message (e.g., the respective representation is displayed in association with a respective representation of the first message and/or with text indicating that the first respective message is a reply to the first message.). The above-described manner of displaying the respective representation of the first respective message that is a reply to the second respective message with an indication that the first respective message is a reply to the first message enables the electronic device to reduce the number of reply threads in the messaging conversation, which simplifies the interaction between the user and the electronic device and enhances the operability of the electronic device and makes the user-device interface more efficient (e.g., by enabling the user to view the replies in chronological order regardless of which message in the thread of replies to the first message to which the first respective message is a reply), which additionally reduces power usage and improves battery life of the electronic device by enabling the user to use the electronic device more quickly and efficiently.

In some embodiments, the messaging user interface includes representations of messages generated by the user account associated with the electronic device on the right side of the user interface and representations of messages generated by other user accounts on the left side of the user interface. In some embodiments, regardless of which user account generated the first message, a representation of a respective second message displayed with an indication that the second respective message is a reply to the first message is displayed on the side of the user interface according to which user account generated the second respective message. For example, if the user of the electronic device generated the first message and a different user generates a respective second message that is a reply to the first message, the representation of the respective second message and a second representation of the first message is entirely displayed on the left side of the messaging user interface even though the first message was generated by the user account associated with the electronic device, and vice-versa.

In some embodiments, in response to an input corresponding to a request to add a tag (e.g., like, dislike, etc.) to a respective message in the conversation, the electronic device displays a plurality of selectable options each associated with a respective tag and a selectable option to create a message that is a reply to the respective message.

In some embodiments, a representation of a respective second message is displayed with an indication of the first message, such as a second representation of the first message displayed at a smaller size, different color, and/or increased translucency compared to the original representation of the first message. In some embodiments, the representation of the respective second message includes text indicating that the author of the respective second message is replying to the author of the first message. For example, the representation of Alice's reply to Bob's message includes the text "Alice replying to Bob."

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, and 1500) are also applicable in an analogous manner to method 900 described above with respect to FIG. 9. For example, the ways of presenting indications of which messages are replies to other messages described above with reference to method 900 optionally have one or more of the characteristics of the ways of presenting representations of messaging conversations, ways of creating and presenting mentions, ways of presenting indications of messages that are replies to other messages, etc., described herein with reference to other methods described herein (e.g., methods 700, 1100, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9 are, optionally, implemented by components depicted in FIGS. 1A-1B. For example, displaying operations 902 and 908 and receiving operation 904 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Creating and Presenting Mentions

Users interact with electronic devices in many different manners, including using an electronic device to send and receive messages. The embodiments described below provide ways in which an electronic device creates and presents links (e.g., rich links) to contacts in a messaging conversation (e.g., "mentions"). Presenting and creating mentions in the ways described herein enhances interactions with a device such as by reducing the time and inputs it takes to create a mention, thus reducing the amount of time needed by a user to perform operations, thus reducing the power usage of the device, which increases battery life for battery-powered devices. It is understood that people use devices. When a person uses a device, that person is optionally referred to as a user of the device.

Figure 10B:
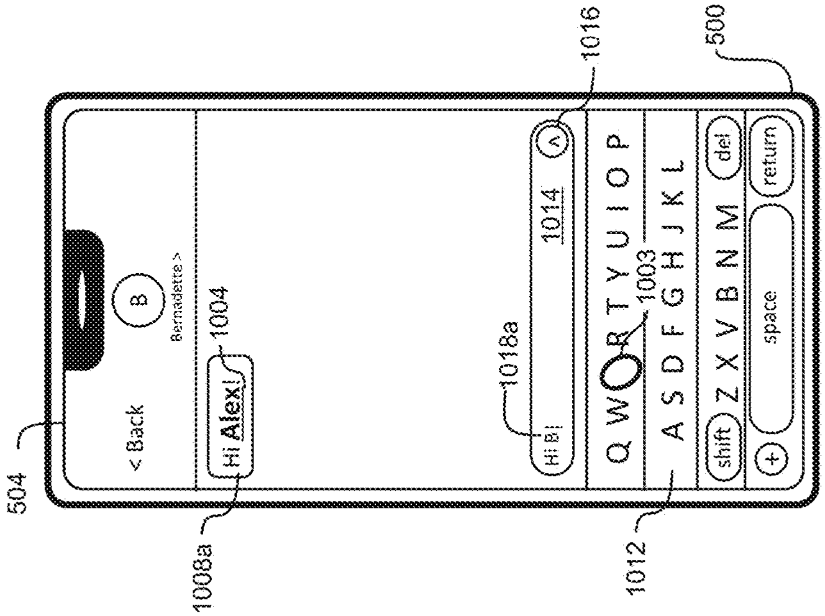
FIGS. 10A-10TTT illustrate various ways the electronic device creates and presents links (e.g., rich links) to contacts in a messaging conversation (e.g., "mentions") according to some embodiments.
Figure 10A:
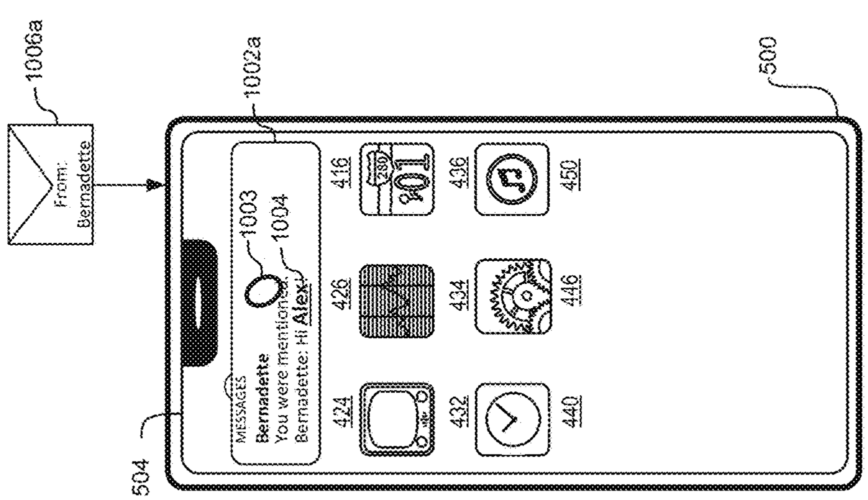
Figure 10D:
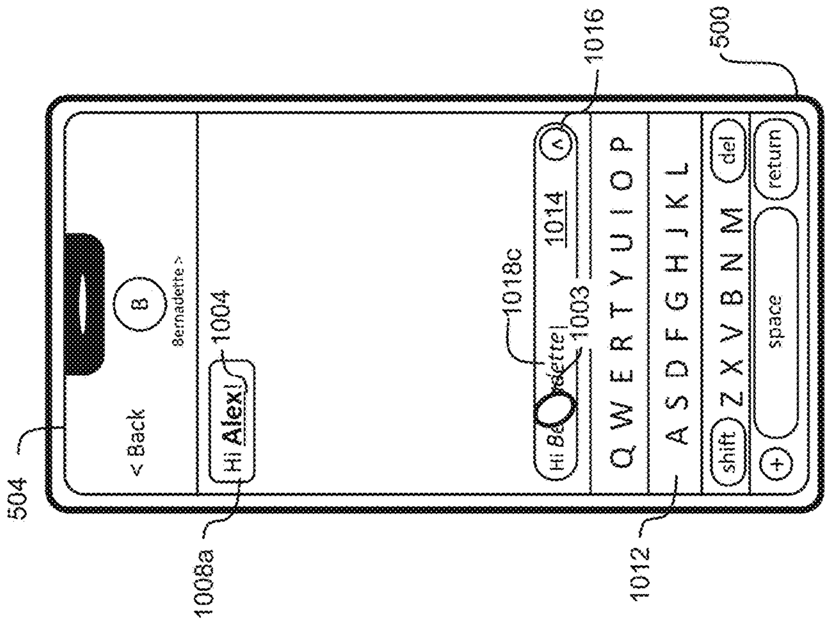
Figure 10C:
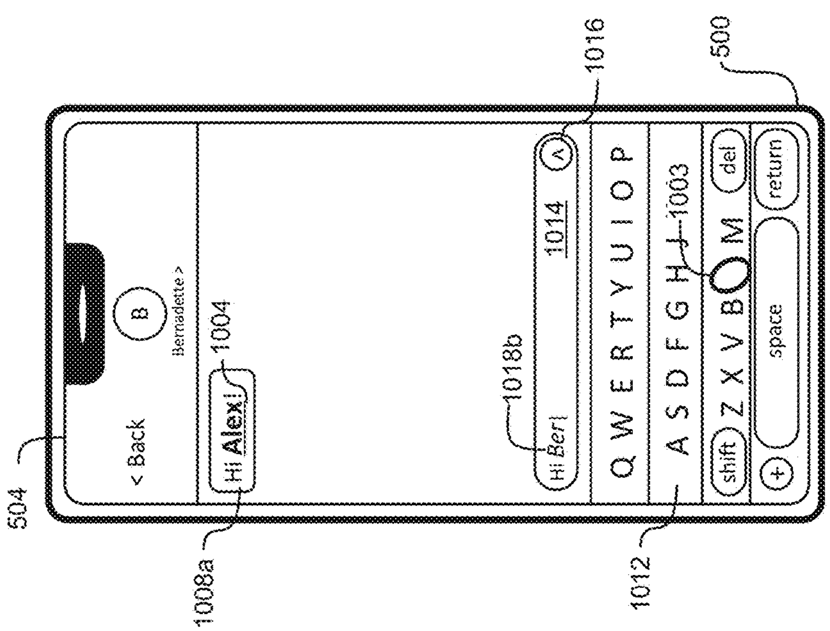
Figure 10F:
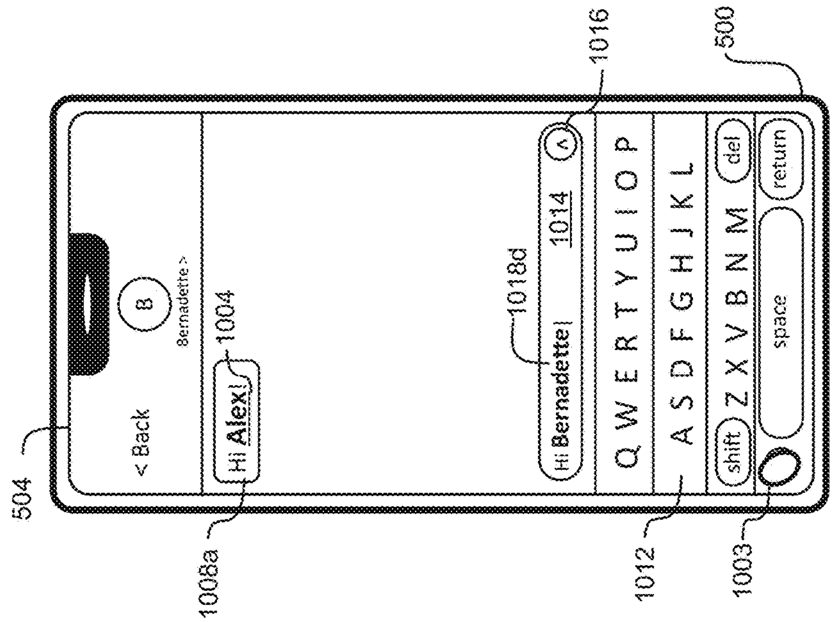
Figure 10E:
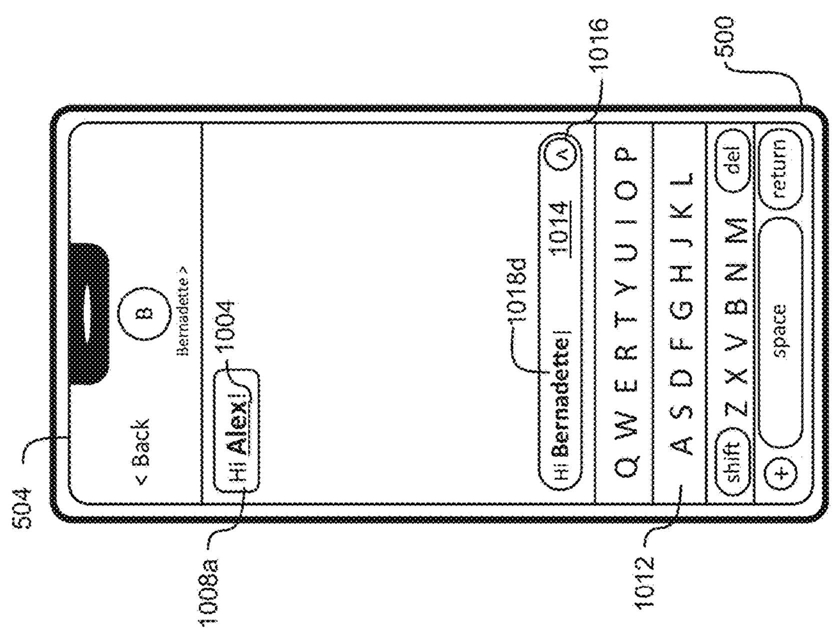
Figure 10H:
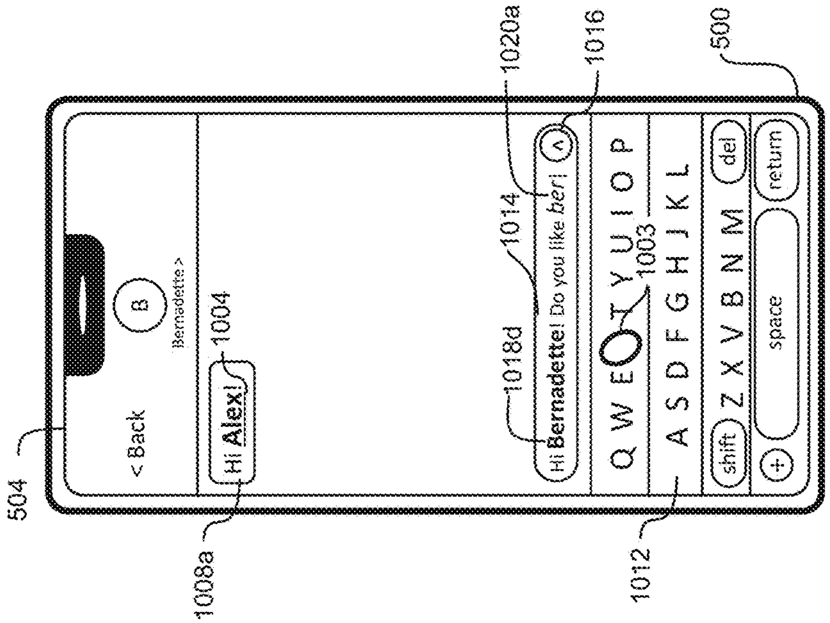
Figure 10G:
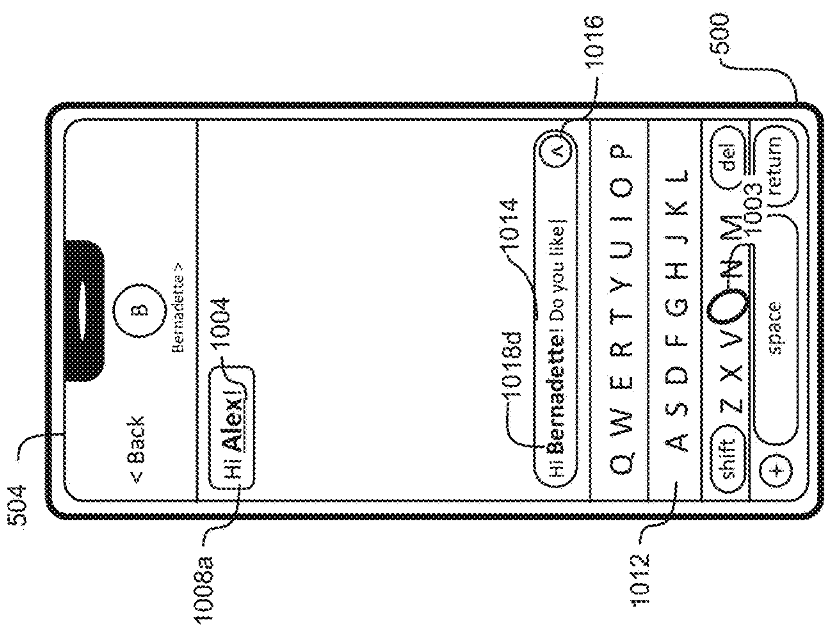
Figure 10J:
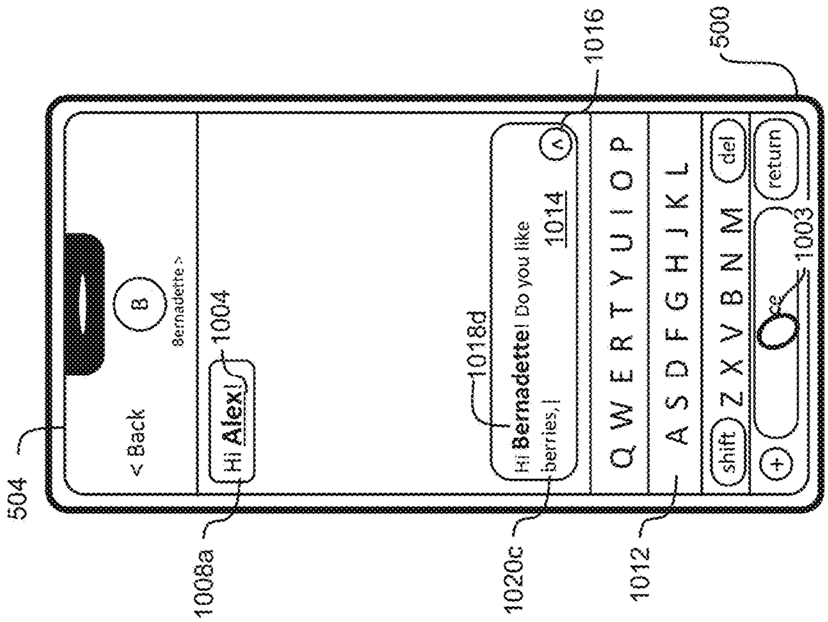
Figure 10I:
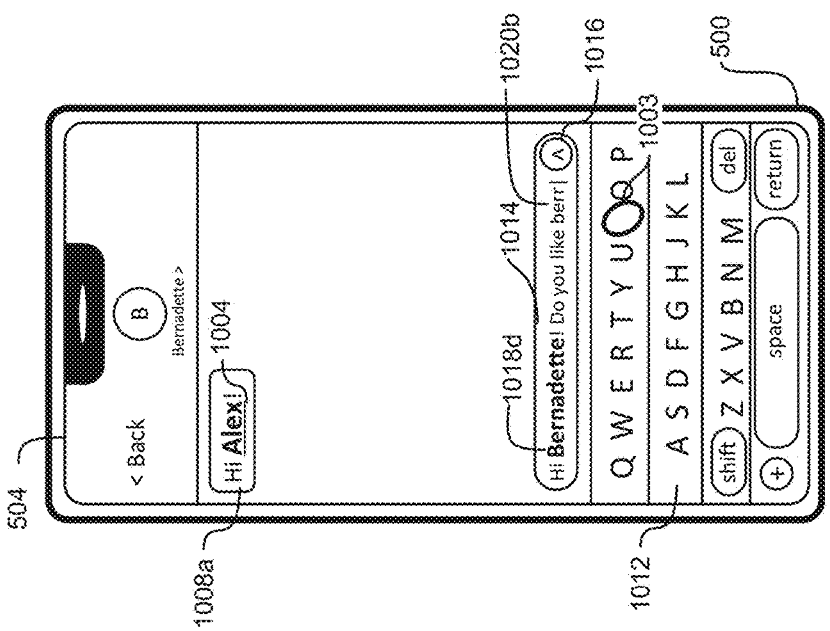
Figure 10K:
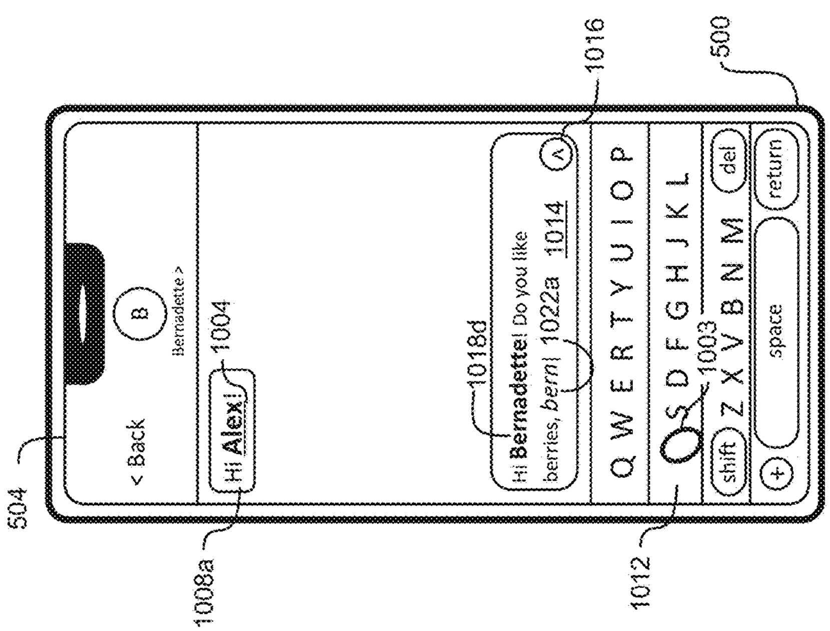
Figure 10L:
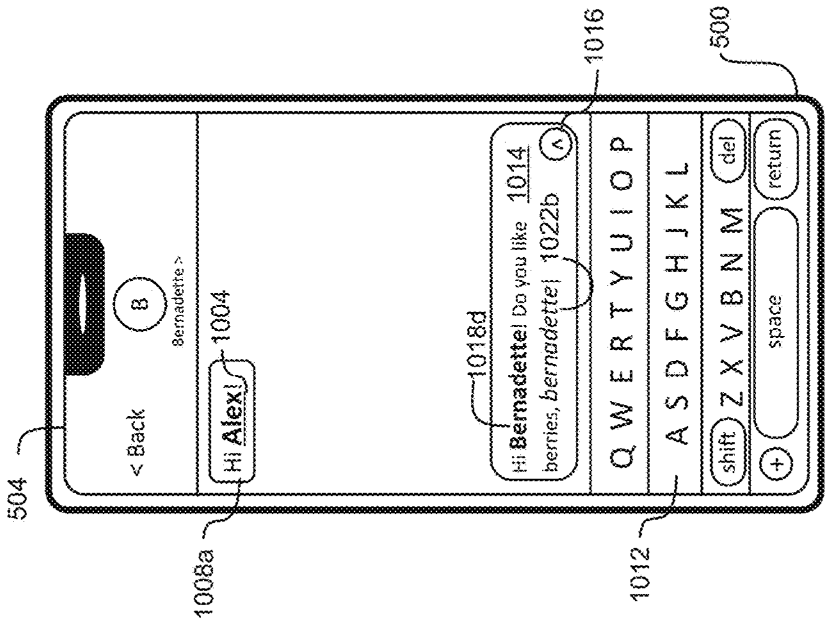
Figure 10N:
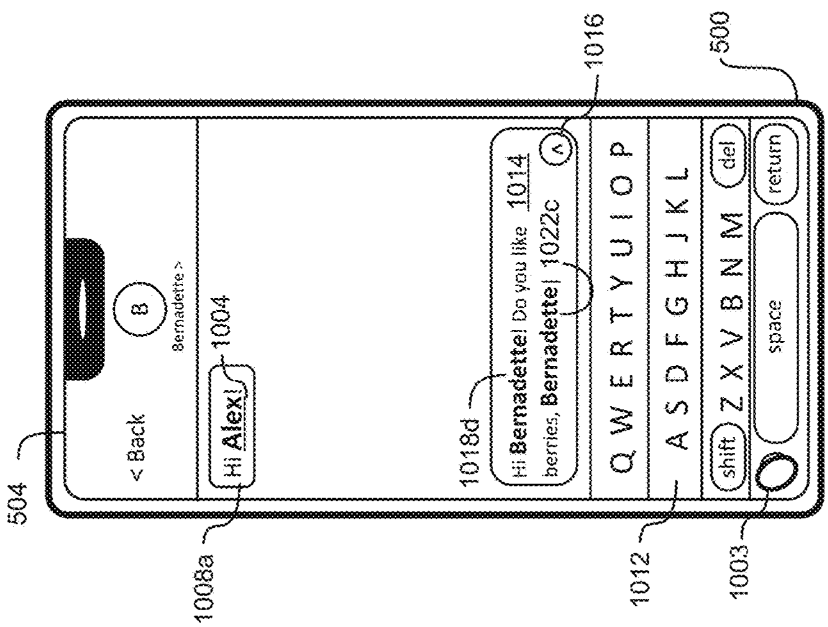
Figure 10M:
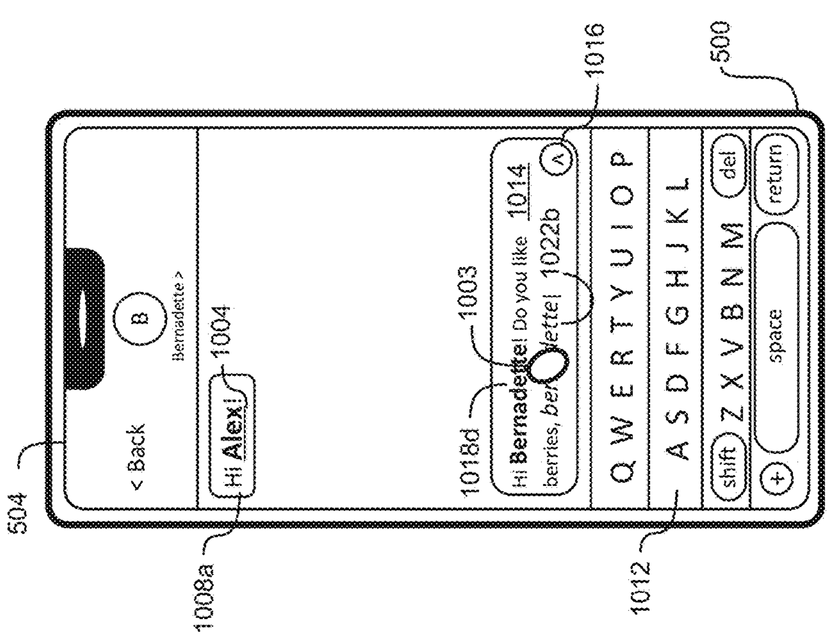
Figure 10P:
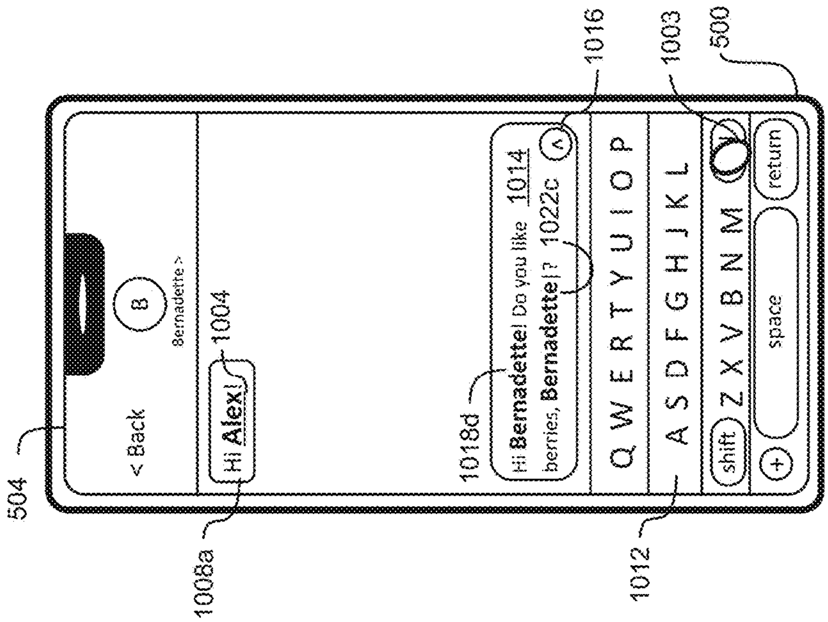
Figure 10O:
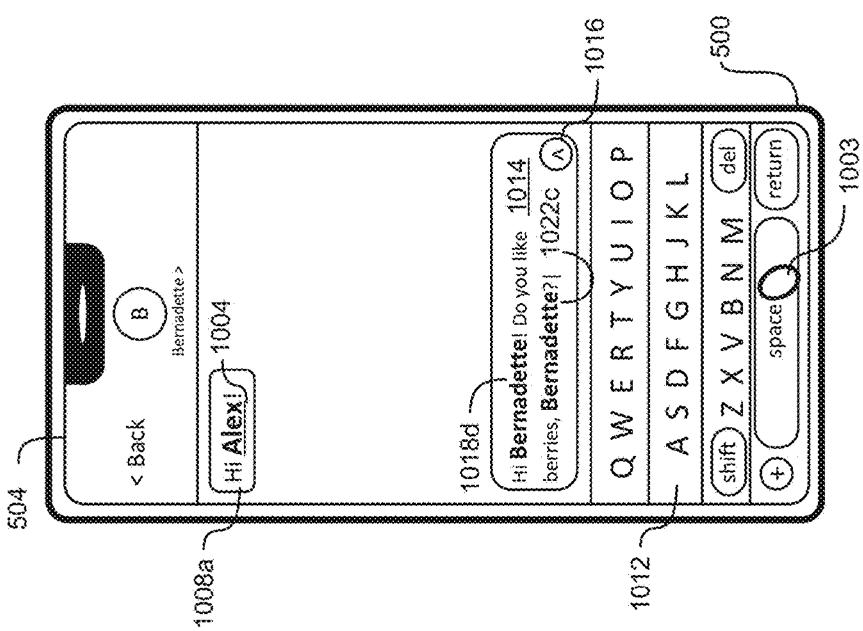
Figure 10R:
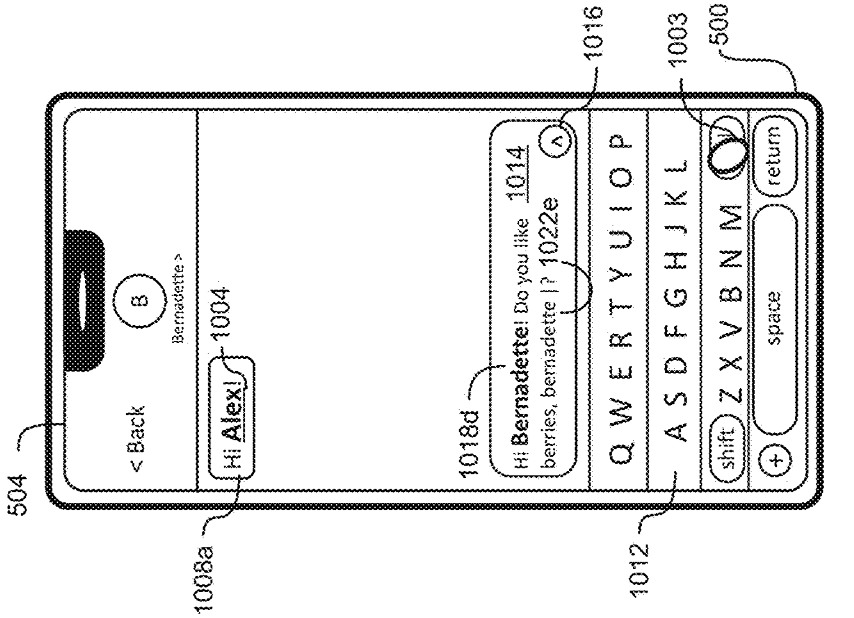
Figure 10Q:
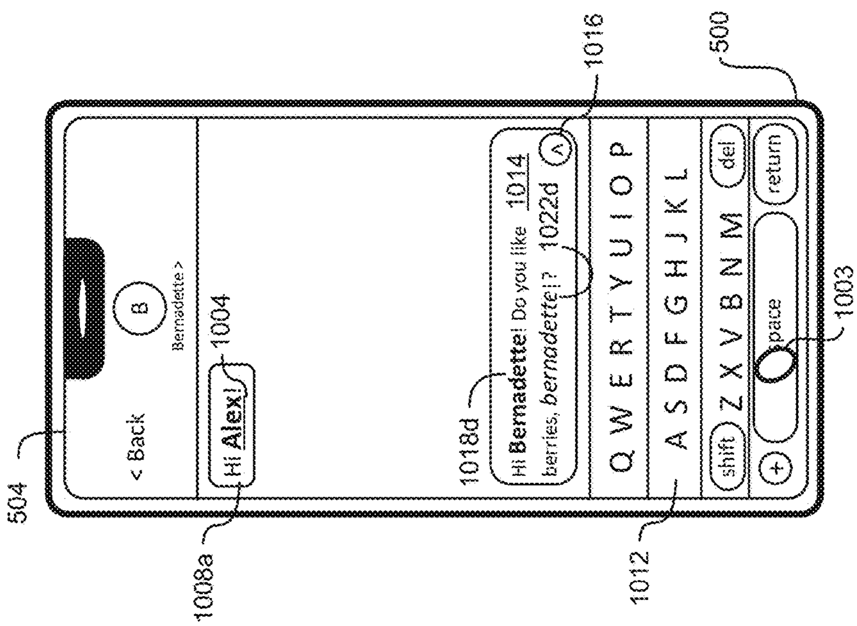
Figure 10T:
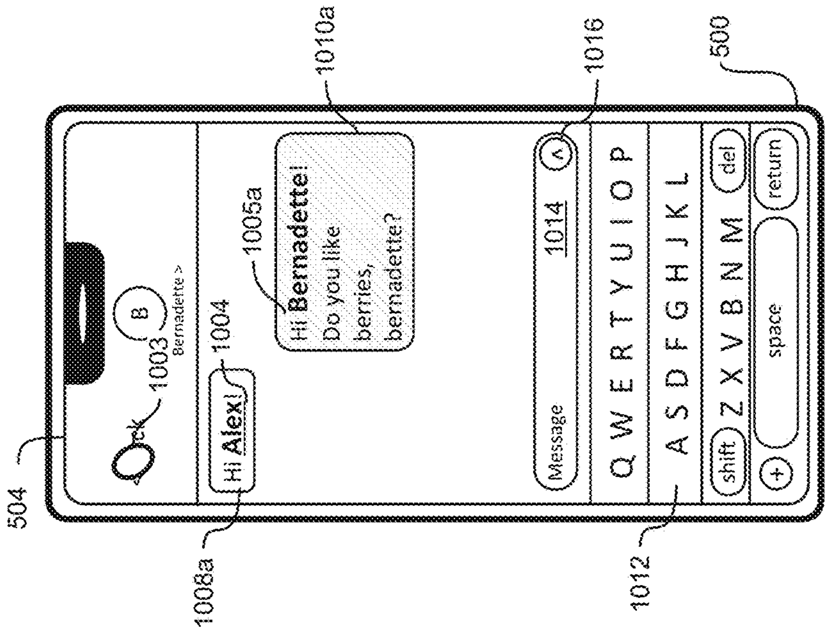

FIGS. 10A-10TTT illustrate exemplary ways in which the electronic device 500 displays indications of links (e.g., rich links) associated with user accounts in a messaging conversation according to some embodiments. The embodiments in FIGS. 10A-10TTT are used to illustrate the processes described below, including the processes described with reference to FIGS. 11A-11B. Although FIGS. 10A-10TTT illustrate various examples of ways an electronic device is able to perform the processes described below with reference to FIGS. 11A-11B, it should be understood that these examples are not meant to be limiting, and the electronic device is able to perform one or more processes described below with reference to FIGS. 11A-11B in ways not expressly described with reference to FIGS. 10A-10TTT.

In some embodiments, the electronic device 500 is able to add a link (e.g., a rich link) associated with a user account (e.g., a "mention" directed to the user account) to an outgoing message and present indications of mentions of the user of the electronic device 500 and other users in a messaging conversation. In some embodiments, when the electronic device 500 transmits a message to one or more other electronic devices that includes a mention, the electronic device 500 encodes the mention with at least one communication identifier (e.g., phone number, e-mail address, user name, or a unique identifier) associated with the user who is mentioned. In some embodiments, the communication identifier is encoded with the text that is to be displayed as the mention. For example, the message data includes one or more delimiters (e.g., { }, [ ], etc.) around the text that is to be presented as a mention, an mention attribute indicating that the text is to be presented as a mention, and the communication identifier associated with the contact as the value for the mention attribute. Specifically, in one example, for a message of "Hi Emily, I miss you!" in which "Emily" is mentioned, the electronic device 500 will create an attributed string such as "Hi { } Emily {"mention"="emily@email.com";}, I miss you! { }."

When the attributed string is sent, the attribute indicating that the text is to be presented as a mention is identified and values of the attribute are encoded and placed into a message dictionary. In some implementations, the communication identifier may be considered a value of the mention attribute. In the example above of a message of "Hi Emily, I miss you!" in which "Emily" is mentioned, the mention attribute, "mention," has the communication identifier, associated as a value of the attribute.

In some implementations, the message dictionary stores <key,value> pairs of mentions and communication identifiers with ranges. The communication identifier will be placed in the message dictionary under a mention key along with the range in which the mention should be displayed in the message. Referring back to the example message, "Hi Emily, I miss you!," in which "Emily" is a mention, the mention for "Emily" starts at the third position of the message and has a length of five to cover all letters in the name "Emily." Therefore, the range for the mention is {3, 5}. The encoded string for the mention may be stored with a key of "m" for mention and a value of "{3, 5}|emily@email.com" for the range and communication identifier. In this example, the range is encoded as {start, length} and is separated from the communication identifier by the pipe character "|," however one skilled in the art would know to use other characters to separate the range from the identifier.

In some implementations, a message may include multiple mentions. For example, a message may be sent that says, "Hey Emily & Kaden, time for dinner!" in which both "Emily" and "Kaden" are mentions. The electronic device 500 may then create an attributed string such "Hey { } Emily {"mention"="emily@email.com";} & { } Kaden {"mention"="kaden@email.com";}, time for dinner! { }." In this example, there are two mention attributes, one associated with "Emily" and the second associated with "Kaden." For the encoded string that is stored in the message dictionary, the mention attributes may be created using (1) the range (e.g., start and length of the substring) of the message that should be a mention, and (2) the communication identifier (e.g., handle) that is associated with the mention. Each mention attribute may be in the format of "range|communication identifier." For multiple mentions, the mention attributes may be joined by a semicolon. Using the example message, "Hey Emily & Kaden, time for dinner!" in which both "Emily" and "Kaden" are mentions, the mention attributes may be shown as "{4, 5}|emily@email.com; {12, 5}|kaden@email.com." In some embodiments, when the electronic device 500 receives a message including a mention, the electronic device decodes the mention by matching the communication identifier to contact information stored on the electronic device 500 (e.g., in a contact card of a contact in an address book stored on the electronic device 500). In accordance with a determination that the communication identifier matches the contact information, the electronic device 500 associates the mention with the contact information. In some embodiments, in response to receiving the message including the mention, the electronic device 500 identifies the respective text that is to be displayed with styling to indicate that it is a mention, as will be described in more detail below. The electronic device 500 can store the association of the text to be displayed as the mention with the communication identifier of the contact to be mentioned. In some embodiments, once the electronic device 500 determines the contact to be associated with the mention and displays the mention with styling to indicate that it is a mention, the electronic device 500 enables user interactions with the mention that are specific to the contact that was mentioned. For example, once the association between the mention and the contact has been stored, in response to detecting selection of the mention, the electronic device 500 presents the contact card of the respective contact. As another example, based on the communication identifier associated with the mention, the electronic device is able to determine whether the user of the electronic device is being mentioned or whether another user with the same name as the user of the electronic device is being mentioned by associating the text displayed as a mention with the mentioned user based on the user's communication identifier, instead of matching merely based on the text (e.g., the name) that is displayed as the mention.

As will be described in more detail with reference to FIGS. 10A-10TTT, in some embodiments, an electronic device 500 associates text with a contact to create a mention by matching the entered text with a name (e.g., first name, last name, nickname) of the contact included in the contact card of the contact. In some embodiments, a respective contact can be stored in association with different names in the contact cards of two different electronic devices. For example, Bernadette's friend may store Bernadette's contact information (e.g., phone number, e-mail address, etc.) in association with the name "Bernadette," (e.g., the contact card includes the name "Bernadette") while Bernadette's son may store Bernadette's contact information (e.g., phone number, e-mail address) in association with the name "Mom" (e.g., the contact card includes the name "Mom"). In this example, Bernadette's friend and Bernadette's son can save the same e-mail address and/or phone number in contact cards including different names (e.g., "Bernadette" or "Mom"). In some embodiments, the contact to be associated with a mention is identified by matching a communication identifier (e.g., phone number, e-mail address, other user name) to the communication identifier of a respective contact. By identifying a contact using a communication identifier, an electronic device 500 is able to properly associate mentions with contacts even if the text presented as a mention of a respective contact does not match the name of the contact stored on the electronic device.

In some embodiments, while the electronic device 500 is determining whether text should be presented as a mention, the electronic device 500 is able to match the text that is entered to a name of a contact even if the text that was entered and the name included on the contact card of the contact are different variations of the name. For example, in some languages (e.g., Russian), names are associated with a plurality of variations selected based on context. As another example, the electronic device 500 is able to match variations of a name where one variation of the name includes one or more accented characters and the other variation does not include the accented characters (e.g., matching "Chloe" and "Chloé"). As another example, in some embodiments, the electronic device 500 is able to match a phonetic spelling of a name using a first alphabet system to the spelling of the name using a second alphabet system. In some embodiments, this way of matching names that are different variations of the same name is facilitated by a dictionary, a function, and/or an application programming interface (API).

In some embodiments, such as in FIG. 10A, the electronic device 500 receives an indication 1006*a* of an incoming message that includes a mention of the user of the electronic device 500. In response to indication 1006*a*, the electronic device 500 optionally presents an indication 1002*a* (e.g., notification) of the message, including the text of the message, or at least a portion of the text of the message. In some embodiments, the indication 1002*a* is displayed in a user interface other than a user interface of a messaging application (e.g., displayed while device 500 is displaying a home screen user interface). In some embodiments, the text of the message or the portion of the text of the message included in indication 1002*a* includes a mention 1004 of the user of the electronic device that is displayed with a visual characteristic different from the rest of the text of the message displayed in the indication 1002*a*. As shown in FIG. 10A, in some embodiments, the mention 1004 is displayed in bold and underlined typeface but in some embodiments, the mention 1004 is displayed in a different color than the color of the rest of the text of the message. Other ways of distinguishing the mention 1004 from the rest of the text of the message are possible. Indication 1002*a* can further include text indicating that the user was mentioned in the conversation (e.g., "you were mentioned") in some embodiments.

As shown in FIG. 10A, in some embodiments, the user selects (e.g., with contact 1003) the indication 1002*a* of the message. In response to the user's selection in FIG. 10A, the electronic device 500 optionally displays a representation 1008*a* of the message in a messaging user interface (e.g., of a messaging application that includes the user interfaces described above with reference to FIGS. 6A-9). Although there are no other messages in the messaging conversation illustrated in FIG. 10B, in some embodiments, previous messages in the conversation are also displayed in the user interface in response to selection of the indication 1002*a* of the message illustrated in FIG. 10A.

As shown in FIG. 10B, in some embodiments, the indication 1008*a* of the message includes the text of the message, including the mention 1004 of the user of the electronic device. The messaging user interface optionally further includes a text entry field 1014 towards which input composing a reply message is directed, a soft keyboard 1012 with which the user is able to provide the text of the reply message, and an option 1016 that, when selected, causes the electronic device 500 to transmit the message to the other user in the conversation. As shown in FIG. 10B, the text entry field 1014 includes text that was provided by the user optionally using the soft keyboard 1012 or another input mechanism, for example. The text optionally includes a portion 1018*a* of text that possibly corresponds to the name of the other user in the conversation. The user may select (e.g., with contact 1003) a region of the soft keyboard corresponding to a character to enter the character into the text entry region 1014.

In FIG. 10C, in some embodiments, the text entry field 1014 may be updated to include further text provided by the user, including a portion 1018*b* of text that possibly corresponds to the name of the other user in the conversation. Because the portion 1018*b* of text matches a first portion of the other user's name and has a length that exceeds a predetermined length (e.g., 2 or 3 characters, etc.), in some embodiments, the portion 1018*b* of text is displayed with a visual characteristic different from the other text in the text entry field 1014 (e.g., "Hi"), including displaying the "B" with the different visual characteristic. As shown in FIG. 10C, the portion 1018*b* may be displayed at a larger size than the other text and/or in italics, but in some embodiments, another visual characteristic, such as bold text, or a color differing from the color of the rest of the text in text entry field 1014 is used. For example, the text in the text entry field other than text 1018*b* may be displayed in black or white and text 1018*b* may be displayed in a different color, such as grey, blue, another color, and/or a color with a special visual effect (e.g., shimmering, color shifting, etc.). As shown in FIG. 10C, the user optionally continues to enter text with the soft keyboard (e.g., with contact 1003).

In some embodiments, as shown in FIG. 10D, after the user has provided further input to enter more text to text entry field 1014, the electronic device 500 continues to display the portion 1018*c* of text corresponding to the name of the other user in the conversation with the larger size and the italic text as described above with reference to FIG. 10C. As shown in FIG. 10D, in some embodiments, the user selects (e.g., with contact 1003) the portion 1018*c* of text corresponding to the name of the other user in the messaging conversation.

In response to the user's selection in FIG. 10D, the electronic device 500 optionally displays the portion of text 1018*d* in text that is bold and not italic, as shown in FIG. 10E. It should be understood that text 1018*c* illustrated in FIG. 10D and text 1018*d* illustrated in FIG. 10E have the same text content and are the same text, but are displayed in different styles in response to the user input illustrated in FIG. 10D. The style of the text in FIG. 10E indicates to the user that the portion of text 1018*a* will be a mention (e.g., a link, a rich link) corresponding to the other user in the messaging conversation when the message is sent. Although FIG. 10E illustrates text 1018*d* as being displayed in bold text, in some embodiments, the text is displayed in a color different from the color of the rest of the text in the text entry field 1014. For example, the rest of the text is displayed in black or white and text 1018*d* is displayed in a different color such as blue, grey, or another color or a color with a special visual effect (e.g., shimmering, color shifting, etc.). In some embodiments, the text 1018*d* is displayed in the other color and in bold.

In some embodiments, text that does not correspond to the name of a contact (e.g., because the text is different from the name of a contact in the conversation, because the text matches the beginning of the name of a contact in the conversation but does not meet a length threshold, because the text does not match the name of the contact in the conversation) is displayed with a first appearance. As illustrated herein, text that does not correspond to the name of a contact in the conversation is shown without bold or italic styling. In some embodiments, text that does not correspond to the name of a contact in the conversation is displayed in a first color (e.g., black or white).

In some embodiments, text that corresponds to the name of a contact in the conversation but has not been designated as a mention (e.g., text that matches the name of the contact in the conversation or text that matches a beginning portion of the name of a contact in the conversation prior to receiving an input turning the name into a mention) is displayed with a second appearance. In some embodiments, inputs that correspond to requests to turn names into mentions include selection of the text that corresponds to a contact in the conversation but is not yet a mention, selection of an option to turn the text into a mention, entry of a predetermined character (e.g., the "@" symbol) with the name of the contact in the conversation (e.g., typing the "@" symbol before the name, such as typing "@Bernadette"). As illustrated herein, text that does not correspond to the name of a contact in the conversation is shown with italic styling. In some embodiments, text that corresponds to the name of a contact in the conversation but has not yet been turned into a mention is displayed in a second color (e.g., grey, blue, another color, any color with a special visual effect (e.g., shimmering, color-changing, sparkling, glowing, etc.)).

In some embodiments, text in the text entry field that will become a mention when the message is sent is displayed with a third appearance. There are a number of ways text can be turned into a mention that will be described herein. As illustrated herein, text in the text entry field that will become a mention is displayed with bold styling. In some embodiments, text in the text entry field that will become a mention is displayed with a third color (e.g., blue, grey, another color).

Once messages are sent, in some embodiments, the message can include one or more mentions that are displayed with different text styling than the styling of other text in the message that is not a mention. As illustrated herein, text in a sent message that is not a mention is not displayed in bold typeface. In some embodiments, text in a sent message that is not a mention is displayed in typeface that is not bold and is in a respective color (e.g., black, white, etc.). As illustrated herein, a mention of a user other than the user of the electronic device is displayed with bold typeface. In some embodiments, a mention of the user other than the user of the electronic device is displayed with bold typeface in the color matching the rest of the text of the message (e.g., black or white) or, in some embodiments, a different color (e.g., blue, green, grey, etc.). In some embodiments, different text styling is used to designate a mention of a user other than the user of the electronic device. As illustrated herein, a mention of the user of the electronic device is displayed in bold and underlined typeface. In some embodiments, a mention of the user of the electronic device is displayed in bold typeface in a color (e.g., blue, green, grey, etc.) that is different from the color (e.g., black, white, etc.) of the rest of the text of the message. In some embodiments, different text styling is used to designate a mention of the user of the electronic device. In some embodiments, mentions of a user other than the user of the electronic device and mentions of the user of the electronic device are displayed with different text styling, such as different colors or another difference.

In FIG. 10F, in some embodiments, the user continues inputting text to text entry field 1014 (e.g., with contact 1003) via the soft keyboard 1012. In FIG. 10G, the text entry field 1014 is optionally updated to include further text provided by the user and the user continues inputting text in the same manner described with reference to FIG. 10F.

In some embodiments, as shown in FIG. 10H, the text entry field 1014 is updated again to include a portion of text 1020*a* displayed in italics to indicate that the text may correspond to the other user in the messaging conversation (e.g., because text 1020*a* matches a beginning portion of the user's name). As shown in FIG. 10H, the user optionally selects (e.g., with contact 1003) another region of the soft keyboard 1012 to continue inputting text into text entry field 1014. In some embodiments, in response to the input illustrated in FIG. 10H, the electronic device 500 updates the text entry field 1014 as shown in FIG. 10I.

In some embodiments, in FIG. 10I, the electronic device 500 displays the portion of text 1020*b* which no longer corresponds to the name of the other user in the messaging conversation. Because text 1020*b* does not correspond to the other user in the conversation, the electronic device 500 optionally displays the portion of text 1020*b*—including the portion "ber" that had been displayed in italics in FIG. 6H—with the same style as the other text in the text entry field 1014. The user optionally selects (e.g., with contact 1003) another region of the soft keyboard 1012 to continue inputting text to the text entry field. In FIG. 10J, the user continues inputting text to the text entry field 1014 via the soft keyboard 1012.

FIG. 10K illustrates the user interface after the user has input additional text to text entry field 1014, for example. The text entry field 1014 optionally includes a portion 1022*a* of text that may correspond to the name of the other user in the conversation because the portion 1022*a* of text matches the beginning of the name of the other user in the messaging conversation. Because the text 1022*a* may correspond to the name of the other user in the conversation, the electronic device 500 optionally displays the portion of text 1022*a* in larger font that the other text in the text entry field (other than mention 1018*d*) and in italics. If the user were to select text 1022*a*, it would optionally turn into a mention similar to mention 1018*d*. The user optionally selects (e.g., with contact 1003) a region of the soft keyboard 1012 to continue inputting text to the text entry field 1014.

FIG. 10L illustrates the messaging user interface after additional text has been input to text entry field 1014, for example. In some embodiments, portion of text 1022*b*, which continues to correspond to the name of the other user in the messaging conversation, continues to be displayed in italics to indicate that, if selected, the portion of text 1022*b* will turn into a mention of the other user in the conversation.

In some embodiments, such as in FIG. 10M, the user selects (e.g., with contact 1003) the portion 1022*b* of text corresponding to the name of the other user in the conversation. In response to the user's selection in FIG. 10M, the electronic device 500 optionally updates the text entry field 1014 as shown in FIG. 10N to display the portion of text 1022*c* in bold, thus indicating that the portion of text 1022*c* will be a mention of the other user in the conversation when the message is sent. When converting the portion of text 1022*b* illustrated in FIG. 10M to the portion of text 1022*c* shown in FIG. 10N, in some embodiments, the electronic device 500 corrects the capitalization of the name of the other user in the conversation (e.g., replacing "bernadette" with "Bernadette"). In some embodiments, the capitalization of the name is corrected such that the capitalization matches the capitalization of the name of the contact card as it appears on the contact card associated with the contact.

In some embodiments, the electronic device 500 stores and displays contact information of one or more contacts as "contact cards." A contact card can include information such as one or more names (e.g., first name, last name, nickname) of the contact, contact information (e.g., phone number, e-mail addresses, physical addresses, social media accounts) of the contact, an image associated with the contact (e.g., a photo provided by the contact or by the user of the electronic device, if no image is provided by a user, the electronic device optionally uses a default image, such as the initials of the user's name). In some embodiments, the electronic device determines whether or not text corresponds to the name of a user in a respective messaging conversation by comparing the text to the names associated with the contact on the contact card. In some embodiments, the text corresponds to the name of the contact if the text matches a name of the contact (and does not correspond to the name of the contact if the text only matches a beginning portion of the name). In some embodiments, the text corresponds to the name of the contact if the text matches a beginning portion of the name of the contact and exceeds a predetermined threshold (e.g., 2 or 3 or 4 or 5 characters). In some embodiments, the predetermined threshold depends on the number of characters in the contact's name (e.g., text with two characters may "correspond" to a name of a contact with three letters, but text with two characters may not "correspond" to the name of a contact with a longer name even if the text matches the first two letters of the name, text with three or four or more characters may "correspond" to the name of the contact with the longer name).

Returning to FIG. 10N, The user selects (e.g., with contact 1003) a region of the soft keyboard to continue inputting text to the text entry field 1014.

In some embodiments, as shown in FIG. 10O, the user selects (e.g., with contact 1003) the space bar of the soft keyboard 1012. In some embodiments, in response to detecting the contact 1003 for a time that is at least a predetermined threshold (e.g., 0.25 or 0.5 or 1 second), the electronic device 500 enables the user to move an insertion marker displayed in the text entry field 1014.

In FIG. 10P, in some embodiments, the electronic device 500 displays the user interface with the insertion marker of the text entry field moved in accordance with further input provided by the user following the selection 1003 illustrated in FIG. 10O. The insertion marker is displayed immediately following the portion of text 1022*c* corresponding to a mention of the other user in the messaging conversation. As shown in FIG. 10P, the user selects (e.g., with contact 1003) a backspace option included in the soft keyboard 1012.

As shown in FIG. 10Q, in some embodiments, in response to the user's selection in FIG. 10P, instead of deleting the last character in the portion of text 1022*d*, the electronic device 500 removes the mention from the portion of text 1022*d*. Portion of text 1022*d* may be updated to be displayed in italics to indicate that the text may correspond to a mention of the other user in the messaging conversation. In addition to removing the mention functionality from the portion of text 1022*d*, the electronic device 500 optionally undoes the capitalization of "bernadette." In some embodiments, when the mention functionality is removed from text, the mention text (e.g., "Bernadette") is replaced with the text (e.g., "bernadette") that had been replaced to be turned into a mention. As shown in FIG. 10Q, in some embodiments, the user selects (e.g., with contact 1003) the space bar of the soft keyboard 1012 to add a space after the portion of text 1022*d*.

As shown in FIG. 10R, in some embodiments, in response to the user's selection in FIG. 10R, the electronic device 500 inserts a space after portion of text 1022*e*. The portion of text 1022*e* may now be displayed without special styling because the user has declined to turn the portion of text 1022*e* into a mention (e.g., by inserting a space after portion 1022*d* of text instead of selecting the text 1022*d*). The user optionally selects (e.g., with contact 1003) the backspace option of soft keyboard 1012 to remove the space.

Figure 10S:
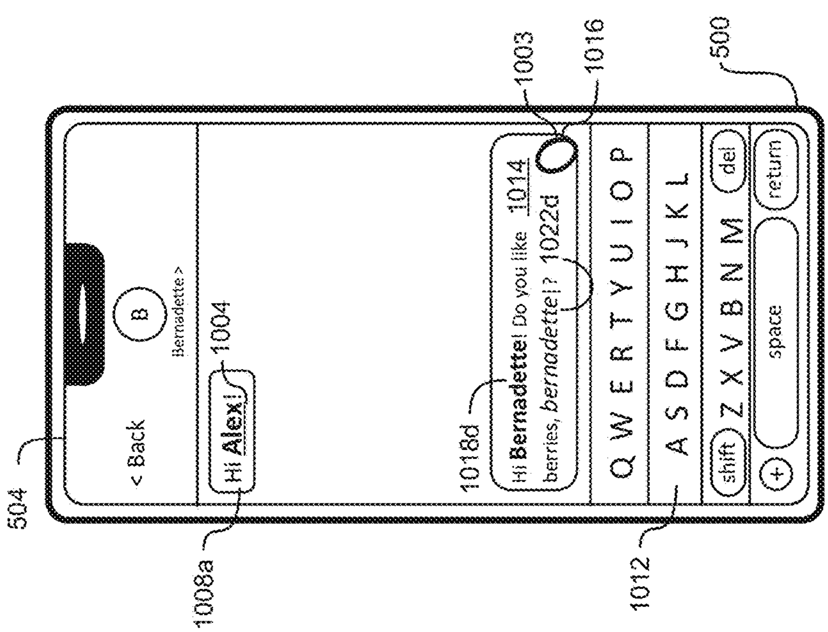

In response to the user input illustrated in FIG. 10R, the insertion marker is moved to the location immediately after text 1022*d*, as shown in FIG. 10S. In some embodiments, because the insertion marker is immediately after text 1022*d*, which may correspond to the name of the contact in the conversation, the electronic device 500 displays the text 1022*d* in italics to indicate that it is possible to turn text 1022*d* into a mention. In FIG. 10S, in some embodiments, the user selects (e.g., with contact 1003) the option 1016 to send the message to the conversation. In some embodiments, in response to the user's selection in FIG. 10S, the electronic device 500 displays a representation 1010*a* of the message sent by the user, as shown in FIG. 10T.

As shown in FIG. 10T, in some embodiments, the representation 1010*a* of the message includes a mention 1005*a* of the other user in the messaging conversation. The mention 1005*a* is optionally displayed in bold typeface to distinguish it from the rest of the text of the message. If the user were to select the mention 1005*a*, the electronic device 500 would, in some embodiments, in response to the selection, display contact information associated with the other user in the messaging conversation. As shown in FIG. 10T, the user optionally selects (e.g., with contact 1003) an option to navigate to a user interface illustrating representations of other messaging conversations accessible to electronic device 500, as shown in FIG. 10U.

Figure 10V:
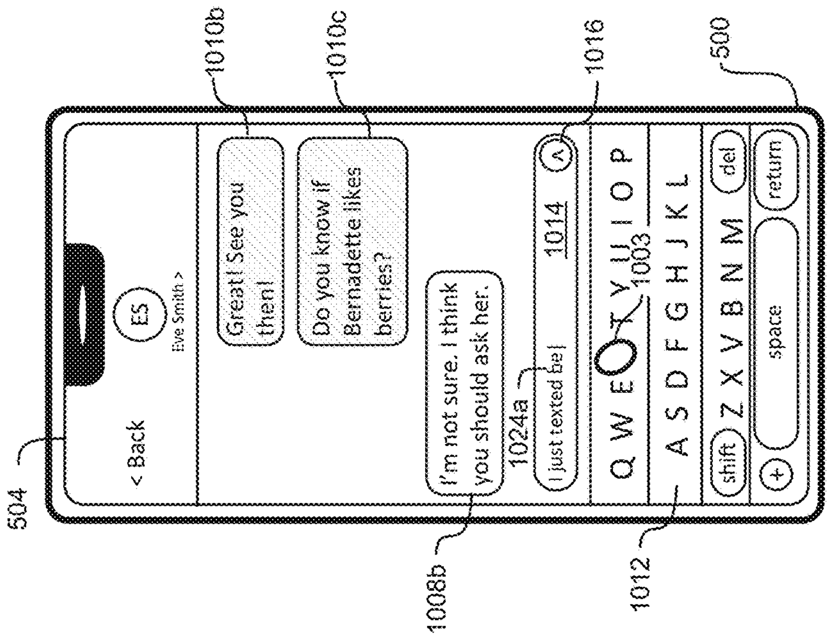
Figure 10U:
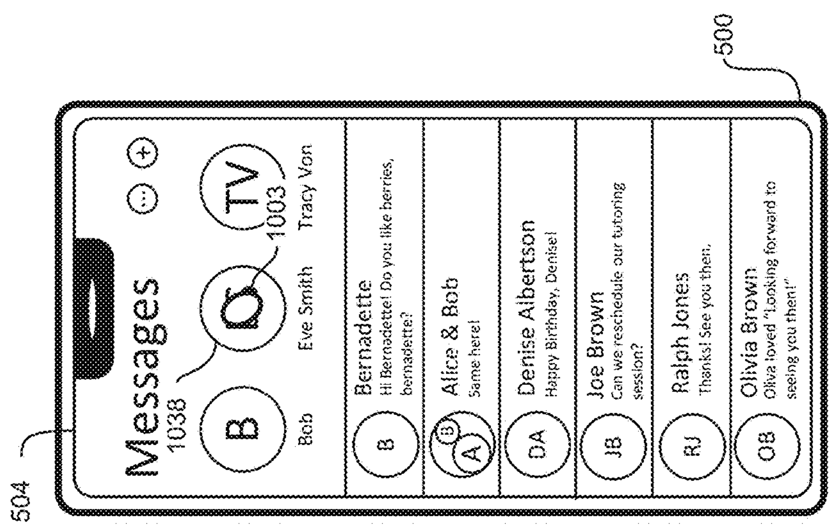

In FIG. 10U, in some embodiments, the electronic device 500 displays a messaging user interface including representations of other messaging conversations that are displayed in a manner similar to one or more of the ways described above with reference to FIGS. 6A-7. As shown in FIG. 10U, in some embodiments, the user selects (e.g., with contact 1003) one of the representations 1038 of another messaging conversation. In some embodiments, in response to the user's selection in FIG. 10U, the electronic device 500 displays the messaging user interface illustrated in FIG. 10V.

As shown in FIG. 10V, in some embodiments, the user interface includes representations 1010*b* and 1010*c* of messages previously sent by the user of the electronic device 500 and a representation 1008*b* of a message sent by the other user in the conversation. Text entry field 1014 optionally includes text previously entered by the user, including portion 1024*a* of text that matches a portion of the name of the user in the conversation illustrated in FIGS. 10B-10T. The user may continue to enter text with contact 1003 on soft keyboard 1012.

Figure 10X:
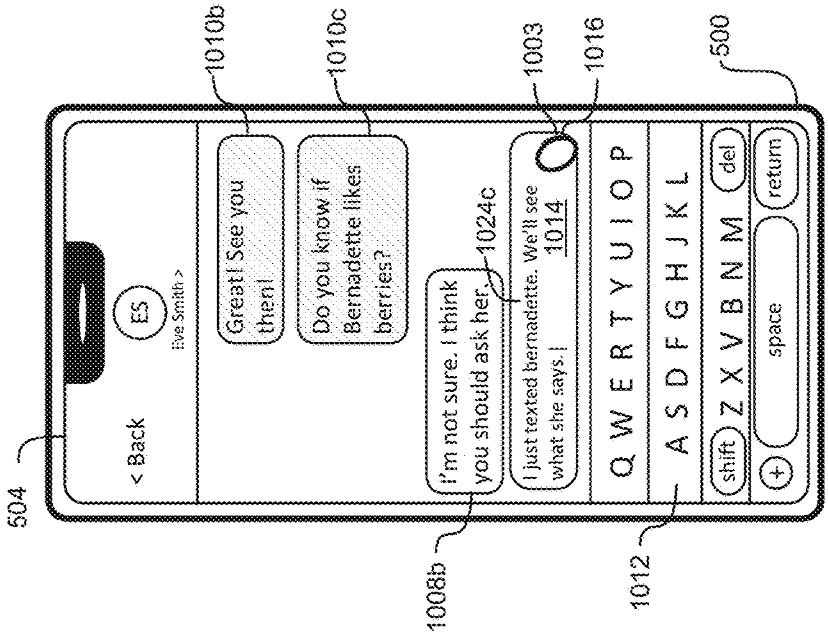
Figure 10W:
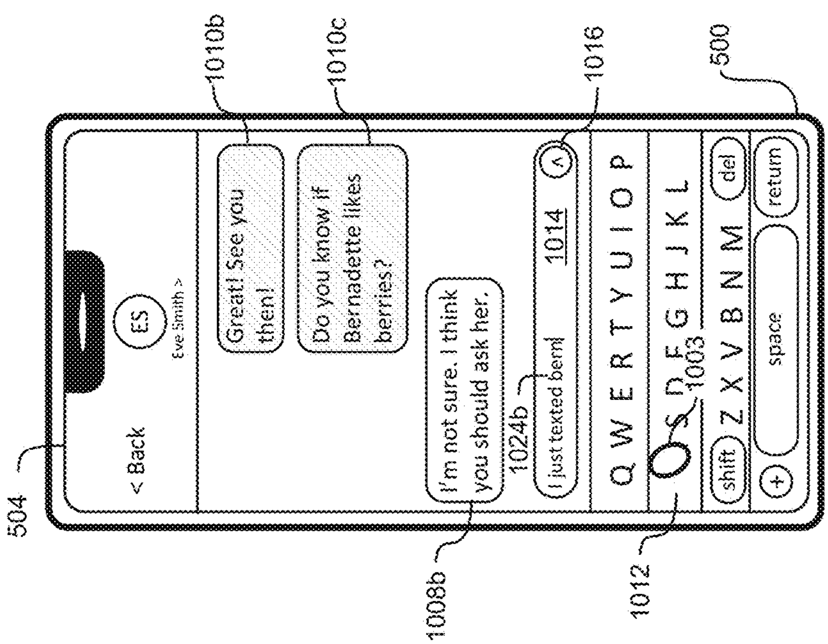

FIG. 10W illustrates the updated text in text entry field 1014, including portion 124*b* of text that matches the portion 1022*a* of text corresponding to the other user in the conversation illustrated in FIG. 10K, for example. Because that user is not part of the conversation illustrated in FIG. 10W, however, the electronic device 500 optionally displays the portion 1024*b* of text with the same style as the other text in the text entry field (e.g., device 500 does not display portion 1024*b* of text in italics as a possible mention, as it did in FIG. 10K). In some embodiments, the electronic device 500 does not create or facilitate the creation of mentions of users in conversations to which they do not have access (or of which they are not a part). As such, text corresponding to Bernadette in FIG. 10W will optionally not be displayed by device 500 in italics. As shown in FIG. 10W, the user optionally selects (e.g., with contact 1003) another region of the soft keyboard 1012 to continue entering text into text entry field 1014.

FIG. 10X illustrates the rest of the text entered into text entry field 1014, for example. Portion 1024*c* of text may match the name of the other user, but is displayed with the same style as the rest of the message because the other user is not part of this conversation. In some embodiments, in response to detecting selection of text 1024*c*, the electronic device 500 optionally displays an option that, when selected, causes the electronic device 500 to initiate a process to add the user corresponding to text 1024*c* (e.g., Bernadette) to the conversation. In some embodiments, once the user has been added to the conversation, it is possible to turn text 1024*c* into a mention of the user according to one or more examples described herein. As shown in FIG. 10X, in some embodiments, the user selects (e.g., with contact 1003) the option 1016 to send the message to the conversation. In response to the user's selection in FIG. 10X, the electronic device 500 optionally transmits the message to the conversation and displays a representation 1010*d* of the message, as shown in FIG. 10Y.

Figure 10Z:
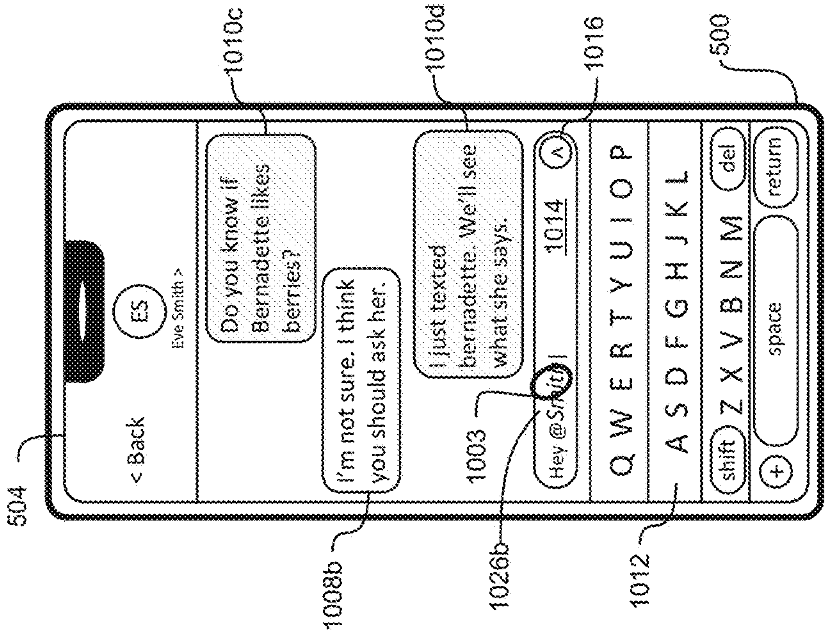
Figure 10Y:
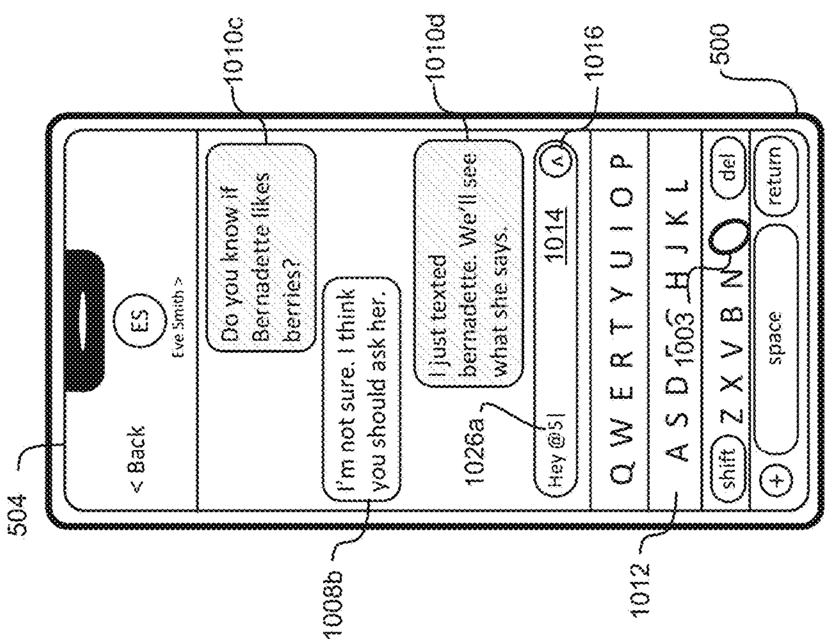
Figure 10B:
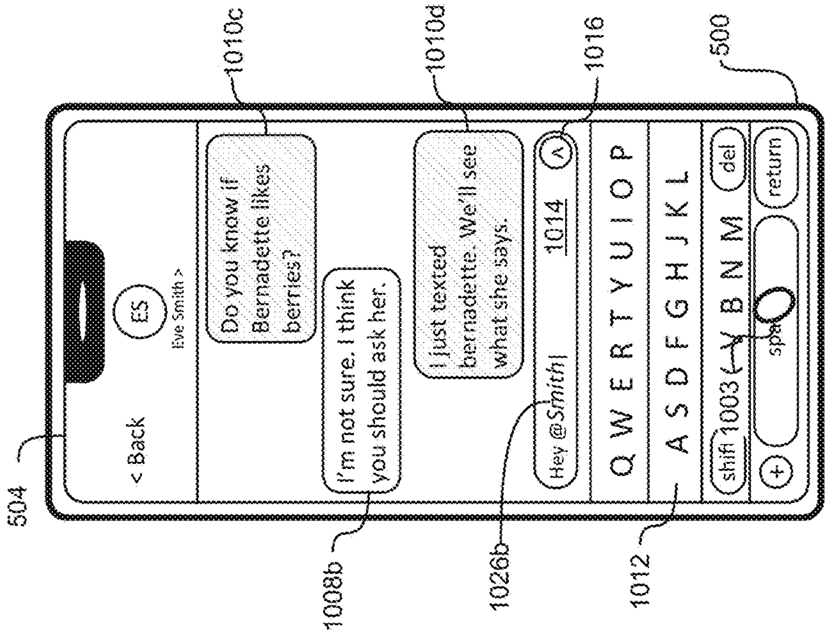
Figure 10A:
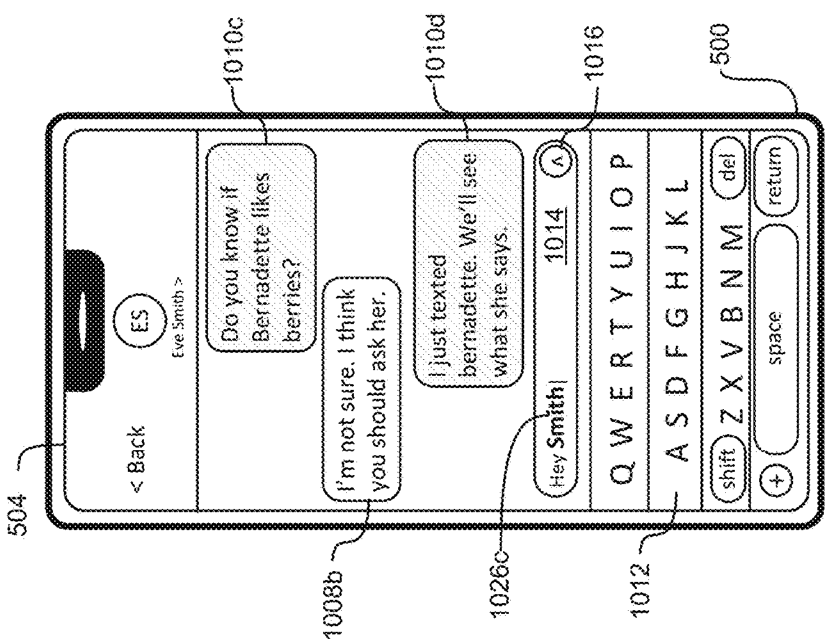
Figure 10D:
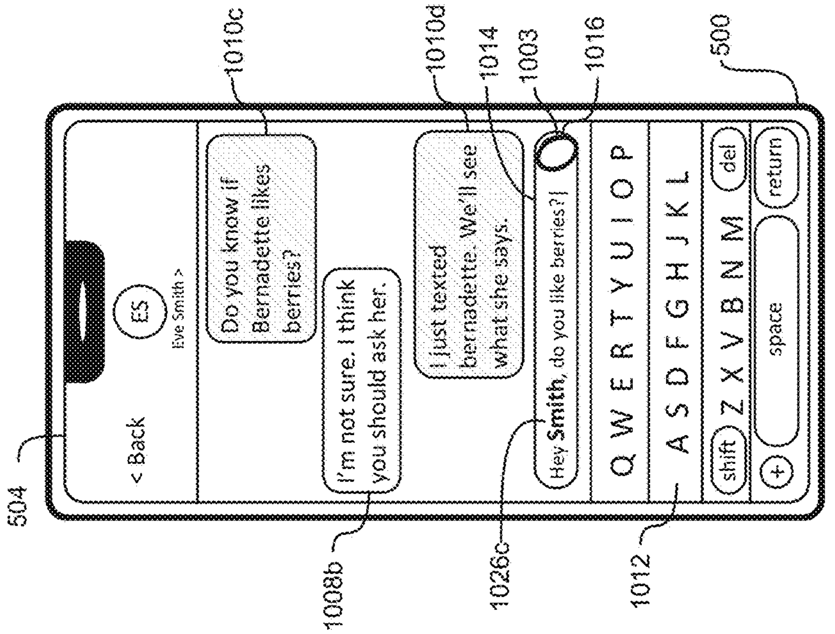
Figure 10C:
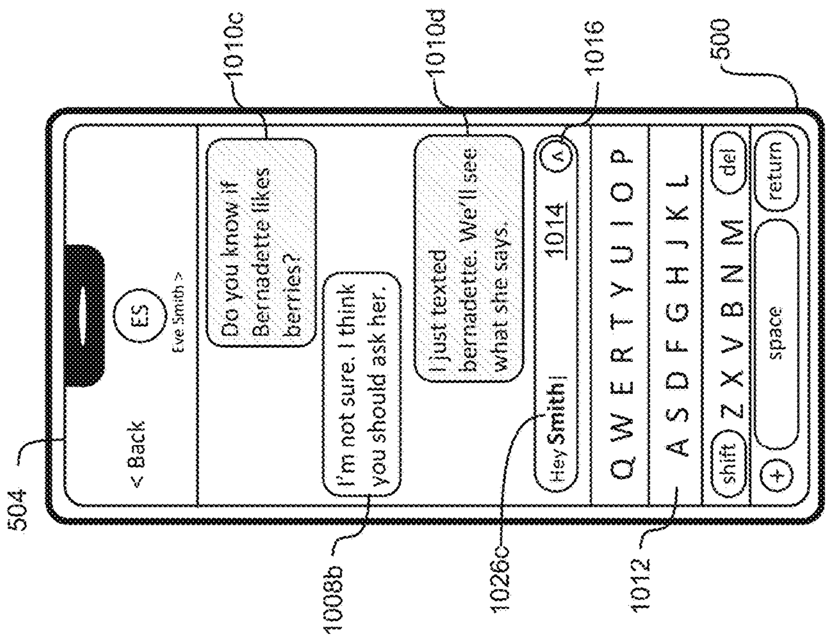
Figure 10E:
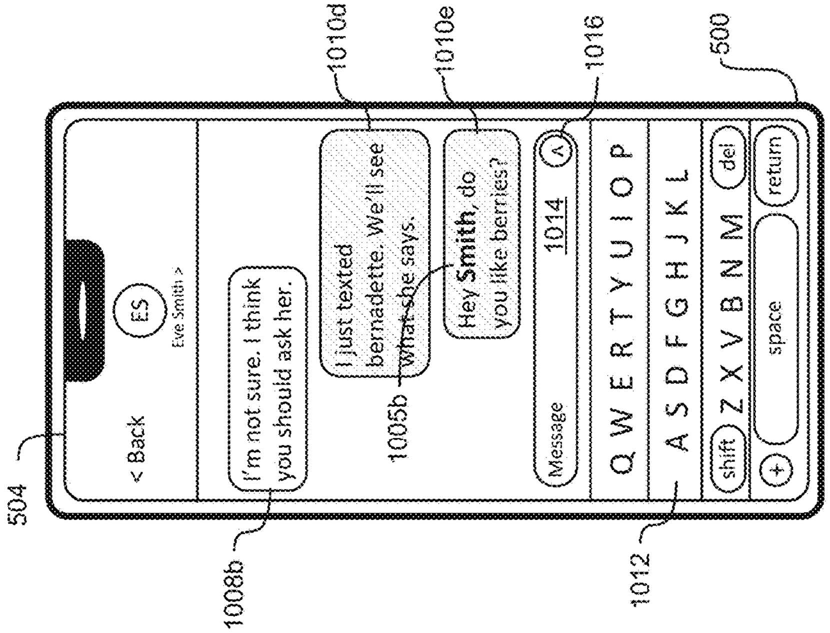
Figure 10F:
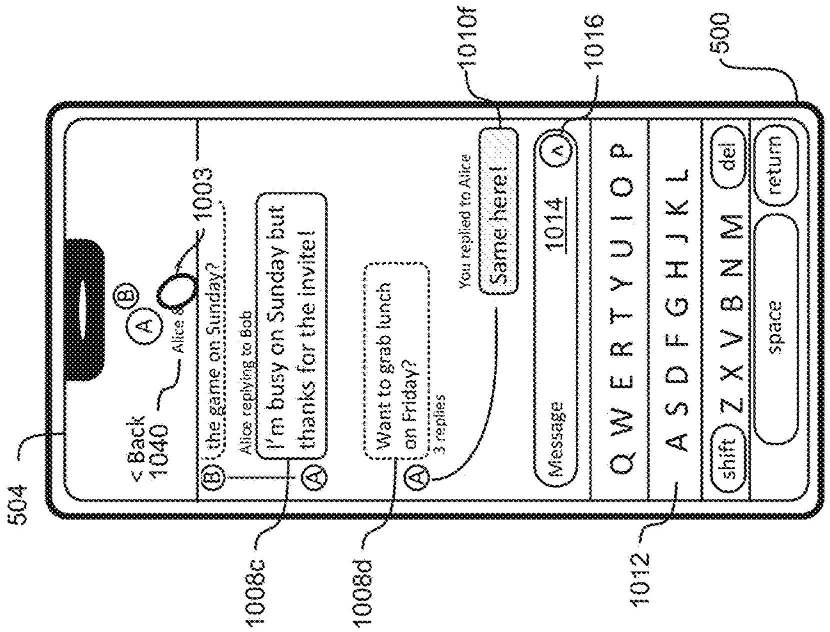
Figure 10H:
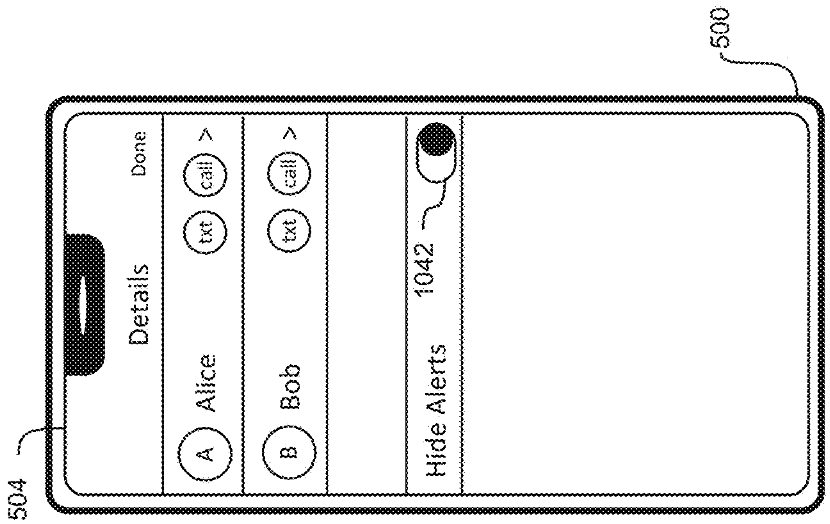
Figure 10G:
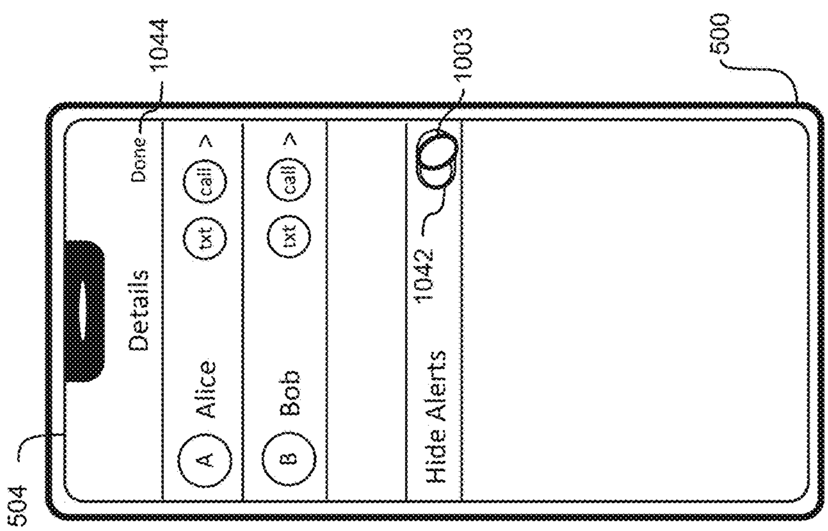
Figure 10J:
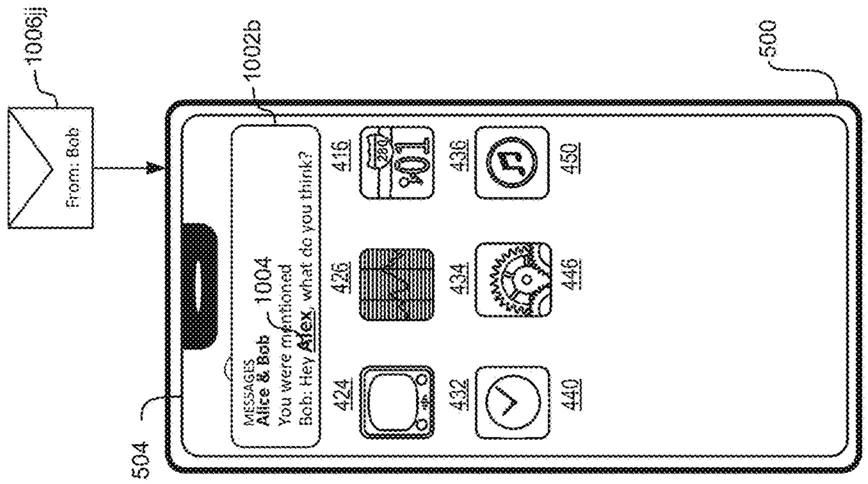
Figure 10I:
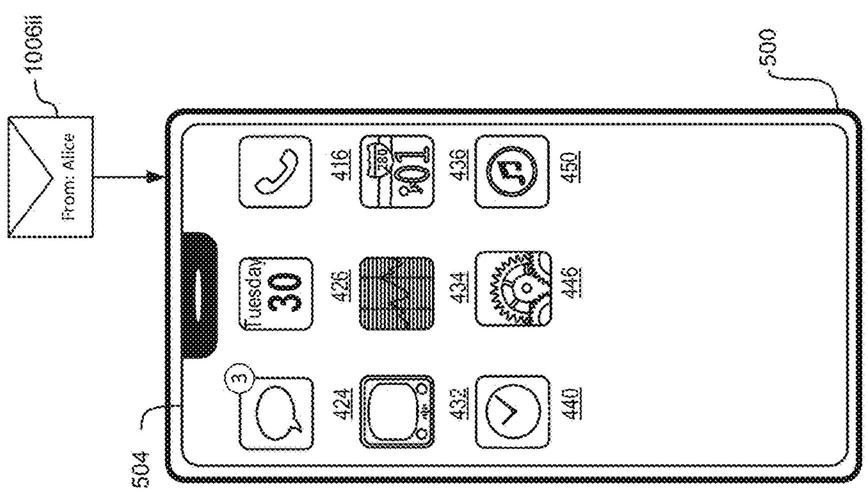
Figure 10K:
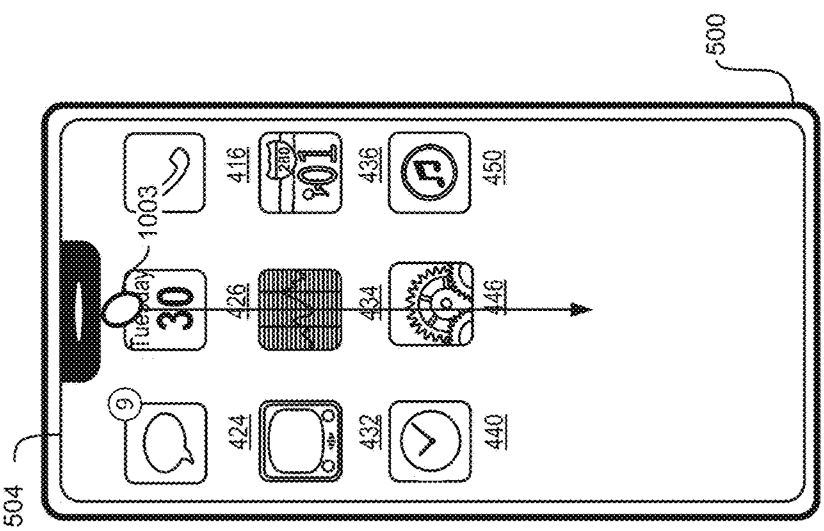
Figure 10L:
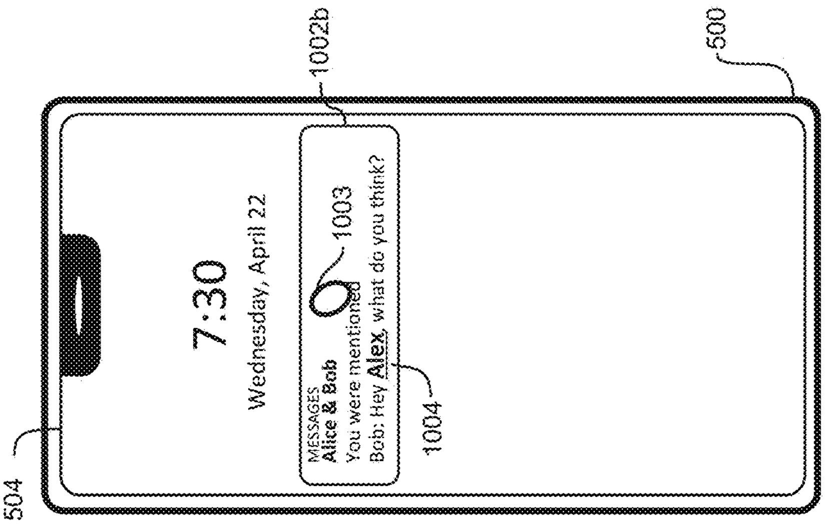
Figure 10M:
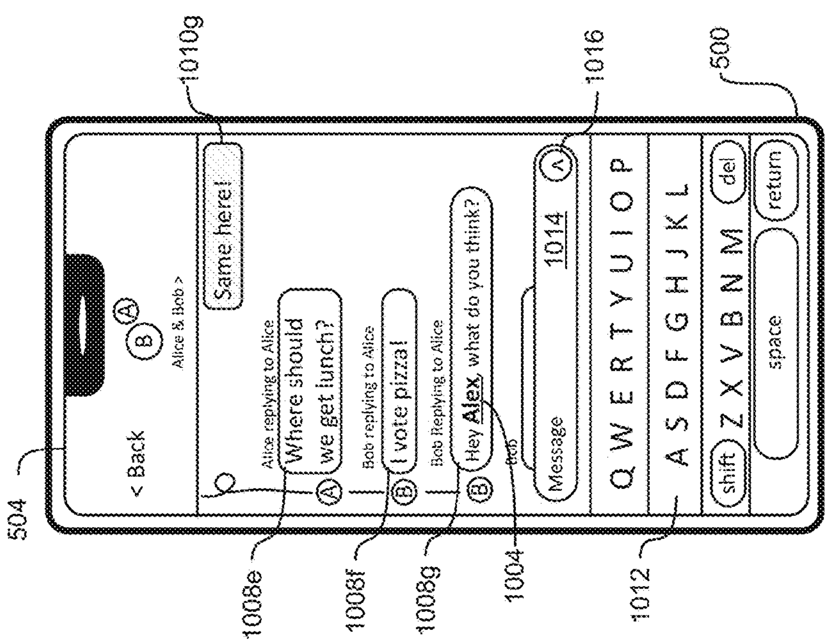
Figure 10N:
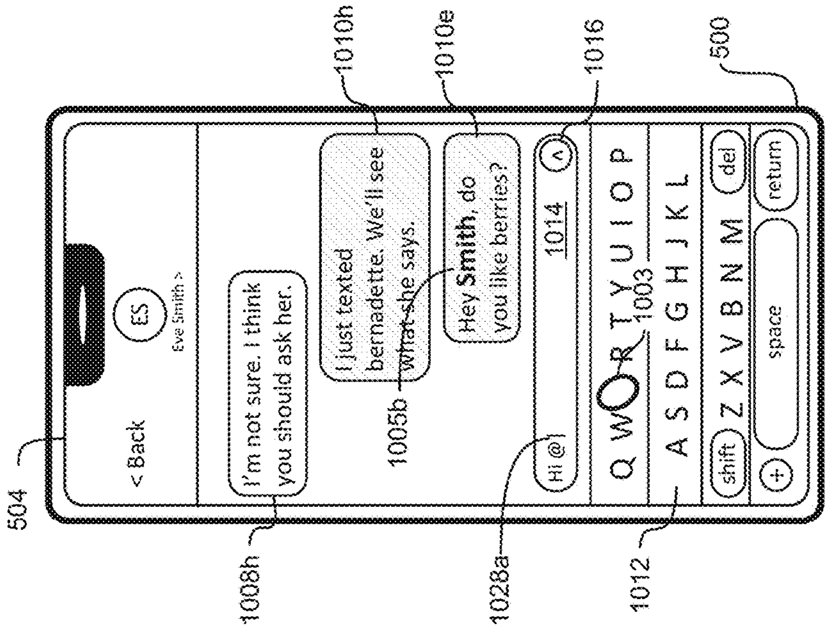
Figure 10O:
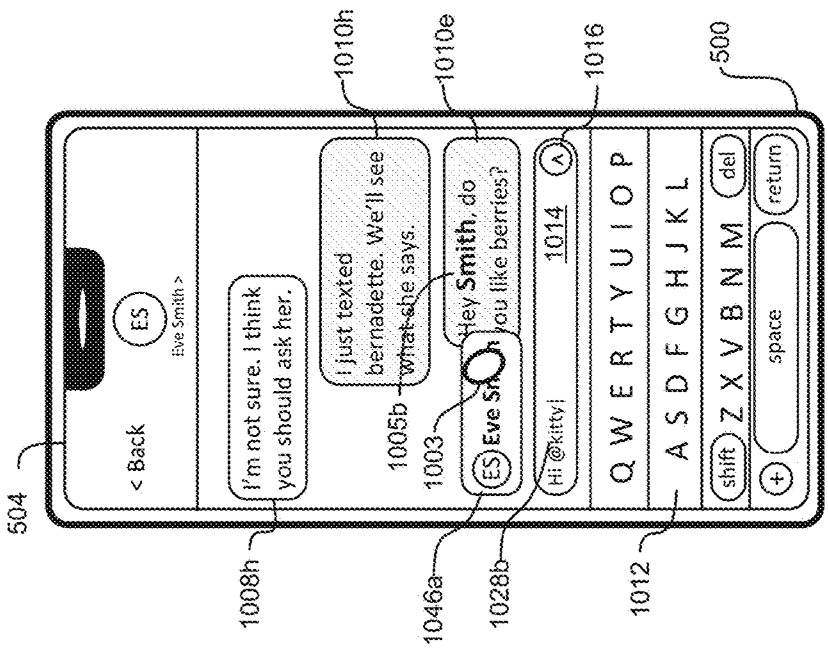
Figure 10P:
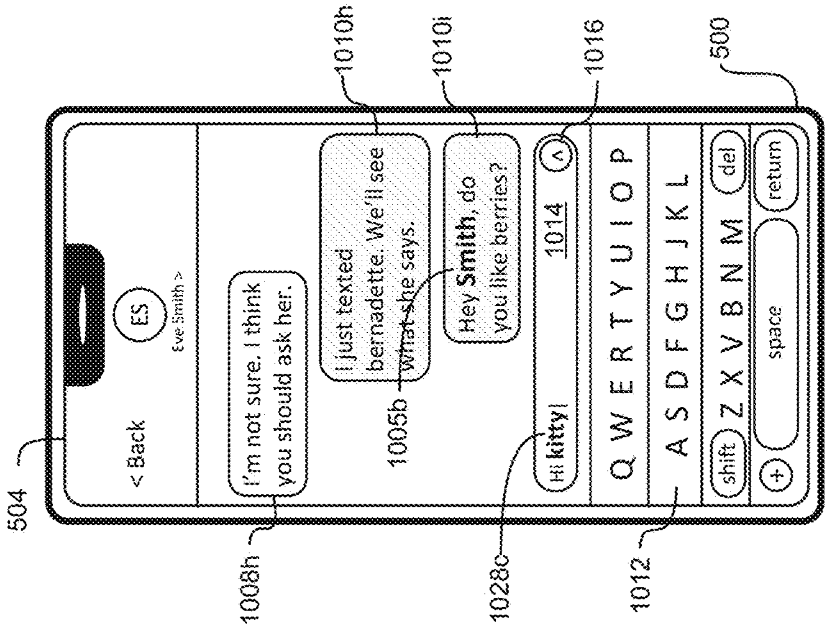
Figure 10Q:
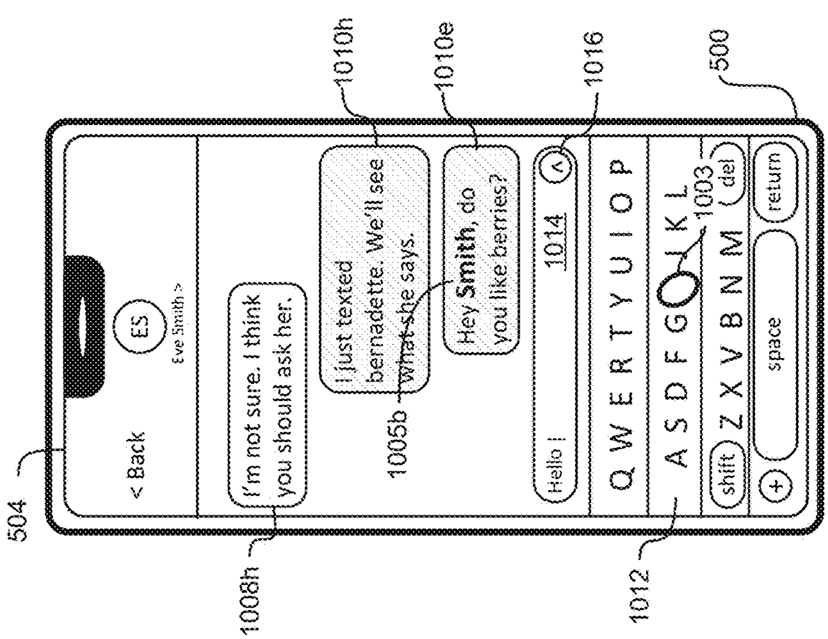
Figure 10R:
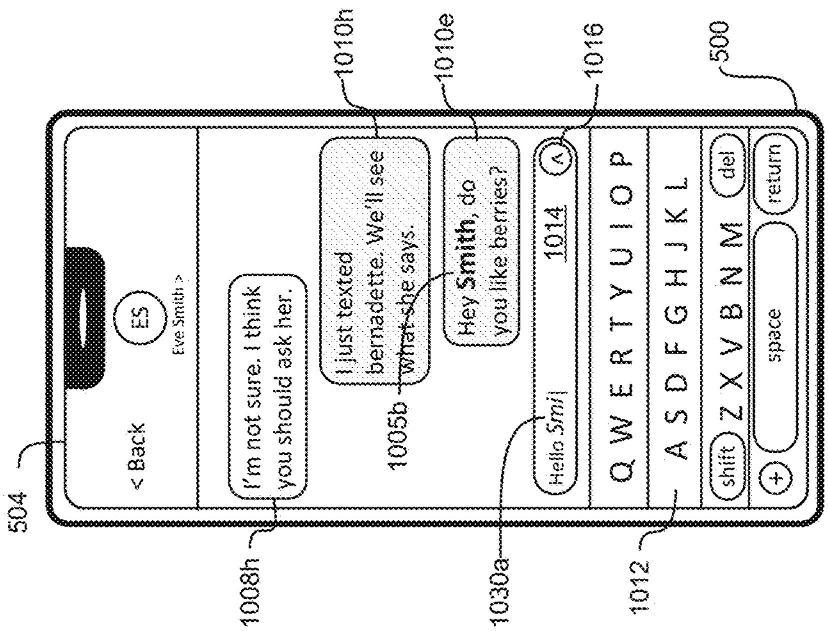
Figure 10T:
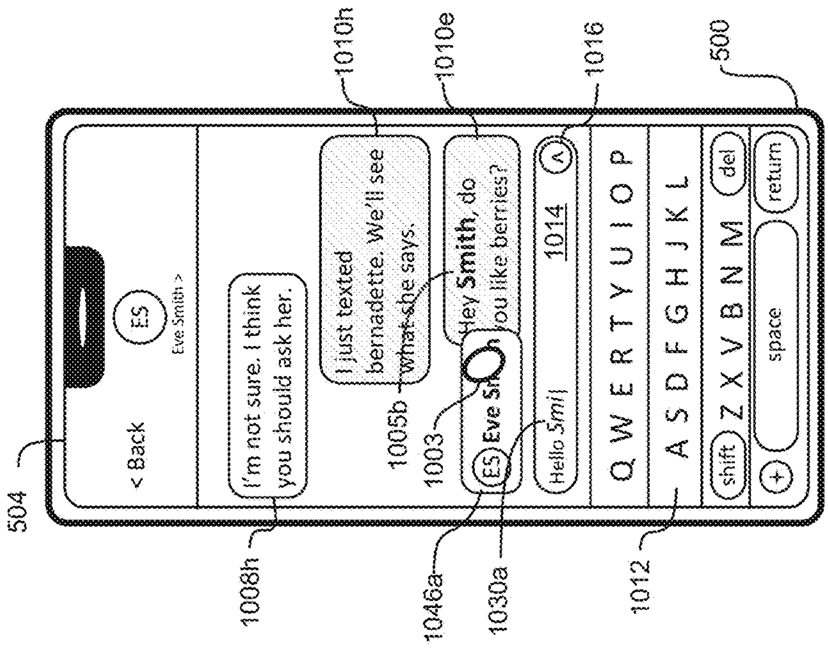
Figure 10S:
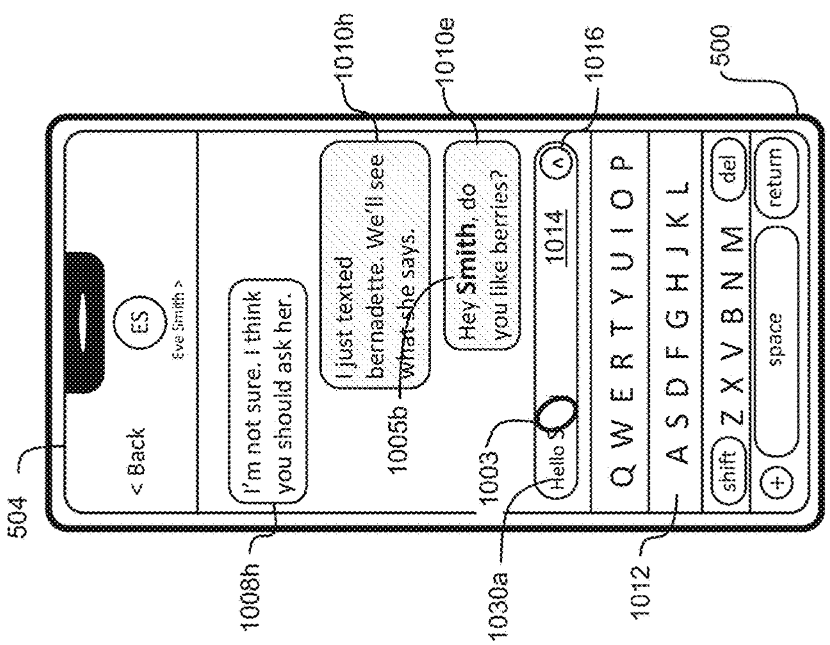
Figure 10U:
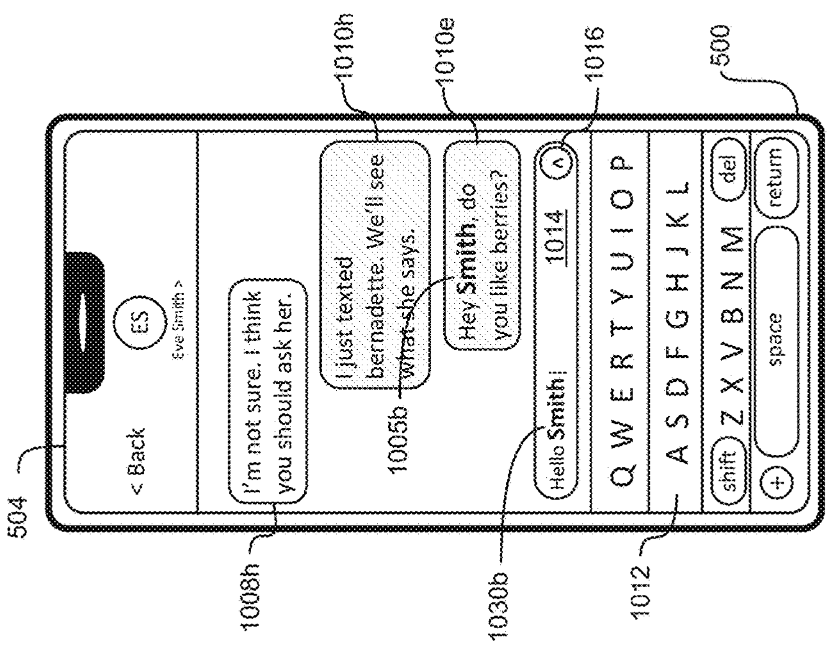
Figure 10V:
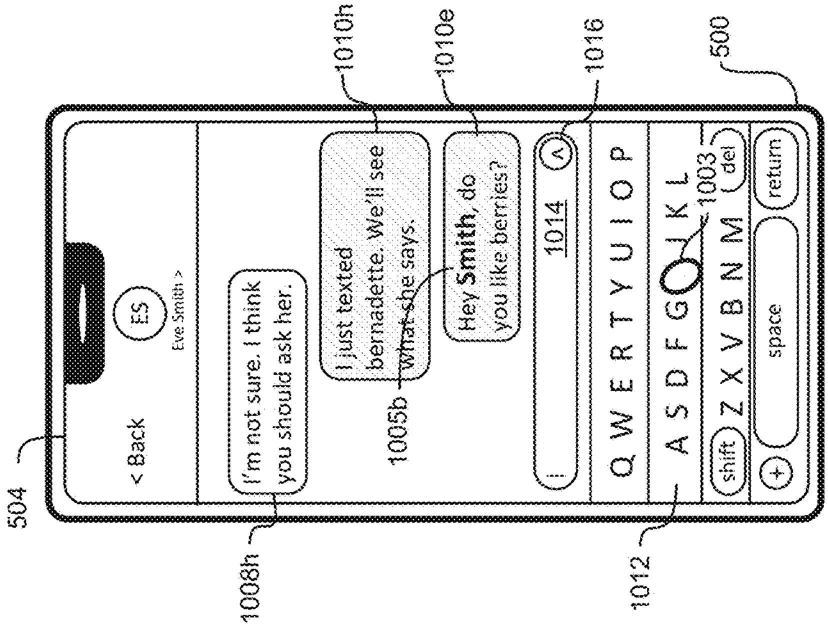
Figure 10W:
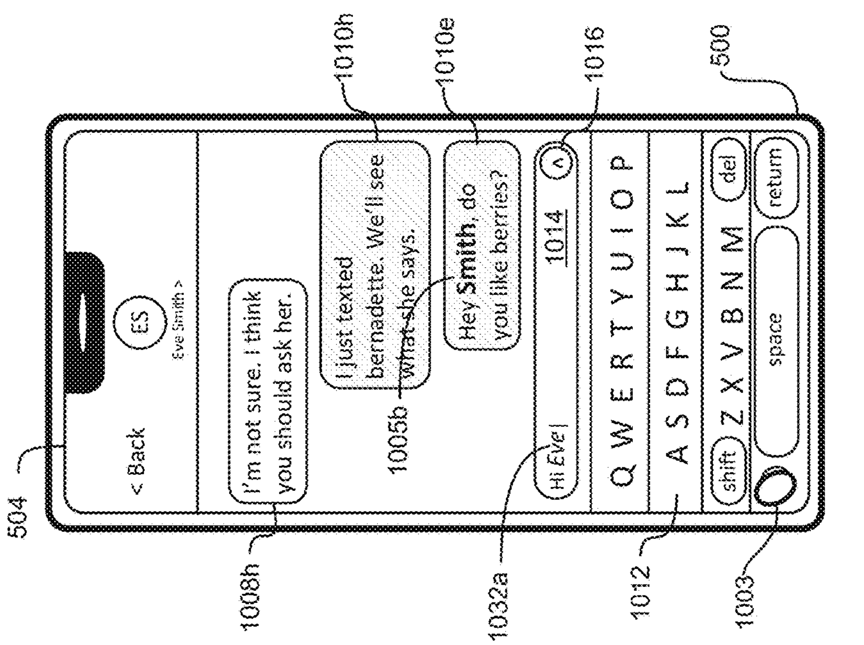
Figure 10X:
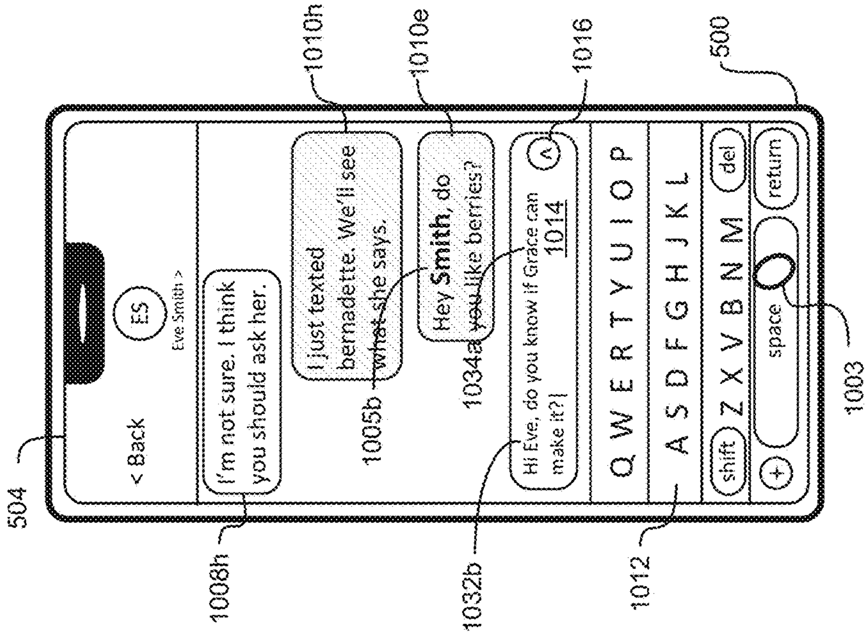
Figure 10Y:
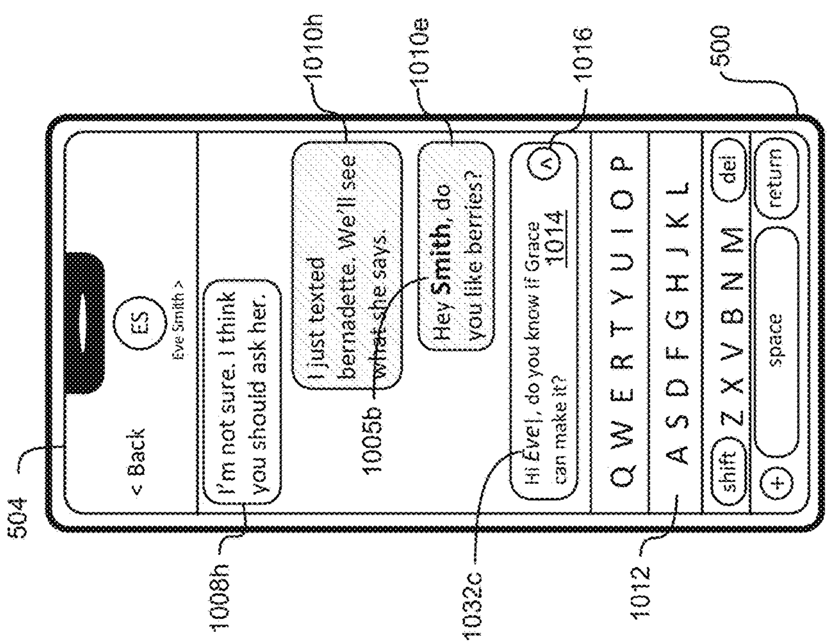
Figure 10Z:
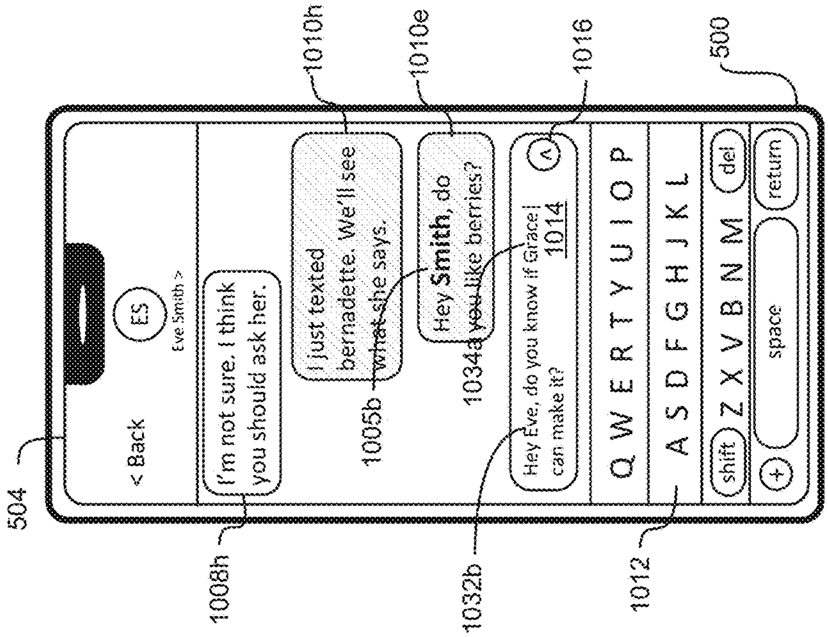

In some embodiments, as shown in FIG. 10Y, the electronic device 500 displays the representation 1010*d* of the message sent by the user in FIG. 10X. In some embodiments, the representation 1010*d* does not include a mention of the user from the conversation illustrated in FIGS. 10B-10T because that user is not in the conversation illustrated in FIG. 10Y. The text entry field 1014 in FIG. 10Y optionally includes text entered by the user, including an "@" symbol. The "@" symbol may be used as another way of creating mentions of other users in a messaging conversation, as will be demonstrated with reference to FIGS. 10Y-10EE. Still referring to FIG. 10Y, the user optionally selects (e.g., with contact 1003) a region of the soft keyboard 1012 to continue inputting text into text entry field 1014.

In some embodiments, such as in FIG. 10Z, the electronic device 500 displays, within text entry field 1014, the text 1026*b* entered by the user. Because text 1026*b* corresponds to the last name of the other user in the conversation (e.g., Smith of Even Smith), the electronic device 500 optionally displays the text 1026*b* in italics to indicate that the user is able to provide an input to turn text 1026*b* into a mention of the other user.

As shown in FIG. 10Z, in some embodiments, the user selects (e.g., with contact 1003) the text 1026*b*. In some embodiments, in response to the user's selection in FIG. 10Z, the electronic device 500 turns the text into a mention 1026*c* as shown in FIG. 10AA. The text of the mention 1026*c* is optionally the last name of the other user without the "@" symbol (e.g., device 500 removes the @ symbol in response to turning the text into the mention). Because the user entered the last name of the other user, in some embodiments, the text of the mention 1026*c* is the last name of the other user and is not replaced with other text, such as the first name or full name of the other user. In some embodiments, if the user were to enter the first name or a nickname of the contact after the "@" symbol, the text of the mention would be the text entered by the user (e.g., the first name or the nickname) after the "@" symbol, again, without replacing the text with the others of the first, last, and/or nicknames of the other user.

FIG. 10BB illustrates the text 1026*b* illustrated in FIG. 10Z again as another example. In FIG. 10BB, instead of selecting the text 1026*b*, the user selects (e.g., with contact 1003) the space bar of the soft keyboard 1012, for example. In response to the user's selection in FIG. 10BB, the electronic device 500 optionally enters a space after the text corresponding to the last name of the other user in the conversation and turns the text into mention 1026*c*, as shown in FIG. 10CC (e.g., including removing the @ symbol in response to turning the text into the mention). Mention 1026*c* is described in more detail above with reference to FIG. 10AA, for example.

FIG. 10DD illustrates the messaging user interface after the user has provided further text to the text entry field 1014, for example. Mention 1026*c* is optionally displayed in bold text, whereas the rest of the text in the text entry field 1014 is optionally not displayed in bold. As shown in FIG. 10DD, the user selects (e.g., with contact 1003) the option 1016 to transmit the text illustrated in text entry field 1014 as a message into the messaging conversation.

In response to the user's selection in FIG. 10DD, the electronic device 500 displays the indication 1010*e* of the message in the messaging conversation as shown in FIG. 10EE.

In FIG. 10EE, the electronic device 500 displays the representation 1010*e* of the message sent by the user in FIG. 10DD. The indication 1010*e* of the message includes a mention 1005*b* of the other user in the conversation that is illustrated in bold typeface. In some embodiments, the mention 1005*b* is distinguished from the rest of the text in the message, which is not illustrated in bold typeface. If the electronic device 500 detects selection of mention 1005*b*, the electronic device 500 would display contact information associated with the other user in the conversation.

FIG. 10FF illustrates an exemplary messaging conversation between the user of the electronic device 500 and two other users. The electronic device 500 optionally displays representations 1008*c* and 1008*d* of messages sent by other users in the conversations and a representation 1010*f* of a message sent by the user of the electronic device 500. Representation 1010*f* is optionally a reply to the message corresponding to representation 1008*d* in a manner similar to the way in which the electronic device 500 displays indications of reply messages described above with reference to FIGS. 8A-9. As shown in FIG. 10FF, in some embodiments, the user selects (e.g., with contact 1003) an option 1040 to access a settings user interface associated with the messaging conversation.

FIG. 10GG illustrates an exemplary settings user interface associated with the messaging conversation. The user interface optionally includes representations of the other users in the conversation, including options to message or call each user. The user optionally selects (e.g., with contact 1003) an option 1042 to hide alerts related to the messaging conversation. When the "hide alerts" setting is activated, the electronic device 500 optionally forgoes presenting indications of notifications of new messages in the messaging conversation unless the new message(s) includes a mention of the user of the electronic device 500. In some embodiments, there is a global setting available on the electronic device 500 (e.g., accessible via a global settings application rather than via the messaging application) that causes the electronic device 500 to forgo presenting notifications of messages including mentions when the message is in a conversation for which alerts are hidden. In some embodiments, in FIG. 10HH, in response to the selection in FIG. 10GG, the electronic device 500 presents the option 1042 with visual styling to indicate that the setting to hide alerts is activated.

In FIG. 10II, in some embodiments, the electronic device 500 receives an indication 1006*ii* of a new message received in the messaging conversation illustrated in FIG. 10FF (e.g., while displaying a user interface other than a user interface of the messaging application, such as a home screen user interface). Because the user activated the setting to hide alerts of new messages received in the conversation and the new message does not include a mention of the user of the electronic device, in some embodiments, the electronic device 500 forgoes presenting a visual indication of indication 1006*ii* as shown in FIG. 10II.

In FIG. 10JJ, in some embodiments, the electronic device 500 receives an indication 1006*jj* of another message received in the conversation illustrated in FIG. 10FF (e.g., while displaying a user interface other than a user interface of the messaging application, such as a home screen user interface). Because this message includes a mention of the user of the electronic device 500, the electronic device 500 optionally displays visual indication 1002*b* of the message. The visual indication optionally includes the text of message, including the mention 1004 of the user of the electronic device 500 (e.g., Alex). In some embodiments, indication 1002*b* is displayed in a manner similar to the manner indication 1002*a* is described above with reference to FIG. 10A.

In some embodiments, as shown in FIG. 10KK, the user provides an input (e.g., a downward swipe with contact 1003 from the top of the home screen user interface) to present a notifications user interface on the electronic device 500. In response to the input illustrated in FIG. 10KK, in some embodiments, the electronic device 500 displays the user interface illustrated in FIG. 10LL.

In FIG. 10LL, the electronic device 500 displays the visual indication 1002*b* of the message received in FIG. 10JJ, for example. In some embodiments, the user interface illustrated in FIG. 10LL includes other visual indications of other notifications received on the electronic device 500, including a visual indication of the message received in FIG. 10II. As shown in FIG. 10LL, the user selects (e.g., with contact 1003) the visual indication 1002*b* of the message.

As shown in FIG. 10MM, in response to the user's selection in FIG. 10LL, the electronic device 500 displays the messaging conversation scrolled to a position in the conversation (e.g., different from the end of the conversation) including a representation 1008*g* of the message corresponding to visual indication 1002*b* in FIG. 10LL. In some embodiments, the user interface illustrated in FIG. 10MM would also be displayed if the user had selected visual indication 1002*b* while it was displayed in the user interface illustrated in FIG. 10JJ. In some embodiments, in response to detecting selection of a visual indication of a message that does not include a mention of the user of the electronic device 500, the electronic device 500 displays the messaging user interface without scrolling the representations of messages to the message corresponding to the selected visual indication (e.g., device 500 displays the messaging user interface at a scroll position corresponding to the end of the messaging conversation). Thus, in some embodiments, selecting a notification of a message that includes a mention (e.g., of the user of the device 500, or of another user in the conversation) optionally causes device 500 to display the contents of the messaging conversation at the scroll position corresponding to the mention.

In some embodiments, a contact of the user of the electronic device 500 is associated with multiple names, such as a first name, last name, or nickname included in the contact card of the user. In some embodiments, the electronic device 500 is able to create a mention corresponding to the contact using any of the names associated with the contact, as will be described in further detail below with reference to FIGS. 10NN-10UU. Moreover, in some embodiments, the electronic device 500 displays an indication of a mention in response to detecting selection of text corresponding to a name associated with a contact.

For example, as shown in FIG. 10NN, the user has entered the "@" symbol into the text entry field 1014 displayed with a messaging conversation. The user optionally selects (e.g., with contact 1003) a region of the soft keyboard 1012 associated with a respective character to enter the character into the text entry field 1014.

In some embodiments, as shown in FIG. 10OO, the user has entered a portion 1028*b* of text corresponding to a nickname (e.g., "kitty") included in the contact card of the contact (e.g., Eve Smith). In response to detecting that the portion 1028*b* of text corresponds to the nickname of the contact (e.g., Eve Smith), in some embodiments, the electronic device 500 presents a selectable option 1046*a* (e.g., displayed above the text entry field) that, when selected, causes the electronic device 500 to turn portion 1028*b* of text into a mention. As shown in FIG. 10OO, the user optionally selects (e.g., with contact 1003) the option 1046*a*.

In FIG. 10PP, for example, in response to the user's selection in FIG. 10OO, the electronic device 500 displays mention 1028*c*. The mention 1028*c* may be displayed in bold text and corresponds to the nickname of the contact. Mention 1028*c* can have one or more of the features and characteristics of other mentions described herein. In this example, the nickname "kitty" with a lowercase "k" is stored in association with the contact's contact information, so the electronic device 500 does not capitalize "kitty" when turning the text into mention 1028*c*. In some embodiments, if the user had entered the text "Kitty" with a capital "K," the electronic device 500 would change the capitalization to conform to the capitalization of the contact card (e.g., changing the text to "kitty" with a lowercase "k"). Because the text in FIG. 10PP has the same capitalization as the text on the contact card, the electronic device 500 does not change the capitalization, for example. If the nickname "Kitty" in the contact card had a capital "K," then text 1028*c* would have been updated to match the capitalization of the nickname in the contact card (e.g., "Kitty" with a capital "K").

In 10QQ, as an example, the user begins to enter a text into text entry field 1014 again. FIG. 10RR illustrates the text provided by the user into text entry field 1014 as an example. The portion 1030*a* of text ("Smi") corresponds to the beginning of the contact's last name (e.g., "Smith"), so the electronic device 500 optionally displays the portion 1030*a* of text in italics to indicate that is it is possible that the text 1030*a* corresponds to the contact. The italics optionally indicate that it is possible to turn the portion 1030*a* of text into a mention associated with the contact.

In some embodiments, as shown in FIG. 10SS, the user selects (e.g., with contact 1003) the portion 1030*a* of text. In response to the user's selection in FIG. 10SS, the electronic device 500 optionally presents a selectable option 1046*a* (e.g., above the text entry field) that, when selected, causes the electronic device 500 to turn the portion 1030*a* of text into a mention associated with the contact, as shown in FIG. 10TT.

In FIG. 10TT, in some embodiments, the electronic device 500 displays option 1046*a* and the user selects (e.g., with contact 1003) the option 1046*a*. Option 1046*a* can include the name of the contact in the conversation and an image associated with the contact card of the contact. In some embodiments, the nickname of the contact (e.g., "kitty") is also displayed. In some embodiments, even if there is a nickname associated with the contact card, the option 1046*a* includes the first and last names of the contact without the nickname. In some embodiments, the electronic device 500 displays options similar to option 1046*a* in response to the inputs illustrated in FIGS. 10D, 10M, and/or 10Z. In some embodiments, the electronic device 500 does not display an option similar to option 1046*a* in response to the input illustrated in FIG. 10Z because the portion 1026*b* of text selected by the user includes the "@" character which indicates that the text should be turned into a mention.

In some embodiments, in response to the user's selection in FIG. 10TT, the electronic device 500 turns the portion 1030*a* of text into a mention 1030*b*, as shown in FIG. 10UU. As shown in FIG. 10UU, because the text 1030*a* illustrated in FIG. 10RR corresponds to the last name of the contact, the mention 1030*b* optionally corresponds to the text of the user's last name.

In FIG. 10VV, as an example, the user selects (e.g., with contact 1003) a region of the soft keyboard 1012 corresponding to a character to enter text into text entry field 1014.

In FIG. 10WW, the electronic device 500 displays a portion of text 1032*a* entered by the user. Because the text 1032*a* corresponds to the first name of the contact, the electronic device 500 displays the text 1032*a* in italics to indicate that it is possible to turn the text 1032*a* into a mention associated with the contact. In some embodiments, the electronic device 500 does not display text in italics unless the text matches an entire name (e.g., first or last name, nickname) of the contact in the conversation, even if the text matches a first portion of the name.

As shown in FIG. 10WW, the user optionally selects (e.g., with contact 1003) a region of the soft keyboard 1003 to continue entering text into text entry field 1014. As shown in FIG. 10XX, after the user continues typing a message into the text entry field 1014, the electronic device 500 optionally displays the portion 1032*b* of text in the same style as the rest of the message because the user continued typing instead of turning the text 1032*a* illustrated in FIG. 10WW into a mention associated with the contact. As shown in FIG. 10XX, in some embodiments, the user selects (e.g., with contact 1003) the space bar of the soft keyboard 1012. In some embodiments, in response to detecting contact 1003 for an amount of time that is at least a predetermined threshold (0.25 or 0.5 or 1 second), the electronic device 500 enables the user to move the location of an insertion marker within the text entry field 1014. In some embodiments, the electronic device 500 would also move the insertion marker if, instead of selecting the space bar of soft keyboard 1012 as described above, the user were to select a region of the display immediately after the text 1032*b*.

As shown in FIG. 10YY, in some embodiments, in response to detecting movement of the insertion marker to the location immediately after portion of text 1032*c*, the electronic device 500 optionally displays the text 1032*c* in italics to indicate that it is possible to turn text 1032*c* into a mention associated with the contact.

In FIG. 10ZZ, in some embodiments, in response to detecting movement of the insertion marker to the location immediately after text 1034*a*, the electronic device 500 optionally forgoes displaying text 1034*a* in italics because the name corresponding to text 1034*a* (e.g., Grace) is not the name of a person with access to the messaging conversation (e.g., is not the name of a person included in the conversation).

In some embodiments, two or more users in a group conversation have the same first name, last name or nickname. As shown in FIG. 10AAA, for example, when the electronic device 500 detects entry of text 1036*a* corresponding to more than one person in the conversation, the electronic device 500 presents options 1046*b* and 1046*c* to turn text 1036*a* into a mention associated with either of the users whose names correspond to the text 1036*a*. In some embodiments, option 1046*b* includes the name and image associated with a contact card of one of the contacts in the conversation (e.g., "Erin A."). In some embodiments, option 1046*c* includes the name and image associated with a contact card of the other contact in the conversation (e.g., "Erin W."). In response to detecting selection of one of the options 1046*b* or 1046*c*, the electronic device 500 converts text 1036*a* into a mention corresponding to the selected user. In some embodiments, when there are enough users with the same first name, last name, or nickname in one messaging conversation that all of the options to create mentions for each user do not fit on the display 504 side-by-side, the electronic device 500 displays the options in a horizontally scrollable arrangement, thereby allowing the user to select from all of the options even if all of the options cannot be concurrently displayed side-by-side.

In some embodiments, the electronic device 500 suggests turning text into a mention when the text matches a name of a contact in a messaging conversation, instead of in response to the text matching at least a portion of the name. For example, in FIG. 10BBB, the user selects (e.g., with contact 1003) a region of the soft keyboard 1012 corresponding to a respective character to enter text into text entry field 1014. In this example, as shown in FIG. 10CCC, the electronic device 500 displays the text 1048*a* in the text entry field 1014. Although text 1048*a* corresponds to the beginning of the first name of the contact in the messaging conversation (e.g., Eve), in some embodiments, text 1048*a* is still displayed in non-italic non-bold text because text 1048*a* doesn't yet match the full first name of the user. As shown in FIG. 10CCC, the user selects (e.g., with contact 1003) a region of the soft keyboard 1012 to continue entering text into text entry field 1014.

In FIG. 10DDD, the electronic device 500 updates the text entry field 1014, for example. Text 1048*b* now matches the full first name of the contact in the messaging conversation, for example. In some embodiments, in response to detecting that text 1048*b* matches the first name of the contact in the conversation, the electronic device 500 displays the text 1048*b* in larger text than the rest of the text in text entry field 1014 and/or in italics to indicate that the text 1048*b* can be turned into a mention. As shown in FIG. 10DDD, the user selects (e.g., with contact 1003) the text 1048*b*, for example.

In some embodiments, in response to detecting selection of text 1048*b* as shown in FIG. 10DDD, the electronic device 500 displays an option 1046*d* above the text entry field to turn text 1048*b* into a mention, as shown in FIG. 10EEE. In some embodiments, the option 1046*d* includes the full name of the contact and an image associated with the contact. As shown in FIG. 10EEE, the user selects (e.g., with contact 1003) the option 1046*d* to turn text 1048*b* into a mention.

As shown in FIG. 10FFF, in some embodiments, in response to detecting selection of option 1046*d* shown in FIG. 10EEE, the electronic device 500 replaces text 1048*b* with text 1048*c*, which is optionally displayed in a larger size than the other text in text entry field 1014 and/or in bold text. In some embodiments, the bold text and larger size indicate to the user that the text 1048*c* will become a mention when the message is sent to the messaging conversation.

In some embodiments, while displaying the option 1046*d* to turn text 1048*b* into a mention, the electronic device 500 detects an input adding additional text to the message, instead of detecting selection of the option 1046*d* as shown in FIG. 10EEE.

FIG. 10GGG illustrates the user interface illustrated in FIG. 10EEE again, for example. As shown in FIG. 10GGG, in some embodiments, while displaying the option 1046*d*, the electronic device 500 detects selection (e.g., via contact 1003) of the space bar of the soft keyboard 1012. In some embodiments, as shown in FIG. 10HHH, in response to detecting selection of the space bar of soft keyboard 1012 shown in FIG. 10GGG, the electronic device 500 enters a space after text 1048*d*. In some embodiments, as shown in FIG. 10HHH, text 1048*d* is now changed to be displayed at the same size as the other text in the text entry field 1014 and is not bold or italic. In some embodiments, the text 1048*d* that is not bold or italic indicates that text 1048*d* is not a mention or is no longer an active potential mention.

In some embodiments, after the first name of the user is entered and is not turned into a mention, the electronic device 500 detects entry of the last name of the user. In response to detecting the full name of the user, in some embodiments, the electronic device 500 displays the first and last names of the user in a way that indicates that the first and last names of the user can be turned into a mention of the user. For example, in FIG. 10III, the user has entered the first name 1048*d* of the user and a portion of text 1050*a* that matches the beginning of the last name of the user. Because the portion of text 1050*a* optionally does not match the full last name of the user, in some embodiments, the text 1050*a* is displayed in the same manner as other text not corresponding to the name of the user (e.g., not bold or italic). As shown in FIG. 10III, the user optionally selects (e.g., with contact 1003) a region of the soft keyboard 1012 corresponding to a character to enter the character into text entry field 1014.

In some embodiments, as shown in FIG. 10JJJ, in response to detecting the first and last name of the user in the text entry field 1014, the electronic device 500 displays the first and last name of the user in italics to indicate that the first and last name of the user can be turned into a mention of the user. For example, portion of text 1048*b* matches the first name of the user and portion of text 1050*b* matches the last name of the user. In some embodiments, portions 1048*b* and 1050*b* are displayed at a larger size than the other text in the text entry field 1014 and/or in italics. In some embodiments, the user selects (e.g., with contact 1003) the text 1048*b*-1050*b* (or either one of text 1048*b* or text 1050*b*).

In response to the user's selection in FIG. 10JJJ, in some embodiments, the electronic device 500 displays an option 1046*d* to turn text 1048*b* and 1050*b* into a mention of the user, as shown in FIG. 10KKK. In some embodiments, in response to detecting selection of option 1046*d*, the electronic device 500 updates text 1048*b* and 1050*b* to be displayed in bold to indicate that the text 1048*b* and 1050*b* will be turned into a mention when the message is sent. In some embodiments, as shown in FIG. 10KKK, the user selects (e.g., with contact 1003) a region of the soft keyboard 1012 to continue entering text into text entry field 1014.

FIG. 10LLL illustrates the exemplary user interface after the user has added additional text to the text entry field 1014. In some embodiments, the user selects (e.g., with contact 1003) a space bar of the soft keyboard 1012. The contact 1003 is optionally detected for an amount of time exceeding a predetermined threshold (e.g., 0.5 seconds, 1 second, 2 seconds). In response to detecting the contact 1003 for the amount of time exceeding the predetermined threshold, the electronic device 500 enters a mode in which the user can move contact 1003 to control movement of an insertion marker in the text entry field 1014.

In some embodiments, as shown in FIG. 10MMM, in response to detecting movement of the insertion marker to the location in the text entry field 1014 immediately after the (e.g., last) name of the user, the electronic device 500 displays the option 1046*d* to turn text 1048*c* and 1050*c* into a mention. In some embodiments, text 1048*c* and 1050*c* is displayed at a larger size than the other text in text entry field 1014 and/or in italics. In some embodiments, the insertion marker can be moved to the location illustrated in FIG. 10MMM by detecting selection of the region of the user interface immediately after text 1050*c*. In some embodiments, the option 1046*d* to turn text 1048*c* and 1050*c* into a mention is displayed in response to movement of the insertion marker without any additional input (e.g., selection of text 1048*c* and/or 1050*c*). In response to detecting selection of option 1046*d*, the electronic device 500 optionally displays the text 1048*c* and 1050*c* in bold to indicate that text 1048*c* and 1050*c* will be turned into a mention when the message is sent.

In some embodiments, in response to detecting selection of the user's name that is not indicated as being a mention, the electronic device 500 displays an option to turn the name into a mention. For example, in FIG. 10NNN, the user selects text 1048*d* and 1050*d*, which match the first and last name of the user in the conversation, but which were not converted into a mention at the time of entry. As shown in FIG. 10NNN, in some embodiments, text 1048*d* and 1050*d* are displayed in the same style as the rest of the text in the text entry field 1014 because the electronic device 500 is not currently configured to replace text 1048*d* and 1050*d* with a mention when the message is sent. In FIG. 10NNN, in some embodiments, the user selects (e.g., with contact 1003) the text 1048*d* and 1050*d* (or either of text 1048*d* or 1050*d*).

In response to the user's selection in FIG. 10NNN, in some embodiments, as shown in FIG. 10OOO, the electronic device 500 displays the option 1046*d* to turn text 1048*c* and 1050*c* in FIG. 10OOO into a mention. The electronic device 500 optionally displays the text 1048*c* and 1050*c* in italics and/or a larger size to indicate that text 1048*c* and 1050*c* will become a mention in response to detecting selection of option 1048*d*.

In some situations, users wish to disassociate text from a mention. FIG. 10PPP illustrates an example of the messaging user interface after the user has entered respective text 1090*a* ("@Eve") into the text entry field. As shown in FIG. 10PPP, the text can include the "@" symbol followed by a name of the contact in the conversation. As shown in FIG. 10PPP, the electronic device 500 can detect selection (e.g., via contact 1003*ppp*) of a space bar included in soft keyboard 1012. In response to detecting entry of a space after the respective text 1090*a* ("@Eve"), the electronic device 500 can create a mention indicated by the name of the contact (e.g., "Eve"), as illustrated in FIG. 10QQQ and as described previously.

FIG. 10QQQ illustrates an example of the messaging user interface after the user has entered a mention 1090*b* ("Eve") into the text entry field 1014. In some embodiments, the mention 1090*b* is created in response to the sequence of inputs described above with reference to FIG. 10PPP. In FIG. 10RRR, while an insertion marker included in text box 1014 is adjacent to the mention 1090*b* ("Eve"), the electronic device 500 detects selection (e.g., via contact 1003*rrr*) of a delete option included in the soft keyboard 1012. In some embodiments, a different input corresponding to a request to delete content from the text entry field 1014 is detected instead. In response to the input, the electronic device 500 can remove the mention 1090*b* from the text entry field 1014 and display the plain text entered by the user again, as shown in FIG. 10SSS.

FIG. 10SSS illustrates an example of the messaging user interface after the user has removed mention 1090*b* as described above with reference to FIG. 10RRR. The text entry field 1014 can be updated to no longer include the mention 1090*b* illustrated in FIG. 10RRR, and instead include the text 1090*a* that had been entered by the user in order to create the mention 1090*b*, including redisplaying the "@" symbol originally entered by the user, but removed from display by device 500 in FIG. 10QQQ.

In some embodiments, the user may wish to continue entering text into text entry field 1014, including a space after text 1090*a*. Thus, in some embodiments, instead of converting text 1090*a* into mention 1090*b* in response to detecting entry of a space following text 1090*a* after the mention 1090*b* has been removed, the electronic device 500 enters the space without converting text 1090*a* into mention 1090*b*. As shown in FIG. 10SSS, the electronic device 500 detects selection (e.g., via contact 1003*sss*) of the space bar included in the soft keyboard 1012 while the text "@Eve" is included in the text entry field 1014. In response to the selection, in some embodiments, the electronic device 500 enters a space after text 1090*a* without converting the text 1090*a* into mention 1090*b*.

FIG. 10TTT illustrates an example of the messaging user interface after the user's selection in FIG. 10SSS. The electronic device 500 can display the text 1090*a* in the text entry field 1014 with a space entered after the text 1090*a* in response to the input illustrated in FIG. 10SSS.

In some embodiments, after removing the mention functionality from the text 1090*a* in response to the input illustrated in FIG. 10SSS, the electronic device 500 detects one or more additional inputs corresponding to one or more requests to delete characters from text 1090*a*. For example, in response to receiving an input to delete a character while displaying the user interface illustrated in FIG. 10SSS, the electronic device 500 updates the text entry field 1014 to include "Hi @Ev" instead of "Hi @Eve." In some embodiments, while displaying the text "Hi @Ev" in the text entry field 1014 after removing the mention functionality from text 1090*a* as described with reference to FIGS. 10RRR-10SSS, the electronic device 500 detects entry of the character "e" followed by a space. In response to this sequence of inputs, the electronic device 500 can display the text "Hi @Eve" followed by a space in the text entry field 1014 but, in some embodiments, does not replace the plain text version of "@Eve" with a mention including text "Eve" (e.g., mention 1090*b*). That is to say, in some embodiments, once the mention 1090*b* has been removed from text entry field 1014, the electronic device 500 will not convert the text 1090*a* into the mention 1090*b* in response to one or more inputs completing the text 1090*a* after part of text 1090*a* has been deleted.

In some embodiments, after the sequence of inputs described with reference to FIGS. 10PPP-10TTT the user may decide that they wish to enter a mention 1090*b* at the location illustrated in FIG. 10RRR. In some embodiments, in response to detecting selection of text 1090*a* illustrated in FIG. 10TTT (e.g., such as by a tap detected on text 1090*a*), the electronic device 500 initiates a process to replace text 1090*a* with a mention 1090*b*, such as by converting the text 1090*a* into the mention 1090*b* in response to the selection or by displaying an option to create a mention in response to the selection (e.g., including removing the "@" symbol, as previously described). Additionally or alternatively, the user is able to completely delete text 1090*a* (e.g., "@Eve") and reenter the text 1090*a* as shown in FIG. 10PPP. In some embodiments, after the text 1090*a* has been completely deleted and completely reentered, in response to detecting entry of a space after the text 1090*a*, the electronic device 500 converts text 1090*a* into a mention 1090*b*, as described above with reference to FIGS. 10PPP-10QQQ.

Figure 11A:
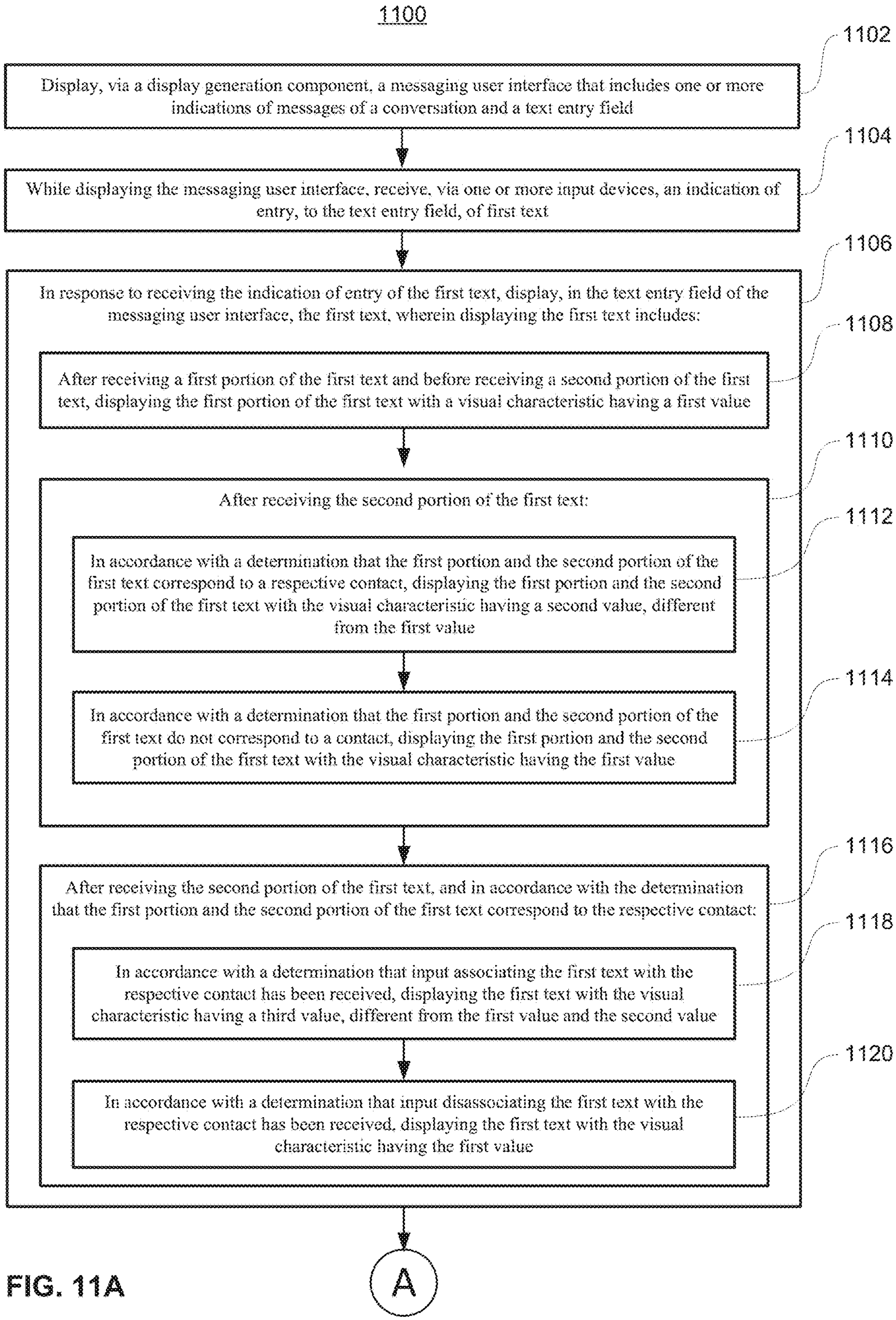
FIGS. 11A-11B are flow diagrams illustrating a method of creating and presenting links (e.g., rich links) to contacts in a messaging conversation (e.g., "mentions") according to some embodiments.
Figure 11B:
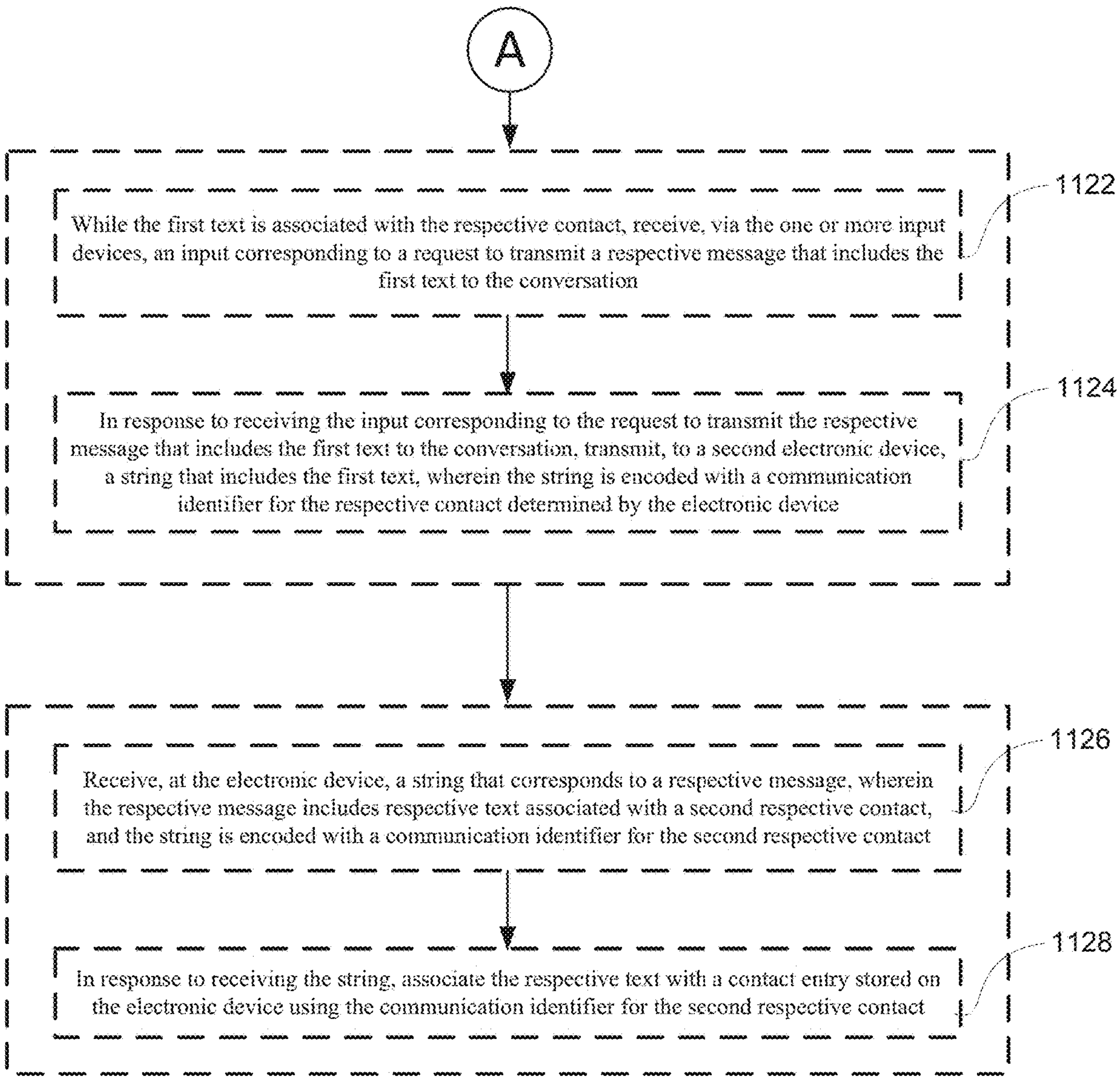

FIGS. 11A-11B are flow diagrams illustrating a method 1100 of creating and presenting links (e.g., rich links) to contacts in a messaging conversation (e.g., "mentions") according to some embodiments. The method 1100 is optionally performed at an electronic device such as device 100, device 300, device 500 as described above with reference to FIGS. 1A-1B, 2-3, 4A-4B and 5A-5H. Some operations in method 1100 are, optionally combined and/or order of some operations is, optionally, changed.

As described below, the method 1100 provides ways in which an electronic device creates and presents mentions in a messaging user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1100 is performed at an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, such as in FIG. 10BBB, the electronic device 500 displays (1102), via the display generation component, a messaging user interface that includes one or more indications 1008*h*, 1010*h*, and 1010*e* of messages of a conversation and a text entry field 1014. In some embodiments, the one or more indications of messages include content (e.g., text, still or video images, audio, links, rich links, etc.) of the messages of the conversation, including messages sent from the user account of the user of the electronic device and/or messages sent by other users (e.g., contacts of the user of the electronic device). The text entry field is optionally a region of the user interface towards which inputs requesting creation of message content are directed.

In some embodiments, such as in FIG. 10CCC, while displaying the messaging user interface, the electronic device 500 receives (1104), via the one or more input devices, an indication of entry, to the text entry field 1014, of first text 1048*a* (e.g., the user enters text input via a keyboard, soft keyboard, voice input, or another input device in communication with the electronic device.

In some embodiments, such as in FIG. 10CCC, in response to receiving the indication of entry of the first text, the electronic device 500 displays (1106), in the text entry field 1014 of the messaging user interface, the first text 1048*a* (e.g., the electronic device displays the text that was entered by the user).

In some embodiments, such as in FIG. 10CCC, displaying the first text 1048*a* includes, after receiving a first portion of the first text and before receiving a second portion of the first text (e.g., the user enters text corresponding to one or more characters of a word or name but does not enter the full word or name), displaying (1108) the first portion 1048*a* of the first text with a visual characteristic having a first value (e.g., the first text is displayed with a first color, size, opacity, font, or text styling). In some embodiments, while the word or name is incomplete, the electronic device displays the text with an appearance that does not correspond to a link (e.g., a rich link) associated with a contact in the conversation (e.g., a "mention"). For example, Alexander begins typing a message to Bernadette and enters the text "Hi Be" (e.g., the beginning of "Hi Bernadette"). In this example, the text "Hi Be" is all displayed in the same color.

In some embodiments, such as in FIG. 10DDD after receiving the second portion of the first text 1048*b* and in accordance with a determination that the first portion and the second portion of the first text 1048*b* correspond to a respective contact (e.g., the first portion and the second portion of the text match a name (e.g., first name, last name, or nickname) of a contact), the electronic device 500 displays (1112) the first portion and the second portion of the first text 1048*b* with the visual characteristic having a second value, different from the first value (e.g., the first text is displayed with a second color, size, opacity, font, or text styling). In some embodiments, once the text matches the name of a contact, the electronic device displays the text with an appearance that corresponds to an option to create a link (e.g., a rich link) associated with a contact in the messaging conversation (e.g., a "mention"). For example, Alexander continues typing a message to Bernadette and enters the text "Hi Bernadette." In this example, the text "Hi" is displayed in a first color and the text "Bernadette" is displayed in a second color different from the first color because "Bernadette" matches the first name of the contact. In some embodiments, in accordance with a determination that the text matches a last name or nickname of the contact (e.g., a last name or nickname included in the contact card of the contact), the electronic device displays the text with the visual characteristic having the second value.

In some embodiments, such as in FIG. 10J, in accordance with a determination that the first portion and the second portion of the first text 1020*c* do not correspond to a contact (e.g., does not correspond to any contact in the messaging conversation, or does not correspond to any contact of the electronic device, regardless of whether the contact is part of the messaging conversation), the electronic device 500 displays (1114) the first portion and the second portion of the first text 1020*c* with the visual characteristic having the first value. In some embodiments, text that does not correspond to the name of a contact in the messaging conversation is displayed with the visual characteristic having the first value. In some embodiments, text that corresponds to a name of a contact of the electronic device that is not included in the messaging conversation is also displayed with the visual characteristic having the first value. For example, Alexander types a message to Bernadette and enters the text "Hi Beagles." In this example, the electronic device displays the text "Hi Beagles" all in the same color because "Hi" and "Beagles" do not correspond to the name of a contact included in the messaging conversation.

In some embodiments, after receiving the second portion of the first text 1048*b*, and in accordance with the determination that the first portion and the second portion of the first text 1048*b* correspond to the respective contact (1116) (e.g., the first and second portions of the first text matches all of a name (e.g., a first name, a last name, or a nickname) of a contact in the messaging conversation), in accordance with a determination that input associating the first text 1048*b* with the respective contact has been received, such as in FIG. 10EEE (e.g., selection of a selectable option that, when selected, causes the electronic device to present the first text as a link (e.g., a rich link) associated with a contact in the conversation (e.g., a "mention") or entry of a character that indicates that the text that follows is to be turned into a mention (e.g., entry of the "@" symbol before the first and second portions of text)), the electronic device 500 displays (1118) the first text 1048*c* with the visual characteristic having a third value, different from the first value and the second value, such as in FIG. 10FFF (e.g., the first text is displayed with a third color, size, opacity, font, or text styling. In some embodiments, the input associating the first text with the contact is selection of the first text and/or selection of an option associated with the first text and a respective contact in the conversation. For example, Alexander types a message to Bernadette that includes the text "Hi Bernadette." In this example, the electronic device displays the word "Hi" in a first color and "Bernadette" in a second color until Alexander selects the word "Bernadette." In this example, in response to Alexander's selection, the electronic device displays an option that, when selected, causes the electronic device to converts the text into a mention. In this example, Alexander selects the option and, in response to the selection, the electronic device converts the text "Bernadette" into a link (e.g., a rich link) associated with Bernadette's user account (e.g., contact info) and updates the display to display "Bernadette" in a third color while continuing to display "Hi" in the first color.

In some embodiments, such as in FIG. 10GGG in accordance with a determination that input disassociating the first text 1048*b* with the respective contact has been received (e.g., the input disassociating the first text with the contact includes a space character, punctuation character, or another character added after the first and second portions of text that is entered after entering the first text without confirming association with a contact (e.g., selection of the text while it is displayed with the second color is not detected)), the electronic device 500 displays (1120) the first text 1048*d* with the visual characteristic having the first value, such as in FIG. 10HHH. In some embodiments, the electronic device displays the first text with the visual characteristic having the first value in response to an input other than an input for turning the first text into a mention. If the user continues entering text after entering the text of the contact's name (e.g., typing a space after the name while it is displayed with the visual characteristic having the second value, adding another character after the name), the electronic device displays the first text with the visual characteristic having the first value. For example, in a conversation with a contact named "Eve," the user types "Eve" and the electronic device displays "Eve" with the visual characteristic having the second value. Then, in this example, the user continues typing to change the word "Eve" to "Even" and the electronic device displays the word "Even" with the visual characteristic having the second value (assuming there is no contact in the conversation with "Even" as a first name, last name, or nickname). For example, the electronic device reverts the first text from having the second color, size, opacity, font, or text styling with which it was displayed because it corresponded to a contact, to having the first color, size, opacity, font, or text styling because an input associating the first text with a contact was not received. In some embodiments, in response to detecting selection of text displayed with the visual characteristic (e.g., a mention) having the third value, the electronic device displays contact information associated with the contact associated with the text with the visual characteristic having the third value in a contact card user interface.

The above-described manner of updating the value of the visual characteristic based on whether the text corresponds to the name of the contact and whether the text is associated with the contact enables the electronic device to provide an efficient way to associate and disassociate text with contacts in the conversation, which simplifies the interaction between the user and the electronic device and enhances the operability of the electronic device and makes the user-device interface more efficient (e.g., by reducing the number of inputs needed to create and remove associations of text to contacts in the conversation), which additionally reduces power usage and improves battery life of the electronic device by enabling the user to use the electronic device more quickly and efficiently.

In some embodiments, such as in FIG. 10FFF, the respective contact is a contact included in the conversation (e.g., the messages in the conversation are sent to the user account of the contact). In some embodiments, displaying the first text 1034*a* includes, after receiving the second portion of the first text 1034*a*, in accordance with a determination that the first portion and the second portion of the first text 1034*a* correspond to a second respective contact that is not included in the conversation, the electronic device 500 displays the first portion and the second portion of the first text 1034*a* with the visual characteristic having the first value. In some embodiments, the electronic device only displays the first text with the visual characteristic having the second value if the text corresponds to the name of a contact included in the messaging conversation because the electronic device only creates links (e.g., rich links) associated contacts included in the conversation within each respective conversation. For example, Alexander is able to create a link (e.g., a rich link) to Bernadette in a conversation with Bernadette but cannot create a link (e.g., a rich link) associated with Evan in the conversation with Bernadette if Evan is not also in that conversation. As another example, Alexander is able to create a link (e.g., a rich link) associated with Eve in a conversation with Eve but cannot create a link (e.g., a rich link) associated with Bernadette in the conversation with Eve if Bernadette is not also in the conversation. The above-described manner of displaying the first text with the visual characteristic with the first value when the first text corresponds to a name of contact that is not included in the conversation enables the electronic device to efficiently communicate to the user that links (e.g., rich links) associated with contacts are only created for contacts within a conversation, which simplifies the interaction between the user and the electronic device and enhances the operability of the electronic device and makes the user-device interface more efficient (e.g., by reducing the number of inputs needed to display the first text without a link (e.g., a rich link) to the contact), which additionally reduces power usage and improves battery life of the electronic device by enabling the user to use the electronic device more quickly and efficiently.

In some embodiments, such as in FIG. 10EEE, the input associating the first text with the respective contact includes selection of a selectable option 1046*d* while the first text 1048*b* is displayed with the visual characteristic having the second value. In some embodiments, the visual characteristic having the second value indicates that it is possible to associate a link (e.g., a rich link) associated with the respective contact with the first text. In some embodiments, if the first text corresponds to exactly one contact in the conversation, selection of the first text causes the electronic device to display an option to associate the first text with the respective contact. In some embodiments, if the first text corresponds to multiple contacts in the conversation, the electronic device displays multiple options to associate the text with one of each of the contacts having names that correspond to the first text. The above-described manner of associating the first text with the contact in response to detecting selection of the first text displayed with the visual characteristic having the second value enables the electronic device to provide an efficient way of associating text with contacts, which simplifies the interaction between the user and the electronic device and enhances the operability of the electronic device and makes the user-device interface more efficient (e.g., by reducing the number of inputs needed to associate text with a contact), which additionally reduces power usage and improves battery life of the electronic device by enabling the user to use the electronic device more quickly and efficiently.

In some embodiments, such as in FIG. 10BB, the input associating the first text 1026*b* with the respective contact includes entry of a predefined character with the first text 1026*b*. In some embodiments, if the first text includes the predetermined character plus text corresponding to the name of the respective contact, once the text corresponding to the name of the respective contact meets one or more criteria (e.g., criteria related to a number of characters, criteria related to the number of contacts in the conversation, criteria related to the number of contacts to which it is possible the first text corresponds, matching a name of the respective contact), the electronic device automatically displays the first text with the third visual characteristic and associates the first text with the respective contact. For example, if Alexander inputs a message to Bernadette that says "Hi @Bernadette," the electronic device displays the text "Bernadette" with the visual characteristic having the third value that, when selected, displays Bernadette's contact information. In this example, "Bernadette" is displayed with the visual characteristic having the third value and as a link to Bernadette's contact information without any additional input other than typing the "@" character before "Bernadette." In some embodiments, if the predefined character is included in the first text, no additional input is necessary to associate the first text with the contact once the electronic device is able to determine the contact to which the first text corresponds. In some embodiments, the electronic device determines the respective contact to which the first text corresponds and displays the first text with the visual characteristic having the third value before the message has been sent (e.g., before it is sent to the messaging conversation, and while the text is being displayed in the text entry field). The above-described manner of associating the first text with the respective contact in response to entry of the predefined character with the first text enables the electronic device to provide an efficient way of associating the first text with the respective contact, which simplifies the interaction between the user and the electronic device and enhances the operability of the electronic device and makes the user-device interface more efficient (e.g., by reducing the number of inputs needed to associate the contact with the first text), which additionally reduces power usage and improves battery life of the electronic device by enabling the user to use the electronic device more quickly and efficiently.

In some embodiments, after receiving the second portion of the first text 1026*b*, and in accordance with the determination that the first text 1026*b* corresponds to the respective contact, in accordance with the determination that the input associating the first text with the respective contact has been received, removing display of the predefined character from the messaging user interface, such as in FIG. 1 OCC. In some embodiments, the electronic device transitions from displaying the predefined character, the first portion of the first text, and the second portion of the first text with the visual characteristic having the second value to displaying the first and second portions of the first text with the visual characteristic having the third value without displaying the predefined character. For example, Alexander enters the text "Hi @Bernadette" and the electronic device displays "Hi" with the visual characteristic having the first value and "@Bernadette" with the visual characteristic having the second value. In this example, once Alexander finishes entering "Hi @Bernadette," (e.g., in response to detecting a space after the last "e") the electronic device displays "Hi" with the visual characteristic having the first value and displays "Bernadette" with the visual characteristic having the third value and does not display the "@" character. The above-described manner of removing display of the predefined character after receiving the second portion of the first text enables the electronic device to reduce the number of characters in the message when it is clear that the first text is associated with the contact by being displayed with the visual characteristic having the third value, which simplifies the interaction between the user and the electronic device and enhances the operability of the electronic device and makes the user-device interface more efficient (e.g., by reducing the inputs needed to view the entire message), which additionally reduces power usage and improves battery life of the electronic device by enabling the user to use the electronic device more quickly and efficiently.

In some embodiments, the respective contact is associated with a contact card including a first name, last name, and/or nickname associated with the contact. The first text optionally corresponds to any one of the first name, last name, or nickname associated with the contact.

In some embodiments, such as in FIG. 10DD, the respective contact is identified by the first text 1026*c* in combination with second text on the electronic device 500, and the entered first text 1026*c* is not accompanied by the second text (e.g., the contact's full name that is stored in the contact information of the electronic device is "Bob Smith", but the entered first text is only "Bob" without "Smith", or vice versa). In some embodiments, such as in FIG. 10DD, after receiving the second portion of the first text 1026*c*, and in accordance with the determination that the first text 1026*c* corresponds to the respective contact (e.g., the first text matches a name or part of a name corresponding to the respective contact in the messaging conversation), in accordance with the determination that the input associating the first text with the respective contact has been received, the electronic device 500 displays the first text 1026*c* with the visual characteristic having the third value without adding the second text to the messaging user interface. In some embodiments, when the electronic device associates the first text with the contact, the electronic device does not change the first text. For example, if Alexander enters the message "Hi Bernadette," the text "Bernadette" is displayed with the visual characteristic having the third value and is associated with Bernadette's user account and the electronic device does not append any additional characters to the text "Bernadette", such as an "@" symbol or Bernadette's last name that is optionally stored in the contact information for Bernadette. The above-described manner of displaying the first text with the visual characteristic having the third value without adding second text to the messaging user interface enables the electronic device to maintain what is entered by the user, which simplifies the interaction between the user and the electronic device and enhances the operability of the electronic device and makes the user-device interface more efficient (e.g., by avoiding changes to the user interface that might result in errors in user-device interaction), which additionally reduces power usage and improves battery life of the electronic device by enabling the user to use the electronic device more quickly and efficiently.

In some embodiments, displaying the first text with the visual characteristic having the third value includes displaying the first text with bold typeface (e.g., and displaying the first text with the visual characteristic having the first value does not include displaying the first text with bold typeface). The electronic device optionally displays the first text with bold typeface once the message including the first text has been sent to the messaging conversation. In some embodiments, an electronic device other than the first electronic device that has access to the conversation also displays the first text in bold typeface.

In some embodiments, in response to detecting selection of text associated with a contact, the electronic device displays a contact card user interface including contact information associated with the contact.

In some embodiments, such as in FIG. 10II, while the conversation is in a mode during which indications of messaging activity in the conversation will not cause presentation of a notification of the messaging activity at the electronic device 500 (e.g., the user of the electronic device has activated a setting that suppresses notifications associated with the conversation (e.g., the user "mutes" the conversation)), the electronic device 500 receives an indication 1006*ii* that respective messaging activity has been added to the conversation. In some embodiments, in response to receiving the indication that the respective messaging activity has been added to the conversation, in accordance with a determination that the respective messaging activity is not associated with text that has been associated with a user of the electronic device, such as in FIG. 10II, forgoing presenting a respective notification of the respective messaging activity at the electronic device. For example, a user activates a setting to suppress notifications associated with a respective messaging conversation and, in response to receiving an indication of a message in the respective messaging conversation that does not include text associated with the user's user account (e.g., the other user has not linked any portion of the text in that user's message with the contact information of the user of the electronic device), the electronic device forgoes presenting a notification of the message because the setting to suppress notifications is activated. In some embodiments, such as in FIG. 10JJ, in accordance with a determination that the respective messaging activity is associated with text that has been associated with the user of the electronic device, the electronic device 500 presents the respective notification 1002*b* of the respective messaging activity at the electronic device. For example, the user activates the setting to suppress notifications associated with the respective messaging conversation and, in response to receiving an indication of a message in the respective messaging conversation that includes text associated with the user's user account (e.g., the other user has linked a portion of the text in that user's message with the contact information of the user of the electronic device), the electronic device presents a notification of the message even though the setting to suppress notifications is activated because the message includes the text associated with the user's user account. In some embodiments, the electronic device has a setting that will prevent the electronic device from presenting notifications of messaging activity in conversations for which the user has activated the setting to suppress notifications even if the messaging activity includes a mention of the user. The above-described manner of presenting the respective notification of the messaging activity in accordance with the determination that the respective messaging activity is associated with text that has been associated with the user of the electronic device while the mode during which indications of messaging activity in the conversation will not cause presentation of the notification enables the electronic device to suppress notifications of messages that are likely not relevant to the user and present notifications of messages that are likely relevant to the user, which simplifies the interaction between the user and the electronic device and enhances the operability of the electronic device and makes the user-device interface more efficient (e.g., by reducing the number of notifications to be presented), which additionally reduces power usage and improves battery life of the electronic device by enabling the user to use the electronic device more quickly and efficiently.

In some embodiments, in accordance with a determination that a mode during which indications of messaging activity including text associated with the user of the electronic device in the messaging conversation will not cause presentation of a notification, the electronic device forgoes presenting notifications in response to receiving messages associated with text associated with the user of the electronic device. For example, if the user activates a setting that suppresses notifications in a conversation even if the messages include text associated with the user account of the user, the electronic device does not present any notifications of messages to the conversation even if the messages include text associated with the user's user account.

In some embodiments, such as in FIG. 10JJ, the electronic device 500 receives an indication 1006*jj* that respective messaging activity has been added to the conversation, wherein the messaging activity includes text that has been linked to a user of the electronic device (e.g., the text is associated with the user of the electronic device in a manner similar to the way in which text displayed with the visual characteristic having the third value is associated with a contact). In some embodiments, in response to receiving the indication 1006*jj* that the respective messaging activity has been added to the conversation, the electronic device 500 presents a respective notification of the respective messaging activity at the electronic device, wherein the respective notification includes a visual indication 1002*b* of the respective notification, the visual indication is displayed via the display generation component, and the visual indication is displayed while the messaging user interface is not displayed (e.g., the electronic device displays, via the display generation component, the visual indication of the respective notification in a user interface other than the messaging user interface, such as a notifications user interface or overlaid on any other user interface displayed by the electronic device). In some embodiments, while displaying the visual indication 1002*b* of the respective notification and not displaying the messaging user interface, the electronic device 500 receives, via the one or more input devices, input 1003 directed to the visual indication 1002*b* of the respective notification (e.g., the electronic device detects selection of a selectable option included in the visual indication of the notification or selection of the visual indication of the notification itself). In some embodiments, in response to receiving the input 603 directed to the visual indication of the respective notification, the electronic device 500 displays, via the display generation component, the messaging user interface, such as in FIG. 10MM, wherein the messaging user interface is navigated to display a representation 1008*g* of the respective messaging activity. In some embodiments, the electronic device displays the messaging conversation scrolled to a location of the message that includes the text associated with the user account of the user of the electronic device. In some embodiments, the electronic device receives an indication that other messaging activity not including text that has been linked to the user of the electronic device has been received. In some embodiments, in response to detecting selection of a notification of the other messaging activity, the electronic device displays the messaging conversation scrolled to the end of the messaging conversation. The above-described manner of displaying the messaging user interface navigated to display the representation of the respective messaging activity in response to detecting input directed to the visual indication of the respective notification enables the electronic device to efficiently present the message associated with the notification, which simplifies the interaction between the user and the electronic device and enhances the operability of the electronic device and makes the user-device interface more efficient (e.g., by reducing the number of inputs needed to view the message associated with the notification), which additionally reduces power usage and improves battery life of the electronic device by enabling the user to use the electronic device more quickly and efficiently.

In some embodiments, such as in FIG. 10T, the messaging user interface includes respective text 1008*a* that is associated with a respective user. In some embodiments, such as in FIG. 10T, in accordance with a determination that the respective user is a user of the electronic device, the respective text 1008*a* is displayed with a respective visual characteristic having a first respective value. In some embodiments, such as in FIG. 10T, in accordance with a determination that the respective user is a user of a second electronic device, different from the electronic device, the respective text 1005*a* is displayed with the respective visual characteristic having a second respective value, different from the first respective value. In some embodiments, text corresponding to a contact in a conversation that is not the user of the electronic device that is included in a message sent to the conversation is displayed with a visual characteristic with a respective value different from the value of the visual characteristic of text that is not associated with a contact. In some embodiments, text corresponding to the user of the electronic device that is included in a message in the conversation is displayed with the visual characteristic with the respective value and another respective visual characteristic with a respective value different from the value of the respective visual characteristic of text that is not associated with the user of the electronic device. For example, text not associated with a user is displayed in a first color (e.g., black) and not bold typeface, text associated with a user other than the user of the electronic device is displayed in bold typeface and the first color (e.g., black), and text associated with the user of the electronic device is displayed in a second color (e.g., blue) and bold typeface. The above-described manner of displaying the text associated with the user of the electronic device with the respective visual characteristic having the first respective value and displaying the text associated with a user of a second electronic device with the respective visual characteristic having the second respective value enables the electronic device to efficiently distinguish text associated with contacts from text not associated with contacts and also distinguish text associated with the user of the electronic device from text associated with other users, which simplifies the interaction between the user and the electronic device and enhances the operability of the electronic device and makes the user-device interface more efficient (e.g., by presenting the text in an easy to understand manner, thus reducing the time it takes the user to understand which text is associated with other contacts and which text is associated with them), which additionally reduces power usage and improves battery life of the electronic device by enabling the user to use the electronic device more quickly and efficiently.

In some embodiments, such as in FIG. 10X, while displaying the messaging user interface, the electronic device 500 receives, via the one or more input devices, a sequence of one or more inputs including an indication of entry, to the text entry field 1014, of second text that corresponds to a second respective contact that is not included in the conversation (e.g., the sequence of inputs includes entering the second text and an input associating the second text with the second respective contact, such as typing the "@" character before the name of the second respective contact, selecting the second text of the name of the second respective contact, or selecting a selectable option associated with the second respective contact that, when selected, causes the electronic device to associate the second text with the respective contact). In some embodiments, in response to receiving the sequence of one or more inputs, the electronic device 500 displays, in the text entry field 1014 of the messaging user interface, the second text 1024*c*. In some embodiments, the electronic device 500 displays, in the messaging user interface, a respective user interface corresponding to one or more contacts associated with the electronic device, wherein the user interface includes a selectable option that is selectable to initiate a process to add the second respective contact to the conversation. In some embodiments, the respective user interface includes representations of the contacts already in the messaging conversation and a representation of the second respective contact displayed in association with a selectable option that, when selected, causes the electronic device to initiate the process to add the respective contact to the conversation. In some embodiments, once the respective contact is added to the messaging conversation, the respective contact is given access to the messaging conversation and the user is able to associate the second text with the respective contact. In some embodiments, if the user does not add the second respective contact to the messaging conversation, the electronic device is not able to associate the second text with the second respective contact. The above-described manner of displaying the selectable option that is selectable to initiate the process to add the respective contact to the messaging conversation enables the electronic device to efficiently add a contact to the conversation in response to the user's request to associate the second text with the respective contact, which simplifies the interaction between the user and the electronic device and enhances the operability of the electronic device and makes the user-device interface more efficient (e.g., by reducing the number of inputs needed to add the contact to the messaging conversation in a situation in which the user is likely to wish to do so), which additionally reduces power usage and improves battery life of the electronic device by enabling the user to use the electronic device more quickly and efficiently.

In some embodiments, while the first text is associated with the respective contact, the electronic device 500 receives (1122), via the one or more input devices, an input corresponding to a request to transmit a respective message that includes the first text to the conversation (e.g., the electronic device detects selection of a selectable option to transmit the message to the other electronic devices in the messaging conversation after the first text has been designated as a mention). In some embodiments, in response to receiving the input corresponding to the request to transmit the respective message that includes the first text to the conversation, the electronic device 500 transmits (1124), to a second electronic device, a string that includes the first text, wherein the string is encoded with a communication identifier for the respective contact determined by the electronic device. In some embodiments, a string is an ordered list of characters (e.g., letters, numbers, symbols). In some embodiments, the communication identifier is a user account associated with the respective contact, such as a phone number, e-mail address, or other user name. In some embodiments, the string includes a predetermined sequence of characters before the first text and after the first text to encode that the first text is to be displayed as a mention, a string that instructs the second electronic device to make the text a mention, and the communication identifier associated with the user account to be associated with the mention. As such, because the communication identifier of the respective contact is encoded into the message string itself, any receiving devices (e.g., other devices in the messaging conversation) are able to retrieve the communication identifier from the message string itself, rather than having to rely on a matching of the first text (e.g., name of contact) with a contact in a contact database at the receiving device, which may be non-existent and/or may not correctly match with the name of the contact stored at the receiving device. In some embodiments, the communication identifier that the transmitting device encodes into the message is the communication identifier for the contact stored (e.g., in a contact directory) on the transmitting device or simply the communication identifier for that contact that is being used in the conversation, independent of whether the contact and/or the communication identifier of the contact is stored (e.g., in the contact directory) on the transmitting devices. The above-described manner of encoding the string with a communication identifier for the respective contact provides an efficient and unambiguous way of associating the first text with the respective user, which simplifies the interaction between the user and the electronic device and enhances the operability of the electronic device and makes the user-device interface more efficient (e.g., by reducing inputs needed to disambiguate the respective user with which the text is to be associated from another user with the same name as the respective user), which additionally reduces power usage and improves battery life of the electronic device by enabling the user to use the electronic device more quickly and efficiently.

In some embodiments, the electronic device 500 receives (1126), at the electronic device, a string that corresponds to a respective message, wherein the respective message includes respective text associated with a second respective contact, and the string is encoded with a communication identifier for the second respective contact. In some embodiments, a string is an ordered list of characters (e.g., letters, numbers, punctuation, symbols). In some embodiments, the encoding includes special characters (e.g., brackets such as { }, [ ], or other delimiters) before and/or after the respective text, a string corresponding to a function that instructs the electronic device to present the first text as a mention, and the communication identifier associated with the second respective contact. In some embodiments, the communication identifier is a user account, such as a phone number, E-mail address, or other user name. In some embodiments, if the electronic device 500 is not configured to present mentions in a messaging user interface (e.g., the electronic device 500 is not able to interpret the encoded mention), the electronic device 500 displays the text that was to be presented as a mention as plain text without displaying the communication identifier. The string optionally includes the rest of the text of the message that includes the mention. In some embodiments, in response to receiving the string, the electronic device 500 associates (1128) the respective text with a contact entry stored on the electronic device using the communication identifier for the second respective contact. In some embodiments, the electronic device associates the respective text with the contact entry stored on the electronic device using the communication identifier for the second respective text independent of whether the contact entry stored on the electronic device associates the respective text with the communication identifier for the second respective contact. In some embodiments, the electronic device from which the string was received associates the second respective contact with name(s) that are different from the name(s) with which the electronic device associates the second respective contact. The electronic device is optionally able to match the communication identifier in the string to the contact information of the second respective contact. For example, the electronic device receives a message including a mention associated with the contact Bernadette where "Mom" (e.g., the respective text included in the message, which is encoded with the communication identifier of Bernadette, Bernadette@123.com) is presented as a mention associated with Bernadette. In this example, although the electronic device does not include the name "Mom" associated with the contact Bernadette in a contact directory of the electronic device (e.g., in the contact directory of the electronic device, the name "Bernadette" is optionally associated with the communication identifier Bernadette@123.com—the name "mom" is optionally not associated with the communication identifier Bernadette@123.com), the electronic device matches the communication identifier associated with Bernadette and encoded with the text "Mom" (e.g., Bernadette@123.com) to its contact directory, and presents the text "Mom" as a mention of Bernadette, properly linked to Bernadette using the communication identifier that was encoded in the received message. In some embodiments, the electronic device does not utilize its own contact directory at all in identifying a contact associated with the mention, and instead utilizes the communication identifier encoded in the mention string as the communication identifier associated with the mention, and utilizes the respective text of the mention string as the name of the contact—as such, in some embodiments, the contact associated with the mention need not be stored in the contact directory of the electronic device. The above-described manner of associating the respective text with a contact entry independent of whether the contact entry at the electronic device associates the respective text with the communication identifier provides an efficient way of correctly associating mentions with contacts, which simplifies the interaction between the user and the electronic device and enhances the operability of the electronic device and makes the user-device interface more efficient (e.g., by reducing inputs needed to match contacts to mentions), which additionally reduces power usage and improves battery life of the electronic device by enabling the user to use the electronic device more quickly and efficiently.

In some embodiments, such as in FIG. 10PPP, the input associating the first text 1090*a* with the respective contact is a first input of a first type (e.g., space) received while the predefined character is displayed with the first text in the text entry field 1014 (e.g., the electronic device detects entry of the predefined character, followed by the first text, followed by the first input of the first type. For example, the electronic device detects entry of "@Bernadette" followed by a space bar and displays the text "Bernadette" as a mention associated with the contact Bernadette). In some embodiments, such as in FIG. 10RRR, while the first text 1090*b* is associated with the respective contact and after removing display of the predefined character from the messaging user interface, the electronic device 500 receives, via the one or more input devices, a deletion input directed to the text entry field 1014. For example, the electronic device optionally detects selection of an option to delete a character immediately adjacent to an insertion marker in a text entry field toward which input composing a message is detected. In some embodiments, such as in FIG. 10SSS, in response to receiving the deletion input directed to the text entry field 1014, the electronic device 500 dissociates the first text 1090*a* from the respective contact. In some embodiments, the electronic device displays the predetermined character and the first text with the same appearance as other text that is not a mention and, if the user were to send the message, the predetermined character and first text would be sent as plain text, instead of as a mention. In some embodiments, such as in FIG. 10SSS, the electronic device 500 redisplays the predefined character with at least a respective portion of the first text 1090*a* in the text entry field 1014. In some embodiments, the electronic device forgoes deleting a character of the first text in response to a single deletion input and dissociates the first text from the contact. In some embodiments, the electronic device detects an input for deleting multiple characters and, in response to the input, deletes one or more characters of the first text and dissociates the first text from the contact. In some embodiments, the electronic device redisplays the "@" symbol at the head of the respective portion of the first text. In some embodiments, such as in FIG. 10SSS, after dissociating the first text 1090*a* with the respective contact, and while displaying the predefined character with the first text 1090*a* in the text entry field 1014 (e.g., the deletion input did not delete any characters from the first text, or the deletion input did delete characters from the first text, but subsequent text input was provided to reenter the deleted characters from the first text), the electronic device 500 receives, via the one or more inputs, a second input of the first type. While displaying the first text and the predetermined character (e.g., "@Bernadette"), the electronic device receives an input adding a space after the first text. In some embodiments, if the first text had not previously been associated with the contact, the electronic device associates the first text with the contact in response to detecting entry of the space. In some embodiments, such as in FIG. 10TTT, in response to receiving the second input of the first type, the electronic device 500 updates a content of the text entry field 1014 in accordance with the second input of the first type without associating the first text 1090*a* with the respective contact and without removing display of the predefined character from the text entry field 1014. In some embodiments, once the association with the first contact has been removed from the first text and the predefined character, the electronic device does not associate the first text with the respective contact in response to the first input. In some embodiments, in response to detecting one or more inputs to delete the entire first text and the predefined character followed by re-entry for the predefined character, first text, and first input, the electronic device presents the first text as a mention. The above-described manner of forgoing associating the first text with the respective contact in response to the input of the first type after the first text was previously dissociated with the respective contact provides an efficient way of removing and maintaining removal of the association with the respective contact from the first text, which simplifies the interaction between the user and the electronic device and enhances the operability of the electronic device and makes the user-device interface more efficient (e.g., by reducing inputs needed to correct accidentally associating the first text with the contact again), which additionally reduces power usage and improves battery life of the electronic device by enabling the user to use the electronic device more quickly and efficiently.

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, and 1500) are also applicable in an analogous manner to method 1100 described above with respect to FIGS. 11A-11B. For example, the ways of creating and presenting mentions described above with reference to method 1100 optionally have one or more of the characteristics of the ways of presenting representations of messaging conversations, presenting indications of messages that are replies to other messages, and creating and presenting mentions, etc., described herein with reference to other methods described herein (e.g., methods 700, 900, 1300, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11B are, optionally, implemented by components depicted in FIGS. 1A-1B. For example, displaying operation 1102 and receiving operation 1104 are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Presenting Indications of Reply Messages

Users interact with electronic devices in many different manners, including using an electronic device to display representations of messages in a messaging conversation. The embodiments described below provide ways in which an electronic device presents indications of messages that are replies to other messages. Presenting the indications of messages that are replies to other messages in the ways described herein enhances interactions with a device such as by reducing the time and inputs it takes to view the messages in a reply conversation, thus reducing the amount of time needed by a user to perform operations, thus reducing the power usage of the device, which increases battery life for battery-powered devices. It is understood that people use devices. When a person uses a device, that person is optionally referred to as a user of the device.

Figure 12B:
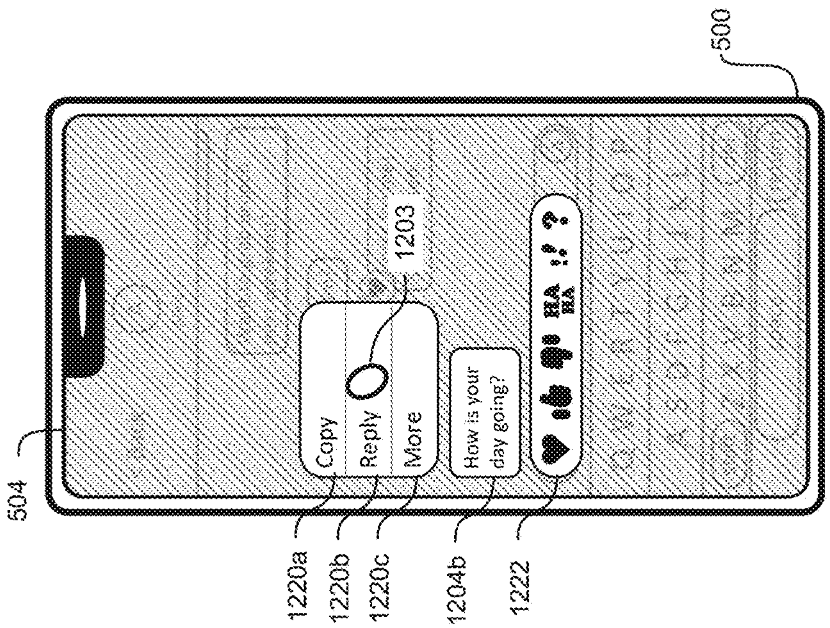
FIGS. 12A-12Y illustrate various ways an electronic device presents indications of messages that are replies to other messages according to some embodiments.
Figure 12A:
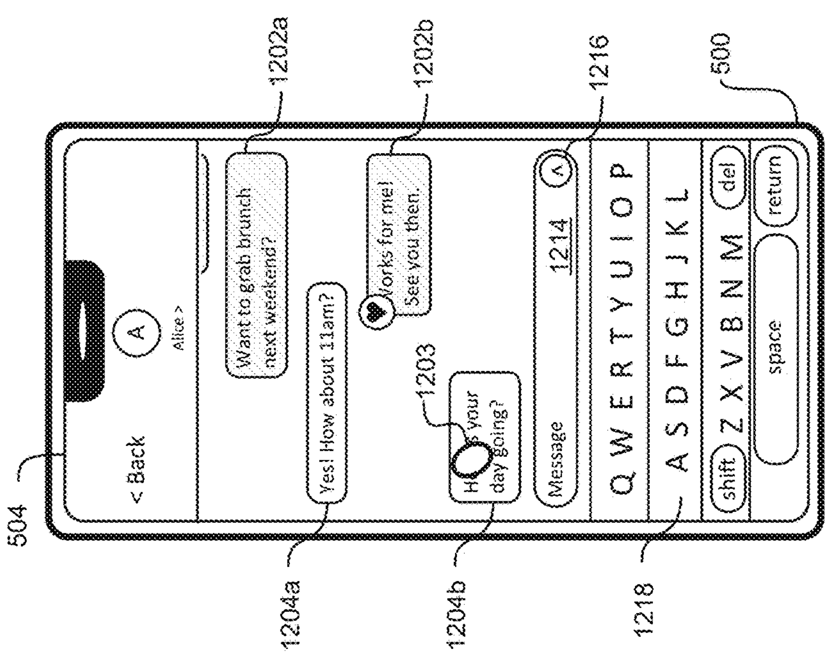
Figure 12D:
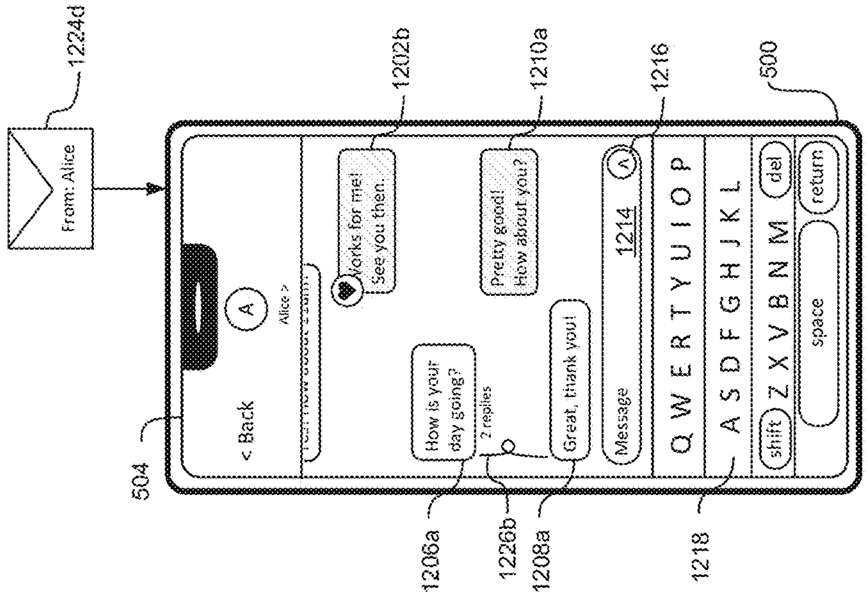
Figure 12C:
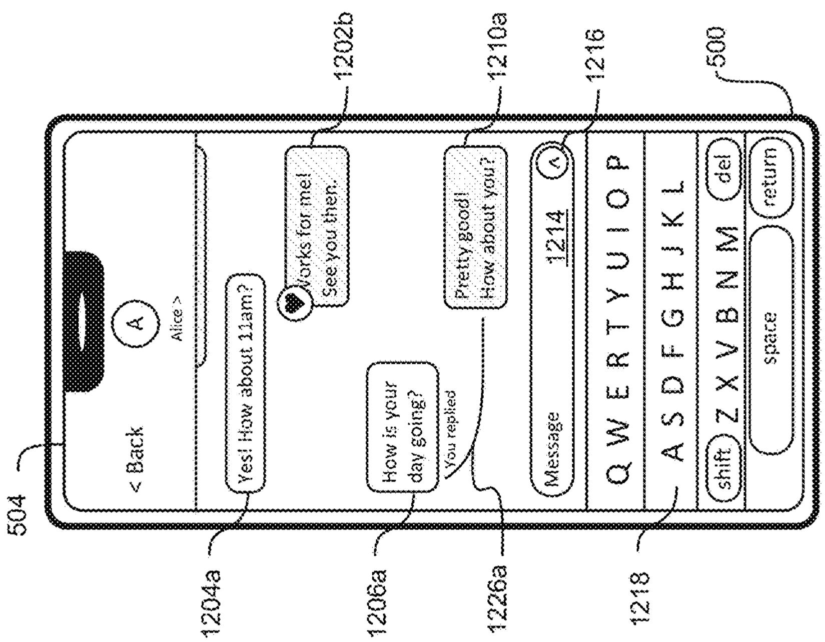
Figure 12E:
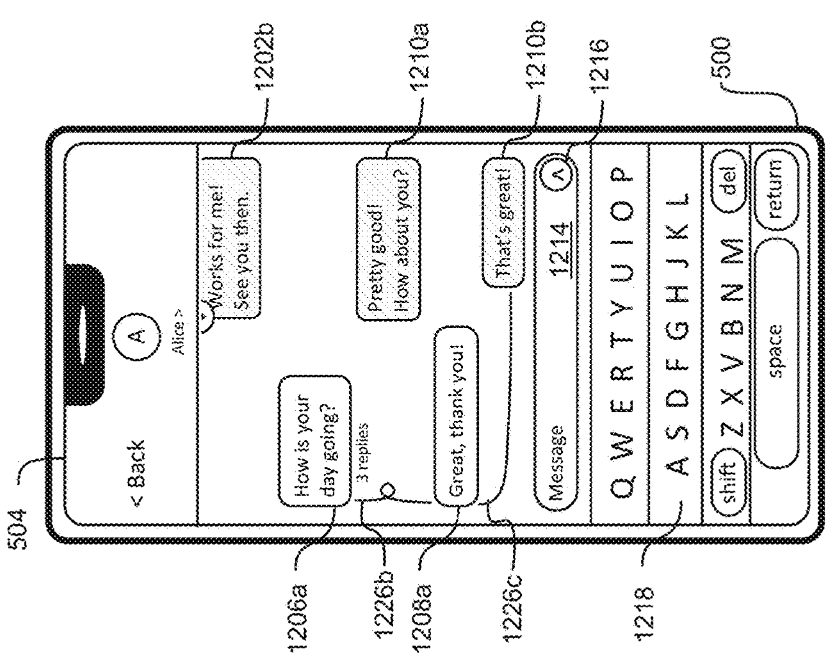
Figure 12F:
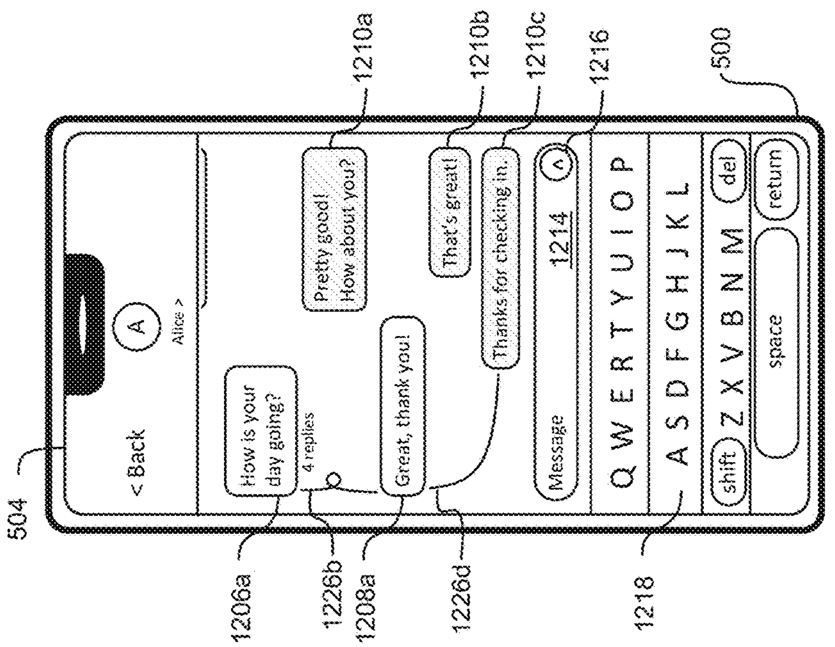
Figure 12H:
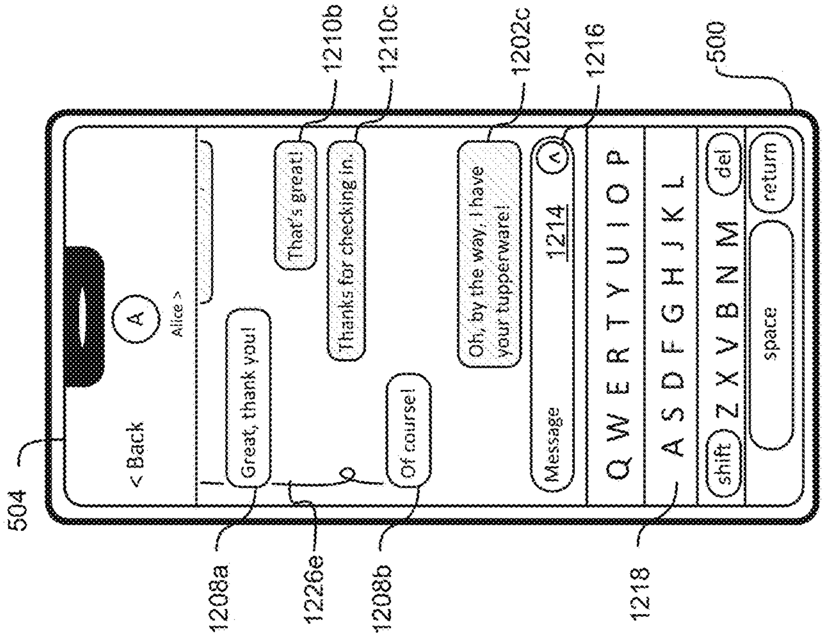
Figure 12G:
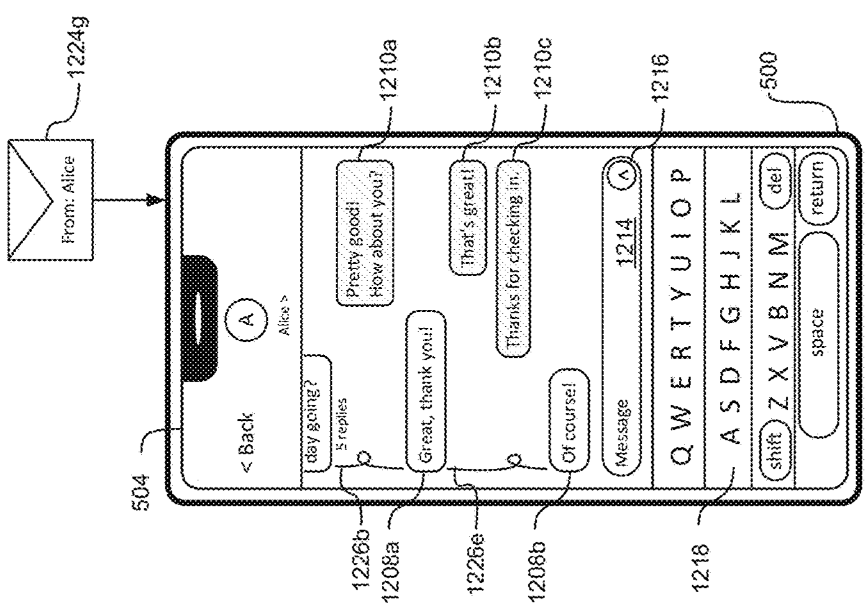
Figure 12J:
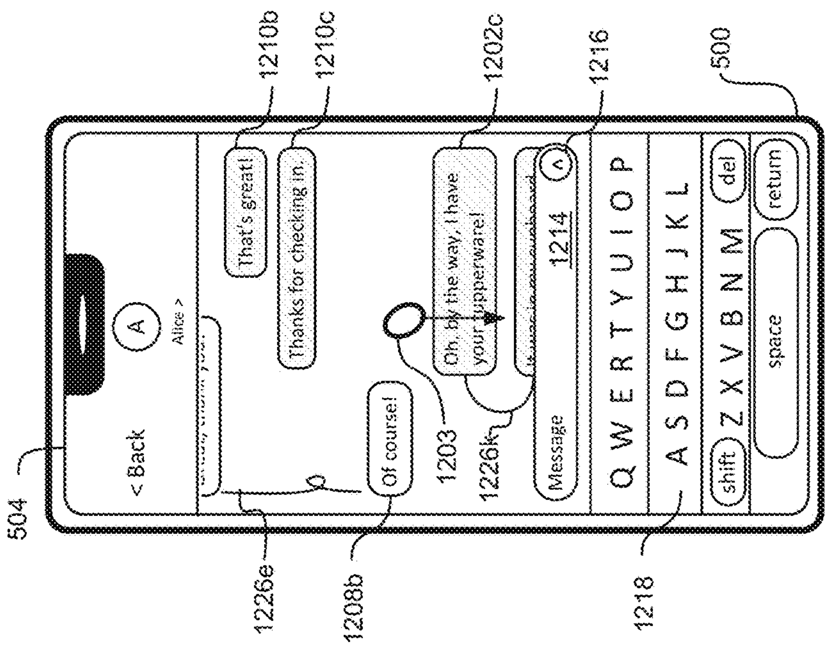
Figure 12I:
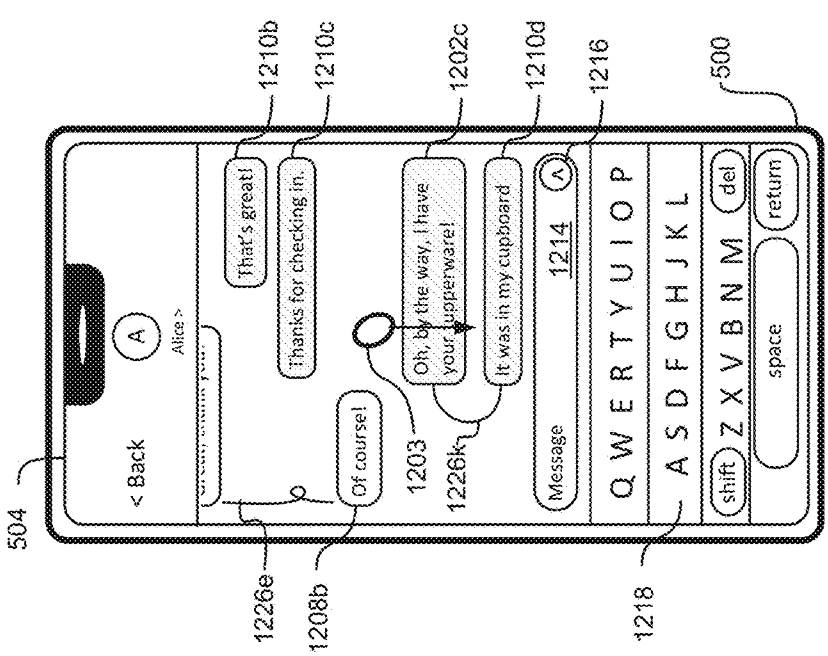
Figure 12L:
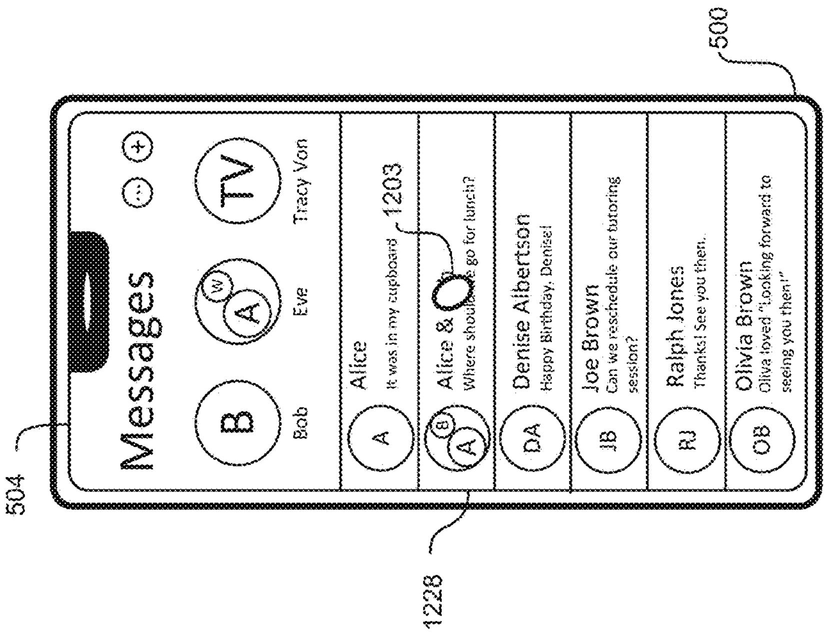
Figure 12K:
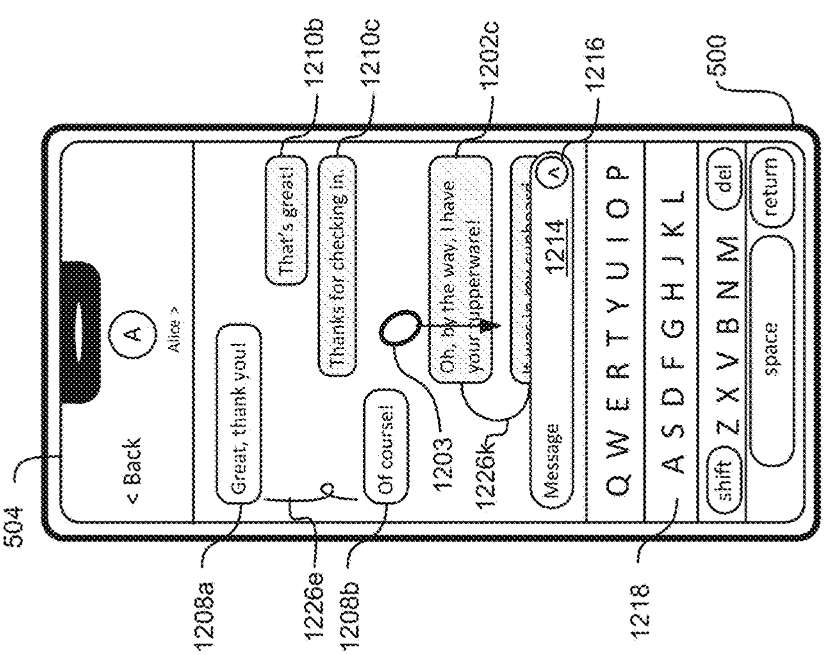
Figure 12M:
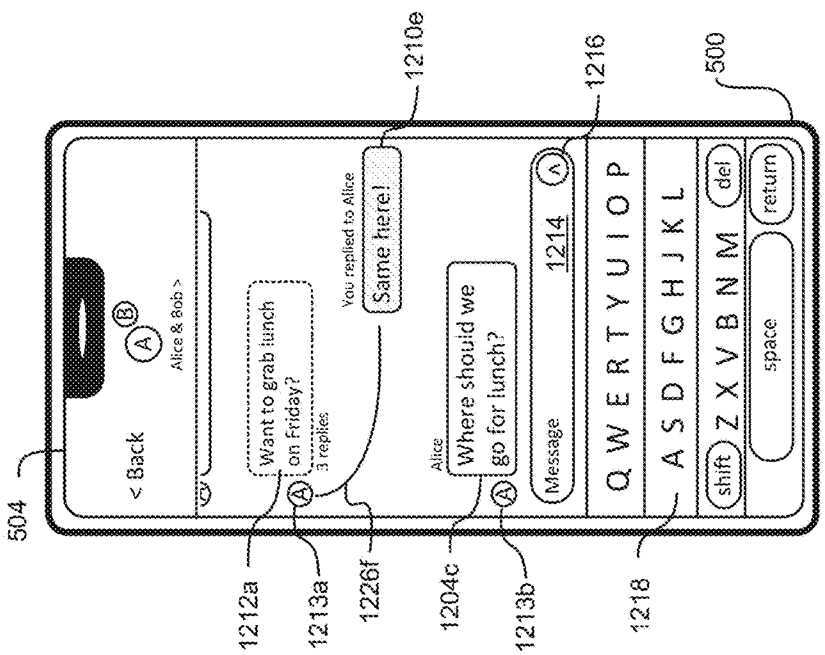
Figure 12N:
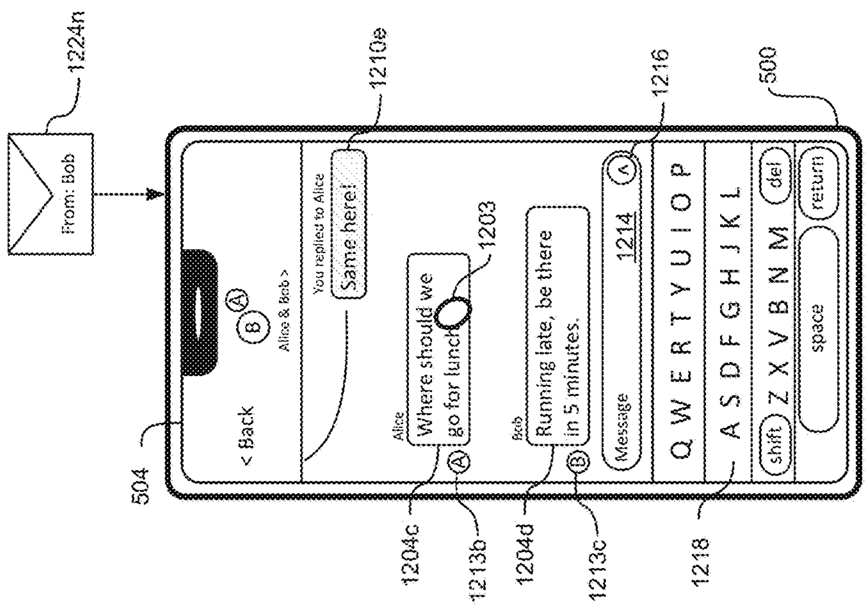
Figure 12P:
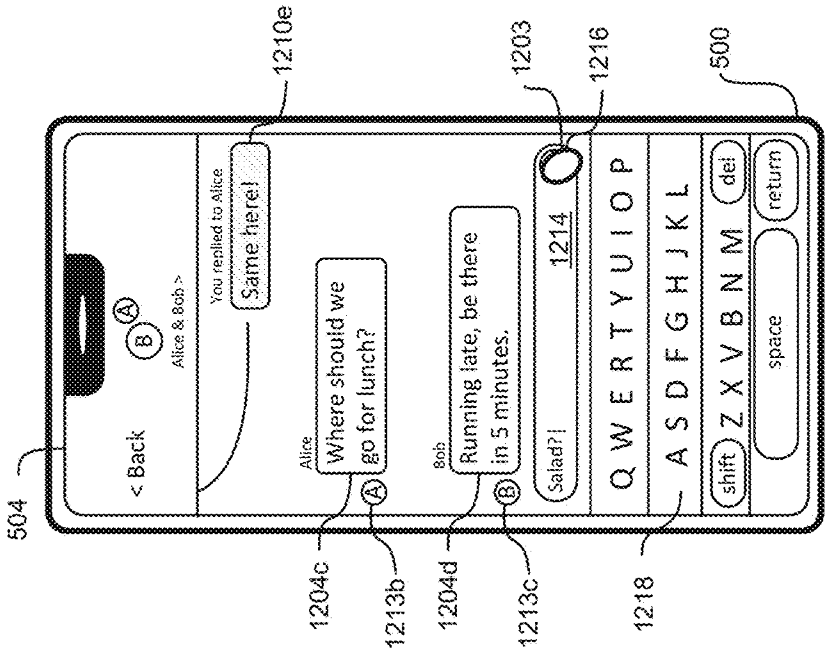
Figure 12O:
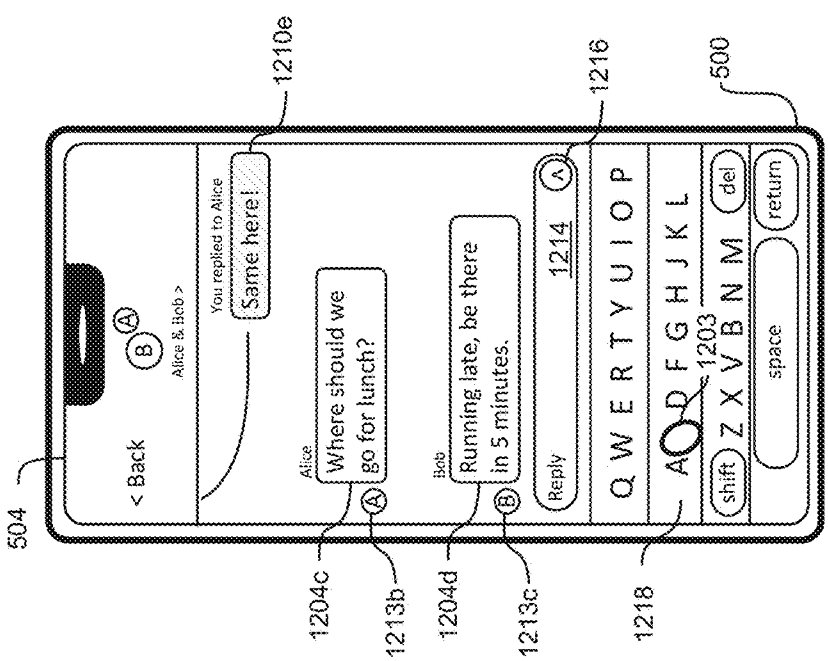
Figure 12R:
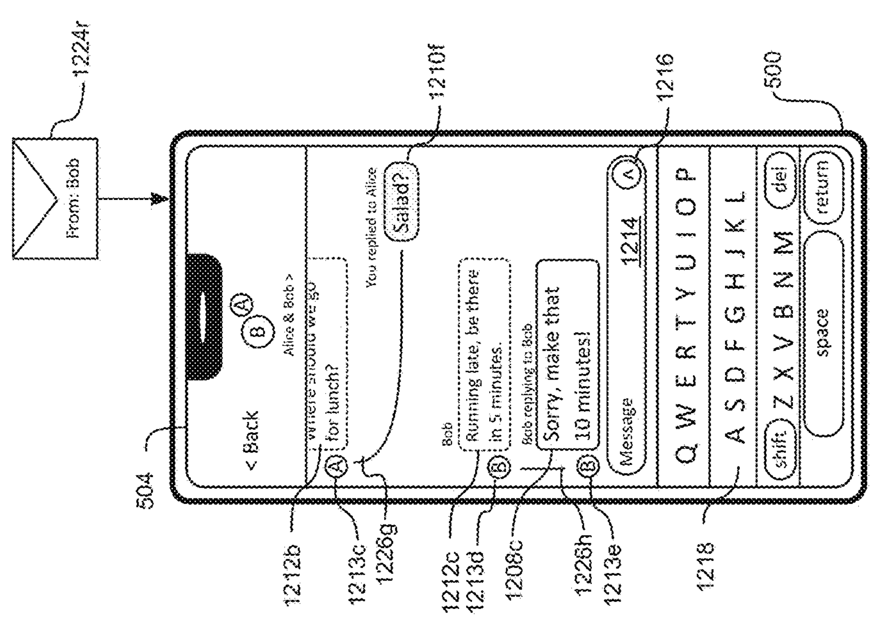
Figure 12Q:
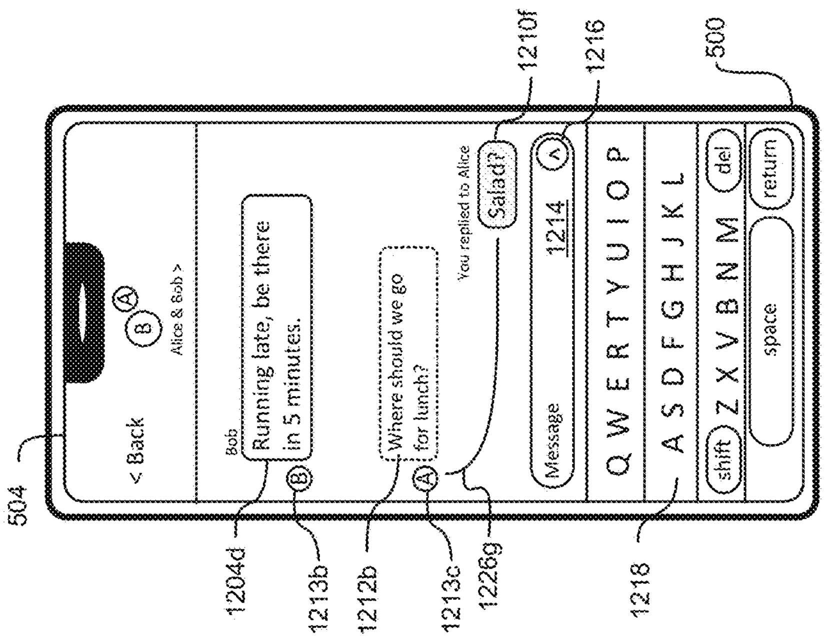
Figure 12T:
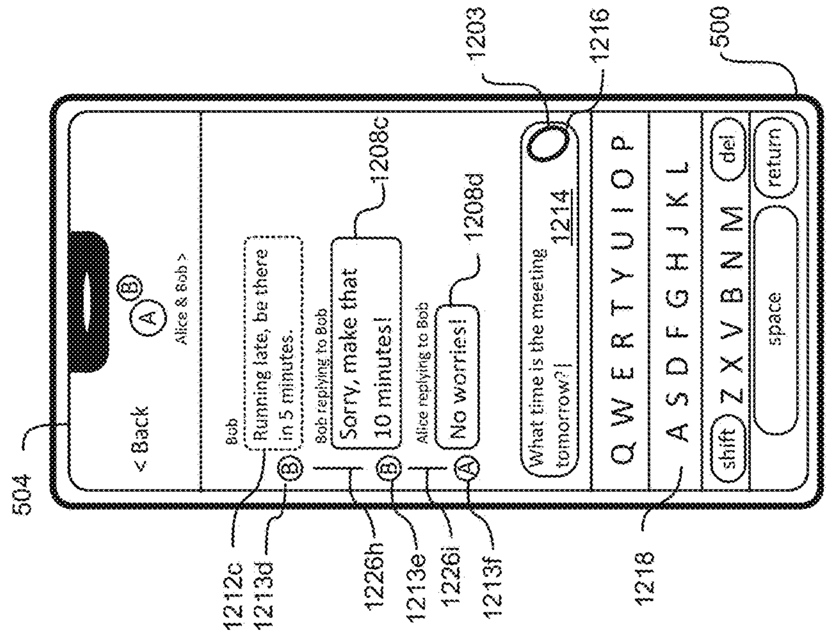
Figure 12S:
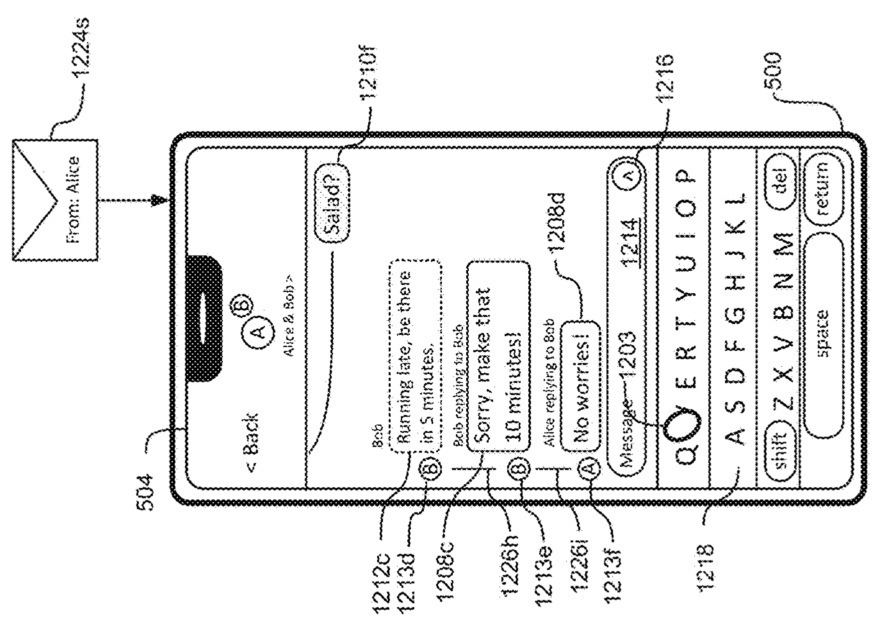
Figure 12V:
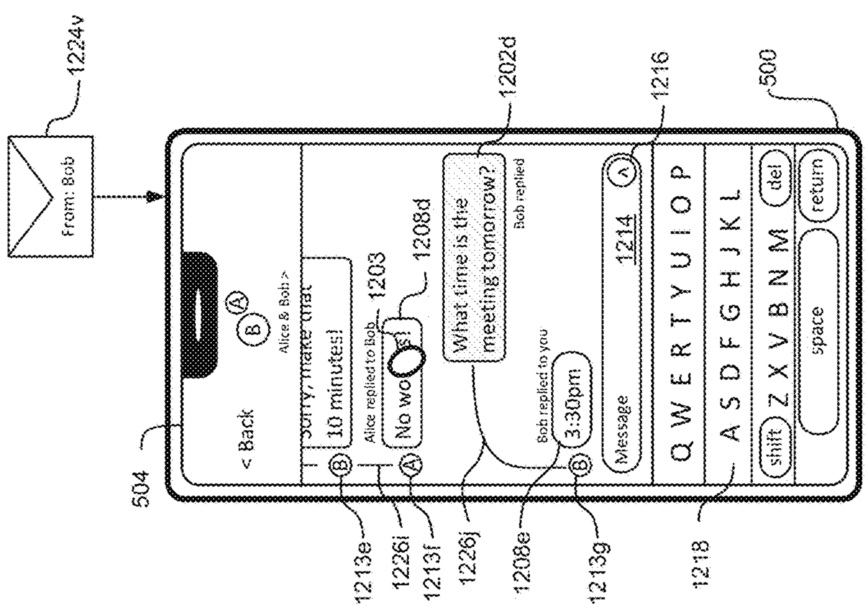
Figure 12U:
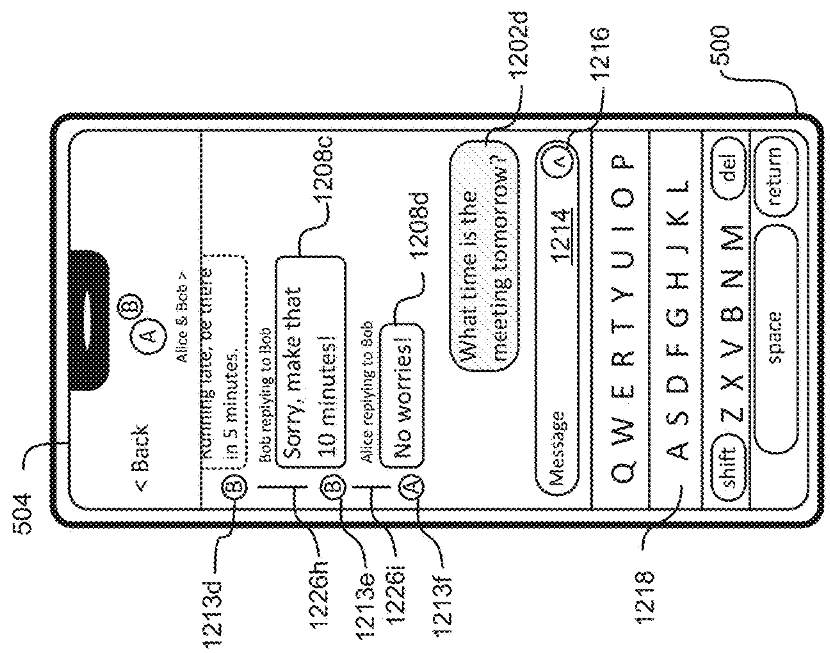
Figure 12X:
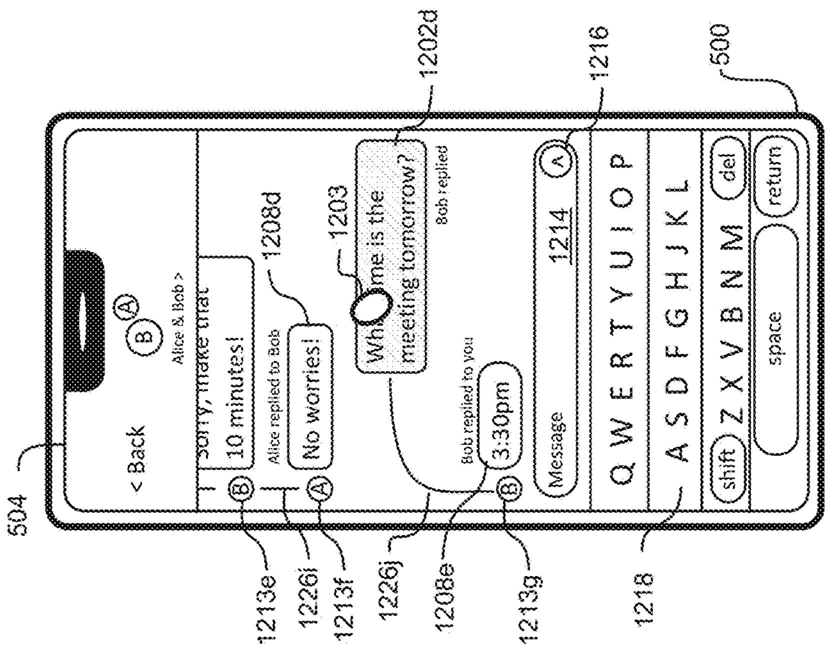
Figure 12W:
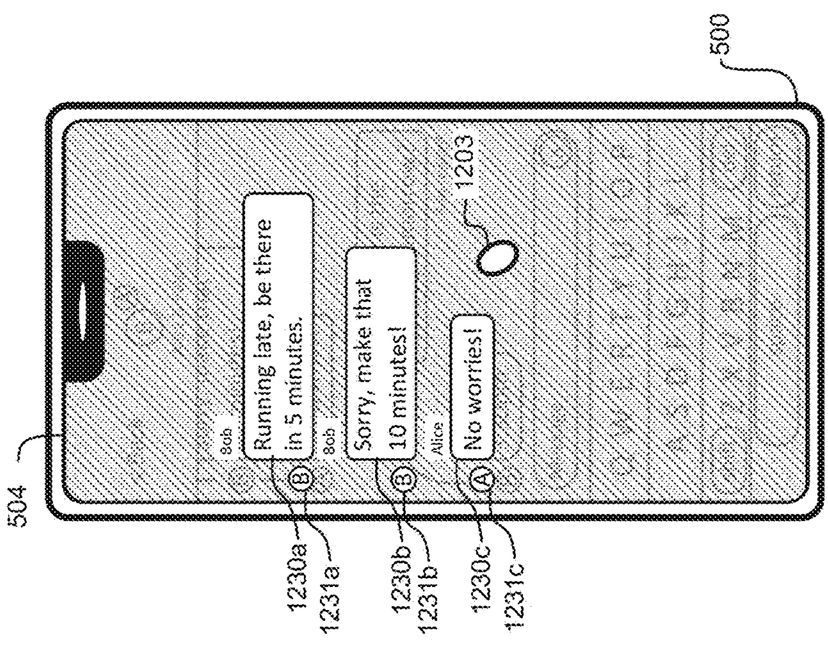
Figure 12Y:
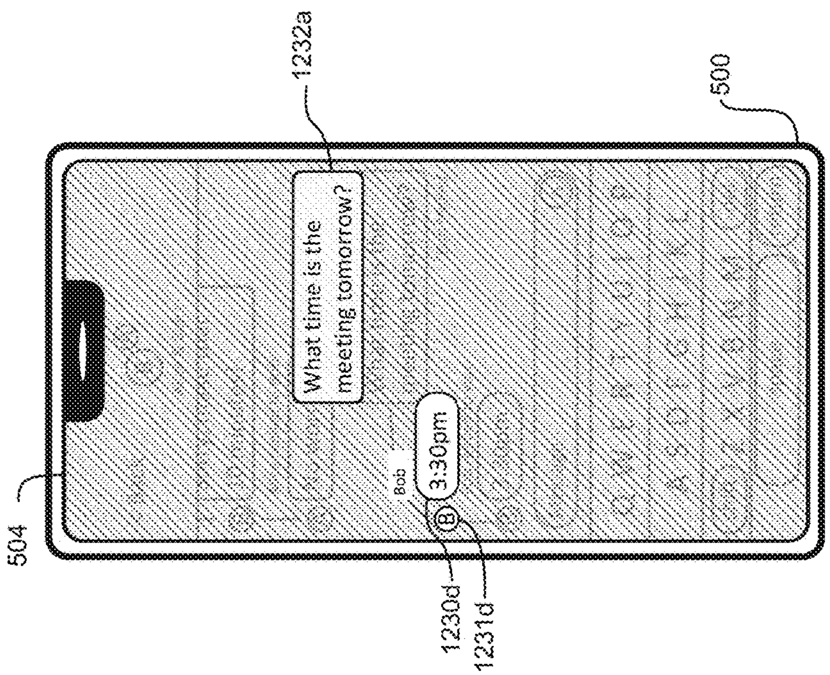

FIGS. 12A-12Y illustrate exemplary ways in which the electronic device 500 displays representations of reply messages in association with one another in accordance with some embodiments. The embodiments in FIGS. 12A-12Y are used to illustrate the processes described below, including the processes described with reference to FIG. 13. Although FIGS. 12A-12Y illustrate various examples of ways an electronic device is able to perform the processes described below with reference to FIG. 13, it should be understood that these examples are not meant to be limiting, and the electronic device is able to perform one or more processes described below with reference to FIG. 13 in ways not expressly described with reference to FIGS. 12A-12Y.

In FIG. 12A, in some embodiments, the electronic device 500 displays a messaging conversation. In some embodiments, the messaging conversation is displayed in response to detecting selection of one of the representations of a messaging conversation described above with reference to FIGS. 6A-7 or in response to detection selection of an indication of a notification described above with reference to FIGS. 10A-10TTT and 11A-11B. In some embodiments, the messaging conversation includes one or more features described above with reference to FIGS. 8A-11.

In the example of FIG. 12A, the messaging conversation optionally includes representations 1202*a* and 1202*b* of messages that were sent by the user of the electronic device 500 and representations 1204*a* and 1204*b* of messages sent by the other user in the conversation. In the example of FIG. 12A, the messaging conversation includes the user of the electronic device 500 and one contact named "Alice." In some embodiments, representations of messages sent by the user of the electronic device 500 are displayed on a first side of the user interface (e.g., the right side) and representations of messages from Alice are displayed on the other side of the user interface (e.g., the left side) to differentiate who sent each message. Also, as shown in FIG. 12A, in some embodiments, representations 1202*a* and 1202*b* of messages sent by the user are displayed in a different color (e.g., blue, green, etc.) illustrated here with shading than the color (e.g., black, white, grey, etc.) of representations 1204*a* and 1204*b* of messages sent by the other user in the conversation. As shown in FIG. 12A, in some embodiments, the user selects (e.g., with contact 1203) the representation 1204*b* of one of the messages sent by the other user in the conversation. In some embodiments, the selection is a tap; in some embodiments, the selection is a long press (e.g., tap for longer than a time threshold, such as 0.5 seconds, 1 second, 2 seconds), in some embodiments, the selection is a double-tap (e.g., two taps received with less than a threshold amount of time (e.g., 0.5 seconds, 1 second, 2 seconds) between liftoff of the first tap and touchdown of the second tap).

As shown in FIG. 12B, in some embodiments, in response to the user's selection in FIG. 12A, the electronic device 500 displays the representation 1204*b* of the message selected by the user on a blurred background. The electronic device 500 optionally displays a plurality of options 1220*a*-*c* that, when selected, cause the electronic device 500 to perform an action with the message associated with representation 1204*b* and a plurality of options 1222 that, when selected, cause the electronic device 500 to add a selected tag to the message associated with representation 1204*b* in a manner similar to the manner described above with reference to FIGS. 8L-8M. As shown in FIG. 12B, in some embodiments, the user selects (e.g., with contact 1203) the option 1220*b* to reply to the message associated with representation 1204*b*. In response to the user's selection, in some embodiments, the electronic device 500 initiates a process to create a message that is a reply to the message corresponding to representation 1204*b*. In some embodiments, initiating a process to create a message that is a reply to the message corresponding to representation 1204*b* includes presenting a soft keyboard or other input mechanism by which the user is able to compose a message. In some embodiments, the electronic device 500 displays the messaging user interface illustrated in FIG. 12A while displaying the soft keyboard. In some embodiments, the electronic device 500 displays the soft keyboard and one or more other selectable options for composing a message in a replies user interface that includes representation 1204*b* without including representations of the other messages as described above with reference to FIGS. 8A-9.

FIG. 12C illustrates the messaging user interface after the user composed the message that is a reply to the message corresponding to representation 1206*a* (the same message as the message corresponding to representation 1204*b* illustrated in FIGS. 12A-12B) as an example. The message composed by the user is optionally represented by representation 1210*a* on the right side of the user interface. Representation 1210*a* is optionally displayed with a line 1226*a* connecting representation 1210*a* to representation 1206*a*. Because no other messages were received between the message corresponding to representation 1206*a* and the message corresponding to representation 1210*a*, in some embodiments, the electronic device 500 displays representation 1210*a* in association with representation 1206*a* rather than displaying an additional representation of the message corresponding to representation 1206*a* (e.g., such as described with reference to FIGS. 8B, 8H, 8K, 8P, 8S, and 8W).

As illustrated in FIG. 12D, in some embodiments, the electronic device 500 receives an indication 1224*d* of a message sent by the other user in the conversation (e.g., Alice). In response to indication 1224*d*, in some embodiments, the electronic device 500 displays a representation 1208*a* of the message on the left side of the user interface, which is also a reply to the message corresponding to representation 1206*a*. Representation 1208*a* is optionally connected to representation 1206*a* by looped line 1226*b*. The loop of looped line 1226*b* is optionally aligned with the representation 1210*a* of the reply message sent by the user. The looped line 1226*b* optionally indicates that the message associated with representation 1210*a* and the message associated with the representation 1208*a*—even though they are displayed on different sides of the user interface because they were sent by different users—are both replies to the message associated with the representation 1206*a*. In some embodiments, instead of displaying a looped line 1226*b*, the electronic device 500 presents a different indication that the messages corresponding to representations 1206*a*, 1210*a*, and 1208*a* are part of the same reply thread, such as displaying a curved line connecting representations 1206*a* and 1210*a* and a curved line connecting representations 1210*a* and 1208*a*.

FIG. 12E illustrates the messaging user interface after another message has been sent by the user of device 500 in accordance with some embodiments. In response to the user sending the message, the electronic device 500 optionally displays representation 1210*b* of the message on the right side of the user interface. The message associated with representation 1210*b* is also a reply to the message associated with the representation 1206*a*, for example, so representation 1210*b* is displayed connected to representation 1208*a* (which represents a message that is also a reply to the message associated with representation 1206*a*) by curved line 1226*c*.

FIG. 12F illustrates the messaging user interface after another message has been sent by the user of device 500. In response to detecting the user's inputs composing and sending the message, in some embodiments, the electronic device 500 displays a representation 1210*c* of the message sent by the user on the right side of the user interface. The message associated with representation 1210*c* is optionally a reply to the message associated with representation 1206*a* and is displayed connected to representation 1208*a* (which represents a message that is also a reply to the message associated with representation 1206*a*) by curved line 1226*d*. Although representation 1210*b* is no longer displayed connected to representation 1206*a* or to a representation of another message that is a reply to the message associated with representation 1206*a*, the message associated with representation 1210*b* is indicated to be a reply to the message associated with representation 1206*a* because it is horizontally aligned with part of line 1226*d* in some embodiments. In some embodiments, representations 1208*a*, 1210*b*, and 1210*c* are displayed in the manner illustrated in FIG. 12F (e.g., with curved line 1226*d* connecting representation 1208*a* and representation 1210*c*) because the messages corresponding to representations 1208*a*, 1210*b*, and 1210*c* are all replies to the message corresponding to representation 1206*a* and there are no messages between the messages corresponding to representations 1208*a* and 1210*c* that are not replies to the message corresponding to representation 1206*a*.

In FIG. 12G, in some embodiments, the electronic device 500 receives indication 1224*g* of another message sent by the other user in the conversation (e.g., Alice). In response to indication 1224*g*, the electronic device 500 optionally displays representation 1208*b* of the received message on the side of the user interface associated with messages from users other than the user of the electronic device 500 (e.g., the left side). The received message is optionally a reply to the same message to which the message associated with representation 1208*a* is a reply, so representation 1208*b* is connected to representation 1208*a* by looped line 1226*e* in a manner similar to the way looped line 1226*b* is described above with reference to FIG. 12D. The loop of looped line 1226*e* is optionally horizontally aligned with representation 1210*c*, because representation 1210*c* optionally corresponds to the most recent message sent by the user of device 500 between the messages corresponding to representations 1208*a* and 1208*b*.

In FIG. 12H, the electronic device 500 optionally displays a representation 1202*c* of another message sent by the user of electronic device 500 on the side of the user interface associated with messages from the user of electronic device 500 (e.g., the right side). The message associated with representation 1202*c* is optionally not a reply to an existing message in the conversation, so representation 1202*c* is optionally displayed without a curved line connecting the representation 1202*c* to a representation of another message. In some embodiments, the distance between representations that are not in the same reply conversation is greater than the distance between representations that are in the same reply conversation. For example, as shown in FIG. 12H, there is more space between representations 1202*c* and 1208*b* than there is between representations 1208*a*, 1210*b*, 1210*c*, and 1208*b*.

FIG. 12I illustrates the messaging user interface after the user of device 500 adds another message that is a reply to the message associated with representation 1202*c*, for example. The new message is optionally represented by representation 1210*d* displayed on the side of the user interface associated with messages from the user of the electronic device 500 (e.g., the right side). Because the message associated with representation 1210*d* is a reply to the message represented by representation 1202*c*, the electronic device 500 displays representation 1210*d* connected to representation 1202*c* by curved line 1226*k*. In some embodiments, lines connecting messages that are in the same reply conversation (e.g., lines 1226*a-k* described in FIGS. 12A-12I) are connected to representations of messages on the left sides of the representations of the messages regardless of which side of the user interface (e.g., whether the message is from user of the electronic device 500 or from a different user) on which the representation is displayed. As shown in FIG. 12I, in some embodiments, the user swipes the user interface with contact 1203 to scroll the user interface.

FIG. 12J illustrates the user interface in response to the beginning of the swipe in accordance with some embodiments. Looped line 1226*e* optionally exhibits a stretching behavior (e.g., like a spring), illustrated here as representations 1208*b* and 1202*c* moving downward before representations 1210*b* and 1210*c* move. In some embodiments, looped line 1226*e* stretches as the swipe begins. FIG. 12K illustrates continuation of the swipe with contact 1203, for example. As shown in FIG. 12K, as the swipe input continues, in some embodiments, the looped line 1226*e* "bounces" back to its original length. In some embodiments, the looped line 1226*e* moves in a manner different from the manner described herein. In some embodiments, the looped line 1226*e* does not exhibit a bouncing or stretching behavior and is scrolled in the same way as the rest of the content in the user interface. In some embodiments, the way the looped line 1226*e* is scrolled is different from the rest of the content and different from the manner described here.

In FIG. 12L, in some embodiments, the user selects (e.g., with contact 1203) a representation 1228 of a group conversation in a messaging user interface including representations of multiple messaging conversations accessible to electronic device 500. The representations of the messaging conversations are optionally displayed in a manner similar to the manner described above with reference to FIGS. 6A-7.

In response to the user's selection in FIG. 12L, in some embodiments, the electronic device 500 displays the messaging conversation illustrated in FIG. 12M.

FIG. 12M illustrates a messaging conversation including a representation 1212*a* of a message to which the message represented by representation 1210*e* is a reply and a representation 1204*c* of an additional message that is not a reply message and to which no reply messages have been received. The messaging conversation illustrated in FIG. 12M can include the user of the electronic device 500 and two contacts named Alice and Bob. In some embodiments, representations (e.g., representation 1210*e*) of messages from the user of the electronic device 500 are displayed on a first side of the user interface (e.g., the right side) and representations of messages (e.g., representations 1212*a* and 1204*c*) from users other than the user of the electronic device 500 are displayed on a second side of the user interface (e.g., the left side).

In FIG. 12N, the electronic device 500 receives an indication 1224*n* of a message from another user in the conversation (e.g., Bob) in accordance with some embodiments. In response to indication 1224*n*, the electronic device 500 optionally displays representation 1204*d* of the received message on the side of the user interface associated with messages from users other than the user of the electronic device 500 (e.g., the left side), which is optionally not a reply to an existing message in the conversation. In FIG. 12N, in some embodiments, the user selects (e.g., with contact 1203) representation 1204*c* to initiate a process to reply to the message associated with representation 1204*c* in a manner similar to the manner described above with reference to FIG. 12B.

In FIG. 12O, in some embodiments, in response to a sequence of inputs including the input illustrated in FIG. 12N, the electronic device 500 updates the text entry field 1214 to indicate that one or more inputs directed to text entry field 1214 to compose a message will compose a message that is a reply to another message (e.g., the message associated with indication 1204*c* that was selected by the user in FIG. 12N). As shown in FIG. 12O, in some embodiments, the user selects (e.g., with contact 1203) a region of the soft keyboard 1218 to enter text of the message that is a reply to the message corresponding to representation 1204*c*.

In FIG. 12P, after the user has entered text into text entry field 1214, in some embodiments, the user selects (e.g., with contact 1203) an option 1216 to send the message to the messaging conversation. In response to the user's selection, in some embodiments, the electronic device 500 displays a representation 1210*f* of the message as shown in FIG. 12Q.

As shown in FIG. 12Q, in some embodiments, the representation 1210*f* of the message sent by the user is displayed connected to a representation 1212*b* of the message to which the user's message is a reply via curved line 1226*g*. In the example of FIG. 12Q, representation 1210*f* is displayed on the right side because it represents a message from the user of the electronic device and representation 1212*b* is displayed on the left side of the user interface because it represents a message from a user other than the user of the electronic device 500. Because the message associated with representation 1204*d* was received between receipt of the message to which the user replied and the user's message, the electronic device 500 optionally displays the additional indication 1212*b* of the message to which the user replied.

As illustrated herein, the curved lines connecting message representations including user avatars (e.g., representations of messages from users other than the user of electronic device 500 in group conversations) to representations of messages from the user of the electronic device 500 are displayed as connecting the avatar to the representation of the message from the user of the electronic device 500. For example, in FIG. 12Q, curved line 1226*g* connects avatar 1213*c* to representation 1210*f*. In some embodiments, the lines connecting messages in the same reply thread connect the representations of messages themselves (e.g., curved line 1226*g* connects to representation 1212*b* instead of to avatar 1213*c*). As will be described below with reference to FIG. 12R, in some embodiments, as illustrated herein, the lines connecting two representations of messages associated with avatars are displayed as connecting the avatars. In some embodiments, instead, the lines connect the representations themselves instead of connecting the avatars.

In FIG. 12R, the electronic device 500 optionally detects an indication 1224*r* of another message from another user (e.g., Bob) in the messaging conversation. In response to the indication 1224*r*, in some embodiments, the electronic device 500 displays a representation 1226*h* of the received message on the side of the user interface (e.g., the left side) associated with messages from users other than the user of the electronic device. Because the received message is a reply to another message in the messaging conversation that was not the most recent message in the conversation, the electronic device 500 optionally displays an additional indication 1212*c* of the message to which the most recent message is a reply. The indication 1208*c* of the most recent message is displayed connected to representation 1212*c* via line 1226*h*, for example. In the example of FIG. 12R, representations 1208*c* and 1226*h* are both displayed on the left side of the user interface because the messages associated with representations 1208*c* and 1226*h* are from users other than the user of the electronic device 500. In some embodiments, representations 1210*f* and 1212*c* are not connected with a line because they are in different reply conversations.

In FIG. 12S, the electronic device 500 optionally detects an indication 1224*s* of another message sent by another user (e.g., Alice) in the messaging conversation. In response to the indication 1224*s*, in some embodiments, the electronic device 500 displays an indication 1208*d* of the received message on the side of the user interface associated with messages from users other than the user of the electronic device 500 (e.g., the left side of the user interface). The received message is optionally a reply to the same message to which the message associated with representation 1208*c* is a reply. Therefore, the representation 1208*d* is optionally displayed connected to representation 1208*c* by line 1226*i* and there are no messages received between the messages corresponding to representations 1208*c* and 1208*d* that are not replies to the message associated with representation 1212*c*. As shown in FIG. 12S, in some embodiments, the user of device 500 selects (e.g., with contact 1203) a region of soft keyboard 1218 associated with a character to send another message to the messaging conversation.

In FIG. 12T, for example, the electronic device 500 displays the text entered by the user in text entry field 1214. The user selects (e.g., with contact 1203) the option 1216 to send the message to the conversation in accordance with some embodiments. In response to the user's selection, the electronic device 500 optionally updates the user interface as shown in FIG. 12U.

FIG. 12U illustrates the updated user interface including representation 1202*d* of the message sent by the user displayed on the side of the user interface associated with messages from the user of the electronic device 500 (e.g., the right side). The message associated with representation 1202*d* is not a reply to an existing message in the conversation, so the representation 1202*d* is not connected to any other representations of messages with a line or curved line.

In FIG. 12V, in some embodiments, the electronic device 500 detects an indication 1224*v* of a new message received in the messaging conversation. In response to the indication 1224*v*, the electronic device 500 optionally displays a representation 1208*e* of the received message on the side of the user interface associated with messages from users other than the user of the electronic device 500 (e.g., the left side), which is a reply to the message associated with representation 1202*d*. Therefore, in some embodiments, the representation 1208*e* is displayed connected to representation 1202*d* by curved line 1226*j* because no additional messages are received between the messages associated with representations 1202*d* and 1208*e*. As shown in FIG. 12V, for example, the user selects (e.g., with contact 1203) representation 1208*d* of a message that is a reply to the message corresponding to representation 1212*c* illustrated, for example, in FIG. 12T.

FIG. 12W illustrates the user interface displayed in response to the user's selection in FIG. 12V in accordance with some embodiments. The user interface optionally includes representations of all of the messages that are replies to the message to which the message associated with the representation selected by the user is a reply (e.g., representations 1230*a*-1230*c* correspond to the same messages as representations 1212*c* and 1226*h*-I illustrated in FIG. 12T) without including representations of messages that are not replies to the message associated with representation 1230*a*. The representations 1230*a-c* are optionally displayed overlaid on a blurred version of the messaging user interface illustrated in FIG. 12V, but in some embodiments, the representations are displayed on a plain background. The user optionally selects (e.g., with contact 1203) the background of the user interface to navigate back.

As shown in FIG. 12X, in response to the user's selection in FIG. 12W, in some embodiments, the electronic device 500 presents all of the representations of all of the messages in the messaging conversation again. The user optionally selects a representation 1202*d* of another message in the conversation in FIG. 12X.

As shown in FIG. 12Y, in some embodiments, in response to the user's selection in FIG. 12X, the electronic device 500 displays a representation 1232*a* associated with the same message as the representation selected by the user in FIG. 12X and a representation 1230*d* of the message that is a reply to the message associated with representation 1232*a*. The replies user interface illustrated in FIG. 12Y can be similar to the replies user interface illustrated in FIG. 12W. These replies user interfaces can differ in that FIG. 12W illustrates a replies user interface for one replies conversation and FIG. 12Y illustrates a replies user interface for a different replies conversation, for example. In some embodiments, in response to detecting selection of any reply message (or an indication of the number of replies to the initial message in any reply conversation), the electronic device 500 displays a replies user interface similar to those illustrated in FIGS. 12W and 12Y that only includes representations of messages in the replies conversation of the selected representation (or indication) without including representations of other messages in the messaging conversation that are not part of the reply conversation.

Figure 13:
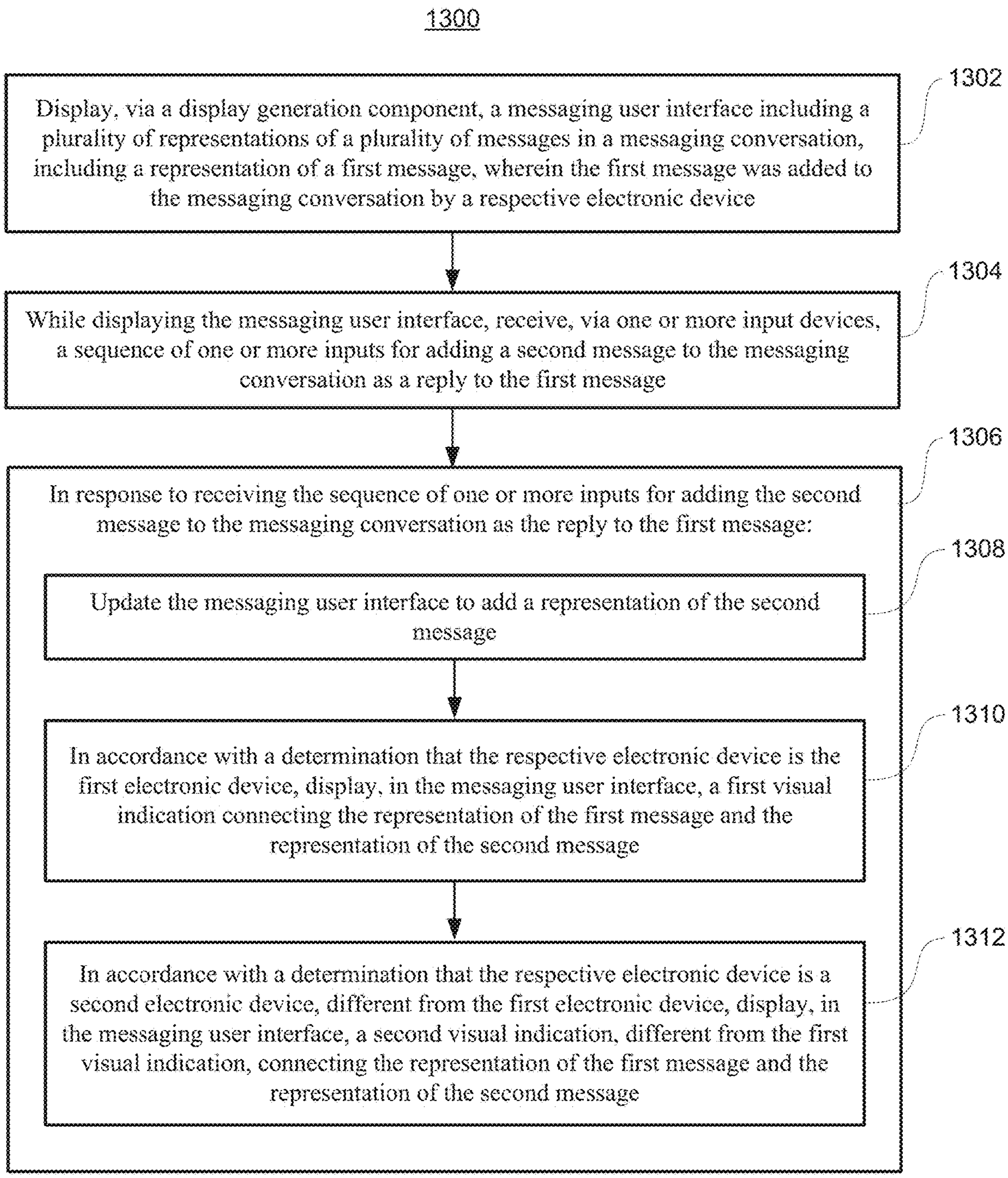
FIG. 13 is a flow diagram illustrating a method of presenting indications of messages that are replies to other messages according to some embodiments.

FIG. 13 is a flow diagram illustrating a method 1300 of presenting indications of messages that are replies to other messages according to some embodiments. The method 1300 is optionally performed at an electronic device such as device 100, device 300, device 500 as described above with reference to FIGS. 1A-1B, 2-3, 4A-4B and 5A-5H. Some operations in method 1300 are, optionally combined and/or order of some operations is, optionally, changed.

As described below, the method 1300 provides ways in which an electronic device presents indications of messages that are replies to other messages in a messaging conversation. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1300 is executed at a first electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.)).

In some embodiments, such as in FIG. 12A, the electronic device 500 displays (1302), via the display generation component, a messaging user interface including a plurality of representations 1204*a*-*b* and 1202*a*-*b* of a plurality of messages in a messaging conversation, including a representation 1204*a* of a first message, wherein the first message was added to the messaging conversation by a respective electronic device (e.g., the first electronic device or another electronic device with access to the conversation). In some embodiments, messages from a user account of the first electronic device are displayed on a first side (e.g., the right side) of the messaging user interface and messages from a user account of a different electronic device are displayed on a second side (e.g., the left side) of the messaging user interface.

In some embodiments, such as in FIG. 12B, while displaying the messaging user interface, the electronic device 500 receives (1304), via the one or more input devices, a sequence of one or more inputs for adding a second message to the messaging conversation as a reply to the first message (e.g., the electronic device detects a sequence of one or more inputs identifying the first message as the message to which the second message is a reply and a sequence of one or more inputs entering the content of the message). In some embodiments, the way in which the electronic device receives the one or more inputs for adding the second message to the messaging conversation as a reply to the first message is similar to one or more features described above with reference to method 900.

In some embodiments, such as in FIG. 12C, in response to receiving the sequence of one or more inputs for adding the second message to the messaging conversation as the reply to the first message (1306), the electronic device 500 updates (1308) the messaging user interface to add a representation 1210*a* of the second message. In some embodiments, such as in FIG. 12I, in accordance with a determination that the respective electronic device is the first electronic device, the electronic device 500 displays (1310), in the messaging user interface, a first visual indication 1226*k* connecting the representation 1202*c* of the first message and the representation 1210*d* of the second message (e.g., the visual indication is optionally a curved line connecting the representation of the first message and the representation of the second message). In some embodiments, the representation of the first message and the representation of the second message are both displayed on the same side of the user interface (e.g., the right side) because both messages were sent by the first electronic device. In some embodiments, the line connecting the representation of the first message and the representation of the second message is a curved line. In some embodiments, lines connecting representations of messages that include replies (e.g., a representation of a first message and a representation of a message that is a reply to the first message or representations of messages that are both replies to the same respective message) are always displayed on the same side of the representation of the message, regardless of which electronic device sent the message. For example, representations of messages sent by the first electronic device are displayed on the right side of the user interface and the curved line connects the left sides of the representations of the messages. As another example, representations of messages sent by other users are displayed on the left side of the user interface and the lines connecting those representations are vertical lines on the left side of the representations of messages. As another example, the curved line connecting a message sent by the first electronic device to a message sent by another electronic device connects the left sides of the representations.

In some embodiments, such as in FIG. 12C, in accordance with a determination that the respective electronic device is a second electronic device, different from the first electronic device, the electronic device 500 displays (1312), in the messaging user interface, a second visual indication 1226*a*, different from the first visual indication, connecting the representation 1206*a* of the first message and the representation 1210*a* of the second message. The visual indication is optionally a line connecting the representation of the first message to the representation of the second message. In some embodiments, the representation of the first message is displayed on one side of the user interface (e.g., the right side) because it is from the first electronic device and the representation of the second message is displayed on the other side of the user interface (e.g., the left side) because it is from a different electronic device. In some embodiments, if a message is received that is not a reply to the first message, the representation of the message is displayed without a visual indicator connecting the representation of the message to the representation of the first message The above-described manner of displaying the first visual indication in accordance with the determination that the respective electronic device is the first electronic device and displaying the second visual indication in accordance with the determination that the respective electronic device is the second electronic device enables the electronic device to efficiently distinguish messages sent by the first electronic device from messages sent from the second electronic device, which simplifies the interaction between the user and the electronic device and enhances the operability of the electronic device and makes the user-device interface more efficient (e.g., by reducing the time and number of inputs needed to determine the sender of the messages), which additionally reduces power usage and improves battery life of the electronic device by enabling the user to use the electronic device more quickly and efficiently.

In some embodiments, such as in FIG. 12D, while displaying the messaging user interface including the representation 1206*a* of the first message and the representation 1226*a* of the second message, and a respective visual indication 1226*a* connecting the representation 1206*a* of the first message and the representation 1210*a* of the second message, receiving an indication 1224*d* of a third message added to the messaging conversation (e.g., message from another device or message inputted by first electronic device). In some embodiments, in response to receiving the indication 1224*d* of the third message added to the messaging conversation, such as in FIG. 12D, the electronic device 500 updates the messaging user interface to add a representation 1208*a* of the third message (e.g., a visual indication including the content of the third message). In some embodiments, in accordance with a determination that the third message is a reply to the first message (e.g., or the second message), displaying, in the messaging user interface, a third visual indication 1226*b* associated with (e.g., connecting) the representation 1208*a* of the third message and the representation 1210*a* of the second message. In some embodiments, the visual indication is a curved line connecting the second representation to the third representation. In some embodiments, the visual indication is a looped line connecting the first representation and the third representation, with the loop being horizontally aligned with the second representation. In some embodiments, the visual indication is a curved line connecting the first representation and the third representation, where the curved line shares a horizontal location with the second representation (e.g., a portion of the curved line is horizontally adjacent to the second representation). In some embodiments, in accordance with a determination that the third message is not a reply to the first or second message, the electronic device displays the third representation without the indication associated with the second and third representations. The above-described manner of displaying the third visual indication associated with the representations of the third and second messages enables the electronic device to efficiently indicate that the third message is a reply message, and an indication of to which message it is a reply, which simplifies the interaction between the user and the electronic device and enhances the operability of the electronic device and makes the user-device interface more efficient (e.g., by reducing the display area needed to indicate that the third message is a reply message, thus reducing the number of inputs needed to view all of the representations of messages in the conversation), which additionally reduces power usage and improves battery life of the electronic device by enabling the user to use the electronic device more quickly and efficiently.

In some embodiments, such as in FIG. 12D, the respective electronic device is the second electronic device (e.g., the first message was added to the conversation by the second electronic device), the third message is a reply to the first message (e.g., or the second message), and in accordance with a determination that the third message was added to the messaging conversation by a third electronic device different from the first electronic device (e.g., the second electronic device or another electronic device), the third visual indication 1226*b* associated with the representation 1208*a* of the third message and the representation of the second message 1210*a* is a visual indication connecting the first message and the third message that includes a respective indication aligned with the second message in the messaging user interface. In some embodiments, the visual indication is a looped line connecting the representation of the first message and the representation of the third message, where the loop is horizontally aligned with the representation of the second message. In some embodiments, if the messaging conversation includes a fourth message received between the first and third messages (e.g., either directly before or directly after) that is a reply to the first or second message and was sent by the first electronic device, the looped line includes a single loop that is horizontally aligned with the representation more recently received message from the first electronic device. In some embodiments, in accordance with a determination that the third message was added to the messaging conversation by the first electronic device, the electronic device updates the user interface to display a curved line that does not include a loop connecting the representation of the first message and the representation of the third message. The above-described manner of displaying the visual indication connecting the first message and the third message that includes a respective indication aligned with the second message enables the electronic device to efficiently indicate that the second and third messages are within the same reply thread, which simplifies the interaction between the user and the electronic device and enhances the operability of the electronic device and makes the user-device interface more efficient (e.g., by reducing the amount of display area needed to indicate that the messages are in the same reply thread, thus reducing the number of inputs needed to view all the messages in the conversation), which additionally reduces power usage and improves battery life of the electronic device by enabling the user to use the electronic device more quickly and efficiently.

In some embodiments, such as in FIG. 12F, the respective electronic device is the second electronic device (e.g., the first message was added to the conversation by the second electronic device). In some embodiments, while displaying the messaging user interface including the representation 1208*a* of the first message, the representation 1210*a* of the second message, and the second visual indication 1226*c* connecting the representation 1208*a* of the first message and the representation 1210*a* of the second message, such as in FIG. 12E, the electronic device 500 receives, via the one or more input devices, a sequence of one or more inputs for adding a third message to the messaging conversation as a reply to the first message (e.g., or the second message). In some embodiments, the electronic device sends the third message to the conversation as a reply to the first or second message. In some embodiments, in response to receiving the sequence of one or more inputs for adding the third message to the messaging conversation as the reply to the first message, the electronic device 500 updates the messaging user interface to add a representation 1210*c* of the third message (e.g., a visual indication including the content of the third message) and replaces the second visual indication with a third visual indication 1226*d* connecting the representation of the first message and the representation of the third message, such as in FIG. 12F. In some embodiments, the third visual indication is a curved line connecting the representation of the first message to the representation of the third message, and the representation of the second message is no longer connected to the representation of the first message with a line. In some embodiments, the representation of the second message is displayed between the representations of the first and third messages, such that a portion of the third visual indication is horizontally aligned with the representation of the second message. The above-described manner of replacing the second visual indication with the third visual indication connecting the representation of the first message and the representation of the third message enables the electronic device to efficiently indicate that the second and third messages are replies to the first message, which simplifies the interaction between the user and the electronic device and enhances the operability of the electronic device and makes the user-device interface more efficient (e.g., by reducing the display area needed to indicate that the first, second, and third messages are in the same reply thread, which reduces the inputs needed to view all of the messages in the conversation), which additionally reduces power usage and improves battery life of the electronic device by enabling the user to use the electronic device more quickly and efficiently.

In some embodiments, such as in FIG. 12Q, the messaging conversation includes a third message (e.g., the third message is added to the conversation by the first electronic device or by another electronic device with access to the messaging conversation). In some embodiments, such as in FIG. 12Q, the electronic device 500 receives an indication of a fourth message added to the messaging conversation that is a reply to the third message (e.g., the fourth message is added to the messaging conversation by the first electronic device or by another electronic device with access to the messaging conversation). In some embodiments, such as in FIG. 12Q, in response to receiving the indication of the fourth message added to the messaging conversation, the electronic device 500 displays, in the messaging user interface, a representation 1210*f* of the fourth message and a respective visual indication 1226*g* connecting a first representation 1212*b* of the third message and the representation 1210*f* of the fourth message. In some embodiments, such as in FIG. 12Q, in accordance with a determination that the messaging conversation includes one or more messages between the third message and the fourth message that are not replies to the third message, the first representation 1212*b* of the third message is an additional representation of the third message in the messaging user interface that was not included in the messaging user interface before receiving the indication of the fourth message added to the messaging conversation, and was added to the messaging user interface in response to receiving the indication of the fourth message added to the messaging conversation. In some embodiments, in accordance with a determination that the messaging conversation does not include one or more messages between the third message and the fourth message, the first representation of the third message is the only representation of the third message that was displayed in response to detecting an indication of receipt of the third message. In some embodiments, in accordance with a determination that the one or more messages between the third message and the fourth message are replies to the third message, the electronic device updates the user interface from including a visual indication associating the first representation of the third message with representations of the one or more messages between the third and fourth message to include a visual indication associating the first representation of the third message, the representations of the one or more messages received between the third message and the fourth message, and the representation of the fourth message. In some embodiments, in response to receiving a reply message when the most recent message is not one of (1) the message to which the incoming message is a reply or (2) a reply to the same message to which the incoming message is a reply, the electronic device 500 displays an additional indication of the message to which the incoming message is a reply (or the first message in the reply thread of the message to which the incoming message is a reply). The additional indication of the message is optionally displayed with one or more visual characteristics that are different from the one or more visual characteristics of the indication of the message that was initially displayed in response to receipt of the message. For example, the additional indication is displayed with increased translucency, decreased size, or different colors than the original indication of the message. The above-described manner of displaying the additional representation of the third message in response to the fourth message enables the electronic device to concurrently display representations of the third and fourth messages even if the messaging conversation includes one or more other messages between the third and fourth messages, which simplifies the interaction between the user and the electronic device and enhances the operability of the electronic device and makes the user-device interface more efficient (e.g., by reducing the inputs needed to view the first representation of the third message in conjunction with viewing the representation of the fourth message), which additionally reduces power usage and improves battery life of the electronic device by enabling the user to use the electronic device more quickly and efficiently.

In some embodiments, such as in FIG. 12R, the messaging user interface includes a representation 1212*c* of a third message and a representation 1208*c* of a fourth message that is a reply to the third message. In some embodiments, such as in FIG. 12R, in accordance with a determination that the third message and the fourth message were added to the messaging conversation by the second electronic device, the messaging user interface includes a third visual indication 1226*h*, different from the second visual indication (e.g., a straight line connecting the representations of the third and fourth messages), connecting the representation 1212*c* of the third message and the representation 1208*c* of the fourth message. In some embodiments, the third visual indication is a vertical line connecting the representation of the third message to the representation of the fourth message when the third and fourth messages are sent by electronic devices other than the first electronic device. The above-described manner of displaying the third visual indication connecting the representations of the third and fourth messages enables the electronic device to efficiently indicate that the fourth message is a reply to the third message, which simplifies the interaction between the user and the electronic device and enhances the operability of the electronic device and makes the user-device interface more efficient (e.g., by reducing the display area needed to indicate that the fourth message is a reply to the third message, thus reducing the number of user inputs needed to view all of the messages in the conversation), which additionally reduces power usage and improves battery life of the electronic device by enabling the user to use the electronic device more quickly and efficiently.

In some embodiments, such as in FIG. 12R, in accordance with a determination that the third message was added to the messaging conversation by the second electronic device, and the fourth message was added to the messaging conversation by a third electronic device, different from the first and second electronic devices, the messaging user interface includes the third visual indication 1226*h* connecting the representation 1212*c* of the third message and the representation 1208*c* of the fourth message. In some embodiments, the electronic device displays representations of messages sent by the first electronic device on a first side of the messaging user interface (e.g., the right side) and displays representations of messages sent by all other electronic devices on the other side (e.g., the left side) of the user interface. The electronic device optionally displays a vertical line connecting the representation of the third message and the representation of the fourth message. The above-described manner of displaying the third visual indication connecting the representation of the third message and the representation of the fourth message enables the electronic device to efficiently indicate that the fourth message is a reply to the third message, which simplifies the interaction between the user and the electronic device and enhances the operability of the electronic device and makes the user-device interface more efficient (e.g., by reducing the display area needed to indicate that the fourth message is a reply to the third message, thereby reducing the number of inputs needed to view all of the messages in the conversation), which additionally reduces power usage and improves battery life of the electronic device by enabling the user to use the electronic device more quickly and efficiently.

In some embodiments, such as in FIG. 12C, in accordance with a determination that the messaging conversation includes two participants (e.g., the first electronic device and the second electronic device), the first visual indication 1226*a* connecting the representation 1206*a* of the first message and the representation 1210*a* of the second message is aligned with the representation of the first message and the representation of the second message. In some embodiments, the first electronic device forgoes displaying a representation of a user of the second electronic device in association with representations of messages from the second electronic device because it is apparent that the messages are from the second electronic device because the second electronic device is the only electronic device other than the first electronic device with access to the messaging conversation. Because the electronic device does not display an indication of the user of the second electronic device in association with the representation of the first message, the electronic device aligns the first visual indication with the representation of the first message (e.g., the lines forming the visual indications connect to the actual representations of messages rather than to representations of users associated with those messages). In some embodiments, such as in FIG. 12M, in accordance with a determination that the messaging conversation includes three or more participants (e.g., the first and second electronic device and one or more third electronic devices), the first visual indication 1226*f* connecting the representation 1212*a* of the first message and the representation 1210*e* of the second message is aligned with a visual representation of a participant displayed and associated with the representation 1212*a* of the first message and the representation 1210*e* of the second message. In some embodiments, the first electronic device displays a representation of the user that sent a respective message in association with a representation of the respective message sent by an electronic device other than the first electronic device. The electronic device optionally displays a curved line connecting the representation of the participant associated with the representation of the first message and the representation of the second message (e.g., in some embodiments, because the second message was provided by the current electronic device, no representation of the current user is displayed in association with that message. In some embodiments, only representations provided to the conversation by other electronic devices are displayed in association with the users who sent those messages). The above-described manner of displaying the first visual indication connecting the visual representation of the participant in accordance with a determination that the messaging conversation includes three or more participants enables the electronic device to provide an indication of the user that sent the first message when there are multiple possible users that could have sent the message, which simplifies the interaction between the user and the electronic device and enhances the operability of the electronic device and makes the user-device interface more efficient (e.g., by reducing the number of inputs needed to determine the sender of each message), which additionally reduces power usage and improves battery life of the electronic device by enabling the user to use the electronic device more quickly and efficiently.

It should be understood that the particular order in which the operations in FIG. 13 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1500) are also applicable in an analogous manner to method 1300 described above with respect to FIG. 13. For example, the ways of presenting indications of messages that are replies to other messages in a messaging conversation described above with reference to method 1300 optionally have one or more of the characteristics of the ways of presenting representations of messaging conversations, creating and presenting mentions, presenting representations of messages that are replies to other messages in a messaging conversation, etc., described herein with reference to other methods described herein (e.g., methods 700, 900, 1100, and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 13 are, optionally, implemented by components depicted in FIGS. 1A-1B. For example, displaying operation 1302, receiving operation 1304, and updating operation 1308 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Creating and Presenting Mentions in Messaging Conversations

Users interact with electronic devices in many different manners, including using an electronic device to send and receive messages. The embodiments described below provide ways in which an electronic device creates and presents links (e.g., rich links) to users in a messaging conversation (e.g., "mentions"). Creating and presenting mentions in the ways described herein enhances interactions with a device such as by reducing the time and number of inputs needed to create a mention, thus reducing the amount of time needed by a user to perform operations, thus reducing the power usage of the device, which increases battery life for battery-powered devices. It is understood that people use devices. When a person uses a device, that person is optionally referred to as a user of the device.

FIGS. 14A-14K illustrate exemplary ways in which an electronic device 500 displays selectable options to insert links (e.g., rich links) associated with user accounts in a messaging conversation according to some embodiments. The embodiments in FIGS. 14A-14K are used to illustrate the processes described below, including the processes described with reference to FIG. 15. Although FIGS. 14A-14K illustrate various examples of ways an electronic device is able to perform the processes described below with reference to FIG. 15, it should be understood that these examples are not meant to be limiting, and the electronic device is able to perform one or more processes described below with reference to FIG. 15 in ways not expressly described with reference to FIGS. 14A-14K.

In some embodiments, the electronic device 500 is able to add a link (e.g., a rich link) associated with a user account (e.g., a "mention" directed to the user account) to an outgoing message and present indications of mentions of the user of the electronic device 500 and other users in a messaging conversation in a manner similar to FIGS. 8A-9.

Figure 14B:
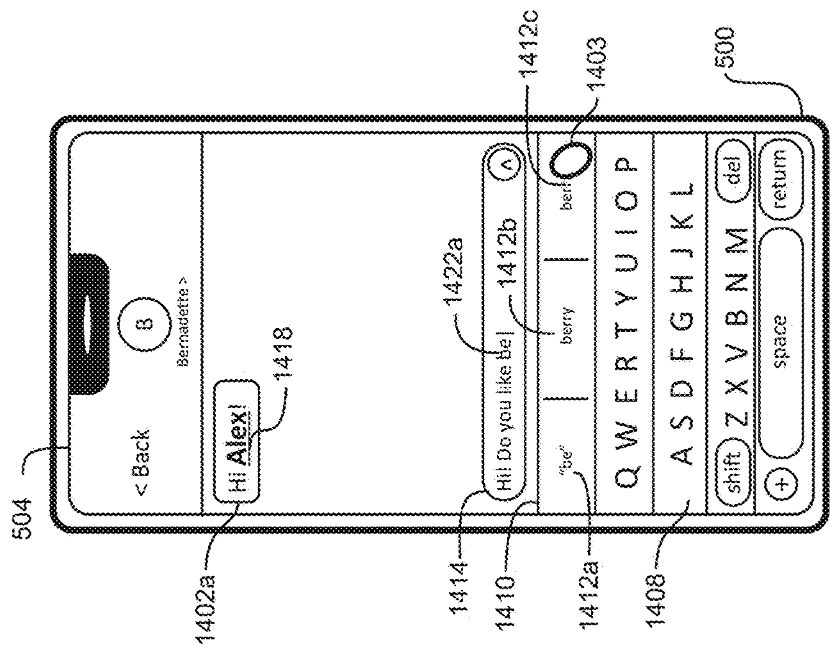
FIGS. 14A-14K illustrate various ways an electronic device presents options to create a link (e.g., a rich link) to contacts in a messaging conversation (e.g., "mentions") using a suggested entry user interface element according to some embodiments
Figure 14A:
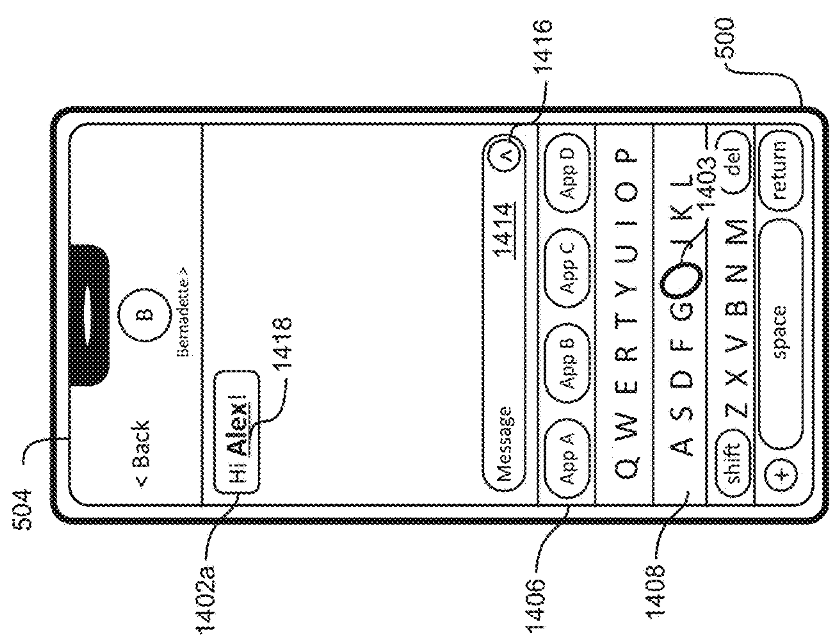

In FIG. 14A, in some embodiments, the electronic device 500 displays a messaging user interface that includes an indication 1402*a* of a message sent by the other user (e.g., Bernadette) in the conversation. The messaging user interface can be similar to one or more messaging user interfaces described above with reference to FIGS. 6A-13. Moreover, in some embodiments, a messages application that displays the user interfaces described with reference to FIGS. 14A-15 can also display the user interfaces described above with reference to FIGS. 6A-13. The indication 1402*a* optionally includes a mention 1418 of the user of the electronic device 500 (e.g., Alex). The mention 1418 is optionally similar to mentions of the user of the electronic device 500 described above with reference to FIGS. 10A-10TTT and 11A-11B.

As shown in FIG. 14A, in some embodiments, the messaging user interface further includes a text entry field 1414, a soft keyboard 1408, and a selectable option 1416 that, when selected, causes the electronic device 500 to send the content displayed in text entry field 1414 to the messaging conversation as a new message. In some embodiments, the messaging user interface also includes a region 1406 including a plurality of options that, when selected, causes the electronic device 500 to insert rich messaging content associated with a respective app associated with the selected option. As shown in FIG. 14A, in some embodiments, the user selects (e.g., with contact 1403) a region of the soft keyboard 1408 associated with a respective character to enter the character into the text entry field 1414.

In FIG. 14B, in some embodiments, the text entry field 1414 includes text that was entered by the user (e.g., using the soft keyboard), including a first portion 1422*a* of text. While the user is entering text into text entry field 1414, in some embodiments, the electronic device 500 displays a suggested entry user interface element 1410 at the location in the user interface at which region 1406 was previously displayed, as shown in FIG. 14A.

The suggested entry user interface element 1410 optionally includes a plurality of options 1412*a-c* that, when selected, cause the electronic device 500 to enter respective text associated with the selected option in place of the first portion 1422*a* of text. As shown in FIG. 14B, in some embodiments, the suggested entry user interface element 1410 includes an option 1412*a* to enter the first portion 1422*a* of text ("be") as-is (e.g., or leave the first portion 1422*a* of text as-is) and two options 1412*b* and 1412*c* to replace the first portion 1422*a* of text with suggested respective other text (e.g., "berry" or "berries"). In some embodiments, the two options 1412*b* and 1412*c* include text (e.g., "berry" or "berries") that starts with the first portion 1422*a* of text (e.g., "be"). In some embodiments, the suggested entry user interface element 1410 includes options to enter text corresponding to the most-recently entered string of text (e.g., the most recent string of characters not interrupted by a space), such as words that start with the most-recently entered string of text, spelling corrected versions of the string of text, capitalization-corrected versions of the string of text, etc. In some embodiments, if the last character entered in the text entry field 1414 is a space, the suggested entry user interface element 1410 can include suggested words that are likely to come after the word(s) entered before the last space entered in the text entry field 1414.

As shown in FIG. 14B, in some embodiments, the user selects (e.g., with contact 1403) one of the options 1412*c* associated with text ("berries") that begins with the first portion 1422*a* ("be") of text but does not match the first portion 1422*a* of text. In response to the user's selection, the electronic device 500 enters the text indicated by option 1412*c* into text entry field 1414.

Figure 14C:
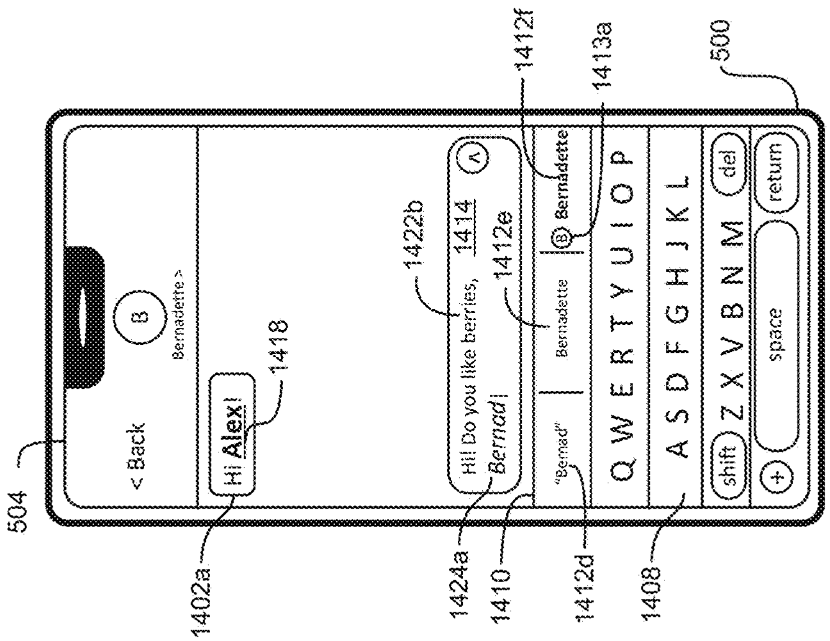

FIG. 14C illustrates the messaging user interface after the electronic device 500 enters a portion 1422*b* of text in response to the user's selection in FIG. 14B and the user continues entering text into text entry field 1414. The text of text entry field 1414 optionally includes a portion 1424*a* of text that may correspond to the other user in the conversation (e.g., Bernadette). The portion of text 1424*a* may correspond to the other user in the conversation because the portion 1424*a* of text matches the beginning of the name of the other user in the conversation.

In some embodiments, in accordance with the determination that the portion 1424*a* of text may correspond to the other user in the conversation, the electronic device 500 displays an option 1412*f* in the suggested entry user interface element 1410 that, when selected, causes the electronic device 500 to insert a mention of the other user into the text entry field 1414. For example, option 1412*f* is displayed in place of option 1412*c* illustrated in FIG. 14B because the user has continued typing, so the electronic device 500 updates the suggested entry user interface element 1410 to include options for updated suggested entries that correspond to the updated text 1424*a*. The option 1412*f* optionally includes the text of the user's name in bold typeface and an image 1413*a* associated with the user. Although FIG. 14C illustrates the text of option 1412*f* in bold typeface, in some embodiments, the electronic device 500 displays the text of option 1412*f* in a different color than the rest of the text in the user interface to indicate that the option 1412*f* is selectable to create a mention associated with the other user in the messaging conversation. In some embodiments, image 1413*a* is an image included in a contact card of the other user in the messaging conversation. In some embodiments, the electronic device 500 does not display the option 1412*f* to turn text 1424*a* into a mention until the text entered by the user matches the name of the contact (e.g., instead of matching the beginning portion of the name of the contact).

In some embodiments, the suggested entry user interface element 1410 further includes options 1412*d* and 1412*e* that, when selected, cause the electronic device 500 to enter text that is not a mention associated with the other user in the conversation. One of the options 1412*d* is optionally selectable to enter text that matches the portion of text 1424*a* or to leave the text 1424*a* as-is (though, if the user does not turn text 1424*a* into a mention, it will be displayed without italics after the user enters a space or punctuation and/or sends the message, for example). The other option 1412*e* is selectable to enter a plain-text version of the name of the other user in the conversation. In some embodiments, in response to detecting selection of option 1412*e*, the electronic device 500 enters the text of the name of the other user in the conversation as plain text that is not a mention of the other user in the conversation. In some embodiments, the characters of the text associated with options 1412*e* and 1412*f* are the same—the text entered in response to detecting selection of option 1412*e* is the plain text version of the text that would be entered in response to detecting selection of option 1412*f*.

In FIG. 14C, the portion 1424*a* of text is also optionally displayed with a visual characteristic that is different from the rest of the text in the text entry field 1414 to indicate that it may correspond to the other user in the conversation, in a manner similar to the manner described above with reference to FIGS. 8A-9. Although FIG. 14C illustrates the portion 1424*a* of text as being displayed in italics while the rest of the text is displayed not in italics, in some embodiments, the electronic device 500 distinguishes text that may correspond to a user in the conversation by displaying it in a different color than the rest of the text in text entry field 1414.

Figure 14D:
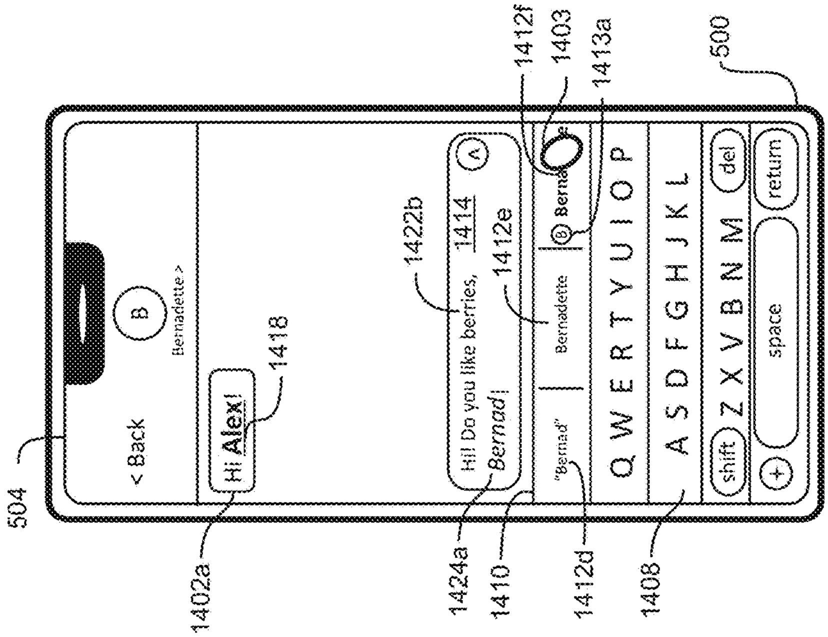

In FIG. 14D, in some embodiments, the user selects (e.g., with contact 1403) the option 1412*f* to insert the text of the other user's name as a mention of the other user into the message displayed in the text entry field 1414.

Figure 14F:
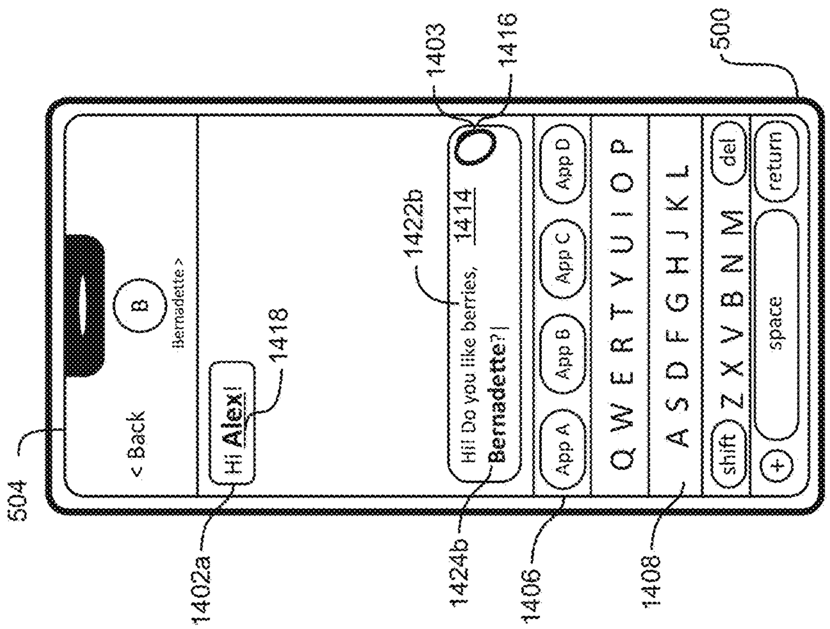
Figure 14E:
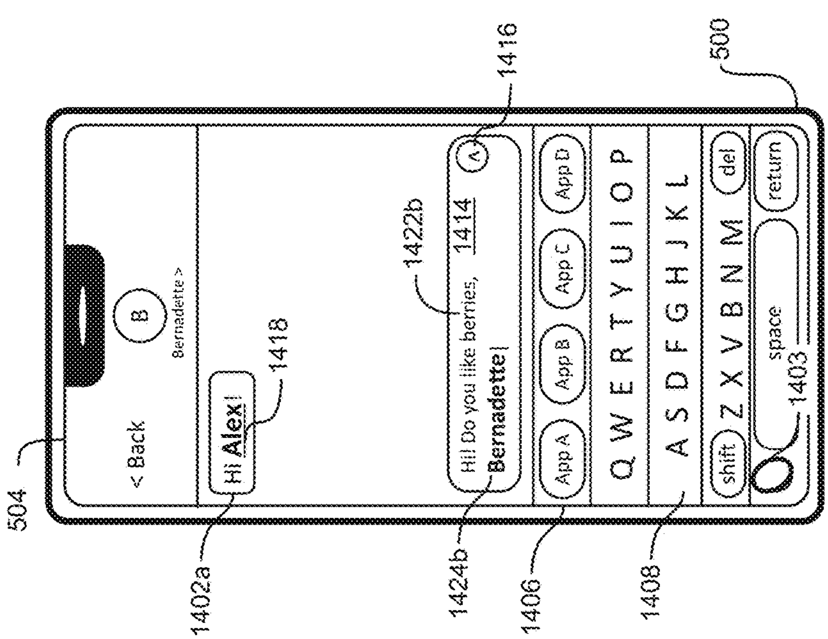

As shown in FIG. 14E, in some embodiments, in response to the user's selection in FIG. 14D, the electronic device 500 replaces text 1424*a* with text 1424*b*. Text 1424*b* is optionally the name of the other user in the conversation displayed in bold typeface to indicate that when the message is sent, text 1424*b* will be a mention of the other user in the conversation, in a manner similar to the manner described above with reference to FIGS. 8A-9, for example. As shown in FIG. 14E, in some embodiments, the user selects (e.g., with contact 1403) a region of the soft keyboard 1408 associated with a punctuation character.

In FIG. 14F, in some embodiments, the electronic device 500 has entered a question mark in the text entry field 1414 in response to one or more inputs including the input illustrated in FIG. 14E. The user optionally selects (e.g., with contact 1403) the option 1416 to send the message to the messaging conversation.

Figure 14G:
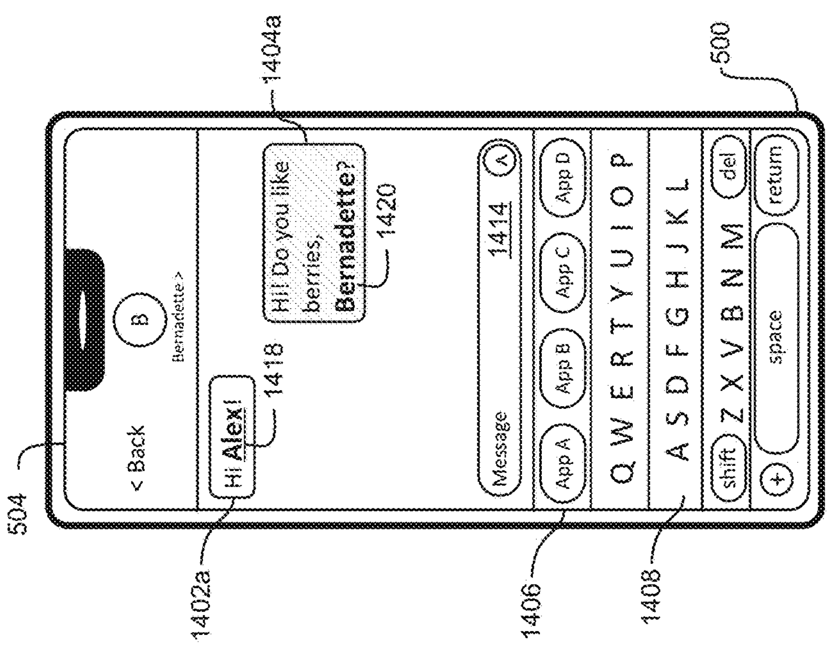

In FIG. 14G, in some embodiments, the electronic device 500 displays a representation 1404*a* of the message sent in response to the input entered by the user in FIG. 14F. Representation 1404*a* optionally includes a mention 1420 of the other user in the conversation that corresponds to text 1424*b* illustrated in FIG. 14F. The mention 1420 is displayed in bold, for example, in FIG. 14G and the rest of the text is not bold in a manner similar to the manner described above with reference to FIGS. 8A-9.

Figure 14H:
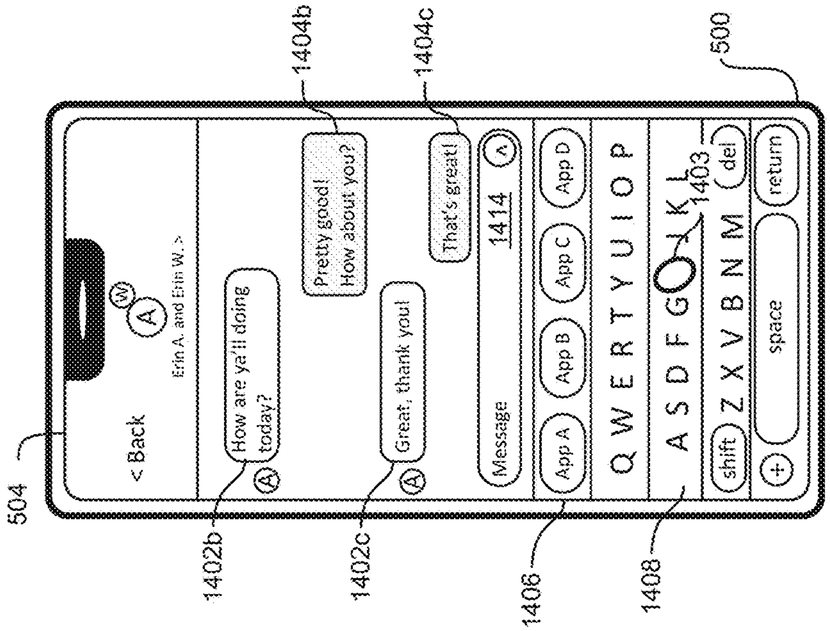

FIG. 14H illustrates another messaging conversation accessible to the electronic device 500 according to some embodiments. In the example of FIG. 14H, the messaging conversation includes the user of the electronic device 500 and two contacts named Erin A. and Erin W. The messaging conversation optionally includes representations 1402*b* and 1402*c* of messages sent by another user in the conversation on the left side of the user interface and representations 1404*b* and 1404*c* of messages sent by the electronic device 500 on the right side of the user interface. As shown in FIG. 14H, in some embodiments, the user selects (e.g., with contact 1403) a region of the soft keyboard 1408 associated with a respective character to enter the character into text entry field 1414.

Figure 14J:
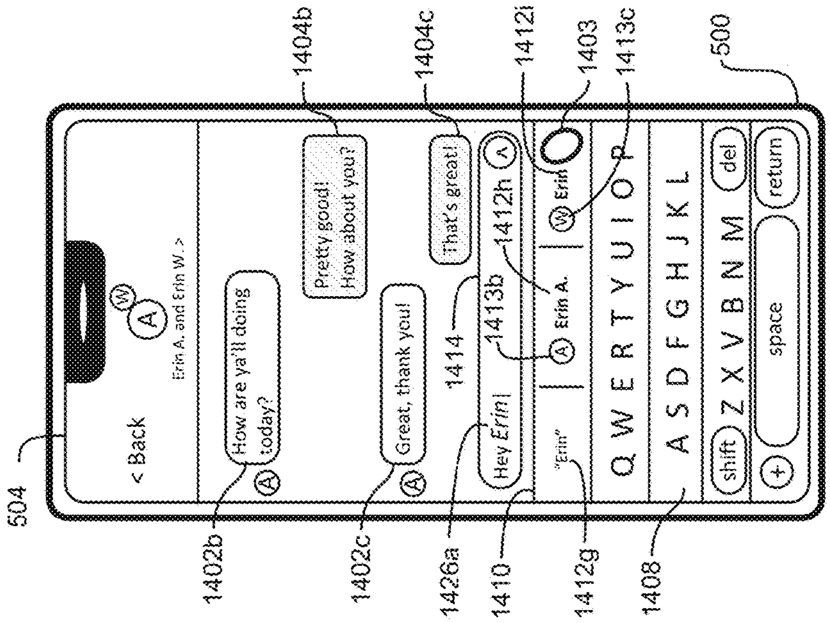
Figure 14I:
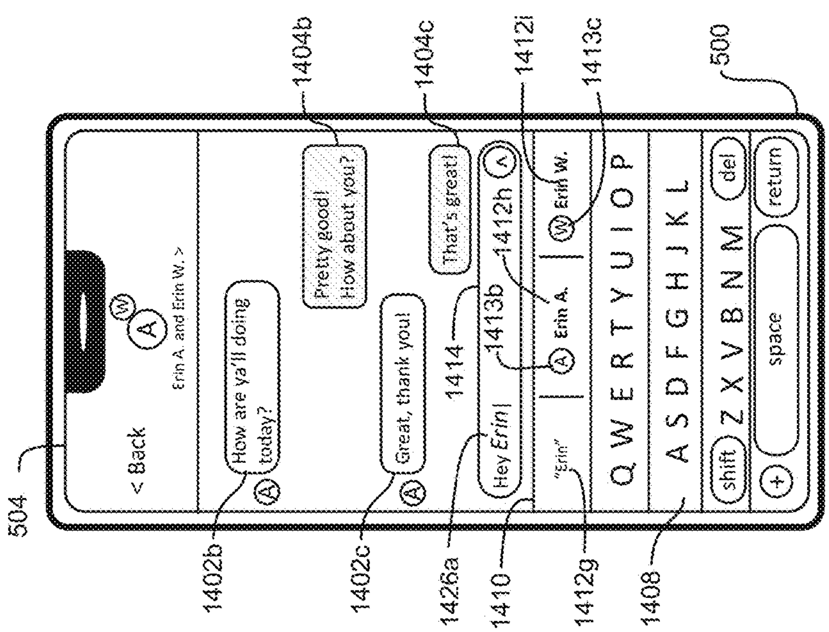

In FIG. 14I, in some embodiments, the electronic device 500 displays text entered by the user in the text entry field 1414, including a portion 1426*a* of text that corresponds to the names of the other contacts in the conversation. In this example, the other contacts in the conversation have the same first name and text 1426*a* corresponds to the first name of both of the other contacts in the conversation. Because text 1426*a* corresponds to the name of at least one contact in the conversation, for example, text 1426*a* is displayed in italics to distinguish it from the other text in the text box 1414 and the suggested entry user interface element 1410 includes an option 1412*h* to replace text 1426*a* with a mention of one of the contacts in the conversation and an option 1412*i* to replace text 1426*a* with the other contact in the conversation. Option 1412*h* optionally includes an image 1413*b* associated with the contact corresponding to option 1412*h* and option 1412*i* includes an image 1413*c* associated with the contact corresponding to option 1412*i*. In some embodiments, in response to detecting a selection of one of the options 1412*h* or 1412*i* where the contact (e.g., on display 504) making the selection is detected for a period of time exceeding a threshold (e.g., 0.5 seconds, 1 second, 2 seconds), the electronic device 500 displays contact information associated with the contact associated with the selected option (e.g., instead of replacing the corresponding text with a mention).

Figure 14K:
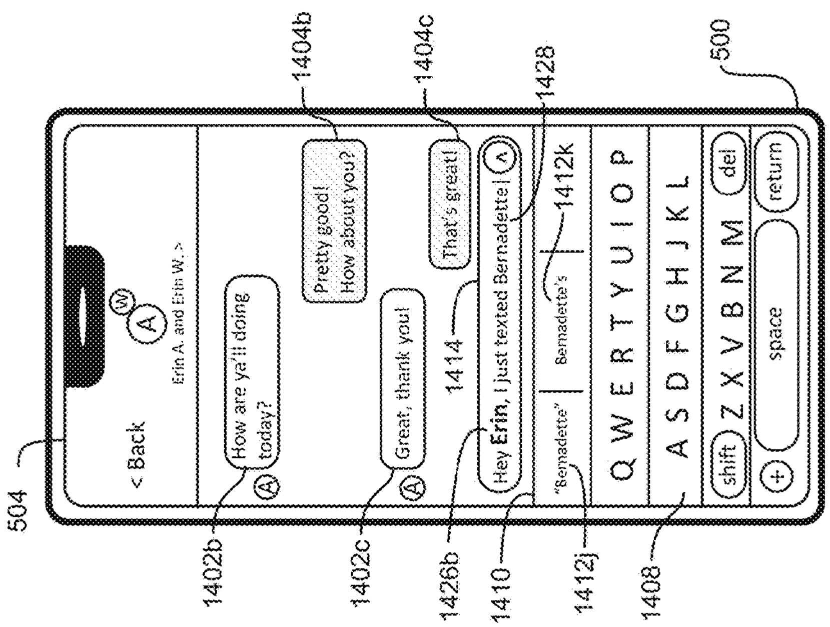

In FIG. 14J, in some embodiments, the user selects (e.g., with contact 1403) the option 1412*i* to replace text 1426*a* with a mention of one of the contacts in the conversation. In response to the user's selection, in some embodiments, the electronic device 500 replaces text 1426*a* with text 1426*b* illustrated in FIG. 14K. As shown in FIG. 14K, the characters in text 1426*a* and text 1426*b* are the same (e.g., the electronic device 500 does not change the text content of text 1426*a* when updating to the styling of text 1426*b*), for example.

In FIG. 14K, in some embodiments, the electronic device 500 displays the text 1426*b* inserted in response to the selection illustrated in FIG. 14J and additional text entered by the user (e.g., via soft keyboard or another input mechanism). Text 1426*b* is optionally displayed in a larger size than the rest of the text and/or in bold to indicate that text 1426*b* will be replaced with a mention of the contact associated with the selected option 1412*i* when the message is sent. The text entered by the user also includes a portion of text 1428 corresponding to a user that does not have access to the messaging conversation (e.g., is not part of the messaging conversation), for example. Because the user corresponding to text 1428 does not have access to the messaging conversation, the electronic device 500 forgoes displaying an option to convert text 1428 into a mention in the suggested entry user interface element 1410 and instead displays options 1412*j* and 1412*k* to enter plain text corresponding to the portion of text 1428 in some embodiments. In some embodiments, in response to detecting the portion 1428 of text corresponding to the user that is not in the messaging conversation, the electronic device displays an option that is selectable to initiate a process to add the user to the conversation. Once the user is added to the conversation, in some embodiments, it is then possible to add a mention of the user to a message in the conversation (e.g., via suggested entry user interface element 1410, as described herein).

Figure 15:
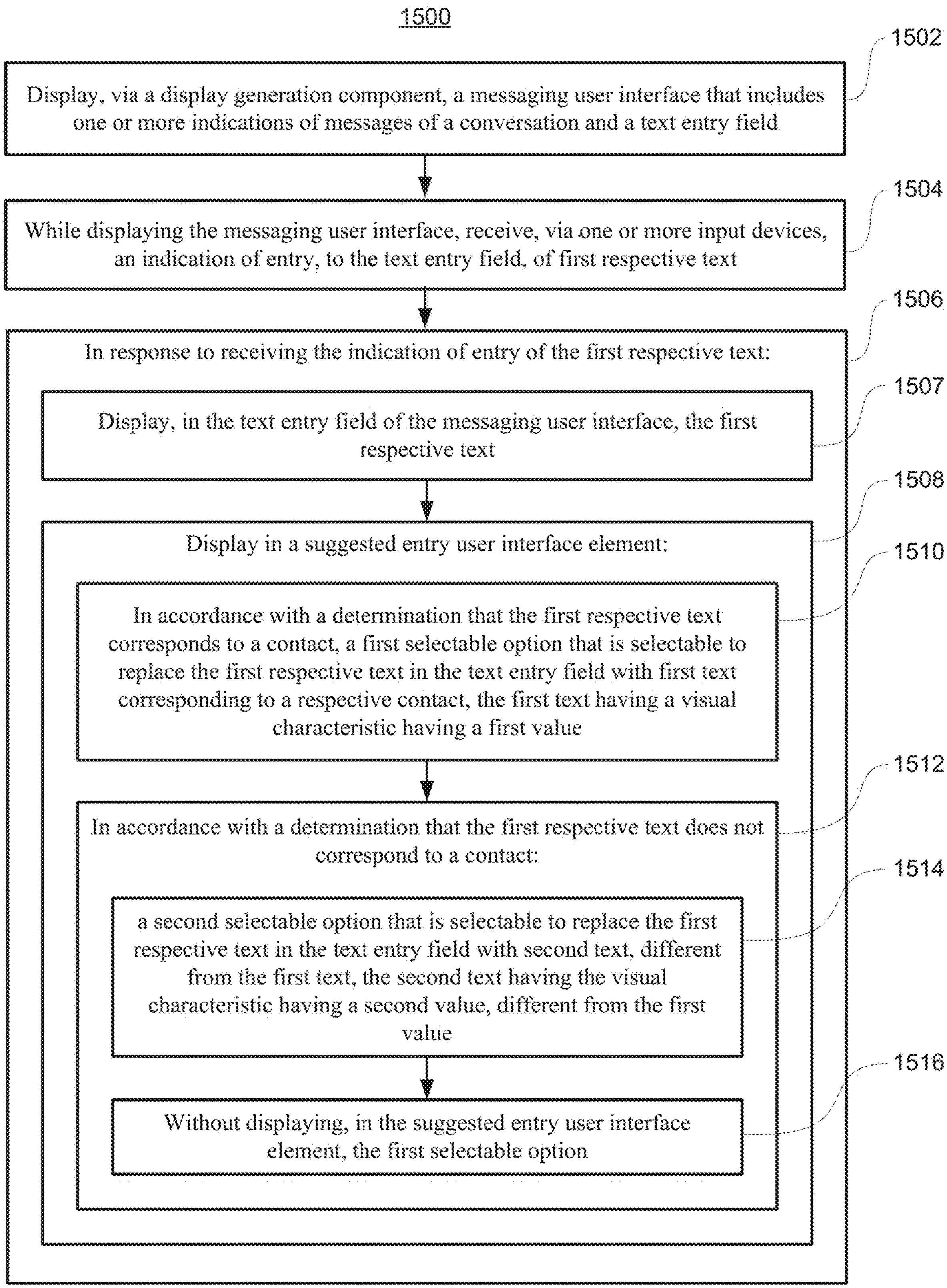
FIG. 15 is a flow diagram illustrating a method of presenting options to create a link (e.g., a rich link) to contacts in a messaging conversation (e.g., "mentions") using a suggested entry user interface element.

FIG. 15 is a flow diagram illustrating a method of presenting options to create a link (e.g., a rich link) to contacts in a messaging conversation (e.g., "mentions") using a suggested entry user interface element. The method 1500 is optionally performed at an electronic device such as device 100, device 300, device 500 as described above with reference to FIGS. 1A-1B, 2-3, 4A-4B and 5A-5H. Some operations in method 1500 are, optionally combined and/or order of some operations is, optionally, changed.

As described below, the method 1500 provides ways in which an electronic device creates and presents mentions in a messaging user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1500 is performed at an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, such as in FIG. 14A, the electronic device 500 displays (1502), via the display generation component, a messaging user interface that includes one or more indications 1402*a* of messages of a conversation and a text entry field 1414 (e.g., the indications of the messages include the content of the message. In some embodiments, the text entry field is a region of the user interface towards which one or more inputs composing a message are directed).

In some embodiments, such as in FIG. 14B, while displaying the messaging user interface, the electronic device 500 receives (1504), via the one or more input devices, an indication of entry, to the text entry field 1414, of first respective text 1422*a* (e.g., the first respective text is entered via one or more of a keyboard, soft keyboard, or voice input.).

In some embodiments, such as in FIG. 14B, in response to receiving the indication of entry of the first respective text 1422*a* (1506), the electronic device 500 displays (1507), in the text entry field 1414 of the messaging user interface, the first respective text 1422*a*.

In some embodiments, such as in FIG. 14D, the electronic device 500 displays in a suggested entry user interface element 1410 (1508), in accordance with a determination that the first respective text 1424*a* corresponds to a contact, a first selectable option 1412*f* that is selectable to replace the first respective text 1424*a* in the text entry field 1414 with first text 1412*f* corresponding to a respective contact, the first text 1412*f* having a visual characteristic having a first value (1510) (e.g., a first color, size, font, or text styling). In some embodiments, the suggested entry user interface element is a region of the user interface in which the electronic device displays one or more suggestions of text corresponding to text entered in the text entry field, such as one or more words that begin with the text entered in the text entry field, one or more corrected spelling suggestions corresponding to text entered in the text entry field, one or more Unicode images (e.g., emojis) corresponding to text entered in the text entry field, etc. For example, in response to detecting entry of the characters "Hel," the electronic device displays "Hello" within the suggested entry user interface element. In some embodiments, in response to detecting selection of the word "Hello," the electronic device enters "Hello" into the text entry field. In some embodiments, the electronic device displays one or more suggested words in the suggested entry user interface that are identified as being likely to follow the text previously entered in the text entry field. For example, if Alice enters "Hello, my name is" into the text entry field, the electronic device displays "Alice" in the suggested entry user interface element because Alice is likely to enter the word "Alice" after "Hello, my name is." In some embodiments, in response to detecting selection of a word or image displayed in the suggested entry user interface element, the electronic device enters the selected word or image into the text entry field. In some embodiments, the first respective text is at least a portion of a name associated with a contact in the messaging conversation. In response to detecting selection of the first text, the electronic device enters the first text having the visual characteristic having the first value into the text entry field and associates the first text with the contact in a manner similar to one or more steps of method 1100. For example, Alexander types a message to Bernadette including entry of "Bern." In this example, the electronic device displays "Bernadette" in the suggested entry user interface element (e.g., with the visual characteristic having the first value) because the text likely corresponds to Bernadette's name. In some embodiments, the electronic device only displays the first text in the suggested entry user interface element (e.g., with the visual characteristic having the first value) if the first text matches the name of the contact. For example, the electronic device does not suggest "Bernadette" until Alexander enters the text "Bernadette."

In some embodiments, such as in FIG. 14B, in accordance with a determination that the first respective text 1422*a* does not correspond to a contact (1512), the electronic device 500 displays, in a suggested user interface element 1410 (1508) a second selectable option 1412*c* that is selectable to replace the first respective text 1422*a* in the text entry field 1414 with second text 1412*c*, different from the first text, the second text 1412*c* having the visual characteristic having a second value, different from the first value (1514) (e.g., a second size, color, font, or text styling) without displaying, in the suggested entry user interface element, the first selectable option (1516). For example, the first respective text is not a portion of the name of a contact in the messaging conversation or the name of a contact in the messaging conversation. In some embodiments, while the text is less than a threshold number of characters in length (e.g., 2 or 3 or 4 characters), the electronic device does not display the name of the contact in the suggested entry user interface element. For example, Alexander types a message to Bernadette, including entry of the character "B." In this example, the electronic device forgoes displaying "Bernadette" in the suggested entry user interface element because the text could correspond to many words other than "Bernadette." In some embodiments, text that does not correspond to a contact in the messaging conversation is displayed, once entered into the messaging conversation, with the visual characteristic having the second value. In some embodiments, the second text is one or more of a spelling correction of the first text, a completed word corresponding to the first text, and/or a predicted word based on the first text and text entered before the first text. In some embodiments, in response to detecting entry of text that does not include text corresponding to a contact in the messaging conversation, the electronic device forgoes displaying the first selectable option that is selectable to replace the first respective text with first text having the visual characteristic with the first value. In some embodiments, the user continues to enter text (e.g., with the soft keyboard or other input mechanism other than the suggested entry region of the user interface) and, in accordance with a determination that the entered text no longer corresponds to the text displayed in the suggested entry user interface element, the electronic device updates the suggested entry user interface element to display options to enter text that correspond to the updated text in the text entry field. In some embodiments, the electronic device continues to display the same options in the suggested entry user interface element if the updated text still corresponds to the options displayed in the suggested entry user interface element. The above-described manner of displaying the first selectable option in the suggested entry user interface element in accordance with the determination that the first respective text corresponds to a contact enables the electronic device to provide an efficient way to associate the first respective text with the contact, which simplifies the interaction between the user and the electronic device and enhances the operability of the electronic device and makes the user-device interface more efficient (e.g., by reducing the number of inputs needed to associate the first respective text with the contact), which additionally reduces power usage and improves battery life of the electronic device by enabling the user to use the electronic device more quickly and efficiently.

In some embodiments, such as in FIG. 14J, in response to receiving the indication of entry of the first respective text 1426*a*, in accordance with a determination that the first respective text 1426*a* corresponds to a first contact and a second contact the electronic device 500 displays, in the suggested entry user interface element 1410, a first respective selectable option 1412*h* that is selectable to replace the first respective text 1426*a* in the text entry field 1414 with third text corresponding to the first contact, the third text having the visual characteristic having the first value and a second respective selectable option 1412*i* that is selectable to replace the first respective text 1426*a* in the text entry field 1414 with fourth text corresponding to the second contact, the fourth text having the visual characteristic having the first value (e.g., names of the first contact and the second contact both include the first respective text). For example, the first contact and the second contact have the same first name and the first respective text is the first name of the first contact and the second contact, or the first respective text corresponds to a portion of the first names of both contacts (e.g., "Mar" corresponding to "Mary" and "Mario"). In some embodiments, the first respective selectable option includes a visual indication associated with the first contact (e.g., a visual representation of the first contact), such as an image included in a contact card of the first contact. In response to detecting selection of the first selectable option, the electronic device enters text associated with the first contact. In some embodiments, the second respective selectable option includes a visual indication of the second contact, such as an image included in a contact card of the second contact. In response to detecting selection of the first selectable option, the electronic device enters text associated with the second contact. The above-described manner of displaying selectable options associated with both the first contact and the second contact enables the electronic device to efficiently provide a mechanism by which the user is able to associate the first respective text with the contact to which the user wishes to refer, which simplifies the interaction between the user and the electronic device and enhances the operability of the electronic device and makes the user-device interface more efficient (e.g., by reducing the number of inputs needed to associate the text with a desired one of the two contacts to which the text corresponds), which additionally reduces power usage and improves battery life of the electronic device by enabling the user to use the electronic device more quickly and efficiently.

In some embodiments, such as in FIG. 14J, the respective contact is included in the conversation (e.g., the respective contact has access to the content of the messaging conversation). In some embodiments, such as in FIG. 14K, in response to receiving the indication of entry of the first respective text 1428, in accordance with a determination that the first respective text 1428 corresponds to a second respective contact that is not included in the conversation (e.g., the second respective contact does not have access to the content of the messaging conversation), the electronic device 500 forgoes displaying, in the suggested entry user interface element 1410, a selectable option that is selectable to replace the first respective text 1428 in the text entry field with third text corresponding to the second respective contact. In some embodiments, the electronic device is not able to associate text with a contact not included in the conversation because contacts not included in the conversation are not able to view messages in the conversation, including a message that has text associated with the contact. In some embodiments, the selected entry user interface element includes a selectable option that, when selected, causes the electronic device to enter text corresponding to the name of second respective contact that is not a link (e.g., a rich link) associated with the second respective contact. The above-described manner of forgoing displaying the selectable option to replace the first respective text with text corresponding to a second respective contact not included in the messaging conversation enables the electronic device to only associate text with users that are able to view the contents of the messaging conversation, which simplifies the interaction between the user and the electronic device and enhances the operability of the electronic device and makes the user-device interface more efficient (e.g., by reducing the user inputs needed to correct user error of attempting to associate text of a message with a contact that is unable to view the message), which additionally reduces power usage and improves battery life of the electronic device by enabling the user to use the electronic device more quickly and efficiently.

In some embodiments, the second text 1412*e* is a spelling-corrected version of the first respective text 1424*a*, such as in FIG. 14C. In some embodiments, the electronic device displays a word included in a dictionary that corresponds to the first respective text, which is not included in the dictionary, in the suggested entry user interface element. In some embodiments, the electronic device concurrently displays the spelling-corrected version of the first respective text with the selectable option that is selectable to replace the first respective text with first text corresponding to a respective contact. The above-described manner of displaying the spelling-corrected version of the first respective text in the suggested entry user interface element enables the electronic device to provide an efficient way to enter the spelling-corrected version of the first respective text, which simplifies the interaction between the user and the electronic device and enhances the operability of the electronic device and makes the user-device interface more efficient (e.g., by reducing the number of inputs needed to correct the spelling of the first respective text), which additionally reduces power usage and improves battery life of the electronic device by enabling the user to use the electronic device more quickly and efficiently.

In some embodiments, such as in FIG. 14C, the first text 1412*d* is the same as the first respective text 1424*a*. In some embodiments, the text of the first respective text matches the text of the first text corresponding to the respective contact. The first text corresponding to the respective contact is optionally displayed with a visual characteristic different from a visual characteristic of the first respective text to indicate that the first text is a link (e.g., a rich link) associated with the respective contact. For example, in a conversation with a contact named Eve Smith, if the first respective text is "Eve," the first text associated with the contact Eve Smith also says "Eve" but is displayed in a different color than other text in the conversation that is not associated with a contact in the conversation. In this example, if the first respective text is "Smith," the first respective text associated with the contact Eve Smith also says "Smith." In some embodiments, in response to detecting entry of text that matches a name (e.g., a first name, last name, or nickname) of a contact, the electronic device presents the selectable option to replace the text with a version of the text that is associated with the contact without updating the content of the text (e.g., without replacing the first name, last name, or nickname with the full name of the contact). The above-described manner of the first text being the same as the first respective text enables the electronic device to provide an efficient way to associate a contact with the text even if the user has already entered the name of the contact, which simplifies the interaction between the user and the electronic device and enhances the operability of the electronic device and makes the user-device interface more efficient (e.g., by reducing the number of inputs needed to customize the text that should be associated with the contact), which additionally reduces power usage and improves battery life of the electronic device by enabling the user to use the electronic device more quickly and efficiently.

In some embodiments, such as in FIG. 14C, the second text 1412*e*, is different from the first respective text 1424*a*. In some embodiments, the second text is a spelling-corrected version of the first respective text or text that begins with the first respective text. For example, if the first respective text is "ber," the second text is "berry", and the first text is "Bernadette". The above-described manner of displaying second text different from the first respective text in the suggested entry user interface element enables the electronic device to provide an efficient way to continue to suggest text for entry that is not tied to respective contacts, which simplifies the interaction between the user and the electronic device and enhances the operability of the electronic device and makes the user-device interface more efficient (e.g., by reducing the inputs needed to enter the second text), which additionally reduces power usage and improves battery life of the electronic device by enabling the user to use the electronic device more quickly and efficiently.

In some embodiments, such as in FIG. 14C, the first selectable option 1412*f* includes a representation of the first text and a representation 1413*a* of the respective contact corresponding to the first text 1424*a*, wherein the representation 1413*a* of the respective contact is different from the representation of the first text. In some embodiments, the representation of the respective contact is an image associated with a contact card of the contact. In some embodiments, selection of the first selectable option enters the first text without entering the representation of the respective contact. In some embodiments, the electronic device concurrently displays the first selectable option and another selectable option that also corresponds to the name of the contact (e.g., same text as the first text) that does not include the representation of the contact and, if selected, enters the text of the name of the contact without associating the text with the contact. In some embodiments, the electronic device displays the other selectable option without also concurrently displaying the first selectable option. The above-described manner of displaying the representation of the contact with the first selectable option enables the electronic device to efficiently indicate the contact with which the text will be associated in response to detecting selection of the first selectable option, which simplifies the interaction between the user and the electronic device and enhances the operability of the electronic device and makes the user-device interface more efficient (e.g., by reducing the number of inputs needed to determine the contact associated with the first selectable option), which additionally reduces power usage and improves battery life of the electronic device by enabling the user to use the electronic device more quickly and efficiently.

In some embodiments, such as in FIG. 14D, in response to receiving the indication of entry of the first respective text 1424*a*, in accordance with the determination that the first respective text 1424*a* corresponds to the contact, the electronic device 500 concurrently displays, in the suggested entry user interface element 1410, the first selectable option 1412*f* that is selectable to replace the first respective text 1424*a* in the text entry field with the first text corresponding to the respective contact, the first text having the visual characteristic having the first value and the second selectable option 1412*e* that is selectable to replace the first respective text 1424*a* in the text entry field with the second text, the second text having the visual characteristic having the second value. In some embodiments, the electronic device concurrently displays options to enter text associated with a respective contact and to enter second text that is not associated with the respective contact in the suggested entry user interface element. The above-described manner of concurrently displaying the first selectable option and the second selectable option enables the electronic device to efficiently provide the user with options to replace the first text with text associated with a respective contact or with other text not associated with the contact, which simplifies the interaction between the user and the electronic device and enhances the operability of the electronic device and makes the user-device interface more efficient (e.g., by reducing the number of inputs needed to access both options), which additionally reduces power usage and improves battery life of the electronic device by enabling the user to use the electronic device more quickly and efficiently.

In some embodiments, such as in FIG. 14D, first text 1412*e* corresponds to the name of the respective contact, and the second text 1412*f* corresponds to the name of the respective contact. In some embodiments, the name of the respective contact is a first name, last name, or nickname associated with a contact card of the respective contact. The second text is optionally the same as the first text, but is not associated with the contact (e.g., selection of the second selectable option will cause entry of the name of the contact without associating the name of the contact with the contact). The above-described manner of displaying options to add the name of the contact associated with the contact or to add the name of the contact not associated with the contact enables the electronic device to efficiently provide options to add the link (e.g., a rich link) to the contact or the plain text version of the contact's name, which simplifies the interaction between the user and the electronic device and enhances the operability of the electronic device and makes the user-device interface more efficient (e.g., by reducing the number of inputs needed to view both options and to add either text to the message), which additionally reduces power usage and improves battery life of the electronic device by enabling the user to use the electronic device more quickly and efficiently.

It should be understood that the particular order in which the operations in FIG. 15 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and 1300) are also applicable in an analogous manner to method 1500 described above with respect to FIG. 15. For example, the ways of creating and presenting mentions described above with reference to method 1500 optionally have one or more of the characteristics of the ways of presenting representations of messaging conversations, presenting indications of messages that are replies to other messages in a messaging conversation, and creating and presenting mentions etc., described herein with reference to other methods described herein (e.g., methods 700, 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 15 are, optionally, implemented by components depicted in FIGS. 1A-1B. For example, displaying operation 1502 and receiving operation 1504 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, accessing the contact information of the user enables the electronic device to send and receive messages, and/or provide link (e.g., rich link or "mention") functionality. Accordingly, use of such personal information data enables users to communicate with other devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can restrict sharing of personal information when creating and presenting mentions or when being mentioned by others in a conversation.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can block sharing of contact information or other personal information while creating and presenting mentions or when being mentioned by another user in a conversation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at an electronic device in communication with a display generation component and one or more input devices:

displaying, via the display generation component, a messaging user interface including a first plurality of representations of a first plurality of messages in a messaging conversation, wherein the first plurality of representations include a first representation of a first message, a first set of one or more representations of one or more second messages that are replies to the first message, and a second set of one or more representations of one or more third messages that are not replies to the first message, wherein the one or more third messages are temporally located between the first message and the one or more second messages;

while displaying the messaging user interface, receiving, via the one or more input devices, an input corresponding to a request to view replies to the first message; and in response to receiving the input corresponding to the request to view the replies to the first message:

displaying, via the display generation component, a replies user interface that is overlaid on the messaging user interface and includes a second plurality of representations of a second plurality of messages, wherein the second plurality of messages is a subset of the first plurality of messages, wherein the replies user interface:

includes a second representation of the first message and a second set of one or more representations of the one or more second messages that are replies to the first message, does not include representations of the one or more third messages that are not replies to the first message, and is a different user interface from the messaging user interface and is configured to receive an input to reply to the first message or the one or more second messages that are replies to the first message but is not configured to receive an input to reply to the one or more third messages that are not replies to the first message, and wherein:

in the messaging user interface, the first set of one or more representations are displayed in association with one or more visual indications that the one or more second messages are replies to the first message, and in the replies user interface, the second set of one or more representations are not displayed in association with the one or more visual indications that the one or more second messages are replies to the first message.

2. The method of claim 1, further comprising:

while displaying the messaging user interface including the first representation of the first message, wherein the messaging user interface includes a first respective representation of a first respective message, different from the first message, that is a most recent message in the messaging conversation, receiving an indication that a second respective message that is a reply to the first message has been added to the messaging conversation; and in response to receiving the indication that the second respective message has been added to the messaging conversation:

in accordance with a determination that the first respective message is not a reply to the first message, updating the messaging user interface to include:

a representation of the second respective message; and a third representation of the first message displayed in association with the representation of the second respective message; and in accordance with a determination that the first respective message is a reply to the first message, updating the messaging user interface to include a representation of the second respective message without including the third representation of the first message.

3. The method of claim 1, wherein the input corresponding to the request to view the replies to the first message includes selection of a selectable option displayed in association with the first representation of the first message in the messaging user interface.

4. The method of claim 3, wherein the selectable option includes a visual indication of a number of replies to the first message in the messaging conversation.

5. The method of claim 1, wherein:

before receiving the input corresponding to the request to view the replies to the first message, the messaging user interface is displayed with a visual characteristic having a first value, and while displaying the replies user interface overlaid on the messaging user interface, the messaging user interface is displayed with the visual characteristic having a second value, different from the first value.

6. The method of claim 1, further comprising:

while displaying the replies user interface overlaid on the messaging user interface, receiving an indication that a first respective message has been added to the messaging conversation; and in response to receiving the indication that the first respective message has been added to the messaging conversation, updating the messaging user interface to include a first respective representation of the first respective message while maintaining display of the replies user interface overlaid on the messaging user interface.

7. The method of claim 1, wherein the replies user interface includes a selectable option that is selectable to initiate a process to reply to the first message in the messaging conversation.

8. The method of claim 1, further comprising:

while displaying the replies user interface, receiving an indication that a first respective message has been added to the messaging conversation as a reply to the first message; and in response to receiving the indication that the first respective message has been added to the messaging conversation as the reply to the first message, updating the replies user interface to include a first respective representation of the first respective message.

9. The method of claim 1, wherein:

the replies user interface is displayed in response to the input corresponding to the request to view the replies to the first message satisfying one or more first criteria or one or more second criteria, the one or more first criteria are satisfied when the input includes selection of a selectable option displayed in association with the first representation of the first message in the messaging user interface, and the one or more second criteria are satisfied when the input includes selection of a respective representation of the first set of one or more representations.

10. The method of claim 1, wherein:

the first set of one or more representations includes a respective representation of a first respective message, in accordance with a determination that the first respective message is a direct reply to the first message, the respective representation is displayed in association with a visual indication indicating that the first respective message is a reply to the first message, and in accordance with a determination that the first respective message is a reply to a second respective message that is a reply to the first message, and is not a direct reply to the first message, the respective representation is displayed in association with the visual indication indicating that the first respective message is a reply to the first message.

11. The method of claim 1, wherein the replies user interface is overlaid on the messaging user interface with at least some transparency.

12. The method of claim 1, wherein the replies user interface is overlaid on the messaging user interface such that the messaging user interface is at least partially visible while the replies user interface is overlaid on the messaging user interface.

13. The method of claim 1, wherein:

the first set of one or more representations of the one or more second messages are displayed in association with a third representation of the first message, different from the first representation of the first message and the second representation of the first message, in the messaging user interface; and the replies user interface does not include a representation of the first message other than the second representation of the first message.

14. An electronic device, comprising:

one or more processors;

memory; and one or more programs, wherein the one or more programs are stored in the memory and configured to be executed by the one or more processors, the one or more programs including instructions for:

displaying, via a display generation component, a messaging user interface including a first plurality of representations of a first plurality of messages in a messaging conversation, wherein the first plurality of representations include a first representation of a first message, a first set of one or more representations of one or more second messages that are replies to the first message, and a second set of one or more representations of one or more third messages that are not replies to the first message, wherein the one or more third messages are temporally located between the first message and the one or more second messages;

while displaying the messaging user interface, receiving, via one or more input devices, an input corresponding to a request to view replies to the first message; and in response to receiving the input corresponding to the request to view the replies to the first message:

displaying, via the display generation component, a replies user interface that is overlaid on the messaging user interface and includes a second plurality of representations of a second plurality of messages, wherein the second plurality of messages is a subset of the first plurality of messages, wherein the replies user interface:

includes a second representation of the first message and a second set of one or more representations of the one or more second messages that are replies to the first message, does not include representations of the one or more third messages that are not replies to the first message, and is a different user interface from the messaging user interface and is configured to receive an input to reply to the first message or the one or more second messages that are replies to the first message but is not configured to receive an input to reply to the one or more third messages that are not replies to the first message, and wherein:

in the messaging user interface, the first set of one or more representations are displayed in association with one or more visual indications that the one or more second messages are replies to the first message, and in the replies user interface, the second set of one or more representations are not displayed in association with the one or more visual indications that the one or more second messages are replies to the first message.

15. A non-transitory computer readable storage medium storing one or more programs, the one or more programs comprising instructions, which when executed by one or more processors of an electronic device, cause the electronic device to perform a method comprising:

displaying, via a display generation component, a messaging user interface including a first plurality of representations of a first plurality of messages in a messaging conversation, wherein the first plurality of representations include a first representation of a first message, a first set of one or more representations of one or more second messages that are replies to the first message, and a second set of one or more representations of one or more third messages that are not replies to the first message, wherein the one or more third messages are temporally located between the first message and the one or more second messages;

while displaying the messaging user interface, receiving, via one or more input devices, an input corresponding to a request to view replies to the first message; and in response to receiving the input corresponding to the request to view the replies to the first message:

displaying, via the display generation component, a replies user interface that is overlaid on the messaging user interface and includes a second plurality of representations of a second plurality of messages, wherein the second plurality of messages is a subset of the first plurality of messages, wherein the replies user interface:

includes a second representation of the first message and a second set of one or more representations of the one or more second messages that are replies to the first message, does not include representations of the one or more third messages that are not replies to the first message, and is a different user interface from the messaging user interface and is configured to receive an input to reply to the first message or the one or more second messages that are replies to the first message but is not configured to receive an input to reply to the one or more third messages that are not replies to the first message, and wherein:

in the messaging user interface, the first set of one or more representations are displayed in association with one or more visual indications that the one or more second messages are replies to the first message, and in the replies user interface, the second set of one or more representations are not displayed in association with the one or more visual indications that the one or more second messages are replies to the first message.

* * * * *